US009930536B2

(12) United States Patent
Smith et al.

(10) Patent No.: US 9,930,536 B2
(45) Date of Patent: Mar. 27, 2018

(54) METHODS AND SYSTEMS FOR DYNAMIC SPECTRUM ARBITRAGE

(71) Applicant: RIVADA NETWORKS, LLC, Colorado Springs, CO (US)

(72) Inventors: Clint Smith, Warwick, NY (US); Samuel Smith, Warwick, NY (US)

(73) Assignee: RIVADA NETWORKS, LLC., Colorado Springs, CO (US)

( * ) Notice: Subject to any disclaimer, the term of this patent is extended or adjusted under 35 U.S.C. 154(b) by 141 days.

(21) Appl. No.: 15/133,539

(22) Filed: Apr. 20, 2016

(65) Prior Publication Data

US 2016/0234828 A1 Aug. 11, 2016

Related U.S. Application Data

(63) Continuation-in-part of application No. 14/591,095, filed on Jan. 7, 2015, now Pat. No. 9,532,229, which
(Continued)

(51) Int. Cl.
*H04W 72/04* (2009.01)
*H04W 16/14* (2009.01)
(Continued)

(52) U.S. Cl.
CPC ........... *H04W 16/14* (2013.01); *H04W 4/206* (2013.01); *H04W 4/22* (2013.01); *H04W 72/00* (2013.01);
(Continued)

(58) Field of Classification Search
CPC ....... H04W 72/04; H04W 16/14; H04W 4/20; H04W 72/048; H04W 4/206; H04W 72/0453
See application file for complete search history.

(56) References Cited

U.S. PATENT DOCUMENTS 6,564,066 B1    5/2003 Biggs et al.
6,650,619 B1   11/2003 Schuster et al.
(Continued)

FOREIGN PATENT DOCUMENTS

EP            1037484 A1    8/2000
KR   10-2007-0066399 A      6/2007
(Continued)

OTHER PUBLICATIONS

Extended European Search Report, Application No. 11807526.6-1857, dated Apr. 8, 2016.
(Continued)

*Primary Examiner* — Andrew Lee
(74) *Attorney, Agent, or Firm* — The Marbury Law Group, PLLC

(57) ABSTRACT

Methods, devices, and systems of various embodiments involve dynamic spectrum arbitrage (DSA) to determine, in a first server, an amount of radio frequency (RF) spectrum resources available for delivery of advertisements. A first DSA-advertisement lease proposal may be sent to a telecommunications exchange. The first DSA-advertisement lease proposal indicates the amount of RF spectrum resources available for delivery of the advertisements. A lease confirmation message may be received, including an ad-information unit configured to deliver content of an advertisement within a designated geographic zone. Advertisement-lease parameters may be sent to a second server in the first communication network. The advertisement-lease parameters may include the ad-information unit and identify the designated geographic zone for delivery of the advertisement to user equipment (UE) situated therein. An ad-report message may be received from the second server reporting delivery of the advertisement to UEs within the designated geographic zone.

30 Claims, 63 Drawing Sheets

Related U.S. Application Data is a continuation of application No. 14/166,127, filed on Jan. 28, 2014, now Pat. No. 8,964,685, which is a continuation of application No. 13/181,764, filed on Jul. 13, 2011, now Pat. No. 8,711,721.

(60) Provisional application No. 61/364,670, filed on Jul. 15, 2010, provisional application No. 61/410,721, filed on Nov. 5, 2010, provisional application No. 61/479,702, filed on Apr. 27, 2011, provisional application No. 61/490,471, filed on May 26, 2011.

(51) Int. Cl.
| | | |
|---|---|---|
| *H04W 4/20* | (2018.01) | |
| *H04W 4/22* | (2009.01) | |
| *H04W 72/00* | (2009.01) | |
| *H04M 15/00* | (2006.01) | |
| *H04W 24/00* | (2009.01) | |
| *H04W 28/16* | (2009.01) | |
| *H04W 36/00* | (2009.01) | |

(52) U.S. Cl.
CPC ........ *H04M 15/60* (2013.01); *H04M 15/8083* (2013.01); *H04W 24/00* (2013.01); *H04W 28/16* (2013.01); *H04W 36/005* (2013.01); *H04W 72/04* (2013.01)

(56) References Cited

U.S. PATENT DOCUMENTS

| | | | |
|---|---|---|---|
| 7,593,721 | B2 | 9/2009 | Ratnakar |
| 8,170,048 | B1 | 5/2012 | Gossett et al. |
| 8,279,786 | B1 | 10/2012 | Smith et al. |
| 2003/0050070 | A1 | 3/2003 | Mashinsky et al. |
| 2005/0038900 | A1* | 2/2005 | Krassner ............... G06Q 30/02 709/231 |
| 2007/0004421 | A1 | 1/2007 | Chambers et al. |
| 2007/0139182 | A1 | 6/2007 | O'Connor et al. |
| 2007/0149187 | A1 | 6/2007 | Levy |
| 2007/0213069 | A1 | 9/2007 | Ji et al. |
| 2007/0254623 | A1 | 11/2007 | Branda et al. |
| 2007/0275690 | A1 | 11/2007 | Hunter et al. |
| 2008/0010674 | A1 | 1/2008 | Lee |
| 2008/0039090 | A1* | 2/2008 | Jin ....................... H04W 36/26 455/436 |
| 2008/0108365 | A1 | 5/2008 | Buddhikot et al. |
| 2008/0133336 | A1 | 6/2008 | Altman et al. |
| 2009/0059856 | A1 | 3/2009 | Kermoal et al. |
| 2009/0161614 | A1 | 6/2009 | Grandblaise et al. |
| 2009/0215446 | A1 | 8/2009 | Hapsari et al. |
| 2009/0247204 | A1 | 10/2009 | Sennet et al. |
| 2010/0009695 | A1 | 1/2010 | Kwon et al. |
| 2010/0220687 | A1 | 9/2010 | Reznik |
| 2010/0302988 | A1 | 12/2010 | Becker |
| 2010/0303026 | A1 | 12/2010 | Chaudhri et al. |
| 2011/0007706 | A1 | 1/2011 | Shaikh |
| 2012/0022928 | A1 | 1/2012 | Wu |
| 2012/0077510 | A1 | 3/2012 | Chen et al. |
| 2012/0120887 | A1 | 5/2012 | Deaton et al. |
| 2012/0264396 | A1 | 10/2012 | Smith et al. |
| 2012/0304213 | A1 | 11/2012 | Lee et al. |
| 2013/0044614 | A1 | 2/2013 | Aguirre et al. |
| 2013/0185162 | A1* | 7/2013 | Mo ..................... G06Q 30/0241 705/14.69 |
| 2013/0190003 | A1 | 7/2013 | Smith et al. |
| 2014/0149221 | A1* | 5/2014 | Rycyna, III ........ G06Q 30/0264 705/14.61 |
| 2014/0355523 | A1* | 12/2014 | Congdon ............... H04W 76/02 370/328 |
| 2014/0355570 | A1* | 12/2014 | Smith ............... H04W 36/0072 370/332 |
| 2015/0332341 | A1* | 11/2015 | Gadoury ............ G06Q 30/0251 705/14.66 |
| 2016/0026983 | A1* | 1/2016 | Lindsley ............... G06Q 20/123 705/26.81 |
| 2016/0210666 | A1* | 7/2016 | Ataka ................. G06Q 30/0255 |
| 2016/0241489 | A1* | 8/2016 | Zheng ................. H04L 61/6063 |
| 2017/0207975 | A1* | 7/2017 | Smith ................. H04L 41/0893 |
| 2017/0223005 | A1* | 8/2017 | Birgisson ................ H04L 63/08 |

FOREIGN PATENT DOCUMENTS

| | | |
|---|---|---|
| WO | 00/56099 A1 | 9/2000 |
| WO | 2012-009557 A2 | 1/2012 |
| WO | 2012-134023 A1 | 10/2012 |

OTHER PUBLICATIONS

Chinese Office Action from Chinese Application 201180044034.5 dated Nov. 4, 2015.
International Preliminary Report on Patentability issued in PCT Application No. PCT/US2011/044042 dated Jan. 24, 2013.
International Search Report and Written Opinion for International Application No. PCT/US2014/019554 dated Jun. 20, 2014.
International Search Report and Written Opinion for International Application No. PCT/US2014/017574 dated Jul. 9, 2014.
International Search Report and Written Opinion for International Application No. PCT/US2014/024420 dated Aug. 5, 2014.
International Search Report and Written Opinion for International Application No. PCT/US2014/026086 dated Aug. 25, 2014.
Notification of Transmittal of the International Search Report and the Written Opinion of the International Searching Authority or the Declaration issued for International Application No. PCT/US2017/028270 dated Jul. 18, 2017.

\* cited by examiner

US 9,930,536 B2

METHODS AND SYSTEMS FOR DYNAMIC SPECTRUM ARBITRAGE

RELATED PATENT APPLICATIONS

This application is a continuation-in-part of U.S. patent application Ser. No. 14/591,095 entitled "Methods and Systems for Dynamic Spectrum Arbitrage" filed on Jan. 7, 2015, which is a continuation of U.S. patent application Ser. No. 14/166,127 entitled "Methods and Systems for Dynamic Spectrum Arbitrage" filed on Jan. 28, 2014, issued on Feb. 24, 2015 as U.S. Pat. No. 8,964,685, which is a continuation of U.S. patent application Ser. No. 13/181,764 filed on Jul. 13, 2011, issued on Apr. 29, 2014 as U.S. Pat. No. 8,711,721, which claims the benefit of priority to U.S. Provisional Patent Applications: 61/364,670 filed on Jul. 15, 2010; 61/410,721 filed on Nov. 5, 2010; 61/479,702 filed on Apr. 27, 2011; and 61/490,471 filed on May 26, 2011, the entire contents of each of which are hereby incorporated by reference for all purposes.

This application is also related to U.S. Pat. No. 8,279,786 entitled "Methods and Systems for Dynamic Spectrum Arbitrage" filed on Jun. 21, 2012, and U.S. patent application Ser. No. 13/693,441 entitled "Methods and Systems for Dynamic Spectrum Arbitrage" filed on Dec. 4, 2012, which are also continuations of U.S. patent application Ser. No. 13/181,764.

BACKGROUND

With the ever increasing use of wireless communication devices for accessing networks and downloading large files (e.g., video files), there is an increasing demand for radio frequency spectrum. Smart phone users complain about dropped calls, slow access to the Internet and similar problems which are due largely to too many devices trying to access finite RF bandwidth allocated to such services. Yet parts of the RF spectrum, such as the RF bands dedicated to emergency services (e.g., police, fire and rescue, etc.) go largely unused due to the non-continuous and episodic employment of such voice-radio communication bands.

SUMMARY

According to a first embodiment, a method for dynamically managing radio frequency (RF) spectrum resources in frequency, space and time includes monitoring the use of RF spectrum resources at a first network and determining an amount of unused RF spectrum resources in the first network. The method includes allocating a portion of the amount of unused RF spectrum resources of the first network for use by secondary users and receiving a request for additional RF spectrum resources from a second network. The method includes providing the second network access to the unused RF spectrum resources of the first network. The method may include off-loading a secondary user from the first network.

According to another embodiment, a communication system comprising a server configured with server-executable instructions to perform operations comprises a dynamic spectrum arbitrage and management. The management enables radio frequency spectrum to be made available to RF devices in frequency, space and time as described herein. In another embodiment, a server configured with server-executable instructions to perform operations comprises a dynamic spectrum arbitrage and management. The management enables radio frequency spectrum to be made available to RF devices in frequency, space and time.

In another embodiment, radiofrequency spectrum clearinghouse includes a server for monitoring the use of RF spectrum resources. The clearinghouse determines an amount of unused RF spectrum resources in a first communication system and allocates a portion of the amount of unused RF spectrum resources for use by secondary users. The server forms allocated shares of the unused RF spectrum resources of the first communication system. The allocated shares are to be utilized by a second communication system. The server may communicate the availability of the allocated shares to the second communication system.

According to various embodiments, a dynamic spectrum arbitrage (DSA) method may determine, in a first server, an amount of radio frequency (RF) spectrum resources available for delivery of one or more advertisements to a designated geographic zone within a first communication network. A first DSA-advertisement lease proposal may be sent from the first server to a telecommunications exchange. The first DSA-advertisement lease proposal may indicate the amount of RF spectrum resources available for delivery of the one or more advertisements. A lease confirmation message may be received in the first server, including an ad-information unit configured to deliver content of an advertisement within the designated geographic zone in accordance with the first DSA-advertisement lease proposal. Advertisement-lease parameters may be sent to a second server in the first communication network. The advertisement-lease parameters may include the ad-information unit and identify the designated geographic zone for delivery of the advertisement to user equipment (UE) situated therein. An ad-report message may be received in the first server from the second server reporting delivery of the advertisement to one or more UEs within the designated geographic zone.

In some embodiments, the DSA method may include a location information unit regarding a plurality of UEs being received from the second server. The determined amount of RF spectrum resources available may be based on the received location information. The advertisement-lease parameters may limit a period during which the advertisement is delivered to the UE situated in the designated geographic zone. A second DSA-advertisement lease proposal may be generated, including revisions from the first DSA-advertisement lease proposal based on the received ad-report message. The second DSA-advertisement lease proposal may be sent from the first server to the telecommunications exchange. The first DSA-advertisement lease proposal may be sent to the telecommunications exchange to offer a DSA-Ad lease as part of an auction. The DSA-Ad lease may dedicate at least a portion of the determined amount of RF spectrum resources for delivering the one or more advertisements within the first communication network. The DSA-Ad lease may limit a boundary within the designated geographic zone in which the advertisement is delivered. The DSA-Ad lease may limit a period during which the advertisement is delivered to the UE situated in the designated geographic zone.

In some embodiments, a request for a DSA-advertising lease proposal may be received in the first server from the telecommunications exchange. The request may define the designated geographic zone. Determining the amount of RF spectrum resources available for delivery of advertisements may include monitoring communications in the first communication network to determine the amount of RF spectrum resources in use. In addition, a difference may be determined between the amount of RF spectrum resources controlled by the first communication network and the determined amount of RF spectrum resources in use. The ad-report message may be sent by the first server to at least one of the telecommunications exchange and an advertiser. The ad-report message may report delivery of the advertisement to the one or more UEs within the designated geographic zone.

According to various embodiments, a DSA method may sending, to a first server, a location information unit regarding a plurality of user equipment (UE) using radio frequency (RF) spectrum resources within a first communication network. Advertisement-lease parameters may be received from the first server identify a designated geographic zone for delivery of an advertisement to UEs situated therein. The advertisement-lease parameters may include an ad-information unit configured to deliver content of the advertisement within the designated geographic zone. An ad-lease designation message identifying the designated geographic zone for delivery of the ad-information unit may be sent to a second communication network. A locator message may be received indicating a first UE is situated in the designated geographic zone. The ad-information unit may be sent to the second communication network to deliver the advertisement to the first UE.

In some embodiments, an ad-report message may be received from the second communication network reporting delivery of the advertisement to one or more UEs within the designated geographic zone. An ad-report message may be sent to the first server reporting delivery of the advertisement to one or more UEs within the designated geographic zone.

Further embodiments include network communications circuitry for communicating with a telecommunications exchange and a dynamic spectrum controller, a memory, and processor coupled to the memory and the network communications circuitry. The processor may be configured to perform operations of the methods summarized above. Further embodiments include a dynamic spectrum controller and/or a dynamic spectrum policy controller having means for performing functions of the methods summarized above. Further embodiments include a processor-readable storage medium on which are stored processor-executable instructions configured to cause a processor of network communications circuitry to perform operations of the methods summarized above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
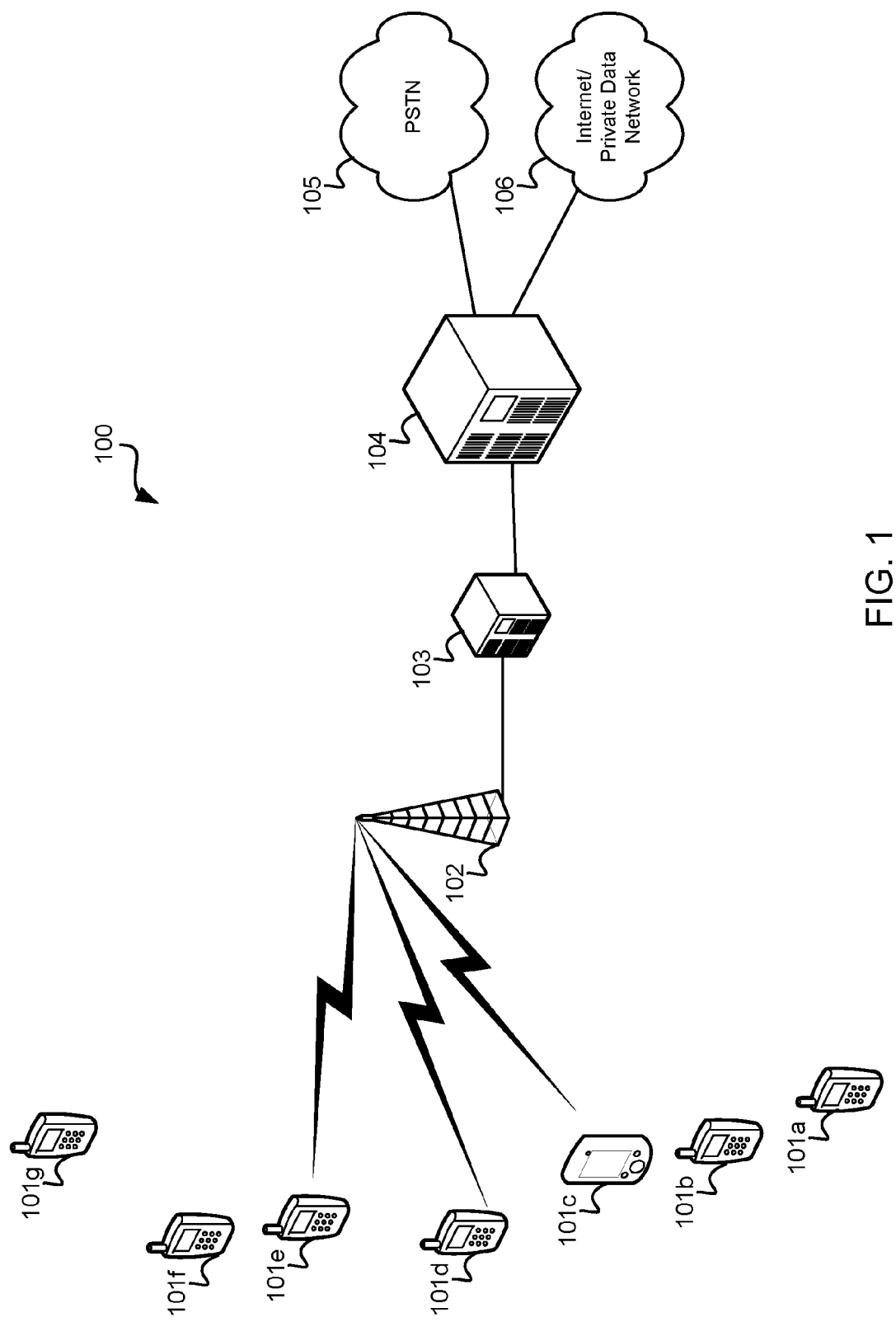
FIG. 1 is a system block diagram illustrating call volume requests made to a cellular communication network under normal conditions.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device," "wireless device" and "user equipment (UE)" may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a mobile device), which can communicate via a cellular telephone communications network.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.). With the ubiquity of wireless device ownership and usage, emergency communication via wireless devices using commercial cellular communication networks often are the most efficient and effective means to mobilize emergency response personnel and resources. Enabling wireless devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a wireless device.

Emergency communications over cellular communication networks is not without problems, however. As discussed above in the Background, cellular communication networks ("networks") are designed to accommodate access requests from only a fraction of the total number of wireless devices in a particular cell. At times of emergency or crisis, network resources may become overtaxed when predictable human responses to the situation prompt an extraordinary number of wireless device users within a particular cell to access the network at the same time. Wireless device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using wireless devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To illustrate the problem, consider the case of a traffic accident occurring on the highway. FIG. 1 illustrates a cellular communication network under normal conditions. As illustrated, multiple wireless devices 101(a-g) are wirelessly connect to the cellular communication network via a base station 102 servicing a particular cell 100. The base station 102 connects via a base station controller (BSC)/radio network controller (RNC) 103 to a Mobile Switching Center (MSC) 104. The MSC 104 contains both a public switched telephone network (PSTN) interface and an Internet interface. Calls made to and from any of the multiple wireless devices 101(a-g) may be routed via conventional landlines over the PSTN 105 or Internet 106 using VOIP. Calls between conventional landline telephone stations and any one of wireless devices 101(a-g) may be routed over via the PSTN or Internet. Calls between wireless devices 101 (a-g) may be routed over the PSTN or Internet to similar MSC 104, BSC/RNC 103, and base station 102 located near the initiating or intended wireless device 101(a-g).

FIG. 1 illustrates the typical situation in which a fraction of the wireless devices within a cell access the network at the same time. For example, FIG. 1 shows seven separate wireless devices 101(a-g) located within the cell, only three of which (101c, 101d, and 101e) are currently accessing the network. Thus, the network is operating well within its operating parameters and all requests to the network from wireless devices 101(a-g) are granted. It is noted that all wireless devices 101(a-g) that are turned on but not in use continue to communicate with the base station 102 via a link management channel (not illustrated). The network uses these communications to keep track of the wireless devices 101(a-g) within each cell to support call routing. However, the amount of information communicated between all wireless devices 101(a-g) and the base station 102 for such tracking purposes is small (particularly in contrast to the bandwidth required for a normal telephone call), so the number of on-but-inactive wireless devices 101 within a cell normally will not overwhelm the network.

Figure 2:
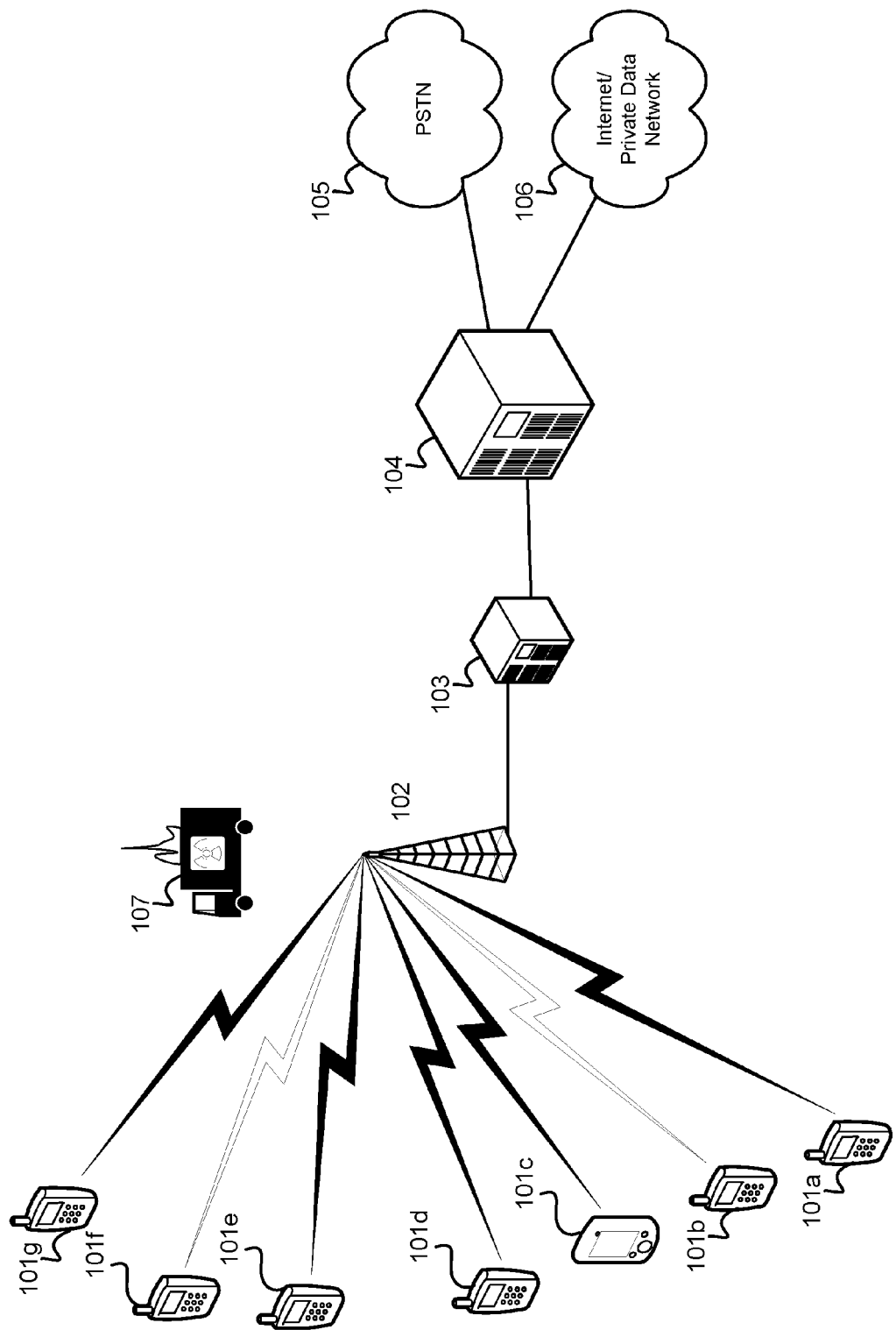
FIG. 2 is a system block diagram illustrating call volume requests made to a cellular communication network under an emergency situation condition.

This normal functioning of the cellular network can be disrupted when, for example, an accident stops traffic, prompting delayed drivers to simultaneously use their wireless devices to alert emergency personnel of the traffic accident (emergency 911 call) or contact friends, family members, business associates, etc., to inform them of the delay. FIG. 2 illustrates a cellular communication network in such an emergency situation. In this illustration, a truck 107 in the vicinity of base station 102 is on fire. Predictably, the truck 107 fire prompts most of the wireless devices 101(a-g) users within the vicinity to access the cellular network at approximately the same time. This causes an overload condition in the cell by exceeding the bandwidth of the carriers on the local base station 102. Consequently, some of the wireless devices 101b, 101f will not be granted access to the network, and new network access requests may be denied until communication channels open up. This communication bottleneck may worsen the emergency situation by delaying the response by emergency personnel and denying first responders with effective communication over the network.

This problem is exacerbated in disaster situations involving many victims and large areas, such as wildfires, floods, hurricanes, tornadoes and terrorist attacks. As witnessed during the September 11$^{th}$ attack and Hurricane Katrina, large disasters can destroy part of the cellular and landline telephone network infrastructure, leaving the remaining network more vulnerable to overload conditions. Network overloads during disaster events are particularly troublesome since such situations naturally involve widespread confusion and require close coordination among a large number of emergency and relief personnel.

If a disaster situation will persist long enough (e.g., a flood or hurricane situation), additional cellular communication capacity can be added to a region by activating a deployable cellular communication system to provide emergency response teams and personnel with the ability to communicate. Such recently developed deployable units, referred to herein as a "switch on wheels," can include a CDMA2000 base station and switch, Land Mobile Radio (LMR) interoperability equipment, a satellite Fixed Service Satellite (FSS) for remote interconnection to the Internet and PSTN, and, optionally, a source or remote electrical power such as a gasoline or diesel powered generator. A more complete description of an example deployable switch on wheels is provided in U.S. patent application Ser. No. 12/249,143, filed Oct. 10, 2008, the entire contents of which are hereby incorporated by reference in their entirety.

These switch on wheels are effectively mobile cellular base stations which may be deployed in a disaster area and operate as a cellular tower antenna. The switch on wheels sends and receives communication signals from a plurality of wireless devices 101 and serves as a gateway portal to the rest of the conventional communications infrastructure. Communications between the switch on wheels and a wireless device 101 is broken down into packets for transport as a VOIP communication, and may be transmitted via satellite to a ground station outside the disaster area from which the call is forwarded through the telephone network to the recipient. Even with the added bandwidth provided by deployable switch on wheels, network overloads may still cause communication delay and frustration to emergency response personnel.

To overcome such problems in the event of a national emergency, the WPA system was developed. Conventional WPA systems provide selected emergency leadership with preemptive access to cellular communication networks. However, conventional WPA systems do not permit calls made to the wireless device of a registered WPA authority. In other words, while wireless devices registered for WPA service may be given priority access for placing calls on the network, there are no provisions in the WPA system enabling those very same wireless devices to receive calls. Incoming calls to wireless devices in a command center may be just as important as outgoing calls. Also, conventional WPA systems assume that if an authorized user needs to make a call, the call will be made from their pre-registered wireless device. However, there may be instances where the authorized personnel do not have their pre-registered wireless device. Alternatively, the wireless device may be damaged. Provisions must be made to enable the authorized personnel access to an overloaded network. Also, emergency personnel who have not previously registered their wireless device on the WPA system cannot access overloaded cellular communication networks "on the fly." Many times, off duty, junior, volunteer emergency response personnel may be the first responders on the scene on an incident. Such personnel may not be entitled to conventional WPA which is designed to address the needs of the leadership. Thus, precisely the personnel who can quickly alleviate a situation given their proximity on the scene are unlikely not pre-registered and authorized for conventional WPA.

To overcome these limitations with conventional cellular communication networks and conventional WPA, the various embodiments provide Tiered Priority Access (TPA) capabilities to deliver Quality of Service (QoS)/Grade of Service (GOS) wireless device communications for first responders for calls both originated and terminated at a mobile handset. The various embodiments are particularly aimed at the needs of first responders at the very start of an emergency event.

TPA as its name implies aims to provide a tiered response to network capacity requirements. The tiered response mirrors typical communication requirements at the incident scene as more responders appear to help resolve the problem(s) at hand. When an incident occurs first responders are either at the incident scene or begin to respond. First responders reporting to an incident initially arrive on scene in small numbers and may grow in direct response to the magnitude and severity of the incident.

To accommodate this predictable response, TPA enables an escalation and de-escalation process based upon call volume as first responders arrive on scene and depart as the situation is restored to normal.

In overview, the various embodiments work as follows. During normal operation, cellular call volume through particular base stations is monitored to determine if the network is reaching capacity limits. Call volume may be monitored based on current calls, attempts to access the network, engaged bandwidth, or other methods known to cellular service providers. Call volume may be locally monitored at the base station 102, at a BSC/RNC 103, or an MSC 104 or, in an embodiment, centrally, such as in a Network Operation Center (NOC). Such monitoring is at the cellular level, since normal emergency situations are most likely to impact one or two cell zones, although TPA will work in a similar fashion in the event of a widespread emergency. When call volume in a cell exceeds a threshold value preselected by the service provider and/or emergency response planners, the system allocates one channel in the affected cell tower to TPA operation.

FIG. 2 illustrates a situation in which call volume has exceeded a threshold indicating that TPA should be implemented. As shown in FIG. 2, more wireless devices 101 in the cell supported by the base station 102 are attempting to access the network than the network can connect. As a result, only some of the wireless devices 101*a*, 101*c*, 101*d*, 101*e* and 101*g* will be able to place or receive calls (shown as solid black), while others will be denied access to the network (shown as white). In this situation, call volume within the cell served by the base station 102 has exceeded the threshold, so one of the communication channels on the antenna will be allocated to TPA operation. However, the channel remains available to general public use until a TPA-authorized call is placed. Thus, no change in the communication network is shown in FIG. 2.

Figure 3:
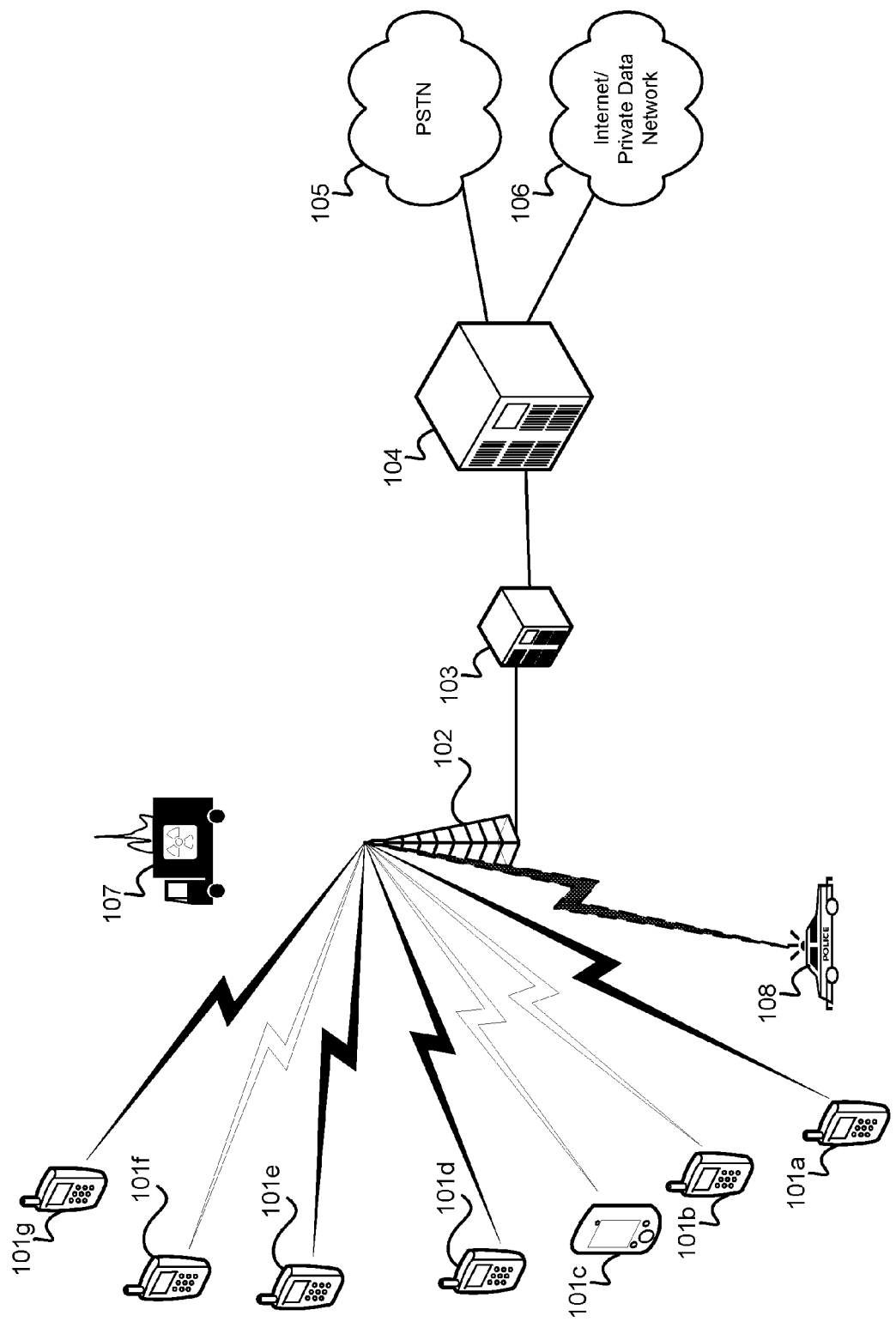
FIG. 3 is a system block diagram illustrating call volume requests made to a cellular communication network under an emergency situation condition when a first responder arrives on the scene.

The various embodiments address this overload condition in order to allow emergency personnel to use the cellular communication network as they arrive on scene, as is illustrated in FIG. 3. When an emergency responder 108 arrives on scene, that individual may initiate a wireless telephone call. If a communications channel has been allocated to TPA operation and the emergency responder's wireless device is pre-registered as a TPA-authorized wireless device, the network can recognize the pre-registered TPA authorized wireless device from the wireless device's unique ID and recognizes the call as a TPA-call. The base station 102, BSC/RNC 103 or the MSC 104 may ensure the TPA call is connected. If necessary, the bandwidth allocated to civilian wireless device users is reduced and one or more non-emergency calls may be dropped to enable the TPA call to be connected. This is illustrated in FIG. 3 as the connection to wireless device 101*c* has been dropped and denied further access to the network (illustrated as a white lightning bolt), and the TPA call (illustrated as a dashed black lightning bolt) by the emergency responder 108 is connected.

Figure 4:
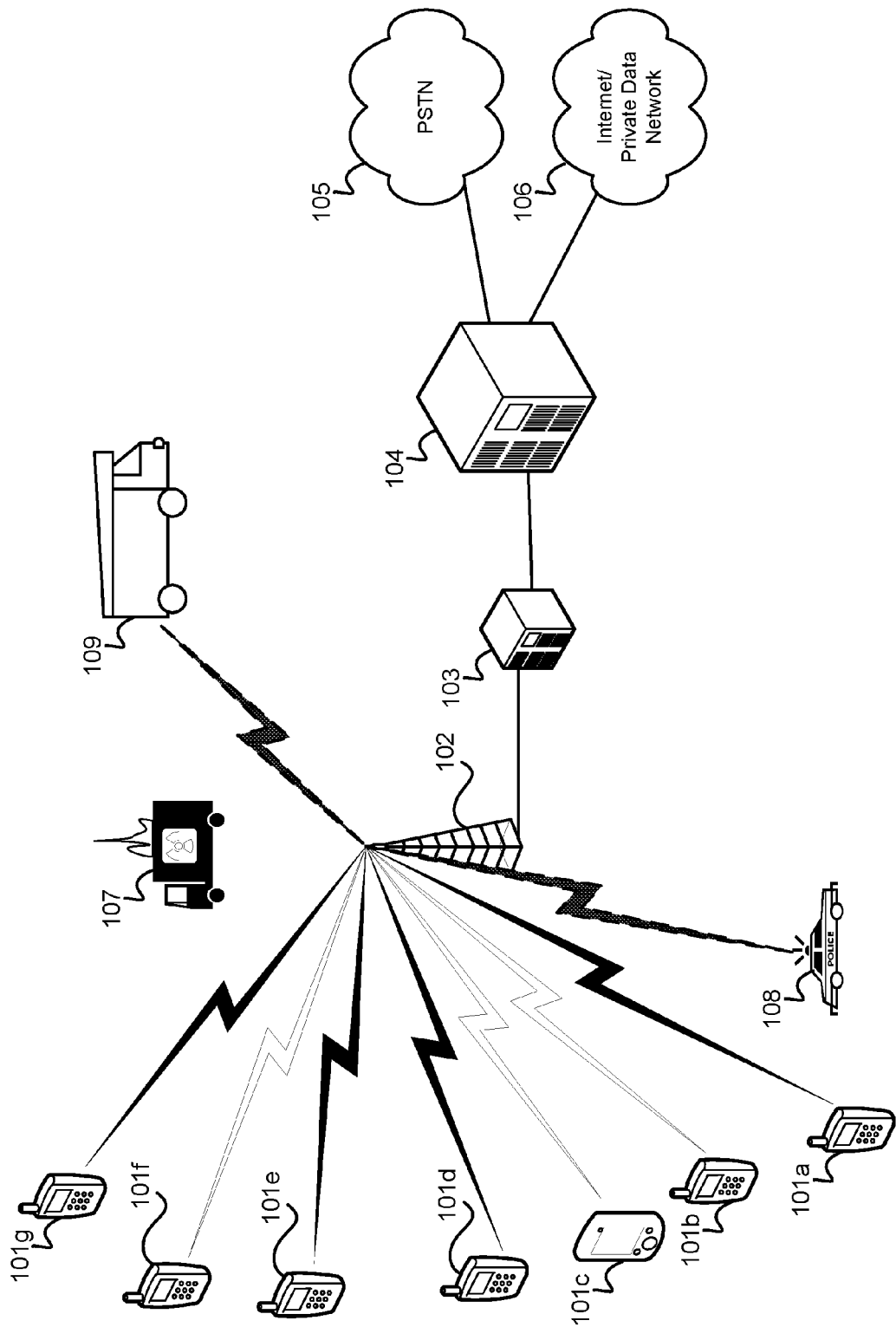
FIG. 4 is a system block diagram illustrating call volume requests made to a cellular communication network as additional emergency response personnel arrive on the scene.

As additional emergency personnel 109 arrive on scene of the emergency, additional TPA calls may need to be connected as illustrated in FIG. 4. To accommodate the increase in TPA calls, additional network resources may be automatically allocated to TPA operation in order to provide emergency responders reliable cellular communications. This is illustrated in FIG. 4 which shows connected TPA calls with police 108 and fire 109 personnel (illustrated as a dashed black lightning bolts), while wireless devices 101*c* and 101*d* have been disconnect (illustrated as a white lightning bolts). Automatically allocating more resources to TPA use reduces the bandwidth available to the general public, which will limit general access to the network. However, emergency personnel are provided reliable access to the network so long as the heavy call volume persists.

Figure 5:
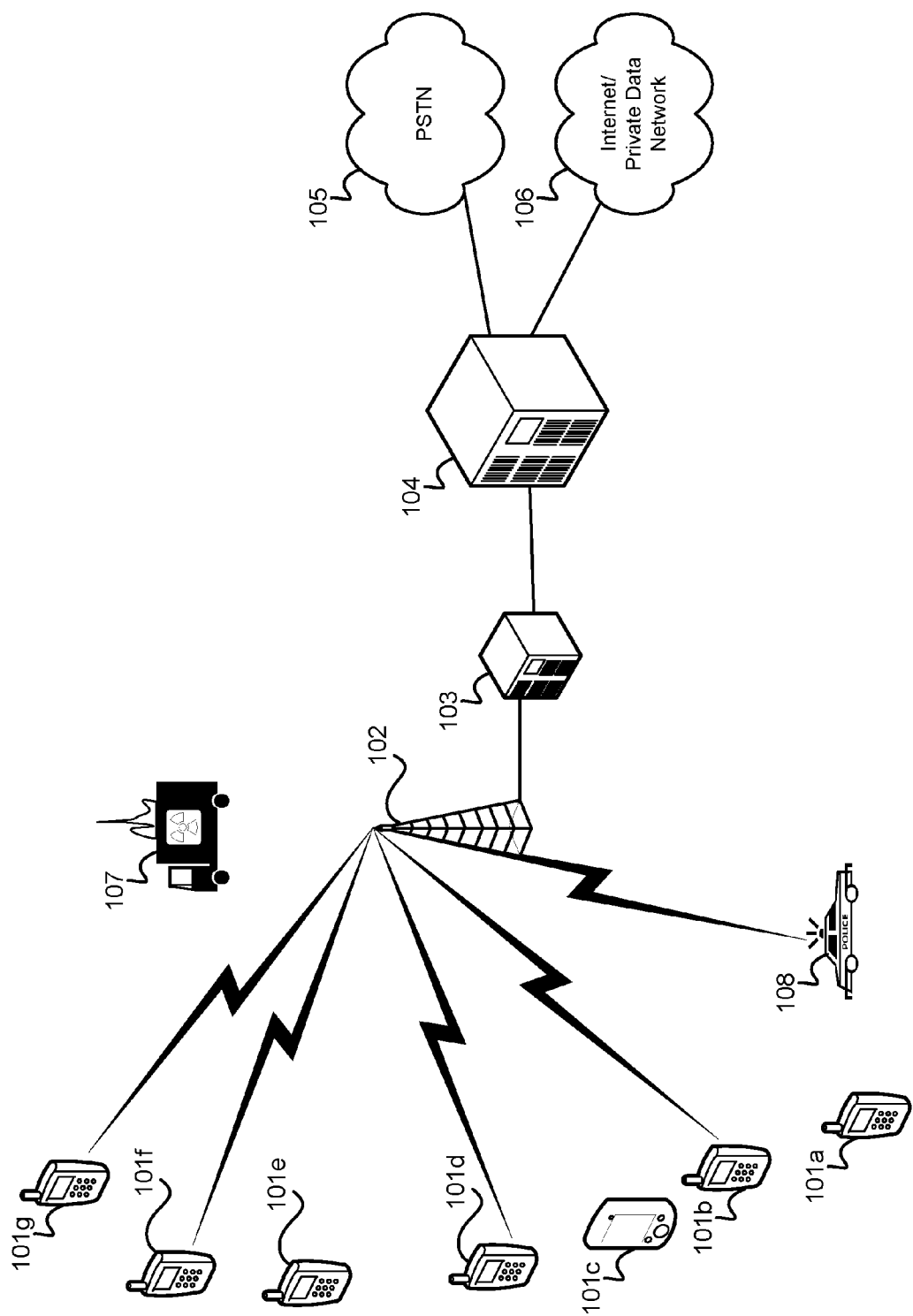
FIG. 5 is a system block diagram illustrating call volume requests made to a cellular communication network after an emergency situation has been alleviated.

Eventually the emergency situation will be resolved and emergency personnel will begin to scene. As conditions return to normal, civilian call volume should return to normal levels while the number of emergency responders requiring TPA-access will also decline. This is illustrated in FIG. 5 which shows that the fire has been extinguished and firemen have left the scene. As traffic begins returning to normal flow fewer general population wireless devices 101*a-g* access the network simultaneously. With cellular communications returning to normal, cellular communications resources may be released from TPA operations, restoring the network to normal operations. As illustrated, the remaining emergency personnel 108 are connected to the cellular communication network in the normal fashion as the call volume has decreased to the point that TPA operation has been terminated.

When TPA operation is implemented on one or more communication channels, the cellular system (e.g., locally in the base station, BSC/RNC, or MSC, or in a central location such as a NOC) monitors incoming and outgoing calls to determine whether any calls are coming from or directed to emergency response personnel. This may be accomplished by recognizing an originating or destination wireless device as being TPA pre-registered wireless device. Alternatively, the system may recognize emergency response personnel when they complete a special dialing procedure such as the *272 dialing procedure described below.

Wireless devices can be pre-registered for TPA use by authorized users. This may be accomplished by registering as a qualified emergency responder (e.g., according to criteria established by governmental authorities) with the cellular network provider. As is well known in the telecommunications art, all wireless devices 101 which access the cellular communication are assigned a unique identification number. In the pre-registration process, the cellular network provider stores the wireless device's unique identification number in a database of authorized TPA personnel. The cellular network provider may also issue the individual a unique Personal Identification Number (PIN) for use in implementing TPA preemption from a non-TPA wireless device as described more fully below.

If the emergency responder's wireless device is not pre-registered (such as a borrowed phone), and the network is overload, the emergency responder may be unable to access network resources. In this situation, the emergency responder can activate the embodiment TPA from a non-registered wireless device 101 by first dialing *272 followed by a personal identification number (PIN) and the telephone number. The nearest base station 102 to the non-registered wireless device 101 receives the transmission from the wireless device 101 indicating that the wireless device is initiating a call. The base station 102 (or BSC/RNC 103 connected to the receiving base station) recognizes the *272 special dialing prefix and starts to route the call to the appropriate destination. Alternatively, recognition and routing of the #272 dialing prefix may be accomplished at the MSC 104. This destination may be the closest PSAP or central location with a database of PINs. The *272 call is similarly processed at the BSC/RNC 103 and later MSC 104 as the call proceeds through the communication network system. The BSC/RNC 103 and MSC 104 controlling the base station antenna 102 and other associated antennae are programmed to recognize the special dialing procedure using a database of pre-registered first responder PINs. This PIN database may be stored at the MSC 104 or at another central location such as a NOC. If the received PIN matches a record in the PIN database, the MSC 104 may immediately give the caller preemptive access to the network just as if the call had been made from a TPA-registered wireless device as described above. In order to support this capability, a TPA-allocated channel reserves sufficient open capacity during TPA-operation to receive and recognize *272 dialed calls. If the communication channel is at capacity and a dialed number does not begin with *272, the call is promptly dropped with no attempt to complete the call. However, if the dialed number begins with *272, the MSC 104 completes the process of comparing the entered PIN to the PIN database and the temporarily registering the call as a TPA-authorized wireless device. Non-TPA calls may be dropped if necessary in order to retain sufficient capacity to receive and recognize *272 calls.

While reference is made throughout the application to the MSC 104 monitoring and providing the TPA capability, it should be appreciated by one of skill in the art that other elements of the communication system may implement the various method steps. These elements may include, but are not limited to equipment collocated with the base station antenna 102, the BSC/RNC 103, or a NOC.

Once a wireless device has been recognized as a TPA-phone by means of the *272 dialing procedure, the MSC 104 will track the wireless device and continue to treat it as if it were a TPA-registered wireless device so long as at least one communication channel is allocated to TPA operation. Using the unique identification number assigned to the wireless device, the MSC 104 will recognize subsequent calls from the wireless device as TPA-calls without the need for the user to repeat the *272 dialing procedure. Similarly, the MSC 104 can identify incoming calls to the first responder that should receive TPA preemption service. Thus, a first responder 108 using a non-registered wireless device can register the wireless device "on the fly" when TPA is implemented for both incoming and outgoing calls by using the *272 dialing procedure to call one number (such as a dispatcher or "911").

In an embodiment, a TPA authorized user with a PIN can authenticate any number of wireless devices using the *272 dialing procedure described above. This embodiment will enable first responders, such as a policeman, fireman or emergency medical technician, to "deputize" volunteers, such as military personnel, doctors or retired policemen that they find on the scene, thus creating a reliable ad hoc emergency communication network. Since the temporary TPA-authorization of a wireless device established by the *272 dialing procedure is rescinded as all communication channels in the affected area return to normal operation (i.e. cease TPA operation), there is limited concern that the TPA system could be compromised for subsequent emergencies provided the authorized user's PIN is not revealed. Even if the PIN is revealed, the PIN can be easily changed without significant impact since TPA implementation is expected to be an infrequent, random and episodic event.

In a further embodiment, a user of a TPA-registered wireless device who does not have (or forgot) a PIN can register another phone "on the fly," thereby "deputizing" it for the duration of the TPA event by simply initiating the special dialing procedure on any wireless device. For example, the first responder may use a TPA-registered wireless device to dial the number of the wireless device to be "deputized" followed by *272 (any dialing prefix or postscript may be used). When this call is received by the MSC 104, the *272 Prefix or postscript is recognized as indicating that the dialed number is to be treated as a temporary TPA-authorized wireless device, allowing it to store the unique ID of the called wireless device in a database for tracking such temporary TPA authorizations. Using this capability, a first responder can quickly deputize one or more volunteers simply by calling their numbers.

In still a further embodiment, emergency response personnel whose position does rise to the level of qualifying for pre-registration TPA service or PIN may still be the first emergency personnel on the scene of an emergency situation. The user may use his/her non pre-registered wireless device to initiate a *272 special dialing procedure. The call may be forwarded to a PSAP which may issue a temporary PIN and add the wireless device to the database of temporary TPA authorizations.

Alternatively, if the user initiates a *272 special dialing (or similar dialing procedure such as 911), the call may be forwarded to a PSAP. In large scale crisis situations, the answering PSAP may be disabled or unable to answer quickly due to the large incoming call volume. In such situations, if the *272 call is not answered by the PSAP within a predetermined time frame a temporary TPA authorization may be automatically issued. Since the circumstances surrounding the issuance of the temporary TPA authorization have not been fully analyzed by a PSAP operator, it is unclear whether the user receiving the temporary TPA authorization is properly authorized. Accordingly, the temporary TPA authorization may be flagged on the PSAP monitor for possible deactivation or investigation.

In a further embodiment, the cellular network is configured to give calls from a TPA-registered wireless device and (optionally) temporary TPA-authorized wireless devices priority when dialing to a civilian (i.e., non-TPA authorized) wireless device within the cell zone(s) implementing TPA operations. When such a call is made, the MSC 104 is programmed to route the call to the dialed wireless device through the communication channel or channels allocated to TPA operation. If a TPA-allocated channel is at capacity when the call from a TPA-authorized wireless device is received for a civilian wireless device, another civilian wireless device call is dropped in order to provide sufficient capacity to complete the call, with the associated preemption process being used to prevent another 911 call from being dropped. This embodiment gives emergency personnel the ability to dial-into an emergency. For example, emergency personnel can use this capacity to call back a civilian who initially called 911 to report an emergency in order to request an update from a potential eye witness. As another example, a first responder can call volunteers within the emergency scene without deputizing their phones, assured of being able to reach the volunteers even though the communications network is otherwise overwhelmed.

TPA operations may be implemented in at least two embodiments of the present disclosure. In a first embodiment described below with reference to FIG. 6, one or more cellular communication channels are dedicating to TPA calls, providing emergency personnel with dedicated communication capacity while leaving the remaining communication channels to the general public. In a second embodiment described below with reference to FIG. 7, call preemption for TPA calls is implemented only as a TPA allocated communication channel reaches capacity. These embodiments are described separately below.

Figure 6:
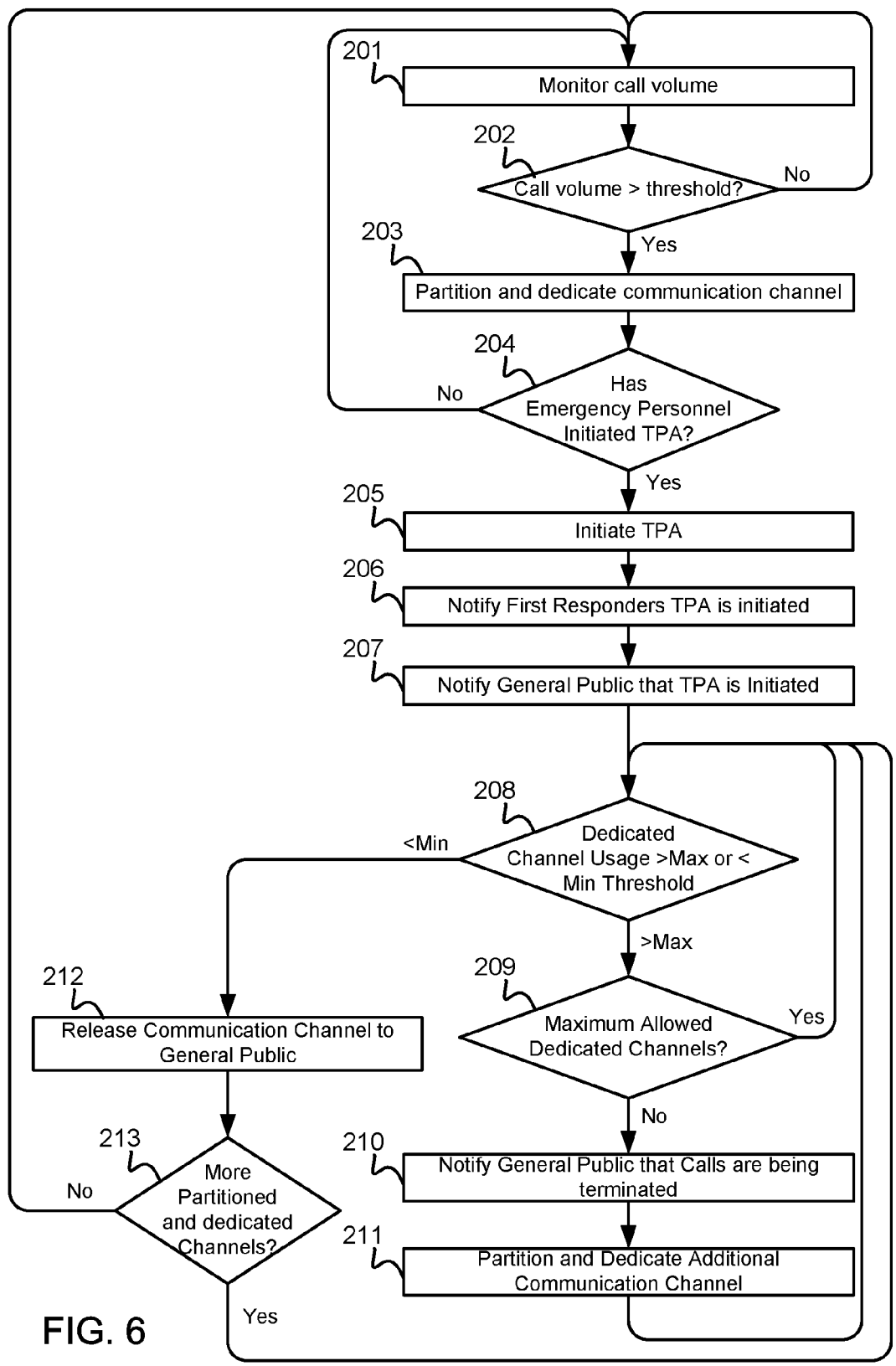
FIG. 6 is a process flow diagram of an embodiment method for managing Tiered Priority Access (TPA) operations on a network.

FIG. 6 illustrates an example process flow of steps that may be taken to implement the first embodiment of TPA that may be operable with a computing device having a processor. During normal operations cellular communication network call volume is monitored, block 201. In particular, the cellular communication network call volume (or number of access requests or engaged bandwidth) are compared against a predetermined threshold (for example 85% of maximum capacity), block 202. If the call volume is below the predetermined threshold a normal situation is assumed to exist, so the monitoring process returns to block 201 to continue monitor call volume. If, however, the call volume (or number of access requests or engaged bandwidth) exceeds the predetermined threshold, an abnormal situation exists which may indicate that an emergency situation is unfolding. To prepare for an emergency situation, network resources (e.g., communication channels on a particular base station antenna) are partitioned and reserved for TPA use, block 203. By automatically allocating a communication channel to TPA use, the system permits a TPA-authorized wireless device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally, by handling civilian (i.e., non-TPA) calls in the ordinary fashion. In instances where the increased call volume is simply due to coincidental network requests and no TPA-qualified user is attempting to place a call, call preemption enabled by TPA is not needed. Thus, the TPA threshold may be exceeded and TPA implemented even when there is no actual emergency incident. Delaying actual implementation of TPA preemption until the service is required by a first responder increases the reliability of the network under normal circumstances.

The system may be informed that an actual emergency situation is occurring indicated by a TPA-authorized emergency response personnel placing a TPA call within the affected cell zone. When the communication channel is in TPA mode, the cellular system (be it at the base station, BSC/RNC/MSC, or in a central location such as a NOC) monitors incoming and outgoing calls to determine whether any emergency response personnel is using a TPA-pre-registered wireless device or has completed a special dialing procedure invoking TPA preemption, block 204. If no emergency response personnel has initiated a call using a TPA-authorized wireless device or the special dialing procedure, the system may continue to monitor access requests, in block 204, as well as call volume, in block 201, to determine if the communication channel should be released from TPA operation, block 202.

If a call is initiated by a TPA-authorized wireless device, or if the call is generated from a non pre-registered wireless device using the *272 dialing procedure, TPA is initiated, block 205. When TPA is initiated, block 205, only emergency personnel previously registered or given clearance "on the fly" will be permitted access to the partitioned and reserved network resources. As noted above, TPA will normally be implemented on a single communication channel initially, leaving the remaining channels to general public use. Then, if TPA-use exceeds the capacity of the TPA-allocated network resources another resource can be converted to TPA operation. By dedicating network resources to emergency personnel use one channel or one resource at a time, the remaining network resources are left available for non-essential general public use. In addition, by dedicating network resources for emergency personnel communication, emergency personnel are able to both send and receive calls on their wireless devices.

In an optional embodiment, upon the initiation of TPA, block 205, the MSC 104 may survey the wireless devices 101 located within the affected cell or serviced by other base station antennae 102 within the same BSC/RNC 103, to identify all registered or temporarily registered first responders. These first responders may be advised via SMS message (or other methods) that they can utilize the TPA service by placing a call or using the special dialing procedure, block 206.

In a further optional embodiment, the base station 102, BSC/RNC 103, or MSC 104 may also send messages to all non-emergency wireless devices 101*a-g* within the affected area/cell 100 advising them to avoid using their wireless device 101*a-g* except for Emergency 911 calls and to indicate that emergency services have been notified, block 207. This messaging may be initiated by the PSAP responsible for the incident area, by the local incident Command and Control authority, or by the network service provider. Such messages may be delivered via SMS message or other communication means. The system may also notify callers connected to the channel allocated to TPA use that their calls are being terminated prior to disconnecting the calls.

As the emergency situation continues to unfold and additional emergency response personnel appear on the scene, additional network resources may be required to support emergency personnel communication. Accordingly, the partitioned and dedicated network resource may be monitored to determine if additional network resources should be partitioned and allocated to TPA. This may be accomplished by comparing the call volume on the partitioned and dedicated network resource to a predefined maximum or minimum threshold, block 208. If call volume exceeds a predefined maximum (indicating an escalating situation), for example 25% usage of the partitioned and dedicated network resources in the cell site/sector, additional dedicated network resources may be partitioned to TPA operation, block 211, to allow emergency response personnel to communicate.

In an embodiment, before terminating calls in order to allocate the additional channel to TPA operation, non-essential (i.e., non-emergency personnel) wireless devices 101 that have a call or data sessions in progress with the allocated channel may be informed with a warning tone and/or recorded announcement that their call is being terminated unless a defined code is entered, block 210. This permits first responders to maintain their calls by quickly entering a code (e.g., their PIN). If an in process call is an emergency 911 call, the defined code may be supplied by a PSAP.

In an embodiment, the system will continue to automatically retrieve and re-allocate network resources for emergency response personnel communication until all available network resources are dedicated to emergency response personnel use. Such an embodiment will maximize communication capabilities of emergency response personnel. Other embodiments may reserve at least a minimum portion of network resource (e.g., one communication channel) to enable the general public the ability to alert emergency response personnel to new or developing emergency situation, such as by placing 911 calls. Accordingly, other embodiments may impose maximum limits to the amount of network resources that are taken away from the general population and dedicated to emergency response personnel communication. To accomplish this, the MSC 104 may determine whether the maximum amount of network resources have been partitioned and dedicated to emergency response personnel communication, in block 209. If the maximum amount of network resources have already been partitioned and dedicated, the MSC 104 may continue to monitor the level of utilization of the partitioned and dedicated network resources, in block 208. If the maximum amount of network resources that can be partitioned and dedicated has not been reached, the MSC 104 may (optionally) inform current callers that calls are being terminated, block 210, and reallocate network resources from general population usage to emergency response personnel communication use, block 211. Once the additional communication channel has been dedicated, the MCS 104 will return to monitoring the level of utilization of the partitioned and dedicated network resources to determine if the emergency situation is escalating or de-escalating, block 208.

As emergency response personnel work to alleviate the emergency incident and return conditions to normal, the need for network resources will decrease as emergency personnel exit the scene. To enable the system to return to normal operations, the MSC 104 may continually monitor the call volume on the partitioned and dedicated network resources for an indication of escalation or de-escalation, block 208. When the level of use of the partitioned and dedicated network resource drops below a predefined minimum, the MSC 104 may begin to re-allocate network resources back to general public usage, block 212. Network resources may be automatically re-allocated channel by channel, incrementally reducing the resources allocated to emergency personnel usage, returning to normal operations in a stepwise fashion.

By demobilizing network resources one channel or network resource at a time, the embodiment provides a flexible communication system which may adapt to the situation as it evolves. If the situation requires more or less network resources for emergency personnel communication, the embodiment system and method can meet the demand while still providing some network resources for the general public to use. The system may wait for a period of time after each release of a TPA-dedicated channel in order to accommodate surges in emergency personnel use during the event wind-down phase, thereby avoiding having to repeat the process of dropping callers, block 210, unnecessarily.

Once the cellular communication channel has been re-allocated for general public usage, the MSC 104 determines if there are any more network resources that are currently partitioned and dedicated for emergency personnel communication, block 213. If additional network resources are currently partitioned and dedicated for emergency personnel communication, the MSC 104 returns to block 208 to determine whether the emergency situation is escalating or de-escalating. As the emergency situation further de-escalates and returns to normal, emergency response personnel require less and less network resources to support their communications. Thus, the MSC 104 will continue to automatically re-allocate network resources to general public usage in response to call volume, block 212, until all network resources are in normal operating configuration for general public use. The MSC 104 may return to block 201 and may monitor call volume waiting for the next emergency situation.

Figure 7:
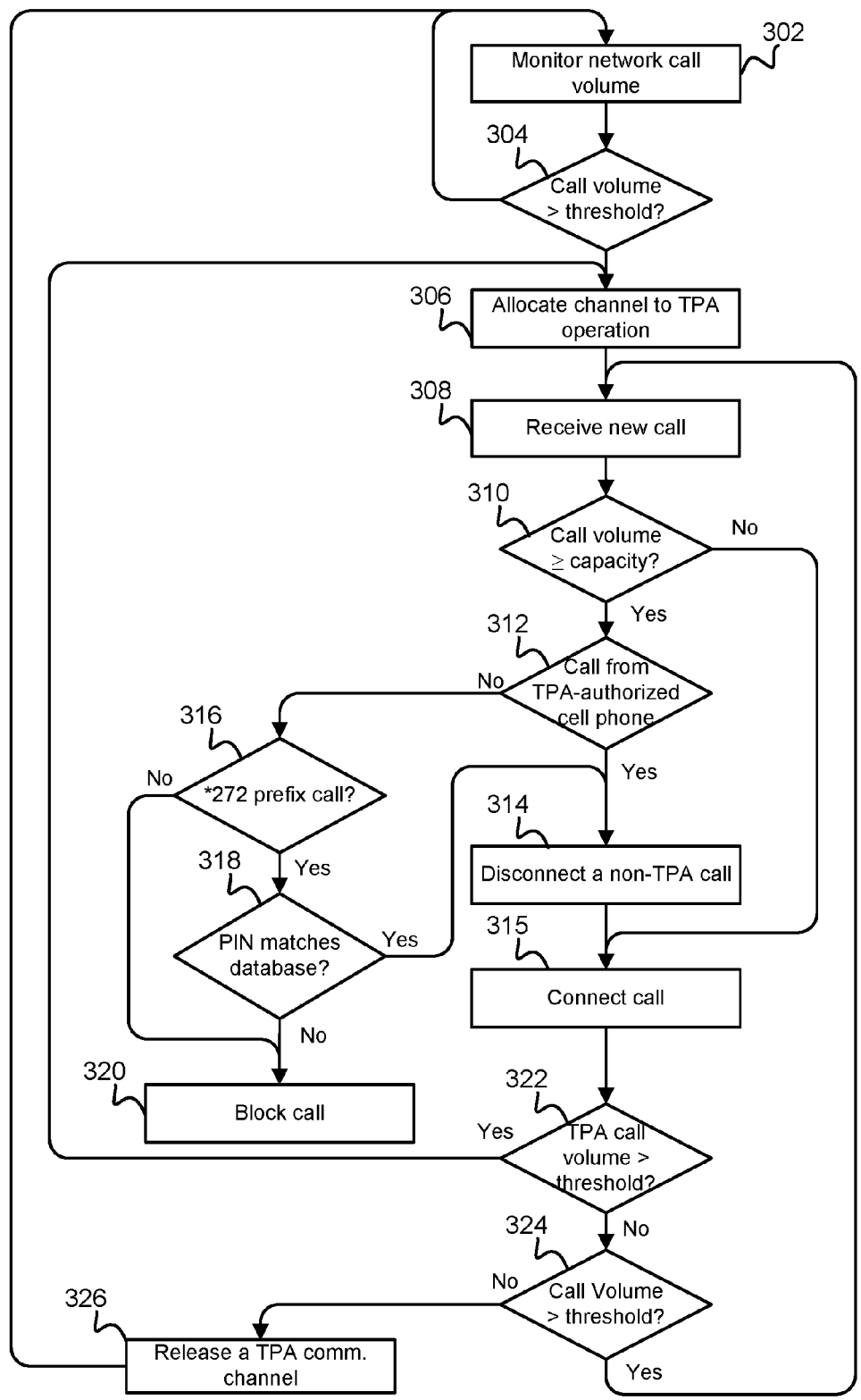
FIG. 7 is a process flow diagram of another embodiment method for managing TPA operations on a network.

In the second embodiment, illustrated in the process flow diagram in FIG. 7, network resources are incrementally allocated to TPA use at level of individual calls by way of call preemption so that public access to the network is maximized while meeting emergency personnel use requirements. During normal operations, cellular communication network usage is monitored, block 302. Network access requests, call volume or engaged bandwidth may be compared to a predetermined threshold (for example 85% of maximum capacity), block 304. If the usage is below the predetermined threshold, a normal situation is assumed to exist, so the monitoring process returns to block 302 to continue monitoring call volume. If, however, the usage exceeds the predetermined threshold, an abnormal situation exists which may indicate that an emergency situation is unfolding. To prepare for an emergency situation, network resources, such as a communication channel on an affected base station antenna, are partitioned and reserved for TPA use, block 306. By automatically allocating a communication channel to TPA use, the system permits a TPA-authorized wireless device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally by handling civilian (i.e., non-TPA) calls in the ordinary fashion. In instances where the increased call volume is simply due to coincidental call volume and no TPA-qualified user is attempting to place a call, call preemption enabled by TPA is not needed. Thus, the TPA threshold may be exceeded and TPA implemented even when TPA call preemption is not required. Delaying actual implementation of TPA preemption until preemption is required by a first responder increases the reliability of the network under normal circumstances.

With a network resource allocated to TPA operation, the cellular system (be it at the base station, BSC/RNC or in a central location such as an MSC) monitors incoming and outgoing calls, block 308. The TPA-allocated channel continues to function as a normal cellular communication channel until (a) the channel is at capacity (i.e., current call volume through the channel equals its maximum capacity) and (b) a TPA-qualified wireless device attempts to access the network to place or receive a call. Call volume on the TPA-allocated communication channel is monitored to determine if a call must be dropped in order to connect a TPA-qualified call. Thus, when a new call is received (incoming or outgoing) that will be allocated to the TPA-allocated channel, the system may first determine if that channel is presently at capacity (i.e., has as many calls connected as the channel can reliably maintain), block 310. If the channel is not at capacity (i.e., there is excess capacity on the network), the call may be connected, block 315. This monitoring of the TPA channel may prevent disconnecting a civilian call if sufficient capacity exists on the channel to enable connection of a new incoming or outgoing TPA call.

As discussed above, the system can recognize a TPA-authorized call by determining if the source or destination wireless device is a TPA-registered wireless device, block 312, and if not by the caller completing a special dialing procedure. The dialing procedure may invoke TPA preemption, block 316. In block 315, the call may be connected. For example, if the caller is using (or the call is placed to) a TPA-registered wireless device the call may be connected. The call may be connected if at least one non-TPA call is connected on the TPA-allocated channel, block 314 and capacity is released to sufficient to connect the TPA call, block 315. This allows the TPA-qualified first responder to make a call without delay even though the network is at capacity. Similarly, if an incoming call is directed to a TPA-qualified wireless device, at least one non-TPA call on the TPA channel is terminated in order to connect the incoming call to the TPA-qualified wireless device. The process of terminating non-TPA calls from the allocated channel may continue as more calls to TPA-qualified wireless devices access the network.

If the caller is not using a TPA-registered phone and did not enter a *272 type dialing sequence, the call may be blocked, block 320, as a non-emergency call at a time when system resources are at capacity. If the caller has entered the special dialing sequence (such as *272 plus a PIN), the entered PIN is compared to PIN values stored in a database (e.g., at the base station 102, BSC/RNC 103, or MSC 104,) in block 318. If the PIN matches a registered emergency personnel, a non-TPA call connected on the TPA-allocated channel, block 314, in order to release capacity sufficient to connect the TPA call, block 315.

The system may also monitor call volume on the TPA-allocated channel, block 322 to ensure sufficient capacity remains to accommodate further emergency personnel requirements. TPA-call volume (i.e., the volume of calls to/from TPA-qualified wireless devices) on a TPA-allocated communication channel may be compared to a threshold value in block 322 to determine when to allocate another communication channel to TPA use. If the TPA call volume threshold is exceeded (i.e., test 322="Yes"), another channel will be allocated to TPA functions block 306, which is discussed above.

TPA-call volume on each TPA-allocated channel, block 322, as well as call volume on all channels, block 324, may continue to be monitored. This may determine when TPA calls are no longer being made, as will occur when the emergency is resolved and first responders leave the scene, or when total call volume returns to a level at which TPA operation is no longer required. If call volume continues to exceed the TPA threshold, the system may continue to operate at least one channel in TPA mode, accepting calls, block 308, checking for TPA channel call volume, block 310 and connecting calls, block 315, if the call is from/to a TPA authorized wireless device block 312 or if call volume is less than capacity. As TPA-call volume declines, the number of channels allocated to TPA-operation can be reduced by releasing a TPA channel, block 326. The monitoring call volume and releasing of channels from TPA allocation will continue until all communication channels are returned to normal operations. Also, if call volume on non-TPA channels drops back to normal, the system may deactivate TPA operation on all allocated channels since the normal capacity of the network can accommodate TPA-qualified callers without the need for TPA preemption.

This second embodiment allows TPA-allocated channels to be operated in a fashion that ensures every TPA-authorized caller can access the network while providing maximum bandwidth possible to the general public. Monitoring of TPA channel call volume allows the system to avoid dropping civilian calls if sufficient capacity exists on the channel to enable connection of a new incoming or outgoing TPA call. If no emergency response personnel initiated a call using a TPA-authorized wireless device or the special dialing procedure, the system may continue to monitor access requests, block 308, and the call volume, block 324, to determine if the communication channel should be released from TPA operation, block 326.

An additional embodiment provides prioritizing access to TPA-dedicated network resources to enable highest priority callers to use the cellular communication network. In a situation where the number of emergency responders can exceed the capacity of the cellular network resources, this embodiment may enable high priority users, such as national leadership and on-site commanders, to preempt other, lower priority users in order to gain instant access to the network. High priority users can use their pre-registered wireless devices to gain access to the network. The unique ID of their wireless devices can be used to determine the priority of the user from a database of unique IDs. Similarly, high priority users can identify themselves to the network using the special dialing procedure, with a code or PIN providing sufficient information for the network (e.g., the MSC 104) to determine the priority of the user from a database of PINs. Using the priority value determined from a database, the network (e.g., the MSC 104) can determine whether the present caller has a higher priority than any callers already connected to TPA-allocated network resources. Assuming the wireless device 101 is properly authorized, the call may be given priority in the queue on the TPA-allocated network resource so that the emergency personnel member using the pre-registered authorized wireless device may be able to complete the call. If the network resource is at capacity, a call from a person with a lower priority level may be dropped in order to free-up sufficient capacity to complete the call.

Figure 8:
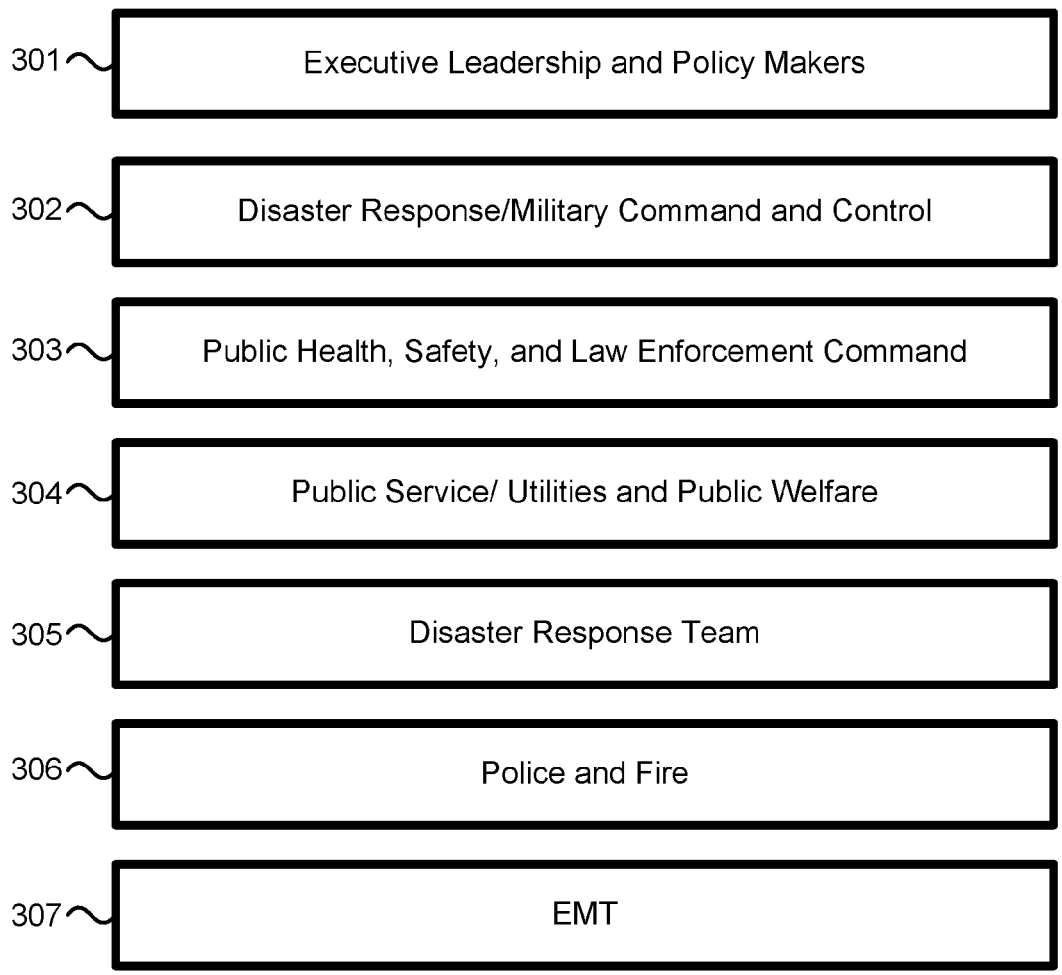
FIG. 8 is an example hierarchical table of classes of users given priority access to emergency communication resources.

FIG. 8 illustrates an example hierarchy of emergency response personnel. Various other configurations are possible and other personnel may be included, and personnel roles or status may change based on events, for example, the military commander 302 may assume the role of executive leadership, etc. As shown in FIG. 8, Executive Leaders and Policy Makers 301 may be given highest priority status. Members of this class may pre-register their wireless devices 101 such that the wireless device 101 unique identifier is stored in a hierarchy database. If a call is placed from any wireless device pre-registered to a member of the executive leader and policy maker class 301, the call is placed first in any queue of partitioned and dedicated network resources. Similarly, Disaster Response/Military Command and Control personnel 302 may be provided the next highest priority class, followed by Public Health, Safety, and Law Enforcement Command 303, Public Service/Utilities and Public Welfare 304, and Disaster Response Team 305. Lower level priority may be afforded to line police and firefighters 306 and emergency medical technicians 307. In all cases, wireless devices may be pre-registered so their unique identifiers and/or the user's PIN can be stored in a hierarchy database to support this embodiment.

The foregoing embodiments may also be implemented in a cellular system using a deployable "switch on wheels" cellular communication system. Since such systems may be implemented in large scale emergency/disaster situations with access limited to emergency responders and command authority, network overload will occur from too many authorized (i.e., non-civilian) users placing calls at the same time. To ensure reliable communications in such cases, the deployable switch on wheels can implement the caller priority embodiment so that callers with highest priority (e.g., national and regional commanders) have assured access to cellular communications, while lowest priority authorized users may be disconnected if necessary. In this embodiment, a database of authorized users indicating individual priority (hierarchy) levels (e.g., illustrated in FIG. 8) may be maintained in a server within the deployable switch on wheels.

The foregoing embodiments have been described as being implemented by the MSC 104. One of skill in the art would appreciate that the foregoing embodiments may be implemented within a number computer switching system elements within the cellular communications network, including but not limited to the base station 102, BSC/RNC 103 or NOC. Monitoring of call volume on communication channels and within a cell is performed automatically already. Such systems may be reprogrammed to implement the foregoing embodiments so that the implementation of TPA operations is performed automatically. Thus, the system can automatically recognize when call volumes exceed thresholds so that a communication channel should be allocated to TPA operation. The system can further recognize TPA authorized calls as described above and dedicate network resources and perform the call connections and disconnections described above automatically. Similarly, as call volume declines below the TPA threshold levels, the systems can automatically return the network to normal configuration. In this manner, the cellular communication network can respond to emergency situations to enable assured communications for emergency personnel without the need for human action or intervention. For example, even if an event goes unreported (e.g., no one bothers to dial 911), the system will nevertheless respond to excess call volume to enable an emergency responder to use the network. This capability also ensures police, fire and EMT personnel (typical individuals who may be authorized to implement TPA) can use the cellular communication network during times of peak usage, such as during rush hour on the freeway or following conclusion of a major sporting event.

The hardware used to implement the forgoing embodiments may be processing elements and memory elements configured to execute a set of instructions, wherein the set of instructions are for performing method steps corresponding to the above methods. Such processing and memory elements may be in the form of computer-operated switches, servers, workstations and other computer systems used in cellular communications centers and remote facilities (e.g., base station antenna locations). Some steps or methods may be performed by circuitry that is specific to a given function.

Wireless devices use the portions of radio frequency (RF) spectrum dedicated to cellular telephone communication. This RF spectrum is shrinking at a fast pace primarily due to the increasing number of wireless devices using the already burdened RF bandwidth and inefficient allocation of bandwidth in the marketplace. Since the total RF spectrum is finite, as the number of users of the RF spectrum grows, more efficient methods of RF spectrum management may be required to ensure that the growing need for RF spectrum is properly addressed.

The currently available RF spectrum is divided among cellular service providers based upon static allocation models such as speculation models and archaic licensing deals. The currently practiced static allocation models rely on a command and control scheme allowing for allocation of spectrum to providers in defined blocks of frequency and space. For example, one static method of leasing RF spectrum includes assigning, based on a leasing agreement, an entire block or sub-block of spectrum to one operator for their exclusive use. Such wholesale allocation of spectrum is inefficient because the licensee provider is purchasing spectrum based on a speculation that the spectrum may be used in the future.

However, the spectrum usage and traffic are dynamic and may depend upon different variables including the time of the day the spectrum is used and the geographic location of the wireless device using that spectrum. Traffic usage may be time dependent since usage may vary during peak as compared to non peak hours. Traffic may also be geographically based since the location where subscribers use the network may also vary. For instance, during the day, time and geographically based usage of spectrum on a network may vary while subscribers are traveling to work, at work, traveling back from work or during off hours.

Because spectrum usage and traffic are dynamic and impossible to predict, providers inevitably waste spectrum resources by speculating regarding its future use. Thus, the current spectrum allocation schemes fail to take into consideration real-time data about traffic patterns, encourage under utilization and segmentation of spectrum, and create further inefficiencies through the implementation of guard bands and bandwidth throttling or bandwidth intensive features and services.

The various embodiment methods and systems provide a Dynamic Spectrum Arbitrage (DSA) system for dynamically managing the availability, allocation, access and use of RF spectrum by using real-time data. Currently, RF spectrum is licensed or purchased in frequency and space based upon speculation of future usage and without taking into account real-time data. The DSA communication system makes RF spectrum available based on frequency, space (i.e., geographical regions) and time, thus, providing a flexible and dynamic spectrum management method and system as compared to the current static command and control methods. Since the RF spectrum resources are available based on time, frequency and space, spectrum allocated through the DSA communication system may be available for short term leases and free from interference. Short term leasing of spectrum may increase competition in a given market area and improve spectrum efficiency without negatively impacting the carriers' ability to deliver service. By efficiently and dynamically managing spectrum availability, allocation, access and use, the DSA communication system may in effect increase the RF spectrum availability.

In an embodiment, the DSA communication system may be a stand-alone business affiliated with the participating providers. In such a scenario, components of the DSA communication system may be integrated units participating network providers to allow providers to monitor their resources vs. bandwidth traffic and determine whether they need or can provide additional resources. The non-integrated components of the DSA communication system may manage the overall exchange of resources between participating providers. Benefits of using the DSA communication system may include optimizing commercial yield and providing wider and more efficient use of bandwidth on physical (geographic) and time bases.

In an embodiment, the DSA communication system may enable allocation of/access to RF spectrum resources by requiring that the participating providers subscribe to the DSA communication system. For example, the subscription may be based on a pricing arrangement. As a participant in the DSA communication system, the RF spectrum requesting providers may be enabled to use any available RF spectrum by slipping in and out of the RF spectrum's "swim lanes" in accordance with their need for bandwidth and their preparedness to pay for it. One spectrum's "swim lane" would be the RF spectrum bandwidth that is owned/controlled by one provider.

To participate in the DSA communication system, initially the carrier or carriers may agree to allow secondary use of their spectrum in the market. DSA communication system may enable each provider to purchase available spectrum in the network of providers or offer to sell additional spectrum to a buyer provider.

In an embodiment, the DSA communication system may determine the compatibilities of the subscriber wireless devices 101 for using the secondary networks and clusters. Incompatible Radio Access Networks (RAN) may be used if subscriber devices are capable. Thus, if wireless devices 101 are capable of accessing different RANs, the DSA communication system may facilitate the devices' access to spectrum from other RANs even if the switch is between incompatible RANs. DSA communication system is policy based and may offer unique implementations for spectrum and capacity management. The DSA communication system may be based on Long Term Evolution (LTE), Evolution-Data Optimized or Evolution-Data only (EVDO), Evolved High-Speed Packet Access (HSPA) and any known wireless access platform.

Figure 9:
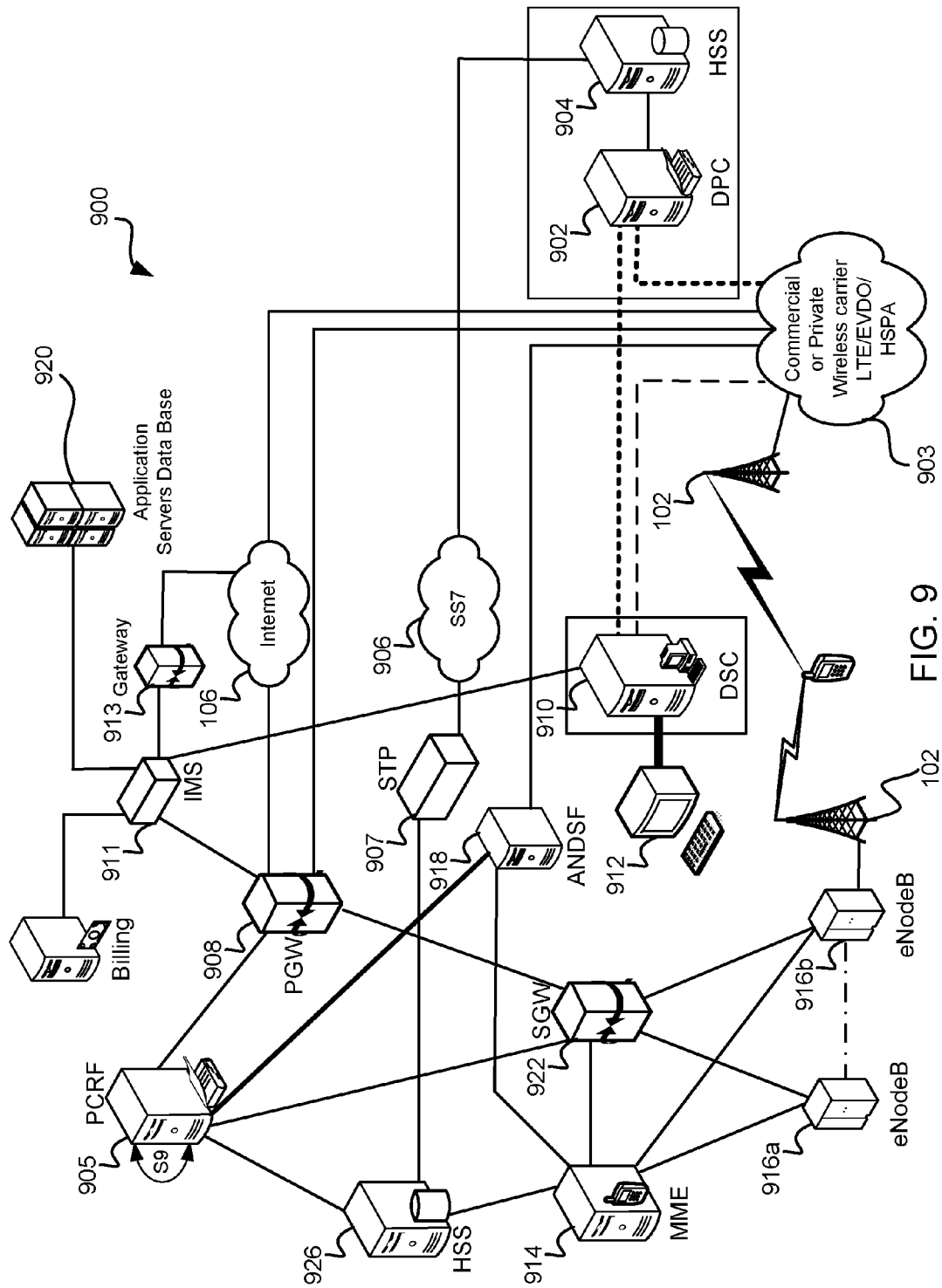
FIG. 9 is a communication system block diagram of a Dynamic Spectrum Arbitrage (DSA) communication system according to an embodiment.

FIG. 9 illustrates a communication component diagram 900 of an embodiment DSA communication system in a wireless access platform based on Long Term Evolution, LTE. The DSA communication system may include the Dynamic Spectrum Policy Controller (DPC) 902 connected to a Home Subscriber Server (HSS) 904 which may communicate with network components of a provider network. The HSS 904 may be a master user database that supports the Dynamic Spectrum Policy Controller (DPC) 902. The HSS 904 may include the subscription-related information (i.e., subscription-profile), perform authentication and authorize the secondary users, and can optionally provide information about subscriber's location and IP information. The HSS 904 may contain users' (SAE) subscription data such as the EPS-subscribed QoS profile and any access restrictions for roaming. It may also hold, store or retain information about the PDNs to which the user can connect. This could be in the form of an access point name (APN) (which is a label according to DNS naming conventions describing the access point to the PDN) or a PDN address (indicating subscribed IP address(es)). In addition the HSS 904 holds dynamic information such as the identity of the Mobility Management Entity ("MME") to which the user is currently attached or registered. The HSS 904 may also integrate the authentication center (AUC), which generates the vectors for authentication and security keys.

The HSS 904 may be connected to a Signaling Server 7 (SS7) 906. Both the Dynamic Spectrum Policy Controller (DPC) 902 and the HSS 904 may be connected to the Internet 106. The HSS 904 may independently communicate with the in-network components of a network via the SS7 network 906.

The DPC 902 may also communicate with the network components of a network provider through a commercial or private wireless carrier 903 (i.e., a "wireless provider") and Dynamic Spectrum Controller (DSC) 910 or directly through the DSC 910 without using a commercial or private carrier. The DSC 910 component may be added to network components for networks which participate with the DSA communication system and may communicate with the OMC/NMS 910. In various embodiments, the DSC 910 component may include a wired or wireless connection to a Policy Control and Charging Rules Function (PCRF) 905 component/server.

Availability of Spectrum Resources

In the various embodiments, the DSA communication system may enable a spectrum provider to monitor and assess its RF spectrum usage and availability, and make available unused RF spectrum for use by other providers or unsubscribed users (i.e., secondary users). The DSA communication system may provide different methods to determine RF spectrum availability, such as location and database lookup, signal detectors and spectrum usage beacon. The DSA communication system may enable one provider (host network) to identify spectrum resources which may be offered for use by another provider or provider subscribers (a secondary user), such as on a pay per use or pay per minute basis.

In an exemplary embodiment, as illustrated in FIG. 9, the DSA communication system 900 may enable a network to determine availability of RF resources. At each network or sub-network, the DSC 910 may monitor call traffic through OMC/NMS 912 to receive detailed status of the various network elements in real-time without inserting another device into the network. The DSC 910 may carry out policy based QoS decisions based on the status of the existing traffic, projected traffic margins and the system policies to determine whether a network or sub-network has resources to allocate for secondary use or requires resources from another provider.

The DSC 910 may be configured with software to communicate data regarding the availability of spectrum resources to the DPC 902 using capacity policy criteria. The data that is communicated to the DPC 902 may include data relating to current excess capacity and expected future capacity of the network or sub-network.

The available resources at a network provider may be dynamically allocated and de-allocated. The resource poll information may be controlled by the DSC 910 and relayed to the DPC 902 for central coordination. However, based on rule sets in the DSA communication system, the DSC 910 may identify resources available for secondary use on a system level and cluster level as traffic in the system fluctuates by increasing and decreasing the resource pool for secondary usage may increase and decrease and may be reported to the DPC 902 via the DSC 910.

Allocation of Available Resources

In the various embodiments, the Dynamic Spectrum Arbitrager (DSA) system may further manage allocation or assignment of RF spectrum resources of a network provider for specific uses, such as use by secondary users. The DSA communication system may manage RF spectrum allocation based on the providers' varying criteria, such as degrees of prioritization (e.g., low priority or no priority), type of connection (e.g., "always on" and "surge" guaranteed access and bandwidth), and price.

In contrast to the currently available spectrum allocation techniques, allocation of spectrum resources by the DSA communication system may rely on real-time traffic status of participating providers. The DSA communication system resource allocation may further depend on different factors, such as availability of resources, the type of services that are being delivered and the policies associated with those services. Some of the key policy criteria that may be considered for allocating resources in the DSA communication system may include Radio Access Selection, Capacity Augmentation, Quality of Service (QoS), bearer selection, Congestion Control, Routing, Security, and Rating. The DPC and DSC 910 may perform policy definition and control.

Radio Access Selection: The DSA communication system may be configured to make the best available spectrum assignment from the available pool of resources. Factors considered in the selection of spectrum assignment may include spectrum bandwidth, location of spectrum in the frequency band, geographic zone along with the requested service, and QoS.

Capacity Augmentation: The DSA communication system may be configured to make the best available capacity augmentation assignment from the available pool of resources. Factors considered in the decision may include spectrum bandwidth, location of spectrum in the frequency band, geographic zone along with the requested service, and QoS.

Bearer Selection: The DSA communication system may be configured to select the resources required to support the requested QoS profile at the radio and transport bearer services.

Admission Control: The DSA communication system may be configured to maintain information of available/allocated resources in both the radio and the IP transport network and perform resource reservation/allocation in response to new service requests.

Congestion Control: The DSA communication system may be configured to monitor traffic conditions on the primary network, and seek alternative methods for capacity off load. Additionally, The DSA communication system may be configured to monitor the primary network and perform back-off of secondary users as traffic demand increases on the primary network.

Routing: The DSA communication system may be configured to ensure that the optimum route for the service is used based on the bearer traffic and available network resources.

Security: The DSA communication system may be configured to provide security for the traffic streams by segregating the traffic into tunnels to ensure no cross pollination of information.

Rating: The DSA communication system may be configured to coordinate rating schemes including prioritization and carrier usage fee and other metering processes.

The DSA communication system resource allocation may be based on different methods, such as stateless and stateful methods. By employing different allocation methods, the DSA communication system may enable providers to tailor spectrum allocation and utilization based on their individual spectrum traffic demands. The stateless method may involve coordinating spectrum usage between networks on a real-time basis. The stateful method may include storing and forwarding spectrum resources following defined time intervals. RF spectrum resources may further be allocated on a need basis, which may be based on committed and peak bandwidth/traffic requirements. The need based allocation method may allow for the greatest flexibility and spectrum utilization. The DSA communication system may further employ a just-in-time allocation method in enabling the providers to allocate spectrum resources. By employing the just-in-time allocation method, the DSA communication system may improve the overall spectrum utilization for a given market and provide a revenue source for wireless carriers.

In an embodiment, the DSA communication system may provide the command and control functions to enable spectrum to be leased for the entire license area or for a defined sub-license area, and for a term. For example, the DSA communication system may facilitate spectrum resource allocation using a sub-spectrum block approach with the ability to increase or decrease the spectrum consumed dynamically. For example, multiple different communication networks can allocate spectrum to the same user.

As shown in FIG. 9, the components of the DSA communication system which are not part of a provider's network, such as the DPC 902, may manage spectrum allocation between different networks or sub-networks.

In an embodiment, the DSA communication system may enable host networks to allocate resources which are currently assigned for use by primary users for use by secondary users. In such a scenario, the secondary users may be granted access to the host networks' spectrum capacity or resources regardless of existing available capacity at of the host network.

Governance and Policy Management

The DSA communication system may operate based on pre-determined rules and parameters which may be based on the statistics of the channel availability. For example, operating rules may enable the DSA communication system to monitor the level of access to RF spectrum at any given time to allow the system to determine whether capacity is available for allocation.

As described above, resource allocation may be done through the DSA communication system components, such as the DPC 902 and DSC 910 following the rules defined by the business arrangement, device compatibility, target system RAN, and capacity and services requested.

FIG. 9 further illustrates the network architecture 900 of an embodiment method for implementing DSA policy governance. The DSA communication system may require that the participating parties adhere to the governing rules and policies.

In implementing the DSA policies, the Policy Control and Charging Rules Function (PCRF) 905 of a participating network may provide the policy and service control rules and the Rivada® Policy Control Network (RPCN) may provide policy changes and corrections based on the DSA rules and DPC 902 requirements. The PCRF may be responsible for policy control decision-making, as well as for controlling the flow-based charging functionalities in the Policy Control Enforcement Function (PCEF), which resides in the PGW. The PCRF provides the QoS authorization (QoS class identifier [QCI] and bit rates) that decides how a certain data flow will be treated in the PCEF and ensures that the data flow and authorization meets and is in accordance with the user's subscription profile. The RPCN may be a part of each network DSC 910. The RPCN may further maintain a Hot List for public safety users who may also be linked to the commercial system.

For example, when resources of a host network is depleting, the network PCRF 905/RPCN may instruct the host network to take an action to recover additional resources for the preferred users of the home network. The instructions sent by the PCRF 905/RPCN may be used to determine the course of action needed to be taken to free-up resources for the use of the preferred users. For example, the PCRF 905/RPCN instructions may be to reduce QoS for secondary user wireless devices 101 or certain applications, or shed secondary user wireless devices 101 from the network based on a set of conditions. While managing the level of its resources by reducing traffic, the host network may implement time slot allocations.

Some optional subcomponents of the EPC may include the MME 914 (Mobility Management Entity), which is a key control-node for the LTE access-network and may be responsible for idle mode UE (User Equipment) tracking and paging procedure including retransmissions and may be involved in the bearer activation/deactivation process and is also responsible for choosing the SGW for a UE at the initial attach and at time of intra-LTE handover involving Core Network (CN) node relocation. MME 914 may be responsible for authenticating the user (by interacting with the HSS). The Non Access Stratum (NAS) signaling terminates at the MME 914 and may also be responsible for generation and allocation of temporary identities to UEs. MME 914 may check the authorization of the UE to camp on the service provider's Public Land Mobile Network (PLMN) and enforces UE roaming restrictions. SGW 922 (Serving Gateway) may route and forward user data packets, while also acting as the mobility anchor for the user plane during inter-eNodeB 916a, 916b handovers and as the anchor for mobility between LTE and other 3GPP technologies. The PGW 908 (PDN Gateway) provides connectivity from the UE to external packet data networks by being the point of exit and entry of traffic for the UE. A UE may have simultaneous connectivity with more than one PGW 908 for accessing multiple PDNs. HSS 926 may be a central database that contains user-related and subscription-related information. The functions of the HSS 926 include, for example, mobility management, call and session establishment support, user authentication and access authorization. ANDSF 918 (Access Network Discovery and Selection Function) provides information to the UE about connectivity to 3GPP and non-3GPP access networks (such as Wi-Fi). The purpose of the ANDSF 918 is to assist the UE to discover the access networks in their vicinity and to provide rules (policies) to prioritize and manage connections to these networks. Network 900 may also include ePDG (Evolved Packet Data Gateway) is to secure the data transmission with a UE connected to the EPC over an untrusted non-3GPP access.

DSA communication system policy and governance may have the same attributes as those found in a commercial network. However, in the DSA communication system, the combination of policy driven QoS with dynamic spectrum arbitrage/allocation may enhance both the primary and secondary (e.g., lessor and lessee) spectrum utilization and reduce the overall costs.

In an embodiment DSA system, the policy/governance may be set for specific levels of network resources per session, per "pipe," per user or a group of users. The policy may also relate to the priorities, such as emergency calls getting highest priority, or preferences, such as allowing degrading quality for ongoing calls or rejecting new ones at near congestion time. DSA policy and governance may also invoke routine policies which may be applied to facilitate the best route for a particular type of communication session and service offering.

Access to Allocated Resources of Another Network

In an embodiment, the DSA communication system may manage the access of users to available RF spectrum resources of a network. For example, the DSA communication system may manage the access of secondary users to spectrum resources of a primary host network that are allocated for secondary use.

The secondary users may access spectrum resources of a primary host network using different methods such as, by acting as a dynamic roamer or using a coordinated spectrum scheme with compatible access techniques. In allowing the secondary user to access a primary host spectrum resources, the DSA communication system may enable the wireless device 101 of a subscriber of one provider to change bandwidths from the spectrum belonging to the home network provider of the wireless device 101 to one belonging to a host network provider based on different parameters such as price, quality of reception, geographic region or zone, and location.

The DSA communication system may provide access to a secondary user based on different access conditions. The DSA communication system may provide access to available spectrum either temporarily or by sharing traffic throughput for a radio access technique with a primary user of a primary provider. Temporary access may involve accessing defined spectrum that was allocated for usage based on the policies of the DSA communication system. Sharing spectrum may involve allowing the subscribers of one provider to access radio spectrum at a host provider on a secondary basis.

Secondary users' home network providers may employ different methods to dynamically contract for allocated RF spectrum resources of a primary provider. For example, the primary provider may auction and the secondary provider may bid for available spectrum resources. The bidding may be a fee based process; which may involve managing the reselling of unused spectrum on temporary or permanent basis to efficiently manage excess resources that might otherwise go unused for that time; or managing leasing of excess RF spectrum on temporary or permanent basis.

Figure 10:
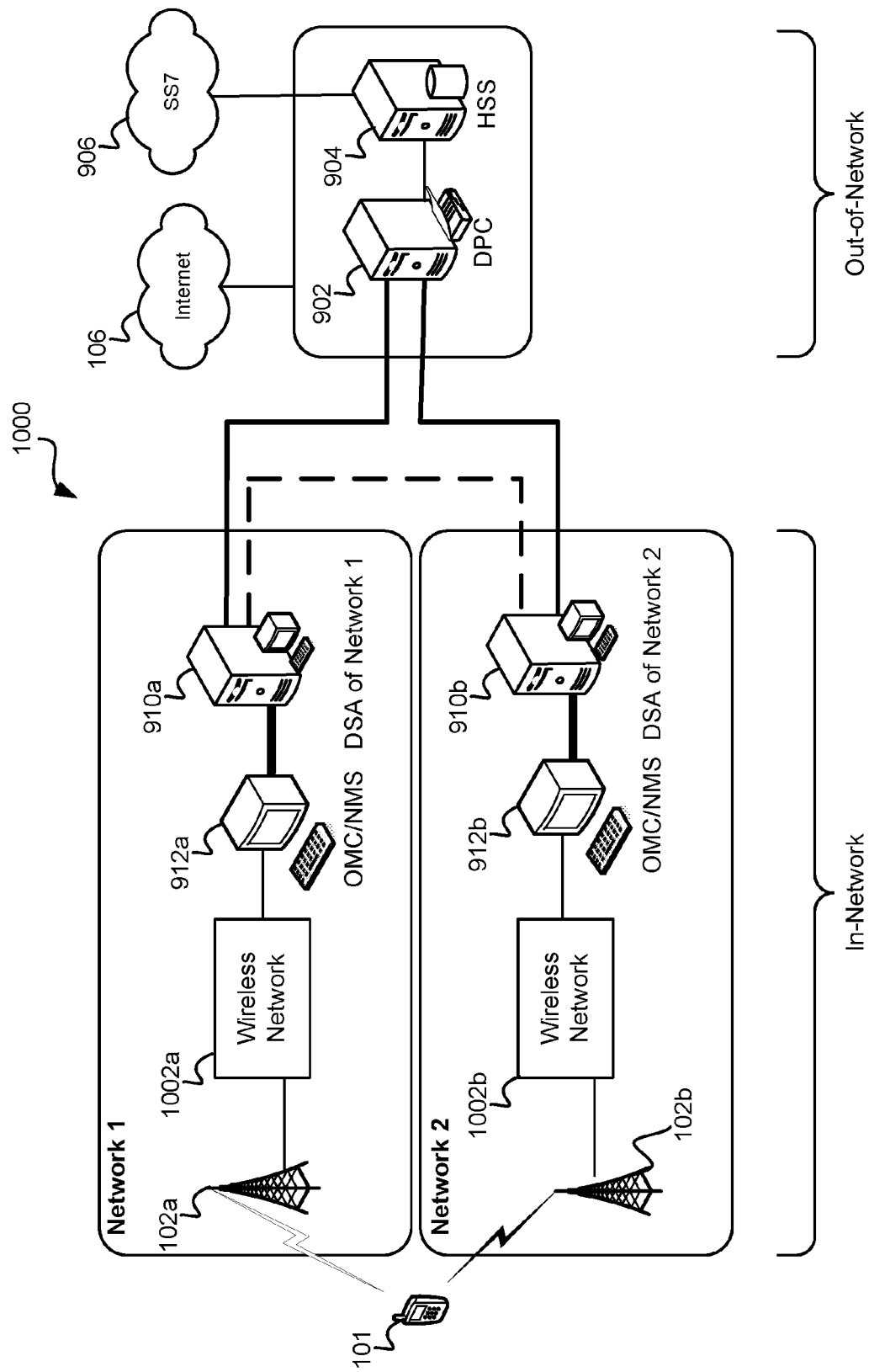
FIG. 10 is a communication system block diagram of a DSA communication system according to an embodiment.

FIG. 10 illustrates network architecture 1000 of two wireless network providers using the DSA communication system to share spectrum resources. The DSA communication system may be comprised of two general components: Out-of-network and in-network components. The out-of-network component of the DSA communication system may include a DPC 902 connected to a HSS 904. The DPC 902 may enable the DSA communication system to dynamically manage the access to the allocated spectrum resources of a network. For example, the DPC 902 may manage the access of secondary users of a network provider to the allocated spectrum resources of a primary network provider.

The DPC 902 may further coordinate DSA communication system policies and effectuate sharing of relative information between network providers. The DPC 902 may further facilitate the charging policy and resource requests which may be communicated with the networks.

The DPC 902 may be configured to communicate with one or several networks (e.g., Network 1 and Network 2) through in-network DSC 910 component of each DSA communication system participating provider. In an embodiment, each Network 1 and Network 2 may include a DSC 910a, 910b which may be an add-on to the online management center/network management system (OMC/NMS) 912a, 912b of a wireless carrier. At each network, the DSC 910a, 910b may manage traffic and capacity of each network and continuously monitor nodes for capacity constraints based upon commands received from or policies and rule sets of the DPC 902. The DSC 910 may communicate its findings with the DPC 910.

Each network may include an OMC/NMS 912a, 912b which may be in communication with a wireless network 1002a, 1002b. The wireless network 1002a, 1002b may be in communication with wireless access nodes 102a, 102b. Subscriber wireless devices 101 may communicate with a wireless access node 102a, 102b. The relationship and interconnectivity of these components of the network are known.

In an embodiment, the DSC 910a of Network 1 may determine that additional resources may be required by Network 1. The DSC 910a of Network 1 may be configured to send a request for additional resources to the DPC 902. The DPC 902 may receive information regarding a secondary user wireless device 101a location and the network.

The DPC 902 may be configured to also receive data from other affiliated networks such as from the DSC 910b of Network 2. The DSC 910b of Network 2 may be further configured to report to the DPC 902 that specified amounts of resources are available in Network 2.

The DPC 902 may be configured to process data received from the requesting network (i.e., Network 1) and the supplying network (i.e., Network 2) and facilitate a real-time access to the resources of Network 2 by the requesting Network 1. Once spectrum resources from Network 2 are made available for access by users of Network 1, the DSC 910a may instruct the wireless devices 101a to change networks and access the spectrum resources provided by Network 2. For example, when a wireless device 101a of Network 1 requests communication resources, its rule set may be validated by the DSC 910 of Network 2. Network 2 may receive the wireless device's 101a updated information in the PCRF 905 (shown in FIG. 9). The PCRF 905, with other platforms, may allow the secondary user wireless device 101a to access the allocated resources of Network 2.

In an embodiment, the accessibility of resources to a secondary user through the DSA communication system may also depend on Host Network Operators policy and use criteria for those resources. The criteria can include both Radio Access and Core Network Resources.

For example, some of the policy and resource criteria imposed by the Host Network Operator may include: Availability of spectrum (e.g., separate or co-existence); availability of capacity/bandwidth (e.g., RF and Core); overhead criteria (e.g., percent total available capacity versus used capacity); existence of back-off criteria (e.g., reselection, handover (intra system and inter-system), termination); treatment (how specific services/applications are treated/routed); barred treatments (e.g., services/applications which are barred for use); rating (e.g., how services are rated, i.e., possible special discount for off-peak usage); geographic boundary (e.g., defining zones or cells for inclusion); time (e.g., defining time and day(s) for inclusion including); duration (e.g., defining incremental allocation based on time and geographic boundary); user equipment types.

The DSA communication system may enable a secondary network to request spectrum resources based on: time (e.g., when are resources requested); required capacity/bandwidth; treatment (e.g., what services are desired, including QoS); geographic boundary (e.g., where services are requested); and duration (e.g., for how long are the resources requested).

In an embodiment, the communications that may be performed by the DSC 910a, 910b may be transparent to the secondary users. In another embodiment, the communication may not be transparent.

Figure 11:
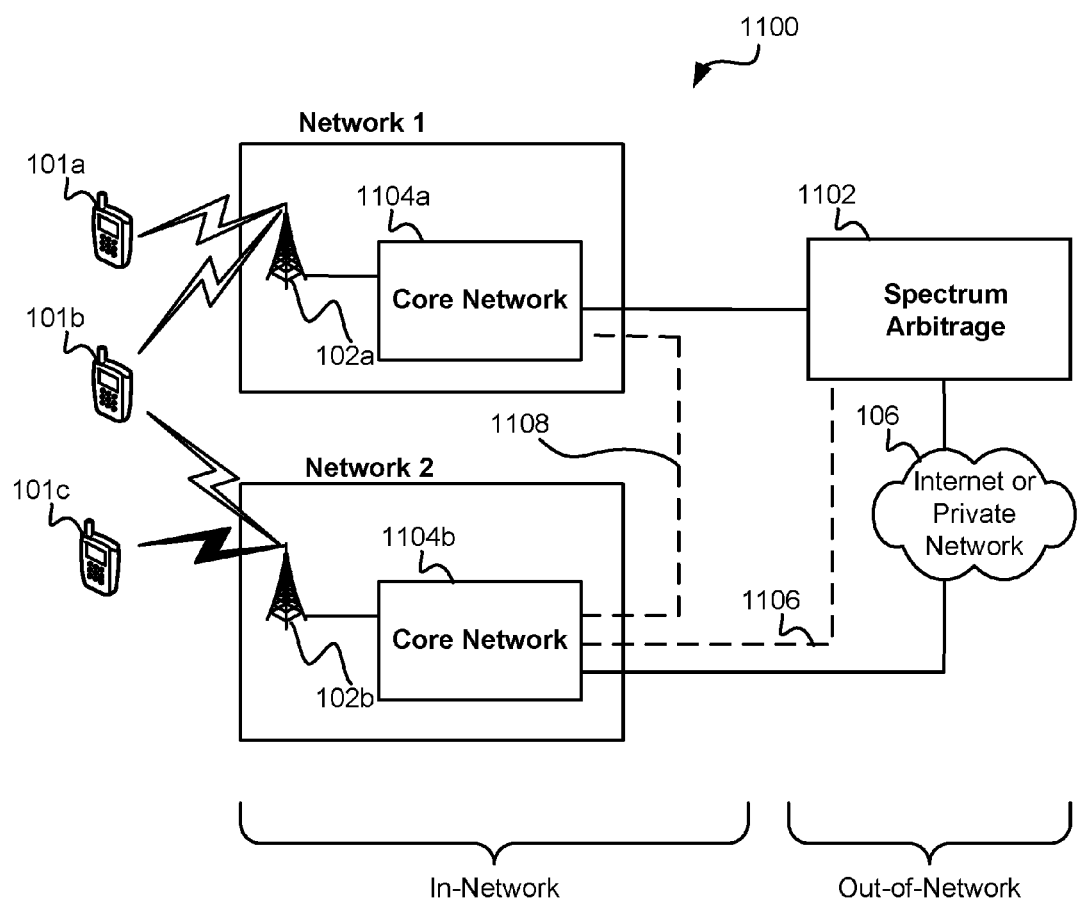
FIG. 11 is a communication system block diagram of a DSA communication system according to an embodiment.

FIG. 11 illustrates a network component diagram 1100 of an embodiment DSA communication system where spectrum usage and traffic data may be processed by a third party or spectrum clearinghouse. The out-of-network component 1102 of the DSA communication system may include sub-components such as the DPC 902 (shown in FIG. 9). The DPC 902 may communicate with the wireless Networks 1 and 2, by communicating with sub-components of the core network 1104a, 1104b. The out-of-network component 1102 may also communicate with one or both networks using the Internet or a private network 106. For example, the DSA communication system out-of-network component 1102 may communicate with the core network 1104b of Network 2 via the Internet 106 while directly communicating with the core network 1104a of Network 1. The core networks 1104a, 1104b may include sub-components such as the DSC 910, Long Term Evolution (LTE), (EVDO), (HSPA) and OMC/NMS 912a.

When Network 1 becomes overburdened and requires additional spectrum resources, the core network 1104a, may determine a need for spectrum and request for additional spectrum resources from the DSA communication system out-of-network component 1102. Network 2 may determine that it has available an excess amount of spectrum resources due to low call traffic. Network 2 may also report the availability of excess resources to the out-of-network component 1102. Communication between the DSA out-of-network component 1102 and Network 2 may be through the Internet 106. Alternatively, the out-of-network component 1102 and Network 2 may communicate directly as shown by dashed line 1106. The DSA out-of-network component 1102 may facilitate the allocation of spectrum resources from Network 2 to Network 1 which is shown here by the dashed line 1108.

The wireless device 101b may access the allocated resources by different methods. Network 1 may instruct the wireless device 101b to switch networks to Network 2 to use the allocated resources as a secondary user on Network 2. Alternatively, the allocated resources of Network 2 may be made available through Network 1 enabling the wireless device 101b to use the resources of Network 2 without having to change communications session from Network 1 to Network 2. For example, networks 1, 2, and 3 may pool spectrum that can be allocated for use by multiple entities.

Figure 12:
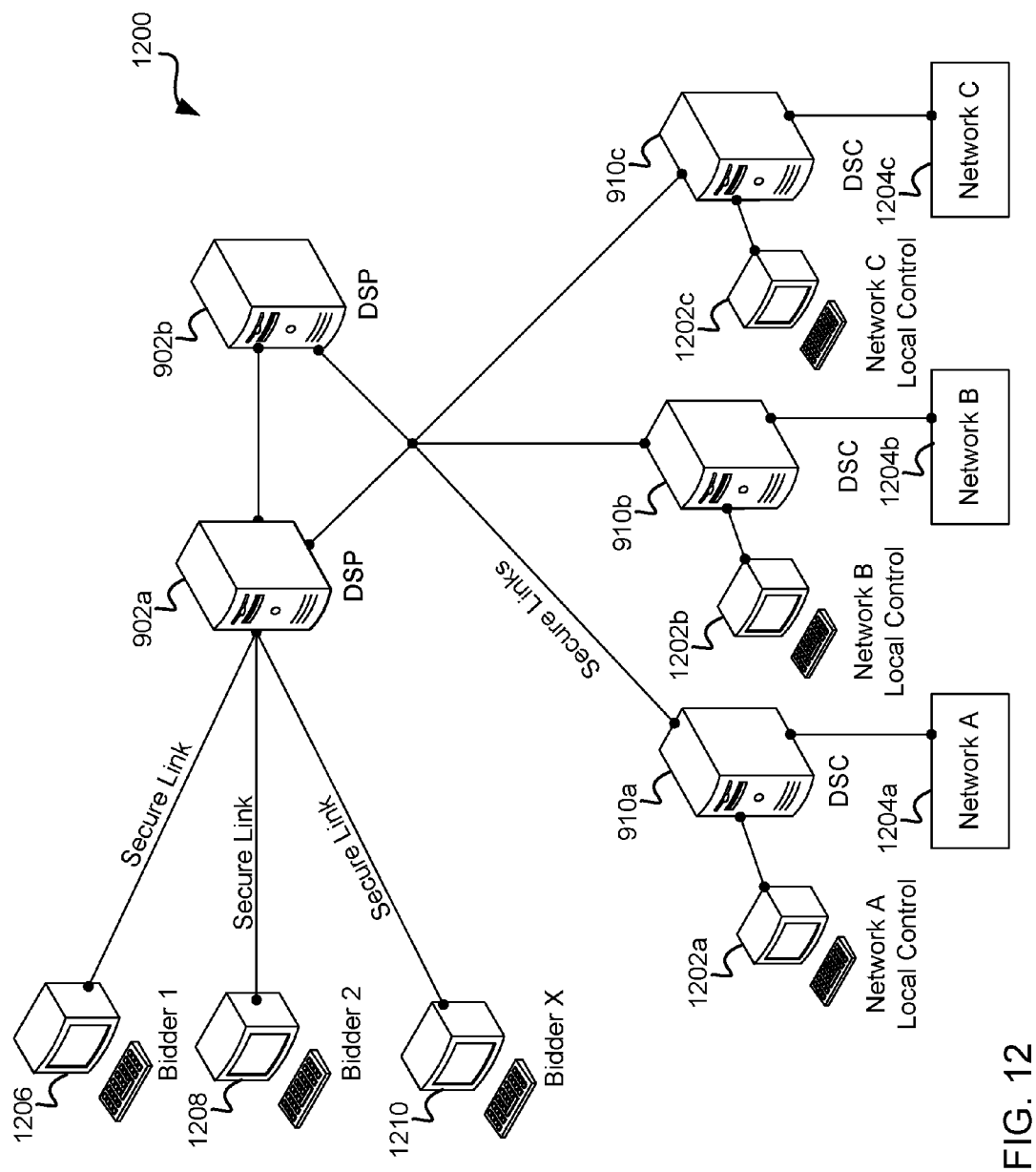
FIG. 12 is a communication system block diagram of a DSA communication system illustrating an embodiment for providing master control for the arbitrage process.

FIG. 12 illustrates a communication system 1200 of an embodiment DSA network. The DPC 902 may provide the master control for the arbitrage process while serving several different networks. The DPC 902 may include the policy and time dependent arbitrage rules for current allocations. The DSC 910 may be configured to also have a local copy of the policy and time dependent arbitrage rules for the current allocation. The local copy of the policy and time dependent arbitrage rules may ensure that the local control of the network resources may be maintained. In addition, the DSCs 910a-910c may be separate platforms interfacing with the network operations system providing a demarcation point for future network operation issues.

In an embodiment, to ensure disaster recovery of the system in the event of an incident, the DPC 902 may be configured as a dual mirrored server site (e.g., DPC 902a and DPC 902b) or include several servers in a geographically dispersed cluster. To secure the network, the DPC 902a, 902b may have a secured link to defined and pre-approved network operators 1204a, 1204b, 1204c (e.g., spectrum resource providers) and system resource requesters 1206, 1208, 1210 (e.g., bidders).

In the event of a failure of communication between the DPC 902a, 902b and DSC 910a, 910b, 910c, the DSC 910 a, 910b, 910c may be configured to use its locally saved policy and rule contents to maintain continuity in an arbitrage process that has been initiated by the DPC 902a, 902b. However, because of the lack of connection with the DSC 902a, 902b, the DSC 910a, 910b, 910c may not be able to facilitate additional new resource allocations or bids. To ensure that local control is always maintained, the DSC 910a, 910b, 910c may be further configured to control and locally override components and functions that enable the local operators to prematurely terminate or back-off resources from a secondary user.

For example, DSC 910a may locally store policy and rules of any communicating DPCs 902a, 902b. As such, if communication between the DPCs 902a, 902b and DSC 910a is compromised after a bid has been processed by a DPC 902a, 902b, the DSC 910a may continue to provide resources to secondary users of bidder 1 1206 without having to terminate the secondary users. Additionally, when Network A 1204a requires more resources to provide service to its own primary users, the DSC 910a may locally control the off-loading of secondary users from Network A to free-up resources based on the policies and rules of the DPC 902a, 902b.

Figure 13A:
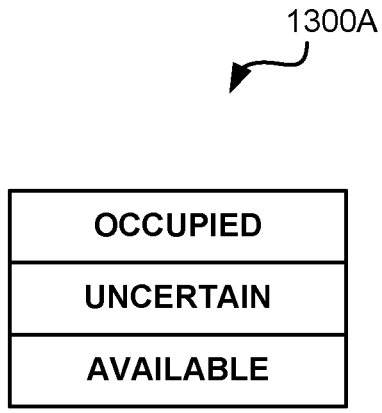
FIG. 13A is a diagram of RF spectrum illustrating its allocation according to an embodiment.

In an embodiment, the process involved in the DSA communication system may be similar in all cases for flow. As illustrated in FIG. 13A, resources of a block of spectrum 1300A may be categorized based on how they are used by a network. Resources for a given spectrum may be categorized as occupied resources, uncertain resources and available resources. The occupied resources may be those resources which are currently in use by the carrier and may not be allocated by the DSA communication system. The uncertain resources may provide a margin for the carrier to manage peak loads. The uncertain resources may be used up during the peak loads and not used during low peak loads. The available resources may be the subset of resources which are not used at all by the network. The available resources may be made available for allocation to other secondary providers.

Figure 13B:
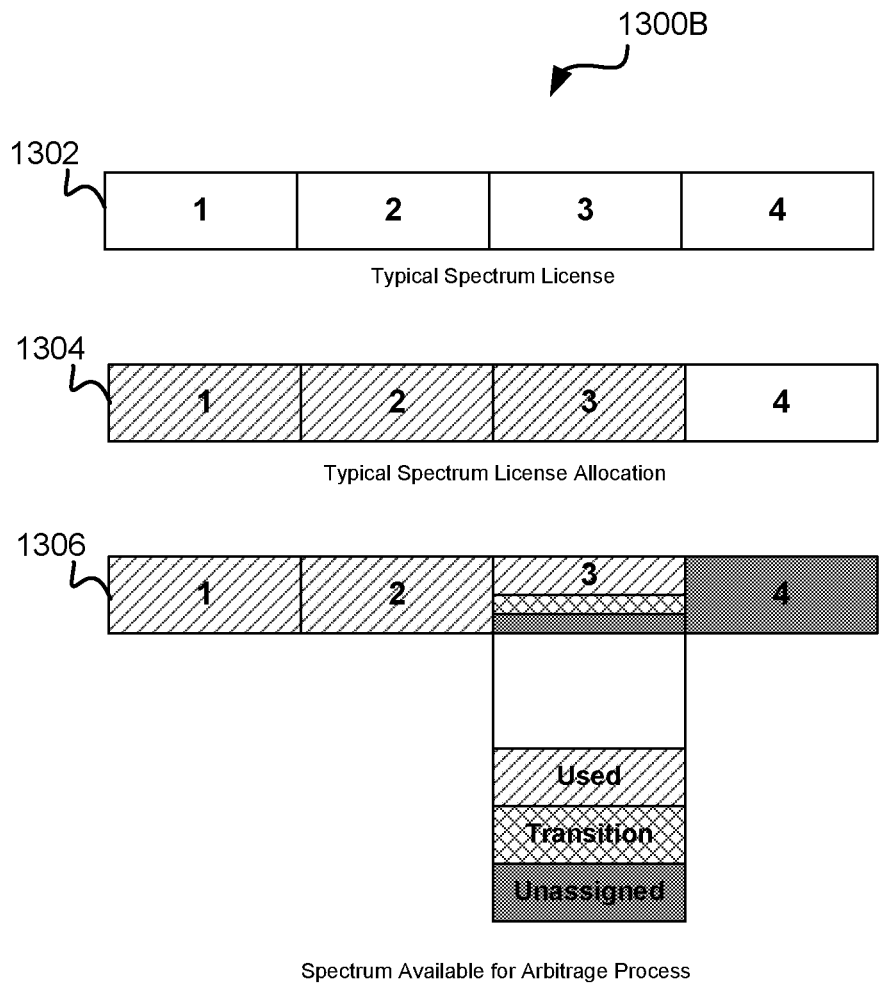
FIG. 13B is a diagram illustrating a manner in which RF spectrum may be allocated for use according to an embodiment.

In an embodiment, spectrum resources may be allocated to secondary users by different methods. FIG. 13B illustrates allocation of spectrum resources of a block of spectrum 1300 licensed by a host network, according to an embodiment. The host network may license a RF spectrum block 1300a including four channels. The host network may dedicate three of the four channels of the RF spectrum block for use by the network 1 subscribers. The dedicated channels 1-2 are shaded in the RF spectrum block 1300b. As shown by RF spectrum 1300b, Channel 4 may remain unassigned by the provider. Channel 3 may be partially allocated, partially transitional and partially unassigned as illustrated by spectrum block 1300c. The transitional section of the spectrum block 1300c may be reserved for use during high traffic periods by the provider's subscriber. The unassigned portions of the licensed spectrum 1300c may never be used.

In an embodiment, the host network may sublicense the unassigned portion of the licensed spectrum to secondary users using the DSA communication system. In such a scenario, the host operator may make available to secondary users the unassigned portion of channel 3 and all of channel 4.

Figure 14:
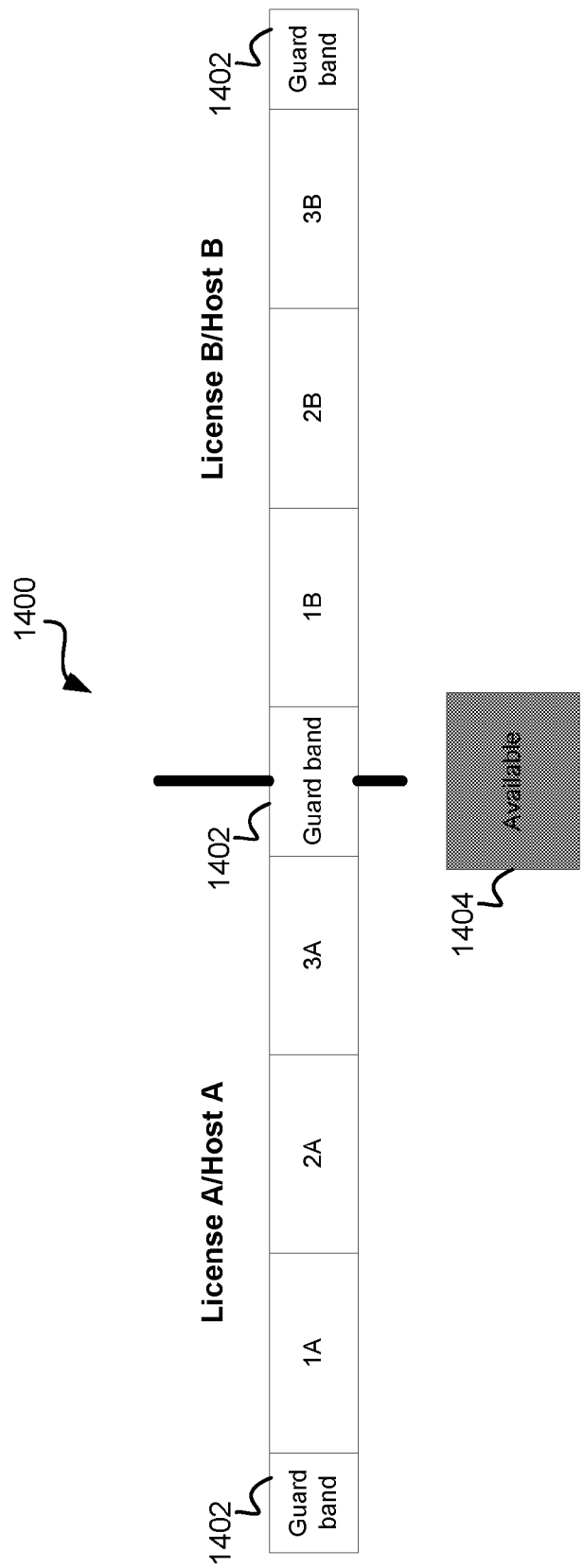
FIG. 14 is a block diagram illustrating the manner in which RF spectrum may be allocated with a guard band for use according to an embodiment.

FIG. 14 illustrates allocation of spectrum resources including a guard band channel of a licensed spectrum 1400, according to an embodiment. The licensed spectrum 1400 may include a guard band 1404 that is either defined or set aside by operators as part of a spectrum deployment policy and program. Such guard bands may include usable resources that currently remain unused. The host network may allow the resources available in the guard bands to be used by secondary users using the DSA communication system. By using the DSA the host network may make available for use the unused guard band resources by combining the guard band into a single usable channel 1402 for resource allocation.

Figure 15:
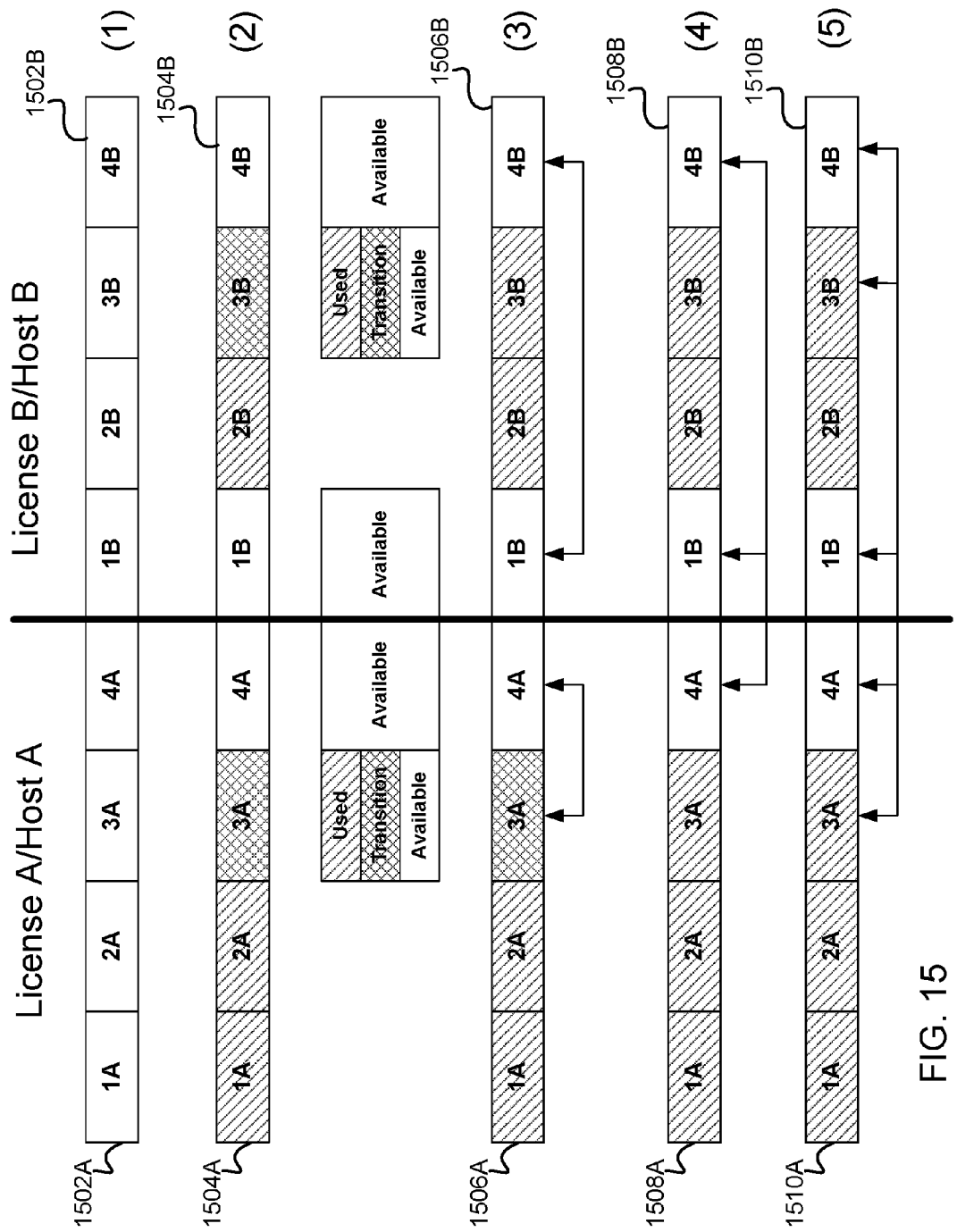
FIG. 15 is a diagram illustrating a manner in which RF spectrum may be pooled for use allocation according to an embodiment.

FIG. 15 illustrates pooling and allocation of spectrum resources of more than one host networks using the DSA communication system, according to an embodiment. In an embodiment, the DSA communication system may be configured to survey the available spectrum from different networks and pool the available together for allocation. In an exemplary embodiment as shown by spectrum block (1), each of the host networks, network A and network B, may license a block of spectrum including four channels each. For example, the block of spectrum 1502A licensed by network A may include channels 1A, 2A, 3A, and 4A. The block of spectrum 1502B licensed by network B may include channels 1B, 2B, 3B, and 4B.

In the exemplary embodiment as shown by spectrum block (2), the spectrum block 1504A of network A may include available channel 4A and partially assigned channel 3A. Channel 3A may be partially assigned for use by the network, partially transitional and partially available for use by other networks. The spectrum block 1504B of network B may include available channels 1B and 4B and partially assigned channel 3B. Channel 3B may be partially assigned for use by the network, partially transitional and partially available for allocation to other networks.

In an exemplary embodiment as shown by spectrum block (3), each spectrum block 1506A, 1506B of network A and network B may make available their resources using the DSA communication system. The DSA communication system may pool the available resources from each network and allocate them for secondary use. For example, the DSA communication system may pool the resources available in channels 1B and 4B and make them available to secondary users. The DSA communication system may pool the resources available in channel 4A and the partial resources available in channel 3A and make them available to secondary users.

The DSA communication system may pool available resources from different networks for allocation to secondary users. In an exemplary embodiment, as shown in spectrum block (4), the DSA communication system may pool available resources from channel 4A in network A, spectrum block 1508A and channels 1B and 4B in network B, spectrum block 1508B, and make them available to secondary users.

In an exemplary embodiment, as shown by spectrum block (5), the DSA communication system may pool available resources from all channels in different networks, including channels with resources that are fully committed for use by the network and channels which include available resources. The DSA communication system may pool spectrum resources from channels 3A and 4A in network A, spectrum block 1510A, and channels 1B, 3B and 4B in network B, spectrum block 1510B, and make them available to secondary users.

In an embodiment, the DSA communication system may enable Mobile Virtual Network Operators (MVNO) to utilize unused spectrum capacity. For example, the DPC 902 may aggregate multiple MVNO's to utilize unused spectrum capacity in a prioritization scheme. This would enable an MVNO to sell its unused or under used capacity to another MVNO thereby ensuring that both MVNO's operating efficiently.

Figure 16A:
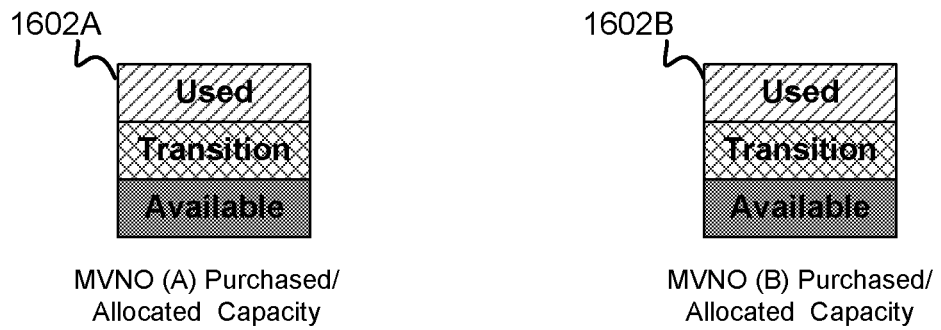
FIGS. 16A through 16C are block diagrams illustrating a manner in which spectrum is allocated for Mobile Virtual Network Operators (MVNO).
Figure 16B:
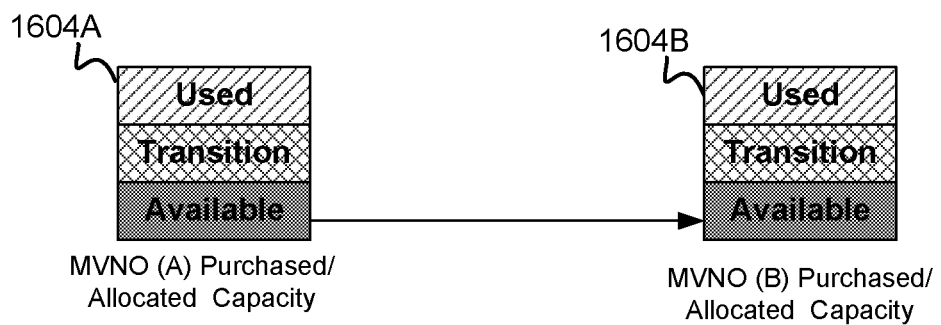
Figure 16C:
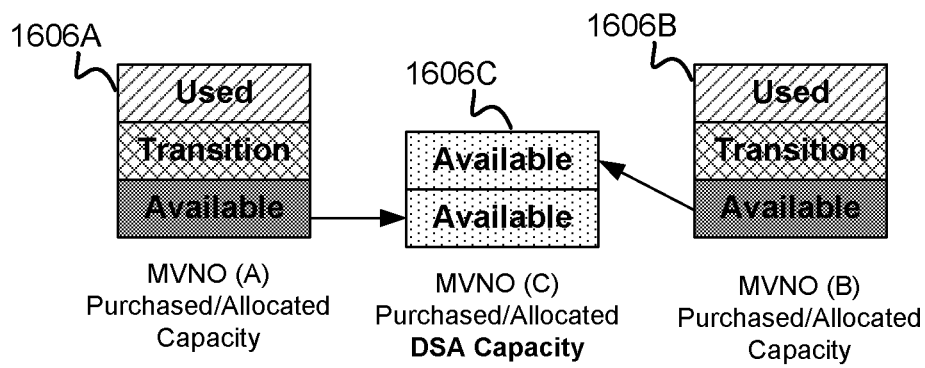

FIGS. 16A-16C illustrate MVNO spectrum aggregation according to an embodiment. FIG. 16A illustrates the allocation or capacity of spectrum for MVNO A 1602A and MVNO B 1602B where both operators possess unassigned spectrum capacity. FIG. 16B illustrates an exemplary embodiment method by which the DSA communication system may enable the MVNO B 1604B to increase or augment its available spectrum capacity by receiving unassigned spectrum from MVNO A 1604A. FIG. 16C illustrates an exemplary embodiment method by which the DSA communication system may be enabled one MVNO C 1606C to receive additional spectrum capacity from two other MVNO's 1606A, 1606B. The MVNO C 1606C may be a new or additional MVNO and may obtain the available unassigned spectrum capacity from MVNO A and B 1606A, 1606B for its potential use. In this scenario, MVNO A and MVNO B 1606A, 1606B may or may not operate on the same host carrier and may or may not have the same Radio Access Technology (RAT). In another embodiment, a conversion may be provided to provide access between different RAT.

In an embodiment, to measure the quantity of the resources that are used by secondary users, the host network may use similar processes as used for pre-paid users to facilitate the time/duration and usage metering of secondary uses which can be done at an individual or global account basis.

Depending on the method used by secondary users to access available resources, several fundamental types of DSA allocation methods may be implemented, including: 1) virtual-best effort method; 2) virtual-secondary users method; and 3) spectrum allocation method which may include License area and Regional area spectrum allocation. Each of these allocation methods may have several variations. For example, in a virtual-best effort method, the DSA communication system may be configured to make available spectrum resources for an entire license area or on a regional, sub-license area basis. Classes of the users may also be defined in user's wireless devices 101 by their home network providers and may be assigned either secondary user or best effort user statuses.

In an embodiment, Resources in the virtual-best effort method may be available to the MVNO through a grant of access to the network involved. Prioritization may occur within the host network based on PCRF rules of the home and host networks.

In the virtual-best effort method, the host network may enable the secondary user wireless devices 101 to use the same network as the host network but on a virtual basis, i.e., an MVNO type of arrangement. Different variations of this arrangement may include situations when 1) the secondary user uses the host network with the same rights as the host network subscribers and 2) the secondary user uses the host network as a secondary user or on a secondary basis where primary users (host subscribers) have higher priority and rights than the secondary user subscribers. Access priority for primary users may be established in networks where the primary users are public safety users. During emergency situations, the host network may drop secondary users due to an increase in use of its spectrum by other users such as public safety primary users.

Figure 17:
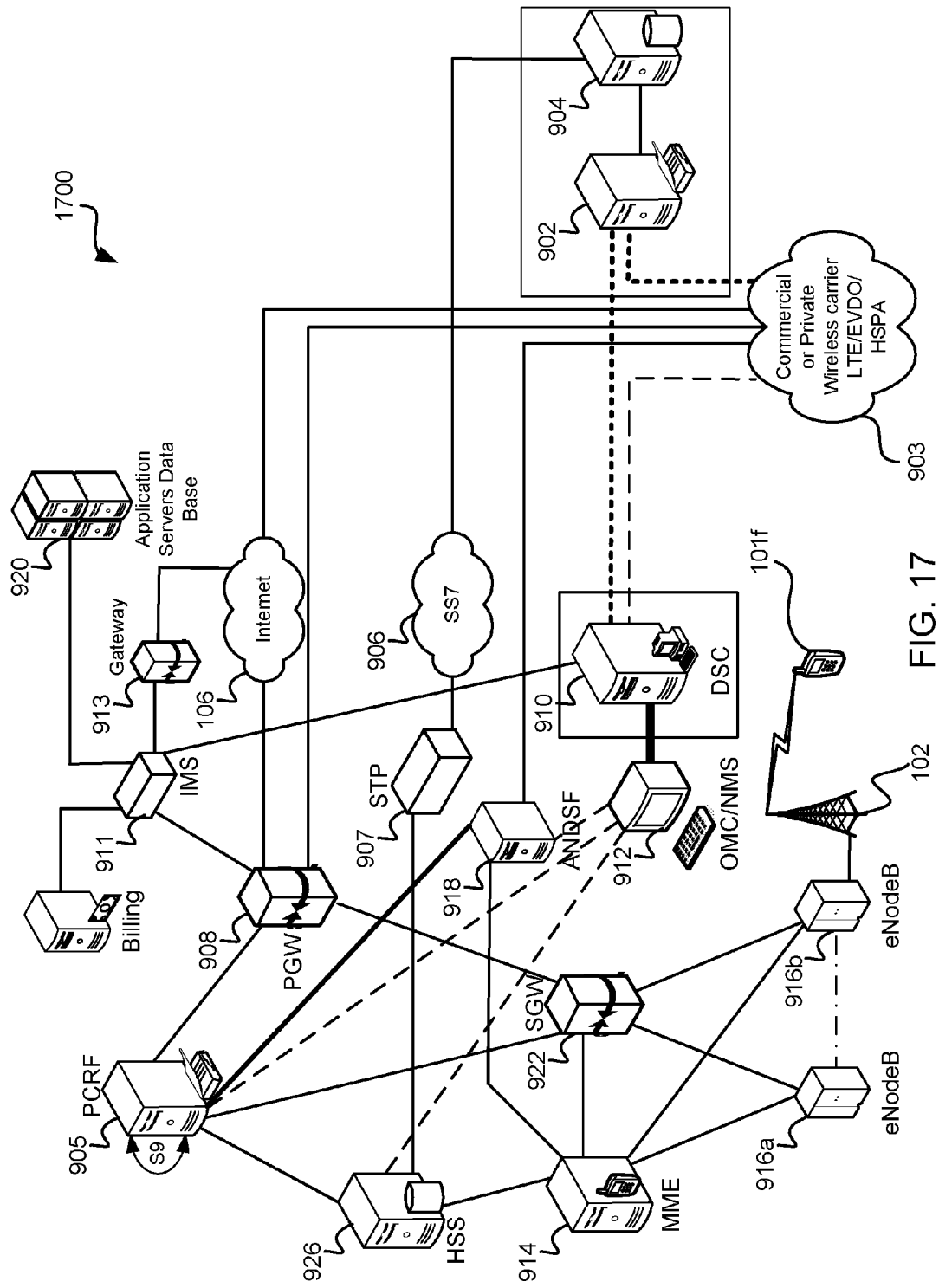
FIG. 17 is a communication system block diagram of a DSA communication system illustrating communication between components of the system for allocating resources according to an embodiment.

FIG. 17 illustrates a communication system 1700 of a DSA communication system for allocating resources according to an embodiment. In a virtual-best effort method, the wireless device 101 may be considered a valid roamer as shown in FIG. 17.

During the bidding process, the DSA communication system may implement a rule sets which may be used to define the types of services, treatments and duration of services for the wireless devices that are granted access to the host network. The rule sets may include information such as: 1) requested capacity/boundary; 2) treatment of services such as when they are required and the QoS; 3) geographic boundaries based on the requested service; 4) time for when resources are requested; and 5) duration for which requested resources would be used by the secondary user. It is contemplated that all or a sub-set of these rules may be used depending on the arbitrage scheme.

In the virtual-best effort method, the DSA communication system may follow the industry roaming process in that access to spectrum may be granted to the secondary users provide the service requesting wireless devices meet the required authentication processes. Validation/authentication of the secondary user wireless devices 101 may be performed following standard MAP/IS-41 processes through the use of the host's HSS 926 and AAA.

Additional criteria that the DSA communication system may add to the process of roaming may include different billing schemes. For example, secondary user's wireless device's 101 access duration or total usage permissions may be governed by the host network. Such governing schemes enable the host network to control the access of the secondary users locally and on a real-time basis. In the virtual-best effort method, the DSA communication system may not reserve resources and merely track the consumption of resources.

In the virtual-best effort method, the primary or host network provider may not grant prioritization to the secondary users except through differentiation afforded by the PCRF 905 and PDN Gateway (PGW) 908 of the host network provider. To use the resources of a DSA communication system using the virtual-best effort method, the secondary users may either use the PGW(s) 908 of the host network of or the secondary network's PGW which may be either connected to the appropriate Serving Gateway (SGW) 922 of the host network or connected to the PGW of the host through an intermediate PGW 908 that is governed by the host network.

The PGW is responsible for IP address allocation for the wireless device 101, as well as QoS enforcement and flow-based charging according to rules from the PCRF. It is responsible for the filtering of downlink user IP packets into the different QoS-based bearers. This is performed based on Traffic Flow Templates (TFTs). The PGW performs QoS enforcement for guaranteed bit rate (GBR) bearers. It may also serve as the mobility anchor for interworking with non-3GPP technologies such as CDMA2000 and WiMAX® networks.

All user IP packets may be transferred through the SGW, which serves as the local mobility anchor for the data bearers when the wireless device moves between eNodeBs. The local mobility anchor point for inter-eNodeB handover includes downlink packet buffering and initiation of network-triggered service requests, lawful interception, accounting on user and QCI granularity, and UL/DL charging per wireless device. SGW also retains the information about the bearers when the wireless devices are in the idle state (known as "EPS Connection Management IDLE" [ECM-IDLE]) and temporarily buffers downlink data while the Mobility Management Entity (MME) initiates paging of the wireless devices to reestablish the bearers. In addition, the SGW performs some administrative functions in the visited network such as collecting information for charging (for example, the volume of data sent to or received from the user) and lawful interception. It may also serve as the mobility anchor for interworking with other 3GPP technologies such as general packet radio service (GPRS) and UMTS.

The MME is the control node that processes the signaling between the wireless device and the CN. The protocols running between the wireless device and the CN are known as the Non Access Stratum (NAS) protocols (eMM, eSM) and security, AS security, tracking area list management, PDN GW and S-GW selection, handovers (intra- and inter-LTE), authentication, bearer management. The MME also contains mechanisms for avoiding and handling overload situations.

An eNodeB performs Radio Resource Management functions, such as radio bearer control, radio admission control, radio mobility control, scheduling and dynamic allocation of resources to wireless devices in both uplink and downlink. The eNodeB may perform Header Compression which refers to the process of compressing the IP packet headers that could otherwise represent a significant overhead, especially for small packets such as VoIP to help ensure efficient use of the radio interface. The eNodeB may perform Security functions by ensuring that all data sent over the radio interface is encrypted.

In an embodiment, the virtual-best effort method may enable the DSA communication system to manage resources allocation by using different methods. For example, the host network's PCRF 905 may control the secondary users' wireless devices 101 that access the host network and track the usage of the resources. The host network's billing system may be used to bill the secondary user.

Alternatively, the host network's billing system may control/track the usage of the resources by the secondary user, and the secondary user's home network PCRF 905 may provide preferred services. In such a scenario, the PCRF 905 of the host network may retain final control.

Alternatively, the host network may provide access and secondary user's home network's PCRF 905 may define the preferred services. Additionally, as part of the allocation process using the virtual-best effort method, different TAI's may be assigned to the secondary user's wireless devices which roam onto the host network. The TAIs may provide differential service areas or defined geographic zones for potential usage.

In an embodiment, the subscriber wireless devices may be allowed to access the home network through identification of a valid PLMN that it has in USIM that is either pre-programmed or provided through OTA provisioning. The home network may direct subscribers to use a host network as secondary users for different reasons. Additionally, if the wireless device 101 is capable of accessing two networks at the same time, the wireless device 101 may potentially use the home network for one type of service and be directed to use a host network for other services.

In an embodiment, available resources may be allocated to secondary users using a virtual-secondary user method (e.g., an Intra-System (i.e., Intra freq—lessor, or Intra freq prime—lessee)). In the virtual-secondary user method, the primary host network may allow the secondary users of the secondary network to operate using the primary network's system spectrum resources with different usage rights as compared to the primary users, such as on a de facto lease but with a different SID. This may be achieved by allowing the secondary users to include spectrum allocation from the primary host network when there is technology compatibility between the primary network systems and the secondary user wireless device 101. This allocation may be applied to the mobile virtual network operator that provides mobile phone services but does not have its own licensed frequency allocation of radio spectrum, nor infrastructure required to provide mobile telephone service.

In a virtual-secondary user method, the prioritization of the secondary users may follow the host network's PCRF 905 and PGW 908 rules. The PGW(s) 908 that may be used by the secondary wireless devices 101 may either be controlled by the host network or available through the secondary user's home network. If the PGW 908 is available through the secondary users' home network, it may either be connected to the appropriate SGW 922 or provided through an intermediate PGW 908 that is governed by the host network. In such a scenario, a secondary user may be considered a valid roamer in the DSA communication system using the virtual-secondary user method as shown in FIG. 17.

In a virtual-secondary user method, the DSA communication system may use five fundamental bidding rule sets, which are used to define the types of services, treatment and duration for the secondary user wireless devices 101. The rule sets may include information such as: 1) requested capacity/boundary; 2) treatment of services such as when they are required and the QoS; 3) geographic boundaries based on the requested service; 4) time for when resources are requested; and 5) duration for which requested resources would be used by the secondary user, and other rule sets as applicable. It is contemplated that all or a sub-set of these rules may be used depending on the arbitrage scheme.

In an embodiment, when employing the virtual-secondary user method, a host network may grant access to a secondary user wireless device 101 provided it meets a predetermined required authentication process. The host network using a virtual-secondary user method may use different billing schemes where the wireless devices 101 access or usage total is governed by the rules and specifications of the host network, allowing the secondary user devices 101 to be controlled locally. As secondary users in the system, the wireless devices' 101 access to the host network can be restricted, reduced, or barred depending on the conditions of the host network. The restrictions, reduction or barring may be imposed on a call, on a regional or system wide basis depending on the conditions set forth by the host network in the bidding system. The restrictions, reductions or barring may further be performed on dynamic basis by overriding the bidding conditions (e.g., in public safety networks).

Authentication or validation of the secondary wireless device user may be performed following the standard MAP/IS-41. Using MAP/IS-41, the host HSS 926 and AAA may authenticate secondary user wireless device.

In an embodiment, when using the virtual-secondary user method, the DSA communication system may require that different components of the host and/or home networks be used for resource allocation. For example, the host network billing system and PCRF 905 may control the secondary user's access to the network and track its usage. Alternatively, the host network's billing system may control and/or track usage and the secondary users' home network PCRF 905 may provide preferred services and the network PCRF 905 may perform the final control. Alternatively, the host network may provide access in the home network PCRF 905 may define the preferred services.

When resources that are allocated using the virtual-secondary user method are near exhaustion either based on time, usage or other criteria, the DPC 902 may notify the home network operator in the host network that the resources may expire. The home network operator, if allowed, may be enabled to top off or replenish the resources available to the secondary user by requesting foreign bidding on additional resources at the host network or otherwise provide additional RF spectrum resources. To provide additional flexibility to the resource allocation process, different TAI's may be assigned to the secondary user's wireless device that is roaming the host network. The TAI's may provide differential service areas or different geographic zones for potential use.

In an embodiment, the secondary user's wireless device may be able to access the home network through identification of a valid public land mobile network or PLMN that it may have stored in its universal subscriber identity module ("USIM"). The USIM may be either pre-programmed or provided through OTA provisioning. When using the home network, the secondary user's wireless device 101 may be redirected to search for a host network from which it can receive services. Once a host network is identified, the secondary user wireless device 101 may use the host network for all services, or use the host network for one type of service. Additionally, the use the home network can be for other services if the wireless device 101 has the capability of accessing two networks at the same time. Various configurations are possible and within the scope of the present disclosure.

Figure 18:
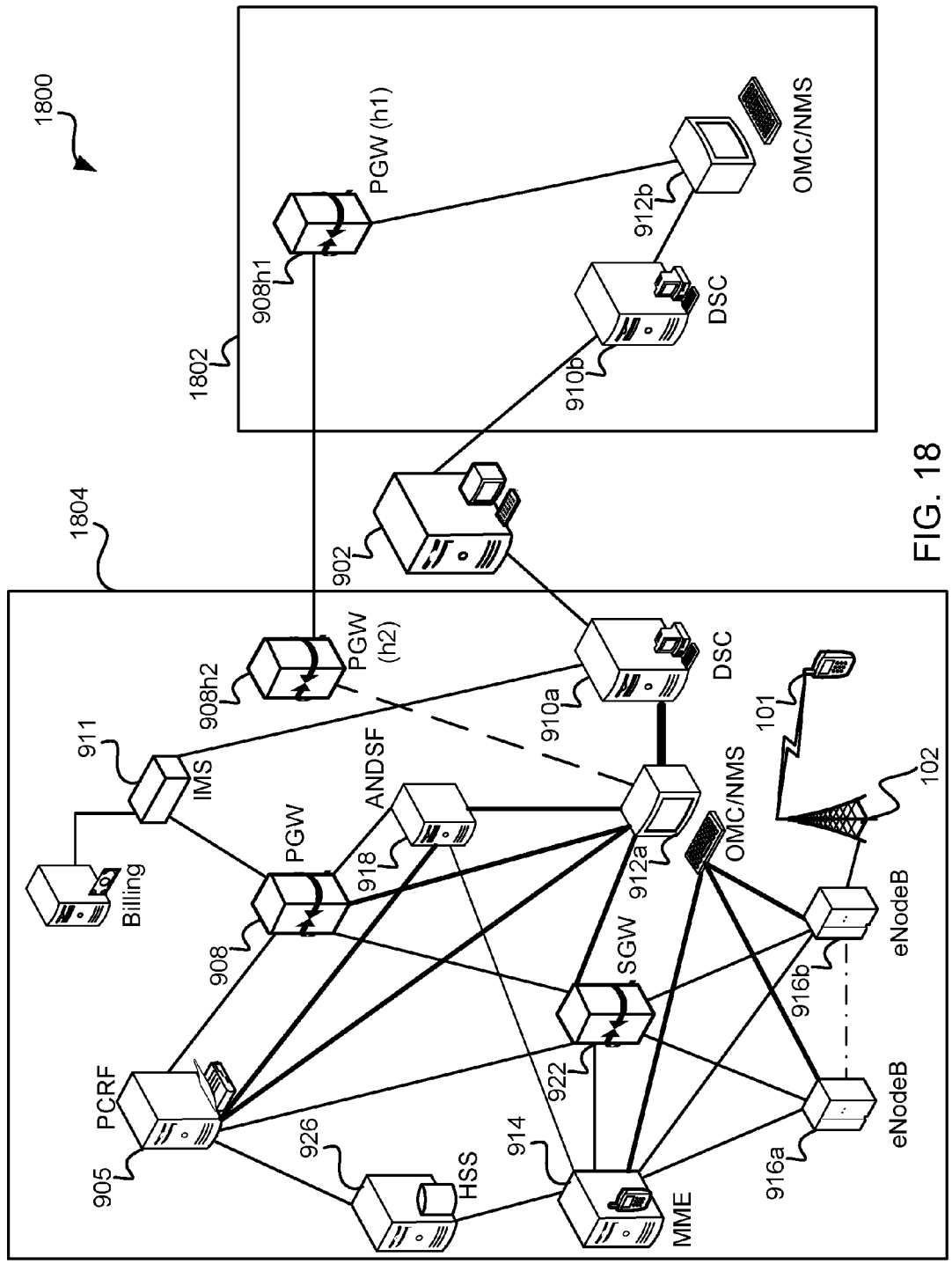
FIG. 18 is a communication system block diagram illustrating communications between components of two networks in a DSA communication system during resource reservation according to an embodiment.

FIG. 18 illustrates a communication system block diagram 1800 illustrating communications between components of two networks in a DSA communication system during resource reservation according to an embodiment. In an embodiment, the host network's (i.e., lessor) configuration may be controlled by the OMC 912. Additionally the home network (i.e., lessee) 1802 may be separate from the host network 1804.

In an embodiment, the host network using the virtual-secondary user method, may reserve resources by using different methods, including: 1) X-furcating of the eNodeB; 2) SGW and PGW link bandwidth; 3) combined resource allocation (PGW and eNodeB); and 4) PCRF (host) control. These resource reservation methods may be used in combination or may be mutually exclusive depending on the host networks requirements and the bidding process.

Figure 19:
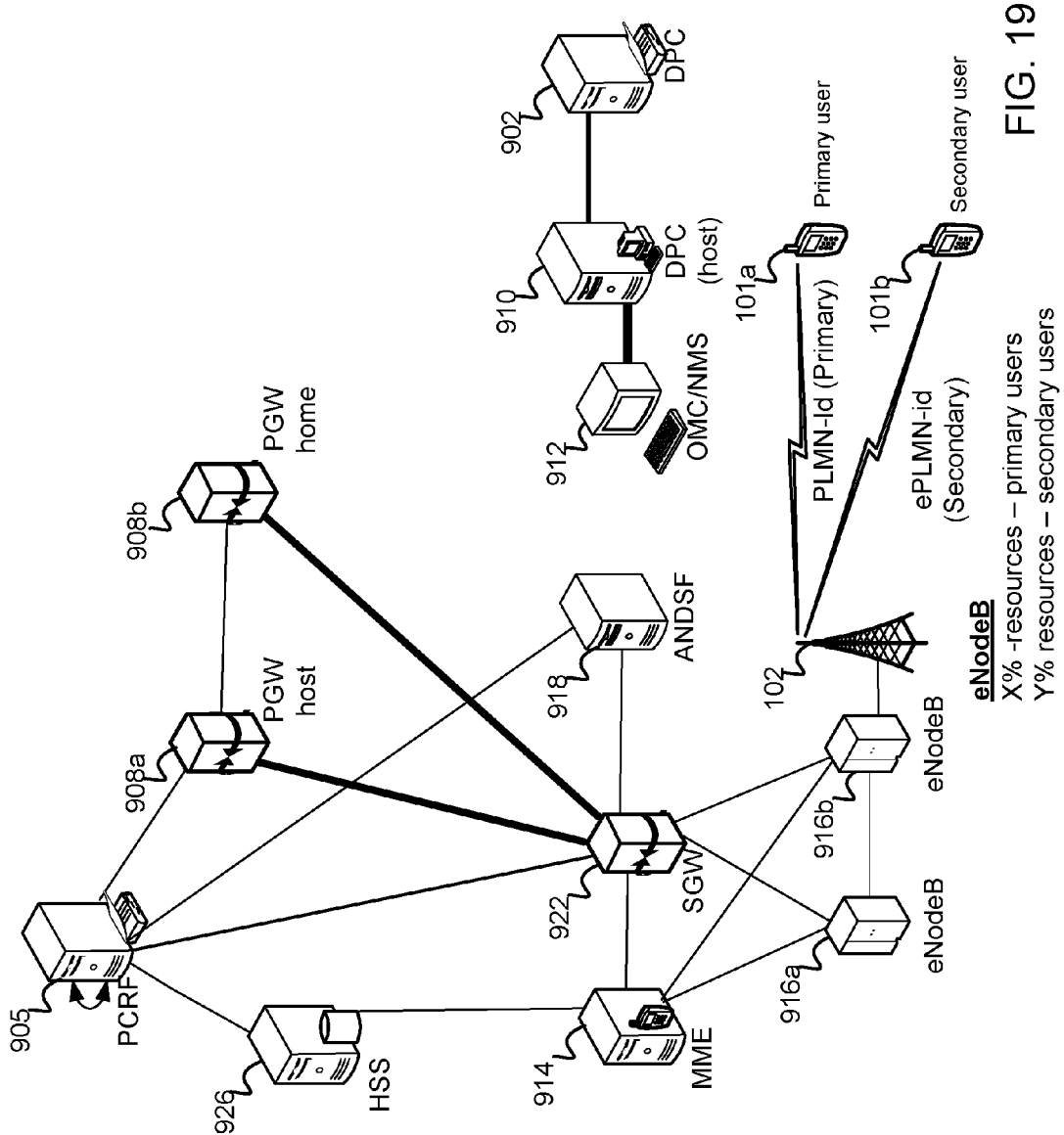
FIG. 19 is a communication system block diagram of a DSA communication system illustrating bifurcation of resources at an eNodeB according to an embodiment.

By x-furcating the eNodeB, resources may be reserved for secondary users. In an exemplary embodiment, as illustrated in FIG. 19, the eNodeB 916b may be bifurcated to reserve resources for secondary users. The eNodeB 916b may receive bifurcating instructions from the PCRF 905, MME 914 and SGW 922 to partition a percentage if its resources which may be used for another PLMN network. The PGW 908 may be located at the host network or may be located remotely. According to the received instructions, the eNodeB 916b may reserve X % of the resources for the use of the primary users and Y % of the resources for use by secondary users. The eNodeB 916b may transmit an enhanced PLMN (ePLMN) which may be recognizable to the secondary user wireless device 101b and camp on the cell.

In an embodiment, resources may also be reserved through controlling of the connectivity between the SGW 922 and the PGW 908 to which the secondary user wireless device is assigned.

Figure 20:
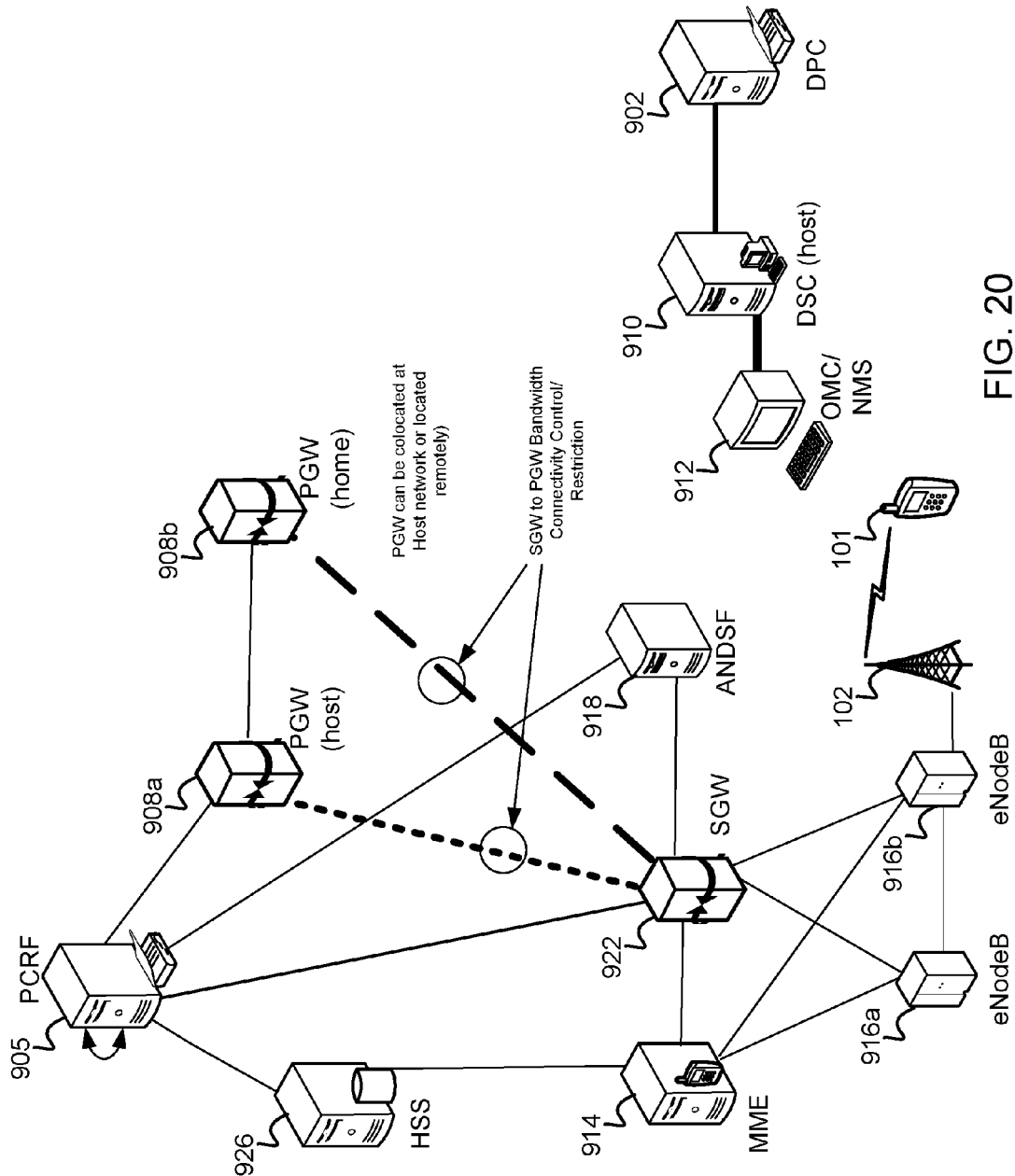
FIG. 20 is a communication system block diagram of a DSA communication system illustrating Serving Gateway (SGW) and Packet Gateway (PGW) link bandwidth allocation and capacity control according to an embodiment.

FIG. 20 illustrates an embodiment method for controlling the SGW 922 and PGW 908a, 908b link bandwidth allocation scheme according to an embodiment. Resource reservation may be controlled by controlling the host SGW 922 connectivity to the various PGW 908a, 908b. The SGW 922 connectivity to the PGW 908a, 908b may be controlled through altering the available bandwidth between SGW 922 and PGW 908a, 908b on a dynamic basis. The PGW 908a, 908b may be local and/or remote with respect to the host network. The SGW 922 and PGW 908 link bandwidth may be altered through the OMC/NMS 912 which may be connected to the DSC 910. PGW 908a may be located at a host network or remotely.

Figure 21:
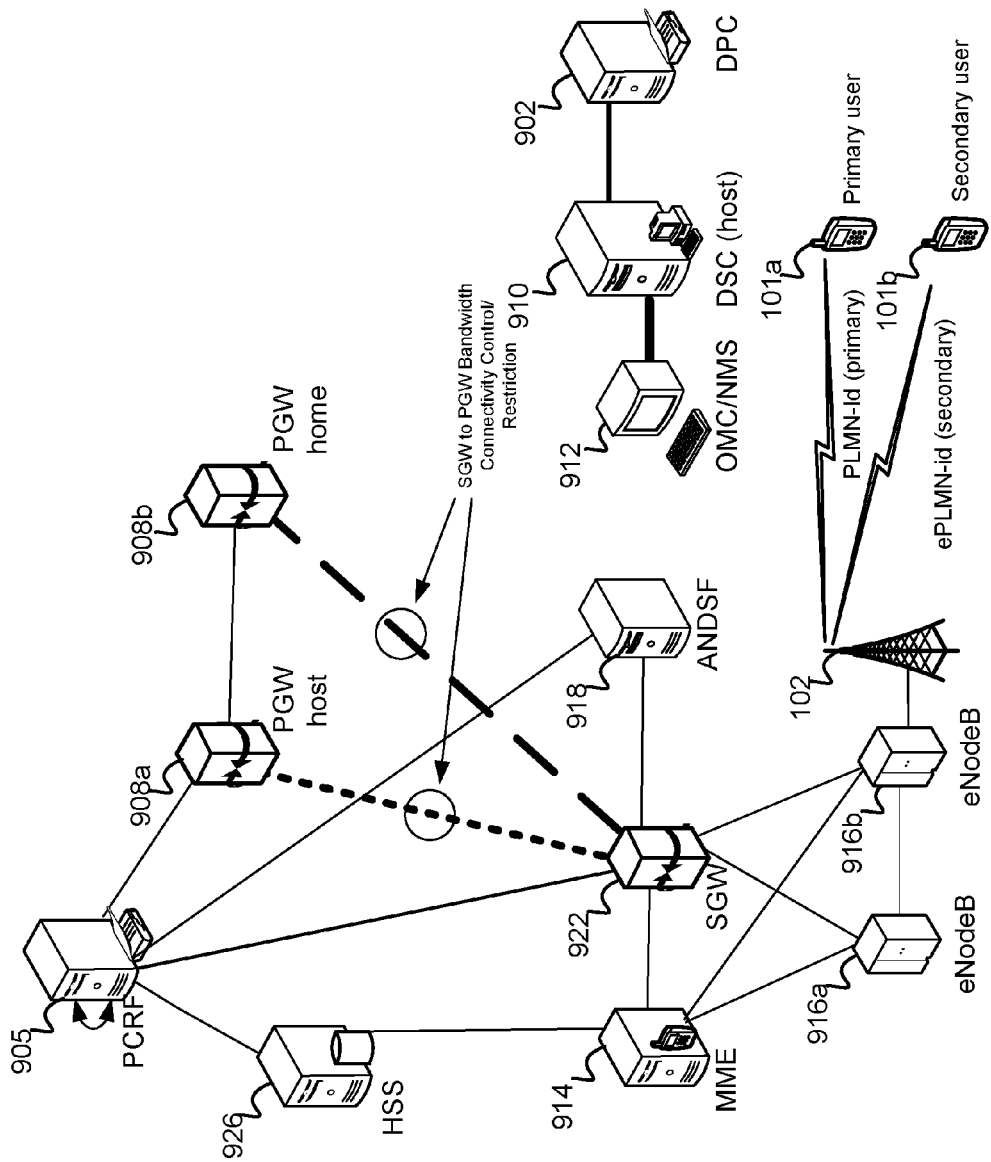
FIG. 21 is a communication system block diagram of a DSA communication system illustrating combining the x-furcation of resources at an eNodeB and SGW and PGW link bandwidth allocation with capacity control according to an embodiment.
Figure 22:
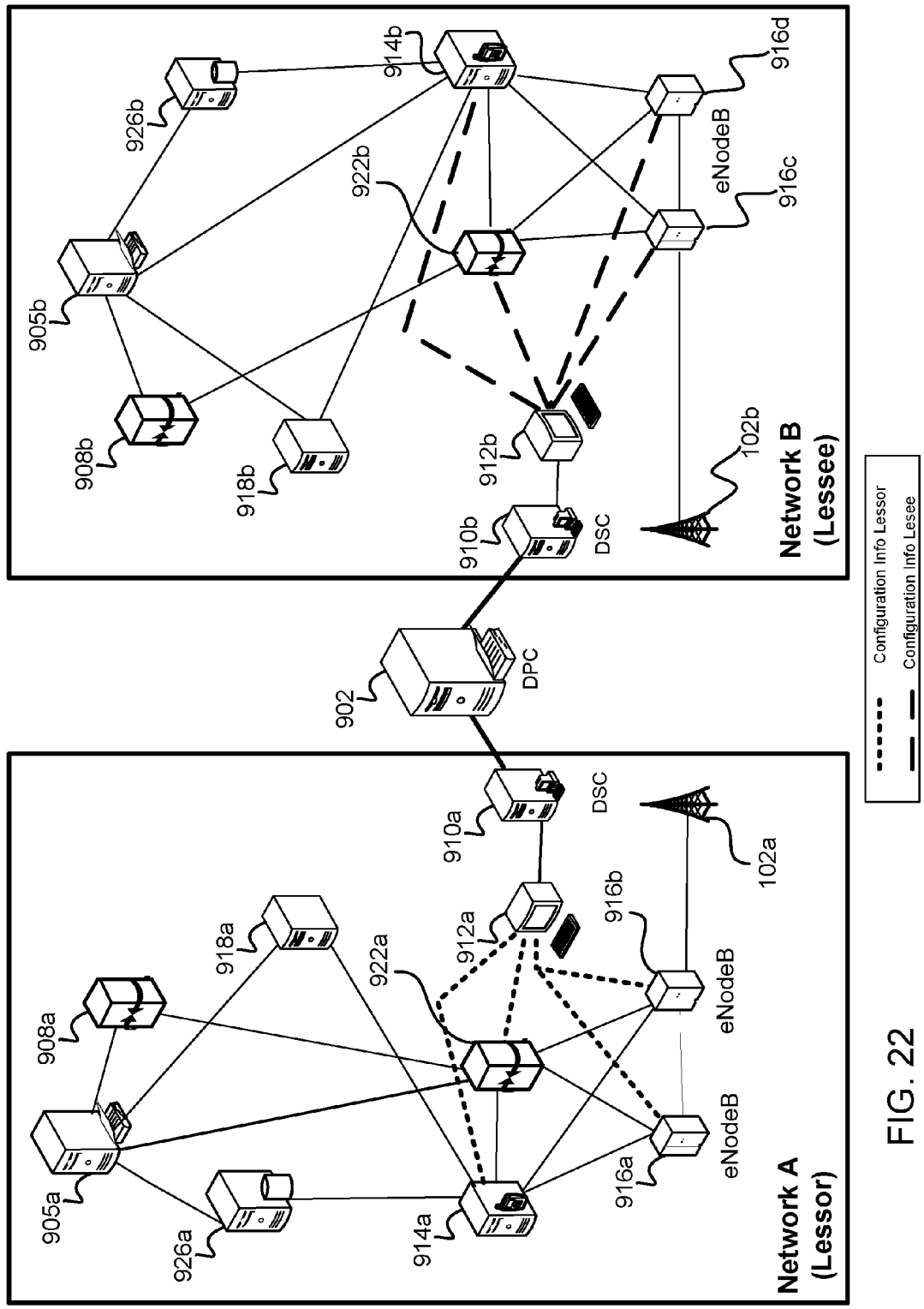
FIG. 22 is a communication system block diagram of a DSA communication system illustrating spectrum allocation based on license and regional area methods according to an embodiment.

In an embodiment, illustrated in FIG. 21, resources may be reserved for allocation purposes by combining eNodeB x-furcation and SGW-PGW link bandwidth control methods.

In an embodiment, the host PCRF 905 may control resource reservation for allocation to secondary users. The host PCRF 905 may prioritize the secondary user wireless device 101 based on the services requested using a combination of the QCI/ARQ ARQ may be an automatic repeat request. In this scenario, the PCRF 905 may assign a QCI/ARQ to the primary user wireless devices 101a and the secondary user wireless devices 101b.

In an embodiment, the RF spectrum allocation method may be used to make resources available for allocation. In the spectrum allocation method (e.g., Inter-System (Inter freq—lessor, Inter freq prime—lessee)) the primary network may assign spectrum resources for the use of the secondary users in a geographic region. Based on this, the secondary network providers may make available the primary network resources as channels/spectrum of their own normal operational network (i.e., can be compatible or IRAT). This, also, may be applied to MVNO. Thus, secondary users may access the primary network resources on their home networks and without having to roam onto the primary network.

The spectrum allocation method may be based on a) licensed area; or b) regional area. In both the license and regional area methods of spectrum allocation, spectrum available for use by the primary network provider operators (i.e., lessor or Network 1) may be programmable through the OMC/NMS 912. Spectrum allocation method may enable the host network to allocate spectrum based on desired bandwidth, geographic boundary of the secondary user, time the secondary user request resources, and duration of time for which the secondary user request resources.

In an embodiment, the spectrum allocation method may make spectrum resources available to secondary users on a dynamic basis. The billing process for the spectrum allocation method may not involve the use of the host or the visiting networks billing platforms. Instead, the DPC 902 may coordinate the billing for this effort.

In contrast to the virtual-best effort or virtual-secondary user methods, the spectrum allocation method may enable the home network operator (Network 2) to use the allocated resources for the secondary user wireless device 101 and not share the allocated resources with the primary host network. Therefore, the allocated spectrum resources may be used by the secondary users for the duration of the lease. The secondary user home networks may also be enabled to control the allocated resources for the duration of the lease by using their radio access network nodes 102.

Figure 23B:
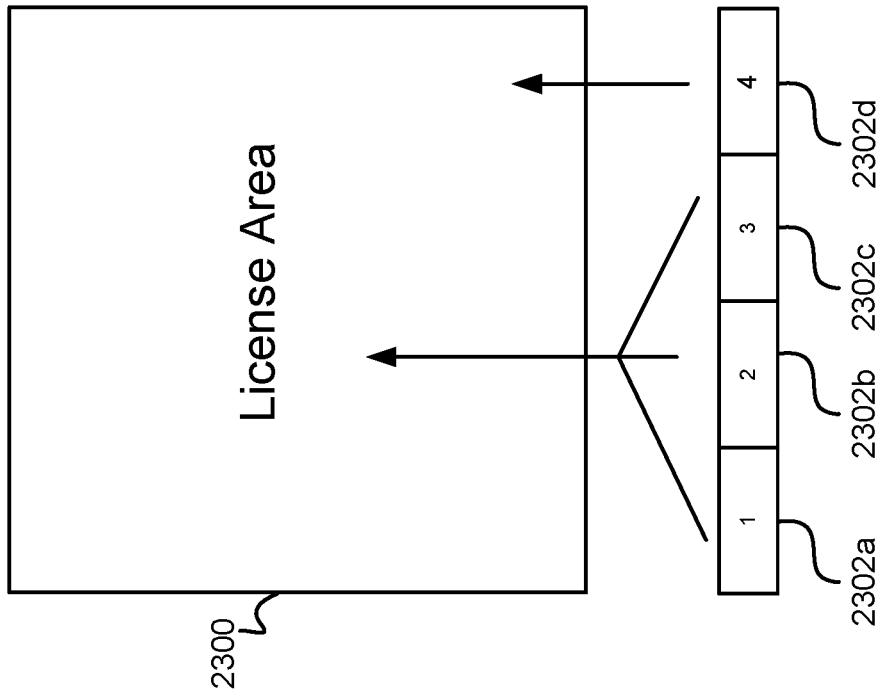
FIG. 23B is a diagram illustrating RF spectrum allocation in a DSA communication system based on license area according to an embodiment.
Figure 23A:
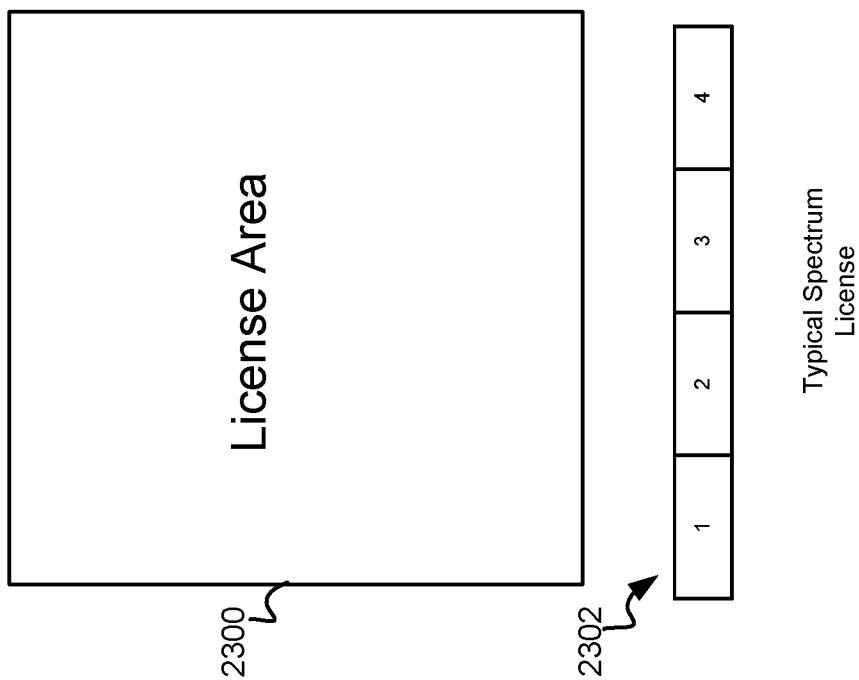
FIG. 23A is a diagram illustrating typical RF spectrum allocation in a licensed area according to an embodiment.

FIGS. 23A and 23B illustrate an embodiment for allocating spectrum resources to a license area 2300 using the spectrum allocation method. When allocating spectrum resources to a license area 2300, the primary host network may allocate a defined amount of spectrum resources to be used by secondary user home networks. Each network operator of the secondary home network may be granted use of the allocated spectrum over a geographically defined license area. As illustrated in FIG. 23A, a block of spectrum license 2300 may belong to a specific license area 2300.

The license area spectrum allocation method may involve partitioning the block of spectrum 2302 which may be used over the entire license area. Partitioning may be accomplished in various different channels, by sharing channels, or by other methods. As shown in FIG. 23B, the block of spectrum 2302 may be partitioned to provide three channels 2304*a*, 2304*b*, 2304*c* for use by the primary users and channel 2304*d* for leasing.

Figure 24:
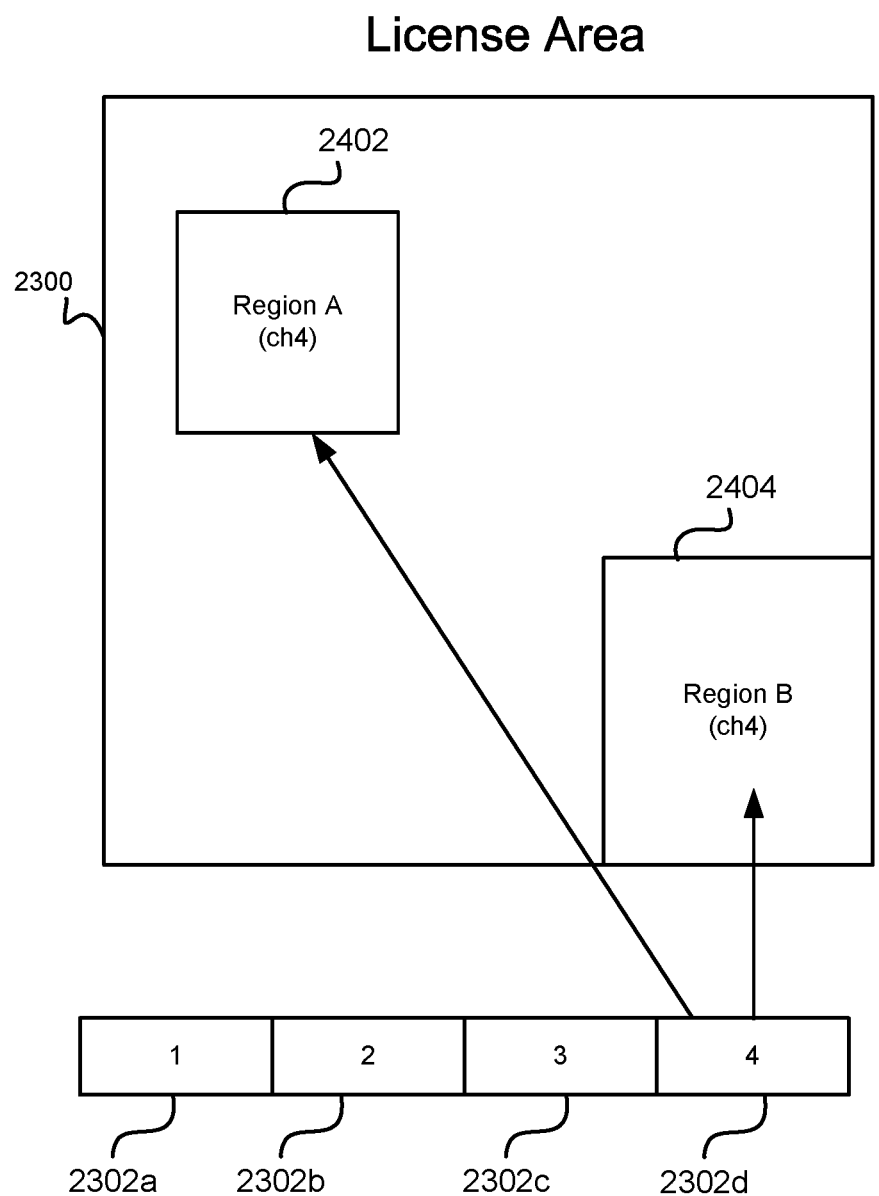
FIG. 24 is a diagram illustrating spectrum allocation in a DSA communication system based on regional area according to an embodiment.

FIG. 24 illustrates an embodiment for allocating spectrum resources to a regional area using the spectrum allocation method. The regional area spectrum allocation may involve allocating spectrum within the host network's defined license area 2300. The primary host network may allocate certain defined geographic areas. The areas border the secondary users which may use the allocated spectrum resources. Therefore, the geographic area designated for the use of the allocated resources may be a sub-area of the entire license area 2300 in which operators have access to the spectrum. The host network (i.e., lessor) may lease, sell, option, or otherwise transfer resources on a temporary basis to other secondary operators for their use in the geographically defined sub-areas. This may allow the primary host operator to reserve the use of other geographic areas to the use of their primary users or for leasing to other secondary networks.

A single resource allocation may be defined for possible use in an operator's license area 2300. For example, Channel (4) 2302*d* may be licensed through the DSA communication system to a successful secondary user bidder for regions A 2402. The same Channel 4 may also be licensed to another secondary user bidder for region B 2404. Outside of regions A 2402 and B 2404, the full spectrum (Channels 1-4) 2302 may be used by the primary network. In regions A 2402 and B 2404, only Channels (1-3) 2302*a*, 2302*b*, 2302*c* may be used by the primary network operators. In regions A 2402 and B 2404, the primary user may not use Channel (4) 2302*d* which is licensed to secondary network providers. For example, a bidder for a resource may engage in many different contractual relationships for spectrum including leasing, buying, optioning, trading, pool, or otherwise transfer spectrum.

Once available resources are allocated, they may be accessed based on different methods. The spectrum access methods may depend on the method of allocation used by the network which is providing the resources. In general, spectrum access methods may be divided into two categories of roaming and non-roaming methods. When resources are accessed based on a roaming method, a secondary user wireless device 101 may be required to use the available resources by roaming onto the primary network. When resources are accessed based on non-roaming methods, the secondary user wireless device 101 may be allowed to remain on its home network while using the allocated resources.

Figure 25A:
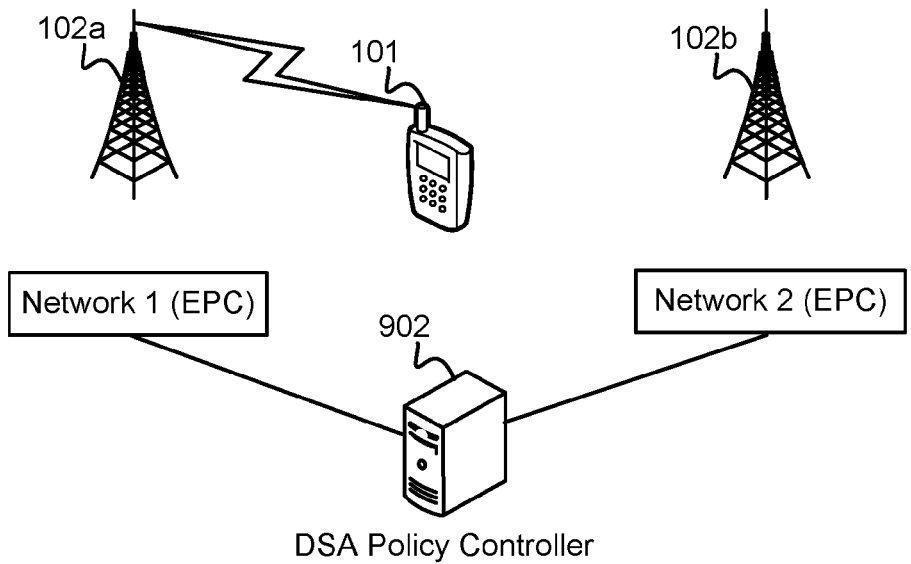
FIG. 25A is a communication system block diagram of a DSA communication system illustrating a situation where the subscriber is using a first carrier (carrier A) according to an embodiment.
Figure 25B:
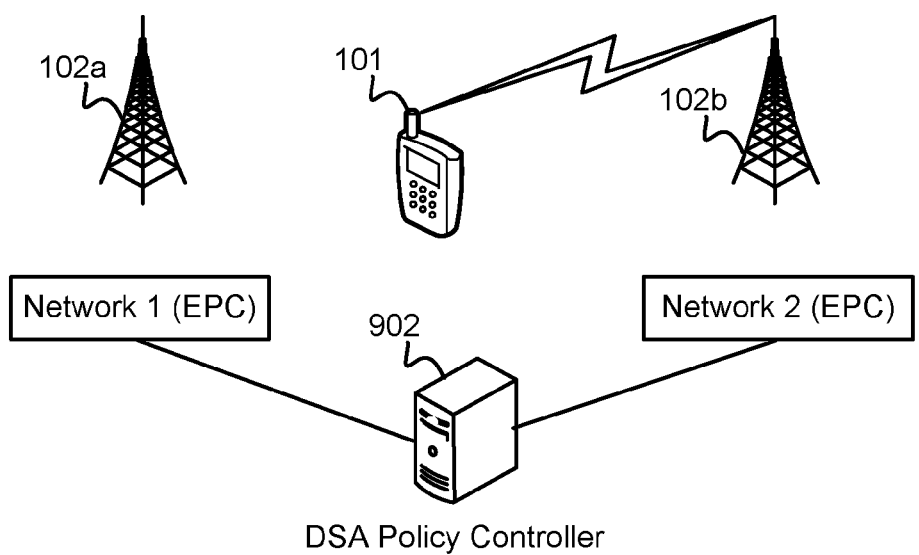
FIG. 25B is a communication system block diagram of a DSA communication system illustrating a situation in which a subscriber is using a second carrier (carrier B) in a de facto type roaming arrangement for spectrum off-loading according to an embodiment.

FIGS. 25A and 25B illustrate two network diagrams showing access to resources using roaming arrangements to allow a wireless device 101 to use resources of another network according to an embodiment. As illustrated in FIG. 25A, a wireless device 101 may currently use the spectrum of Network 1. Network 1 may communicate to DPC 902 that the additional spectrum resources may be required to continue service to the wireless device 101. DPC 902 may also receive information from Network 2 which may have additional or excess spectrum resources that may be allocated for use to the wireless device 101 from other networks.

As illustrated in FIG. 25B, once the DPC 902 confirmed that Network 2 has spectrum for allocation, based on the services being used, time and/or geographic location, the wireless device 101 may be instructed to switch carriers from Network 1 to Network 2.

In an embodiment, a secondary user network provider may license or lease the right to use spectrum resources that are allocated by a primary network. In such a scenario, the secondary user device 101 may not be required to roam onto the primary network to use the allocated spectrum resources. The secondary user device 101 may remain on the secondary home network which may make available the resources of the primary network through the secondary network access points based on the licensing terms.

Figure 26A:
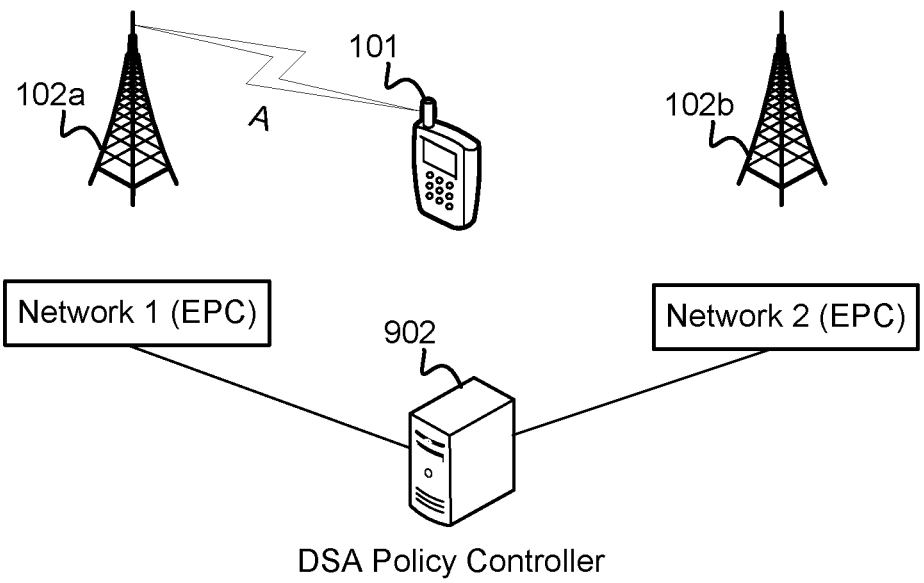
FIG. 26A is a communication system block diagram of a DSA communication system illustrating a situation in which the subscriber is using a first carrier (carrier A) for both public safety and commercial DSA schemes according to an embodiment.
Figure 26B:
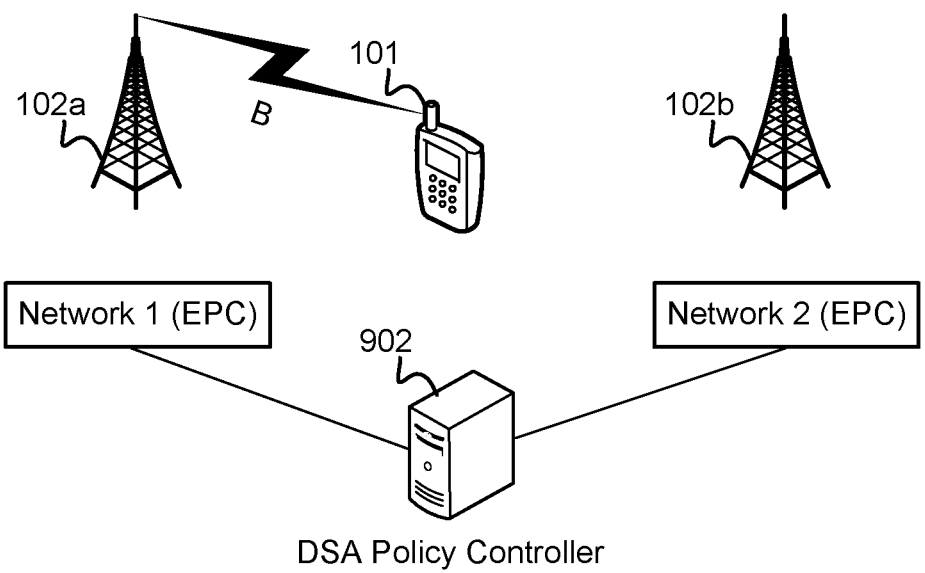
FIG. 26B is a communication system block diagram of a DSA communication system illustrating a situation in which based on the services being used, geographic location or time the subscriber can use carrier B resources in a de facto short term lease using DSA according to an embodiment.

FIGS. 26A and 26B illustrate a further spectrum allocation method using short term leasing of resources according to an embodiment. Available spectrum may be leased to other networks by employing the DSA communication system, based on a license area, sub-license area or by individual nodes, cell site. DSA communication system may make available such leased spectrum for secondary use through other networks following a geographic and space boundary determination. In an embodiment, a secondary user may access allocated spectrum of a host network through its own secondary network and without having to switch to the host network.

FIG. 26A illustrates a wireless device 101 in communication with the wireless access node 102*a* of Network 1. Network 1 may have a licensing agreement with Network 2 to use a designated block of the spectrum of Network 2. In such a scenario, when the spectrum resources of Network 1 are exhausted and additional resources are required, Network 1 may use the licensed secondary spectrum resources to communicate with the subscriber wireless devices 101.

FIG. 26B illustrates a wireless device 101 in communication with Network 1 using licensed secondary spectrum resources of Network 2.

Figure 27A:
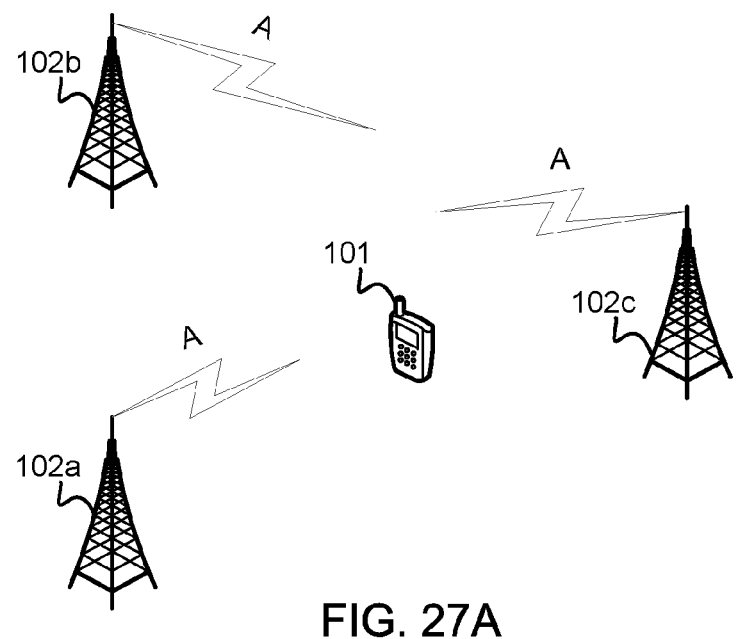
FIG. 27A is a communication system block diagram of a DSA communication system illustrating a normal operation situation according to an embodiment.
Figure 27B:
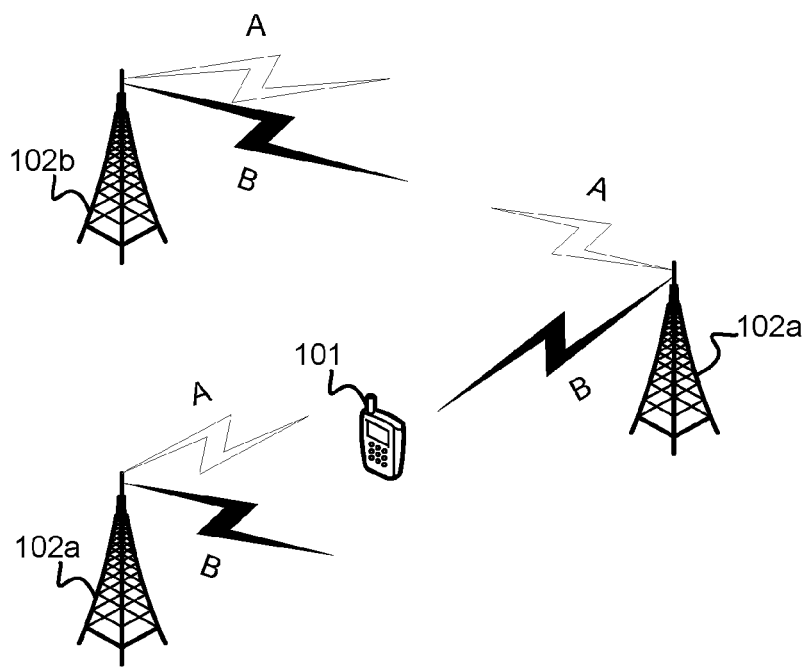
FIG. 27B is a communication system block diagram of a DSA communication system illustrating additional capacity and spectrum made available for use by a subscriber according to an embodiment.

Licensing of spectrum resources may enhance the capacity of a network as illustrated in FIGS. 27A and 27B. As shown in FIG. 27A, network provider A may serve a wireless device 101 through different wireless access points 102a, 102b, 102c depending on the geographic location of the wireless device 101. The wireless access points 102a, 102b, 102c may serve the wireless device 101 using spectrum resources from network provider A.

Due to increased traffic, network provider A may requires additional spectrum resources to properly serve its subscribers. Network provider A may license or lease spectrum resources from network provider B to enhanced and augment its available spectrum resources. As illustrated in FIG. 27B, spectrum capacity enhancement of provider A may be achieved through co-use of the radio access platform with provider B. In such a scenario, the wireless access point 102a, 102b, 102c may broadcast spectrum signals received from both providers A and B.

Initial Cell Selection

Cell selection or origination may involve the situation where the wireless device 101 of one network is directed to another network for accessing additional resources available on the new network. Currently, wireless devices 101 are programmed to establish connection with the correct networks for receiving services. To find the correct networks, once the wireless device 101 is powered on, it may search preferred Public Land Mobile Networks (PLMN), preferred roaming list (PRL) and radio carriers that the device is authorized to use. The PLMN/PRL and list of radio carriers may be provisioned on the wireless device. The PLMN/PRL list may include PLMN identifications of authorized networks and carrier in ranked order.

Because the DSA communication system may provide dynamic and real-time access to spectrum resources, when using the DSA system, spectrum resources may be available at networks which are not listed on the wireless device's PLMN/PRL.

As part of the DSA communication system process the wireless device 101 may be programmed in advance with the appropriate PLMN list. Further, the wireless device 101 may also be provisioned over-the-air on the secondary home network. The over-the-air provisioning may provide instructions to one or a group of wireless devices 101 to reinitiate the cell selection process with an updated PLMN list.

Alternatively, the wireless device 101 may be configured with a client application which upon receipt of a WAP/SMS message enables the wireless device 101 to search for a PLMN that has been made available in the DSA process.

Several methods may be used to allow the wireless devices to access available resources on different networks. In the DSA communication system, there are at least two types of networks or source systems: virtual or existing networks. Virtual networks may include networks that utilize the Radio Access Network (RAN) of the primary network. When wireless devices 101 are required to access virtual networks, the regulatory features and requirements for emergency calls (e.g., 911 calls) and other regulatory stipulations may need to be addressed.

When connecting to virtual networks, the DPC 902 of the primary network may control the access of the secondary user wireless device 101 and access RF spectrum resources and the subscriber records of the primary system to allow the secondary users to appear as roamers on the primary network. The secondary user wireless devices 101 may use a list of preferred networks to access virtual networks.

Alternatively, when originating using existing networks, the secondary user wireless device 101 may make a cell selection based upon a priority list of networks participating in the DSA communication system. Once the secondary user wireless device 101 is authenticated, the DPC 902 of the primary host network may validate the secondary user to access resources on the primary network. If authentication or validation is not successful, the DPC 902 of the primary user may send a request to the secondary wireless device 101 via a client in the device to re-originate onto the proper system.

Wireless devices 101 may include a universal subscriber identity module or USIM. The USIM may be a single or dual USIM. Critical information such as data required to select the correct network may be stored on the USIM. By using a USIM, a wireless device 101 may be enabled to no longer use a PLMN. USIM may have stored upon it information such as home International Mobile Subscriber Identity, or IMSI (HPLMN), prioritization list of permitted VPLMNs and forbidden PLMNs list.

If a wireless device 101 uses a dual USIM, it may be enabled to immediately access spectrum resources available in an alternative network. The dual USIM may further enable a multiband, multimode wireless device 101 to access a variety of networks in the DSA as well as using standard roaming arrangements.

Figure 28:
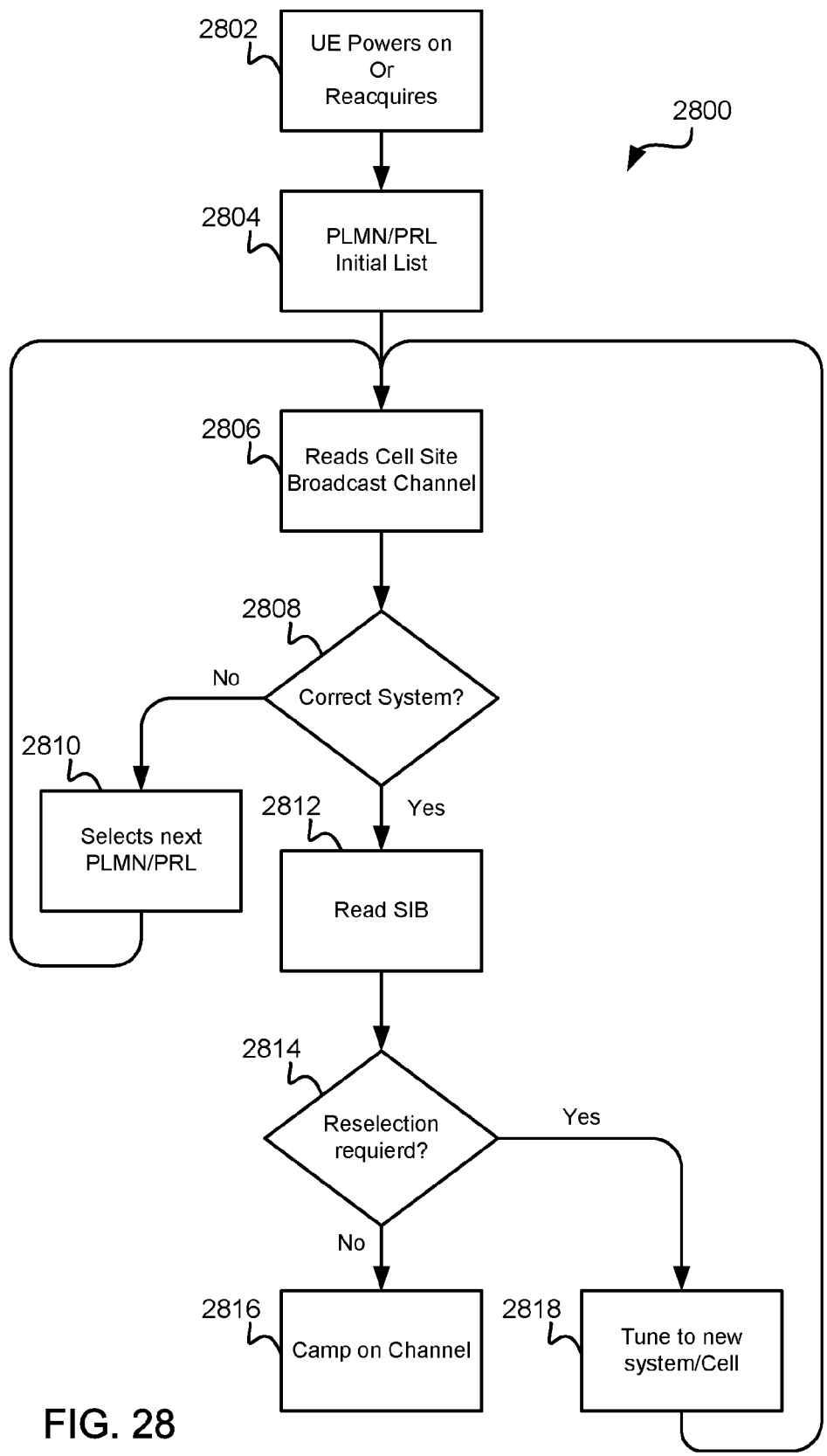
FIG. 28 is a process flow diagram illustrating an embodiment method for network selection and reselection in a DSA communication system.

FIG. 28 illustrates an embodiment method 2800 for network and cell initialization by a wireless device 101 in the DSA system. The initial network and cell selection may begin with the wireless device 101 when it is either powered on or trying to reestablish connectivity, block 2802. The wireless device 101 may initially search the PLMN/PRL list that is stored on the device, block 2804, and select a cell by receiving, reading and determining the strength of nearby cell site broadcast channels, block 2806.

The wireless device 101 may read the cell site broadcast channel and determine whether the cell site offers the correct system, determination 2808. The wireless device 101 may select and establish a connection to the best cell site available. To identify the best cell site available, the wireless device 101 may measure the adjacent cells based upon the access technology to determine which cell is the best to utilize.

If, at initiation, a suitable cell is not available (i.e., determination 2808="No"), the wireless device 101 may use the Any Cell Selection process/stage and continue to search for a suitable cell site by selecting the next PLMN/PRL listing until it finds a site that allows normal access following the access protocol in the appropriate PLMN list, block 2810.

If the correct system is available through the selected cell site (i.e., determination 2808="Yes"), the wireless device 101 may receive and read the System Information Block (SIB)/Master Information Block (MIB) transmitted by the selected cell site, block 2812. The SIB/MIB may include information about the network that the cell site is serving and available services through that network.

In an embodiment, SIB/MIB may include a host of information such as PLMN ID(s), Cell ID, traffic allocation identifiers (TAI) (routing area), LTE neighbor list, LTE non system sites, GSM cCells, UMTS cells, and CDMA cells. This information may be used by the wireless device 101 for different purposes. For example, when the wireless device 101 moves from eNodeB to eNodeB, it may use the SIB/MIB information sent from the new eNodeB to determine that a change has occurred in the serving eNodeB. To detect the change in eNodeB, the wireless device 101 may identify the change in SIB/MIB information which may include a change in change in the PLMN availability and TAI parameters. TAI defines specific routing areas that can further be used to refine a geographic region in which the wireless device 101 can use available resources.

SIB/MIB information may be transmitted to the cell site by the network. The cell site may receive the network information through the HSS 926 of the network. In addition to the data transmitted through the SIB, the HSS 926 of the network may also provide the information as to which PGW(s) 908 the wireless device 101 may use to access resources on the network.

Upon reading the SIB/MIB, the wireless device 101 may determine whether reselection is required, at determination block 2814. If no reselection is required (i.e., determination block 2814="Yes"), the wireless device 101 may camp on the cell channel, in block 2816. If system reselection is required (i.e., determination block 2814="No"), the wireless device 101 may be instructed to reselect a new cell or system based on the cell selection/reselection process, block 2818.

While camping on the selected cell site, the wireless device 101 may receive additional information and instructions over the air from the selected network, such as updated list of public land mobile network or PLMN/PRL. The wireless device 101 may also continue to monitor the SIB/MIB for any changes or additional information.

In an embodiment, the SIB/MIB may provide a Secondary Access Class which may enable the wireless device 101 to determine which channels based on the DSA process it can use for access through the reselection process. The SIB/MIB may also include data to enable the camping wireless device 101 to reselect another radio access technology (IRAT) and attempt to acquire a control channel on the new Radio Access Terminal (RAT). The information in the SIB/MIB may, thus, be used to instruct a wireless device 101 to reselect another RAT that is associated with the same or another network which may be on a another frequency band.

Cell reselection, which may trigger PLMN selection, may be controlled via specific parameters. For example, the DSA communication system may employ barred PLMN-id to prevent a wireless device 101 using resources from one network to attempt to roam on to other networks. For example, the DSA communication system may prevent a secondary user wireless device 101 using resources of a primary host network to roam back to or establish connection with the secondary home network. Similarly, the DSA communication system using a PLMN id prioritization scheme that is over the air (OTA), client activated or dual USIM driven may also prevent a wireless device 101 using resources of a network to reestablish connection with other networks unless the DSA communication system rules permit.

In an embodiment, a wireless device 101 that is camping at a cell site may be instructed to perform cell reselection when the capacity of the current cell reaches a predetermined level. In such a scenario, the DSC 910 of the current camping network, using the OMC 912, may change the SIB/MIB of the current network to include instructions the camping wireless device 101 to perform a cell reselect and search for another TAI area or system. The instructions to perform a cell reselect may also be forwarded by the WAP/SMS message to the wireless device 101.

Figure 29:
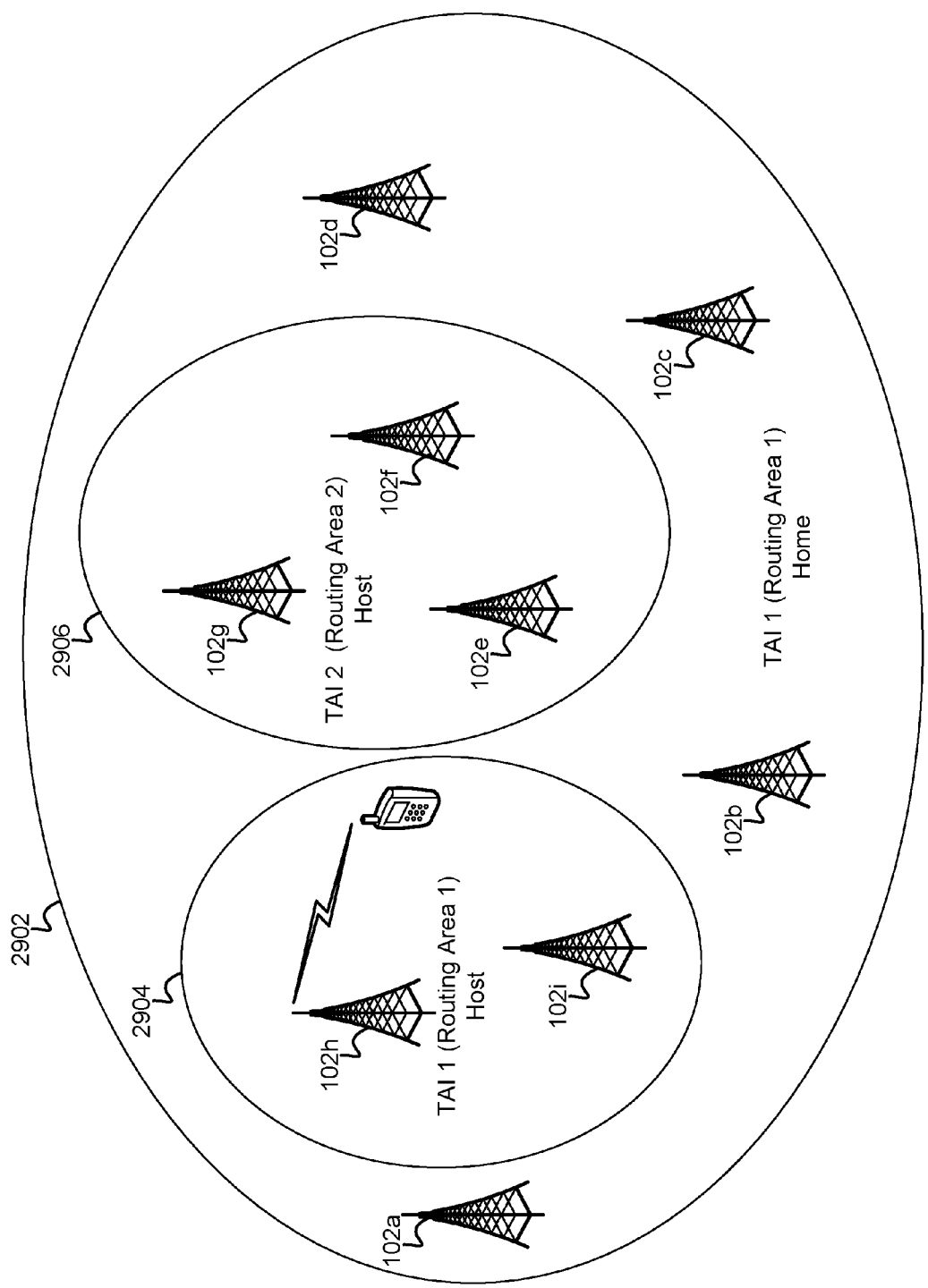
FIG. 29 is a communication block diagram of a DSA communication system illustrating traffic allocation identifier (TAI) routing areas where the home non-DSA user equipment uses one TAI element and DSA user equipment use another TAI.

FIG. 29 illustrates an embodiment network diagram for cell reselection using changes in the TAI. When using a network, different wireless devices 101 may be assigned different TAI's depending on their particular uses and device types. For example, a network may assign one TAI to DSA communication system users. The network may also assign another TAI to devices which do not use the DSA communication system. The advantage of using multiple and layered TAI's may enable the TAI assigning network to selectively tailor usage traffic. The multiple and layered TAI's may further enable the TAI assigning networks to prevent the wireless devices 101 that may have correct PLMN-id but are not supposed to use the selected area from selecting the cells but may be denied service or may be forced into cell reselection.

In an embodiment, a special client may be installed on DSA communication system compatible wireless devices 101 to enable the wireless devices 101 to determine which system and RAT is supposed to use on secondary bases. The PLMN/PRL list of the client application may be updated by receiving an SMS or WAP that may be transmitted to the handset via a text message or through a data (IP) session. The updated client application may instruct the wireless device 101 to go to the proper channel for accessing allocated resources of a primary network.

Using a client application may facilitate the implementation of the DSA communication system in legacy networks and systems which may or may not possess the ability (e.g., due to software load) to have a secondary access channel defined in the SIB.

In idle mode, the wireless device 101 may be instructed to perform intra and inter frequency measurements in the cell reselection process. Using information in the SIB/MIB or from the client application, the wireless device 101 may perform intra-frequency search, inter-frequency, or inter-radio access tech (iRAT). This process may be controlled by UTRAN. The Intra and Inter frequency measurements or inter-radio access technologies may be on a region or cell/sector bases, depending on configuration of the wireless device 101.

Authentication of Secondary User Wireless Devices:

Once the wireless device 101 selects the appropriate cell site and before it enters an idle mode, the wireless device may need to be authenticated by the system on which it is camping. The selected network requires validation and authentication of the wireless device 101 to ensure that the device possesses the required permissions to access the network.

The DSA communication system may authenticate a wireless device 101 using different methods. Authentication of the wireless device with the DSA may depend on the business arrangements between different providers and the DSA system. For example, authentication may be based on general or prioritization levels. The authentication process may be followed using the DPC 902 HSS 904 as the anchor and this may be accessed by the AAA/AuC of the 3G/2.5G networks of the PCRF 904 in LTE or similar platform. The Host Network may authenticate the secondary users by using standard MAP/IS-41 signaling.

Upon authentication, each entrant may be assigned: (a) defined usage level allowed on host network; duration permitted on system; purchase type (e.g., wholesale or a range of IMI's); HSS would allow redirecting of inbound calls; applications would continue where they relied on a server which is accessible from the backend.

Monitoring and Tracking of Allocated Resources:

The DSA communication system may ensure that the primary network provider always has adequate resources to manage traffic on the primary provider network (e.g., Network 2). Therefore, depending on the volume of traffic, the DSA communication system may dynamically on a real-time and/or statistical basis alter the spectrum/capacity available to secondary users.

For example, at peak hours, call traffic may increase in the primary network. When call traffic increases in the primary network, the DSA communication system may reduce the amount of spectrum available for allocation to secondary users to ensure that the primary users have adequate resources.

The DSA communication system may manage allocation of and access to resources based on different factors including priority level of the users, time the spectrum is used and the geographic location of the user. In an embodiment, when the secondary access to the primary network is related to certain events such as disasters, emergencies, first responders or public safety, the DSA communication system may manage the secondary use of the primary system by using different prioritization. For example, when secondary users are first responders who are using the primary network resources, the DSA communication system may maintain or increase the resources allocated to the secondary users by the primary network provider to allow the emergency calls to go through successfully, even to the detriment of the primary network users.

In an embodiment, the use of spectrum resources of one network by a secondary user may be managed and controlled by different components of the DSA communication system such as the DPC 902. For example, the DPC 902 of a primary network may monitor the use of the allocated spectrum resources to ensure appropriate steps are taken when allocated resources are exhausted or no longer available for secondary use.

The DSC 910 of the primary network may be configured to monitor or receive data regarding the traffic levels associated with the primary network on which the wireless devices 101 is operational as a secondary user. The DSC 910 may further be configured to off-load the secondary user by downgrading resources, forcing to terminate (i.e., off-load) a connection of a secondary user or redirecting a secondary user to another carrier or channel set if the primary network capacity threshold is reached.

The DSC 910 of a primary network may also inform the DPC 902 when off-loading of secondary users may be required. For example, an unexpected surge of primary callers may cause the DSC 910 to request that secondary users be off-loaded to make available resources for the primary users. When off-loading of secondary users is initiated, technical access parameters may be sent to (OTA) to the wireless device 101. Alternatively, the system may dynamically assign resources via LTE using the X2 link instructing the defined wireless device 101 to handover to the new LTE network.

Off-loading of secondary users may include redirecting the secondary users' connections back to the secondary user's own network, to another provider network or channel or disconnecting the secondary users' connections with the primary provider network. For example, when a primary host network may be required to terminate a secondary user due to increased demand on the primary network, the DPC may be configured to determine whether other networks are available to redirect the secondary user's connection instead of terminating. The DPC 902 may inquire for resources from DSC 910 of other networks. If the resources are available for use in other networks, the DPC 902, using a rule set, may determine the most cost effective connection with another host network which satisfies the resource request requirements. Once the DPC 902 has identified another host network to which the secondary user wireless device 101 may be redirected, the DPC 902 may instruct the wireless device 101 to transition over to the new host network for the communication session. The process of off-loading of secondary users may include handover or back-off processes which are explained in more detail below.

In a further exemplary embodiment, the DPC 902 of the host network may also be configured to instruct the primary host network to release the secondary user wireless device 101 back to the secondary home network after the use of the primary network resources is completed. The DPC 902 may further be configured to force terminate the secondary user's connection with the primary network if the DPC 902 determines that additional capacity is required for use by primary users.

If sufficient capacity is available, the DPC 902 may force the secondary user to continue to use the resources of the primary host network until the traffic volume on the primary host network requires additional action based on rule sets.

In the various embodiments, the DSA may further manage the use of the allocated and accessed spectrum. For example, the DSA communication system may manage the use of the host network's RF spectrum by employing a back-off mechanism. When the host spectrum network is accessed by high priority users, the spectrum may rid of lower priority users to make available spectrum to higher priority users.

Figure 30:
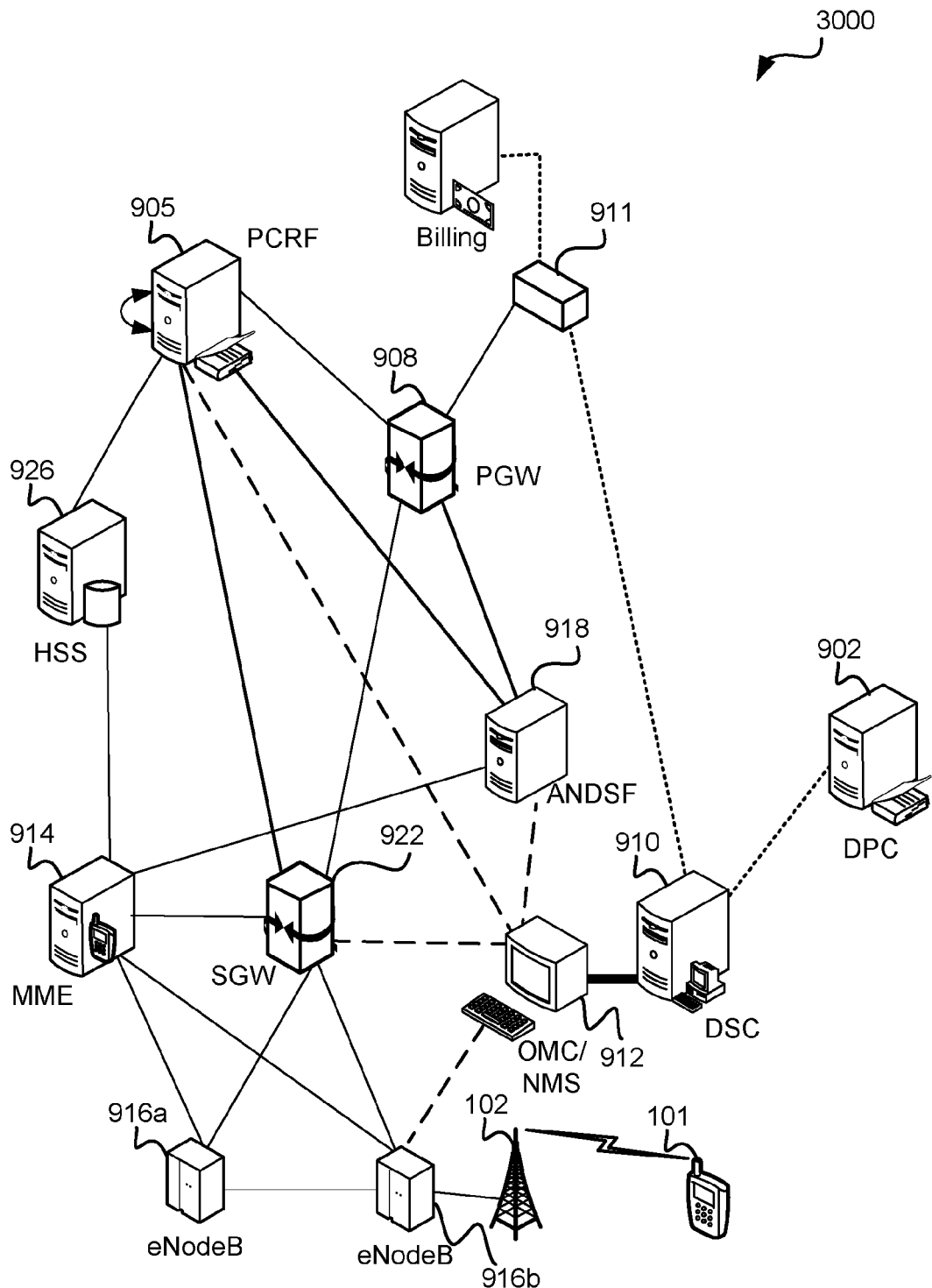
FIG. 30 is a communication block diagram of a DSA communication system illustrating high level tracking and monitoring of RF spectrum resource allocations and use according to an embodiment.

FIG. 30 illustrates a network architecture diagram 3000 for monitoring and tracking of spectrum usage according to an embodiment. Tracking and monitoring of the use of spectrum resources may be performed using different methods. In a DSA communication system using the virtual-best effort method of resource allocation, the DSC 910 may monitor usage of spectrum resources based on pre-arranged billing information and communication with the primary network billing platform.

The DSC 910 may monitor the usage level for the group and also track usage level with the PGW 908. The usage may be compared and monitored against what was anticipated or rather successfully bid. Once a predefined amount of the allocated resources are used by a secondary user, the DSC 910 of the primary network may be configured to generate a notice that resources are reaching a critically low level and send it to the secondary network provider through the DPC 902. The secondary user may receive the notice through its own DSC 910. Upon receipt of the notice, the secondary user provider network may rebid for additional resources or simply let the remaining resources to run out.

In the event that a secondary user is actively using a primary network when allocated resources are fully consumed, the primary network may instruct the secondary user wireless device 101 to reconnect to the home network (secondary user network provider), terminate the wireless device's connection, or charge an overage or supplemental fee to the secondary network based on a previously negotiated contract. Upon termination of connection, the secondary user wireless device may not be able to access the primary network resources unless additional resources are allocated for the secondary user.

In a DSA communication system using the virtual-secondary user method, the DSC 910 may monitor the usage of the allocated resources based on pre-arranged billing information and communication with the host primary network billing platform. The process of monitoring the usage of the allocated resources based on a virtual-secondary user method may involve mentoring the usage level for the group and also tracking usage of the level with the PGW 908.

Similar to the DSA communication system using the virtual-best effort method, the DSA communication system using the virtual-secondary user method may monitor the usage by comparing the usage against the amount of resources that was allocated to the secondary user network provider. Once a predefined amount of the allocated resources are used by the secondary user, the DSC 910 of the primary network may be configured to generate a notice that resources are reaching a critically low level and send it to the secondary network provider through the DPC 902. The secondary user may receive the notice through its own DSC 910. Upon receipt of the notice, the secondary user provider network may rebid for additional resources or simply let the remaining resources to run out.

In the DSA communication system that is using the virtual-secondary user method, after allocated resources are exhausted, the secondary user may be terminated by different methods, for example by 1) No prioritization back-off; or 2) prioritization back-off as discussed below.

In the no prioritization back-off method, when the allocated spectrum resources at the pre-determined level are consumed, no further usage may be permitted. Once allocated spectrum resources are exhausted, the primary network DSC 910 may instruct the secondary user wireless device to connect to the secondary user home network, terminate the secondary user wireless device's connection with the primary network, or charge an overage free based on previously negotiated contracts. Upon termination from the primary network, the secondary user wireless device may not be able to access the primary network resources unless additional resources are obtained by the secondary home network provider.

In the prioritization back-off method, when the allocated spectrum resources are at critically low levels and before the resources are completely consumed, the primary network may commence a back-off process during which the primary network may place the secondary user wireless device 101 on another suitable network. If not, other suitable networks are available to accept the secondary user wireless device 101, the primary network may handover the secondary user wireless device 101 back to the secondary user home network. The primary network may credit the secondary network for any allocated resources that were not used by the secondary users.

When using the resource allocation method, the primary host network may monitor allocated resources differently depending on whether resources are allocated based on a license area or regional area method.

If the allocation of resources is preformed based upon a license area method, the primary network may monitor the usage of the resources by the secondary users. When the allocated resources are near exhaustion, the DSC 910/DPC 902 may inform the secondary user network that the temporary lease of the resources is about to expire and provide an opportunity to the secondary network to bid for and purchase additional resources.

If the secondary network fails to or refuses to obtain additional resources, the primary network may terminate or back-off the secondary user from the primary network using different methods, such as, 1) no prioritization back-off; or 2) prioritization method.

In the no prioritization back-off method, when the lease of the resources is expired, the spectrum resources may no longer be available to the secondary users. The primary network may instruct the secondary user wireless devices 101 to either handover to another radio access system in their network or terminate their use.

In the prioritization back-off method, the primary network's DSC 910/DPC 902 may coordinate resources with the DSC 910 of the secondary network with respect to the affected sites. The secondary network may attempt to handover the secondary user wireless network to another network, base station, radio access channel or system for the affected area. The primary network may credit the secondary network for unused allocated resources.

If the allocation of resources is preformed based upon a regional area method, the primary network may monitor the usage of the resources by the secondary users. When the allocated resources are to expire and near a predetermined completion level, the DSC 910/DPC 902 of the primary host network may inform the secondary home network that the impending termination of resources. The primary network may provide the secondary network an opportunity to rebid for additional resources.

If the secondary network fails or refuses to obtain additional resources, the primary network may terminate or back-off the secondary user from the primary network using different methods, such as, 1) no prioritization back-off; or 2) prioritization method.

In the no prioritization back-off method, when the leased term for the allocated resources is expired, the secondary user may no longer have access to the spectrum resources of the primary network. The primary network may either hand over the secondary user to another radio access system in their network, which can be a host network or another network or terminate the secondary user's access to the primary network resources.

In the prioritization back-off method, the DSC 910 and DPC 902 of the primary network and the DSC 910 of the secondary network may coordinate resources with the affected sites and commence the back-off process before the lease of allocated resources is expired. The secondary network may attempt to handover the secondary user wireless network to another network, base station, radio access channel or system for the affected area. The primary network may credit the secondary network for unused allocated resources.

Handover of Secondary Users During Off-Loading:

In an embodiment, the DSA communication system may employ handover methods to prevent interruptions during or maintain communication sessions between wireless devices 101, the DSA communication system and/or network providers. For example, a communication session may include a wireless device 101 establishing connection with a network. Handover may occur when the wireless device's 101 connection migrates from the home network to a host network and back to the home network during the period of one communication session. The SIB/MIB generated by the network may include the list of cells and networks that may be used to handover a communication session.

Outside of the DSA communication system, mobile assisted handovers may involve the wireless device 101 informing the servicing network that a better server is available and changing the connection from the current server to the better server. Such mobile assisted handovers may be performed when wireless devices are roaming on host networks. However, the DSA communication system may not allow such mobile assisted handovers, because the best server for roaming purposes may not be the most optimum cell for capacity relief Communication sessions with the DSA communication system may involve circuit switch or packet switched services.

Figure 31:
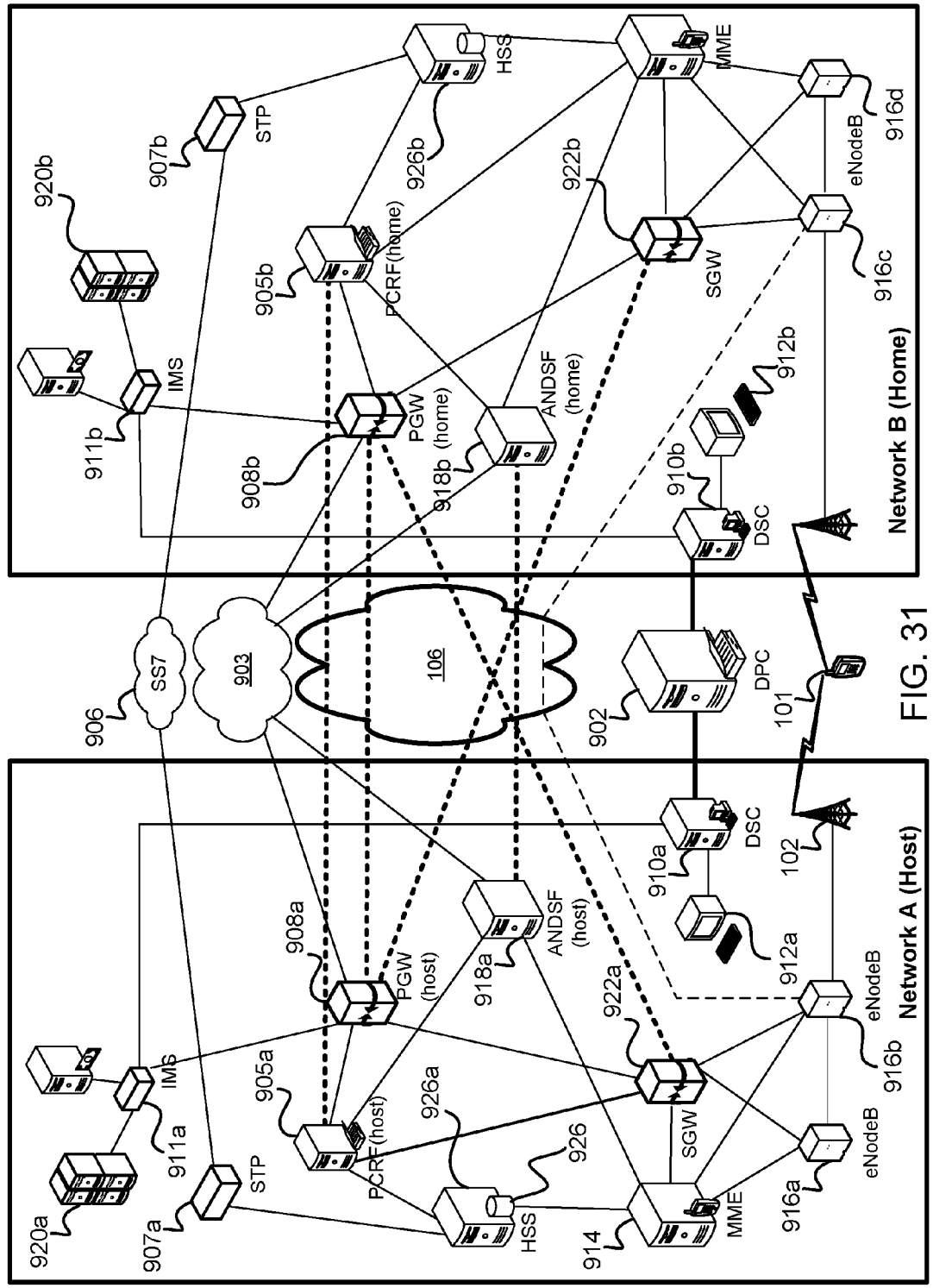
FIG. 31 is a communication block diagram of a DSA communication system illustrating integration required for full mobility between visiting and home networks.

FIG. 31 illustrates a network component diagram of an embodiment network capable of performing handover of communication sessions. To implement a handover of a communication session, certain connectivity between components of the host and home networks (e.g., network A and network B) may exist. For example, the PGW 908 of the host and the home networks may be connected. The PGW 908 of the host and home networks may communicate through the Internet or a private data network. The PGW 908 of the host may also be connected to the SGW 922 of the home network. The ANDSF 918 of the host and home networks may also be connected to allow handover to the legacy system and to invoke the back-off process when the wireless device is required to migrate from the host to the home network.

Access Network Discovery and Selection Function (ANDSF) is used to manage intersystem mobility policy and access network discovery information stored in a wireless device supporting provisioning of such information from an ANDSF. The ANDSF may initiate the provision of information from the ANDSF to the wireless device as specified in 3GPP TS 24.302 [3AA].

Figure 32:
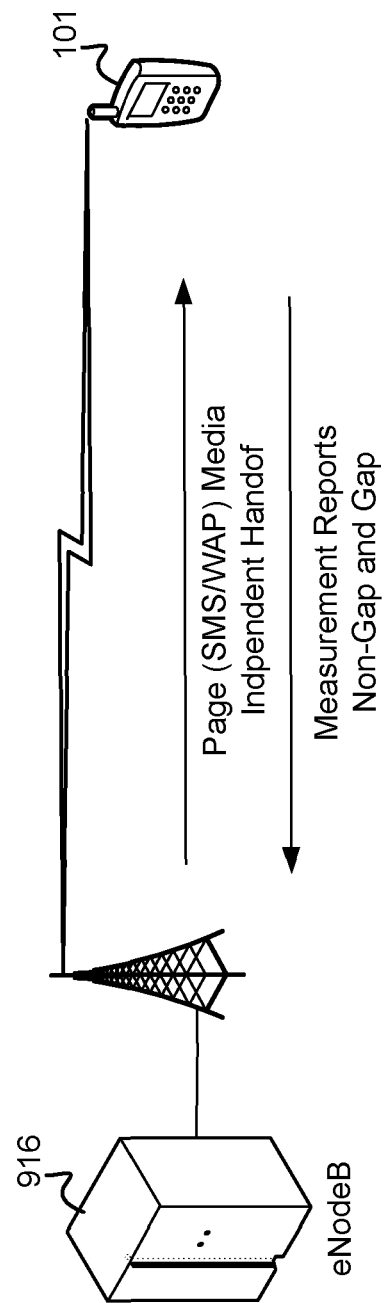
FIG. 32 is a communication block diagram of a DSA communication system illustrating media independent handover of user equipment from one network to another according to an embodiment.

FIG. 32 illustrates a network diagram of an embodiment method for media independent handover. The ANDSF through the DSA process may initiate the handover by sending a SMS/WAP message to the wireless device 101 instructing it to go a gap or non-gap handover. The handover process may be initiated under different circumstances and for different reasons. For example, a network may commence a handover process based on contract specifications between the host and the home network, based on the level of resources at the host network and whether the resource has reached a predetermined threshold, based on resources leased by the home network being exhausted or based on whether a back-off process is initiated.

When the host resources are no longer available for use or a back-off process is initiated, the DSA communication system may employ additional components or schemes to handover a communication session. In such a scenario, the eNodeB of the host network may perform a back-off process based on the QCI and ARP designations. The eNodeB 916 back-off may involve handing over the current communication session from the host eNodeB 916b to another eNodeB through the use of the X2 link between the exchanging networks. This process may also be achieved by using the DSMPTA process with the ANDSF.

To initiate and implement a handover process, the host network may generate and send certain commands to the wireless device 101. For example, three different types of handover include: 1) Interfreq; 2) intrafreq; and 3) IRAT.

In the interfreq handover, the network currently serving a wireless device 101 (i.e., the current network) may initiate handover of the wireless device 101 from the current network to another network. In the intrafreq handover, the current network may initiate a handover of the wireless device 101 from one cell in the one network to another cell in the same network for capability offload. In the IRAT handover, the current network may initiate wireless device 101 handover to another RAT.

The interfreq handover may be initiated when the current network sends instruction to the secondary user wireless device 101 to begin using the resources of another network. For example, a wireless device 101 on a home network may be instructed to use a host network for large upload/downloads of files.

The interfreq handover may be used to offload a secondary user from a host network based on the policy decision in place. The interfreq handover may further be used when a wireless device 101 no longer needs to use the services of the host network as a secondary user and thus may be sent back to the its home network.

The interfreq handovers may further be used when a wireless device 101 leave the DSA communication system cluster or cell area and requires to continue its communication session. In such a scenario, the wireless device 101 may be either transferred to another network/cluster or sent back to the home network. The interfreq handovers may further be used to relieve network capacity constraints by allowing some primary users to use the services of another network as secondary users.

The intrafreq handovers may be used in current network to relieve cell congestion by shedding traffic from one cell to another. To avoid a ping-pong effect which may prevent resolving capacity issues, the intrafreq handover commands may bar wireless devices 101 from using the neighboring cell/sector, as appears on the PLMN/PRL list, for defined periods of time.

IRAT handovers may be used to redirect wireless devices 101 to another RAT. During a handover from one IRAT to another, both ratio access technology and frequency of operation may be changed. This type of handover may be used when the DSA communication system is available and the wireless device 101 is initially active on a particular channel. The current network may instruct the wireless device 101 to change to another RAT through the IRAT handover process. In one embodiment, the handover command may be initiated from a current network, or alternatively the handover command may be initiated from a different network or entity. Thus, if the wireless device 101 communication session is dropped during the handover process, the wireless device 101 may be able to reestablish the communication session with the target RAT and not revert back to the previous network.

In one non-limiting embodiment, the session may be dropped during INTERFREQ and/or INTRAFREQ handovers. In this embodiment, the device may reestablish connections by reverting back to a previous network.

Figure 33:
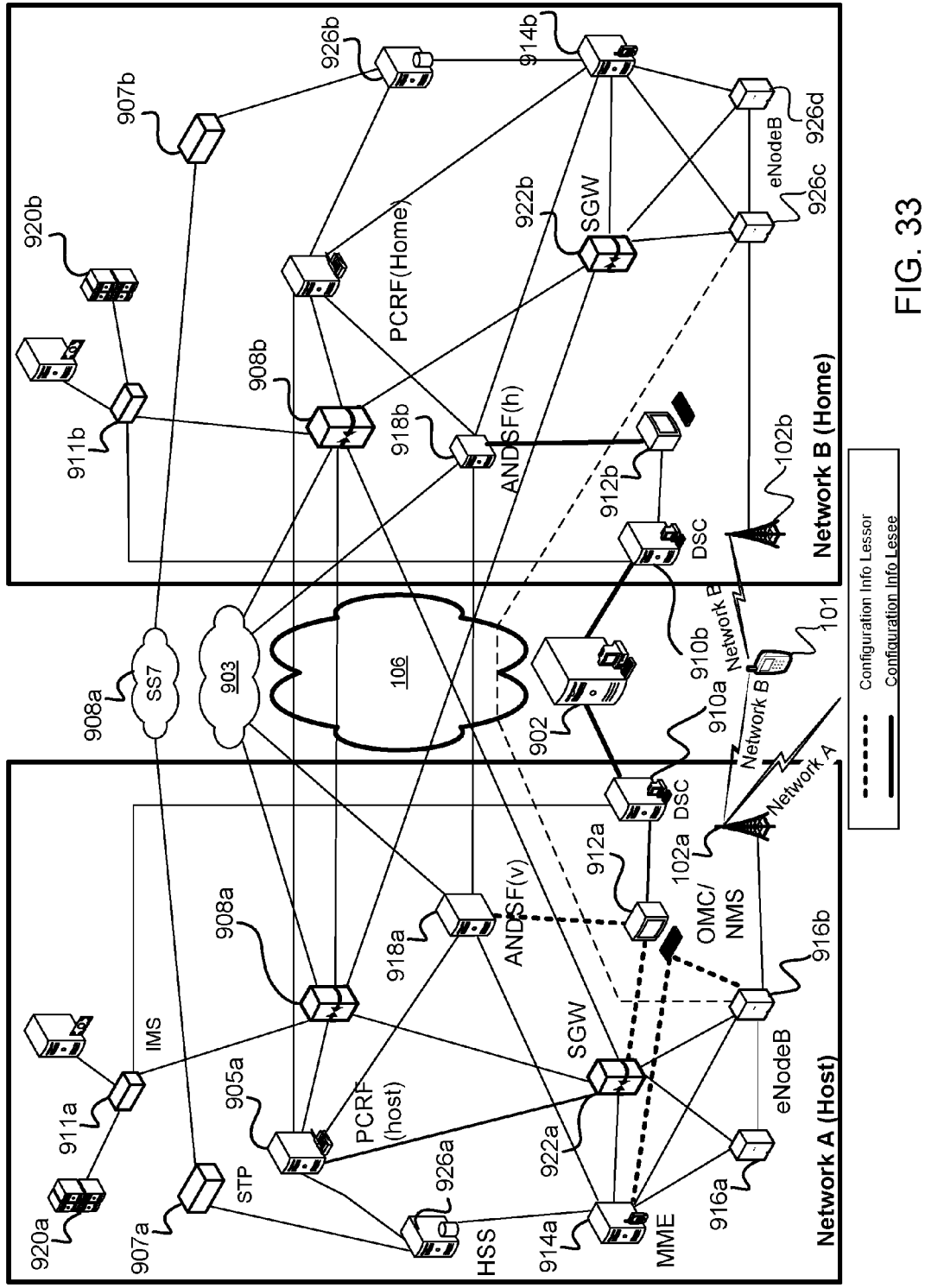
FIG. 33 is a communication block diagram of a DSA communication system illustrating data flow for initiating a network handover according to an embodiment.

FIG. 33 illustrates a network component diagram of an embodiment system required for initiating a network handover as part of the DSA process. The handover process may be initiated by the DSC 910 based on its rule sets which are established prior to the bidding or during the bidding process. The use of the ANDSF 918 may enable both intrafreq, interfreq, and IRAT handovers to take place allow for maximum flexibility.

Back-Off of Secondary Users from the Host Network:

The DPC 902 may continuously monitor the host network resources to ensure that sufficient levels of resources are available for the use of the primary users of the host network. When the capacity of available resources at the host network reaches a predefined threshold, the host network may instruct the wireless device 101 to begin a back-off process of the secondary users. The back-off process may be initiated to free-up resources at the hosting network.

When resources need to be made available to primary users or subscribers of a network, the DSA may initiate a back-off of the secondary users to free-up additional resources. The back-off process may involve different or combined methods depending on the DSA configuration. However, commonality of the back-off policy is done using the wireless device 101 type and any special flags associated with the device, policy decision for redirecting active and idle traffic, policy decision as to whom and the order to shed traffic, and re-provisioning either OTA or via activating a client application.

In an embodiment, the DSA communication system may be configured to employ tiered priority access (TPA) rules (as explained in detail above with respect to FIGS. 1-8) when initiating back-off processes. For example, the back-off process may be initiated when a resource level reaches a predetermined threshold level which may be user defined. The threshold detection process may include traffic monitoring of the Radio Access Network (RAN) and Core Network resources and determining whether a predetermined threshold level is reached which may trigger QoS or require shedding of secondary users to free-up resources.

Threshold levels for RAN and Core Network resources may be determined based on the traffic usage that secondary users may generate. For example, when more than 85% of the RAN resources are used, back-off process may be implemented to either reduce the throughput of the secondary users or shed secondary users from the host network or both. By initiating the back-off process, the host network ensures that amount of available RAN and Core Network resources always remain above 15%.

In an embodiment, the back-off process of the DSA which would allow each host network to maintain certain amount of resources free at all times may be proactive and independent of actual incidents. In the event of an incident, such as a natural disaster, the DSA communication system may have the capacity to make available free resources to first responders and employ the TPA process if additional resources are necessary.

In an embodiment, the DSA communication system may monitor the traffic during the back-off process and begin to release RAN resources for secondary use at user defined intervals.

In an embodiment, each host network may employ certain back-off policies and resource criteria in deciding whether to initiate a back-off process. These policy and resource criteria may include: spectrum availability (separate or co-existence); capacity/bandwidth availability (RF and Core); overhead criteria (percent total available capacity vs. used capacity); back-off criteria (reselection, handover—intra system and inter-system) termination); treatment (how specific services/applications are treated/routed); barred treatments (which services/applications are barred for use); rating (how services are rated, i.e., possible special discount for off-peak usage); geographic boundary (define zone or cell for inclusion); time (define time and day(s) for inclusion); duration (define incremental allocation based on time and geographic boundary); user equipment types.

Back-off process may be implemented differently for different resource allocation methods. In an embodiment, the back-off process for the virtual-best effort (pure roaming) allocation method may be governed by the PCRF 905 policy rules set forth in the (EPC). The eNodeB may also be configured to initiate traffic reducing actions based on capacity loads by using the X2 link. In such a scenario, the eNodeB may enable the host network to shed secondary users by handing off traffic to the adjacent cell sites. In one embodiment, the eNodeB may send instructions to one or more entities including the UE. In another embodiment, the eNodeB may initiate the process.

Additionally the back-off process for DSA may also involve one or more items which will be governed or instituted through the DSC following the agreed upon policy based rule sets and are meant to ensure session continuity or re-allocation of the UE to another access method in an attempt to ensure the user experience is maintained during the back-off process.

In an embodiment, the (DSMPTA) back-off process for virtual-best effort may be above and beyond the typical rule sets which are part of the Access and EPC. When traffic reaches a pre-defined threshold, the DSA communication system may initiate one or a combination of processes to implement a DSMPTA back-off process. The PCRF 905 may dynamically adjust the QCI/ARQ values for the secondary user wireless device 101. This may involve restricting the bandwidth or placing usage onto a best effort or lower priority scheme. The cells which are experiencing capacity constraint may be placed on a barred cell list so that no additional secondary user may access the cells. The updates to the barred cell list may be communicated to the wireless devices 101 through re-provisioning the broadcast message that is sent to the wireless devices 101. The broadcast message may be updated with information regarding the barred cells and the neighboring available cells.

To ensure that the wireless devices 101 receive and read the broadcast messages regarding the barred cells and the available neighboring cells, the DSA communication system may send WAP/SMS messages to the configured wireless devices 101 to force them to reselect. The wireless devices 101 will have to read the broadcast messages when they enter the reselection process.

In an embodiment, the DSA may initiate close service groups to restrict the use of particular cells sites to the roaming wireless devices 101. The combination of CSG and TAI's which may be involved with the capacity issue may restrict the secondary user wireless device 101 from accessing the network. For example, the CSG and TAI may drop callers, may reduce quality, may expand the network, or may provide other items to deal with the capacity issue.

In an embodiment, during a back-off session, the ANDSF 918 may facilitate a handover of the secondary users to another network or back to the secondary user home network. ADDSF 918 may initiate a network handover if connectivity is available with another network. The wireless devices 101 may be handed over to another network or another access network (RAT/IRAT).

In an embodiment, the back-off process in DSA using a virtual-secondary user method of resources allocation may be governed by the PCRF 905 policy rules set forth in the EPC and DPC 902. The PCRF 905 policy rules of a primary host network which apply to the secondary users may take priority over those enforced by the DPC 902. However, the PCRF 905 policy rules of the primary host network may be dynamically changed or amended based on the conditions set forth by the primary host network operations requirements. Additionally, the back-off process in a DSA communication system may involve additional items. The implementation of these additional items may be controlled and governed through the DSC 910 of the primary host network based on the agreed upon policies and rules sets. The DSC 910 policies and rules are designed to ensure communication session continuity and good user experience during the back-off process.

In the event that the existing policies and rule sets in the Access and EPC fail to apply to a back-off process, the DSA back-off process for secondary users may be implemented. For example, when primary host network traffic reaches a predetermined threshold level, the host DSC 910 may instruct the host eNodeB to handover the secondary user to adjacent cell sites within the host network using the X2 link and based upon the secondary user wireless device 101 QCI/ARQ rule sets. Alternatively, the DSC 910 may instruct the host eNodeB to handover the secondary user to the home network using the X2 link when the host and home networks are connected for full mobility.

Based upon instructions received from the host DSC 910, the host PCRF 905 may dynamically adjust the QCI/ARQ values for the secondary user wireless devices 101. For example, the host PCRF 905 may restrict the bandwidth, change resources allocation method to virtual-best effort, or change priority schemes to low priority.

The DSC 910 may instruct the host network to update or generate a list of barred cells and include the cells which are currently experiencing traffic capacity that is above the predetermined traffic capacity threshold. The DSC 910 may further instruct the host network to broadcast a message to re-provision the secondary user wireless devices 101 with the updated barred cell list. The broadcast message may further include information regarding the next ring or multiple rings of cells adjacent to the constrained cell or group of cells. The broadcast message may include changed and valid PLMN-ids, altered TAI for the cell or cells, and altered neighbor lists for the use of the secondary user wireless device 101 to perform a handover process or network reselection. To ensure that secondary user wireless devices 101 check for the re-provisioning broadcast messages, the host network may send a WAP/SMS message to configured wireless devices 101 to force them to perform network reselection.

The host DSC 910 may further instruct the host network to initiate Close Service Groups (CGS) to restrict the use of particular cell sites to the roaming secondary user wireless devices 101. The combination of CGS and TAI involved with the network capacity may restrict access of the roaming secondary user wireless devices 101 to the host network. The access restriction effectuated by the combination of CGS and TAI may render the host network only accessible to designated primary users.

In the event that connectivity exists between the primary host and another network (e.g., the secondary home network), the host DSC 910 may instruct the host ANDSF 918 to initiate a network handover of the secondary user wireless device 101 to another connected network or access network (RAT/IRAT).

To reduce capacity overload when eNodeB is x-furcated for resources allocation and access, the host OMC 912 (or other policy based controls configured to manage capacity) may instruct the eNodeB to shed the resources accessible to the secondary user wireless devices 101. Accordingly, the resources designated for secondary use and associated with an eNodeB for the affected area may be reduced. The reduction in available resources of an eNodeB may be force handovers to or reselection of adjacent cell with resources.

The reallocation of eNodeB resources may be balanced by host network initiated handovers to force the secondary user wireless devices 101 to handover to another network on which they can roam and be provided with adequate resources. For example, the handovers may be interfreq RAT or IRAT handovers.

The host PGW 908 may also be used as part of the back-off process. The SG of the secondary user wireless devices 101 may be connected to the appropriate host PGW 908 based on the policies and rules of the host HSS 904 and PCRF 905. The host DSC 910 may control the bandwidth of the connection between the host PGW 908 and wireless device's 101 SG. During the back-off process, the host DSC 910 may initiate the host network to reduce the bandwidth between the PGW 908 and secondary user wireless device's 101 SG which are being moved out of the host network. The process by which the DSC 910 may reduce bandwidth between the PGW 908 and SG may be governed by predetermined policy and rules. The host DSC 910 may continue to monitor the host network cells which may be overburdened by high traffic and assess additional bandwidth reduction to the host PGW 908-device SG connection to reduce traffic.

Not all the processes initiated by the DSC 910 as part of the DSMPT back-off process may be necessary and the implementation of these processes and the order in which they may occur may depend on the agreements between the host and home networks.

In an embodiment, the back-off process may be implemented in the DSA communication system using a spectrum allocation method of resources allocation. The spectrum allocation method may include the license area and regional area methods for resources allocation.

In an embodiment, the back-off process for a DSA using a license area method may involve the reallocation of the spectrum resources from the secondary home network (i.e., lessee) to primary host network (i.e., lessor). The host network using the license area method may initiate the back-off process to handover all the existing secondary user wireless devices 101 from the lessor's spectrum to another network or back to the home network. The time frame for the reallocation will be predetermined based on rule sets defined by the lessor and lessee agreements. Depending on the time frame defined in the rule sets, not all the secondary users may be migrated out the host network in time and as a result, some secondary users may be dropped.

Based upon pre-negotiated agreements between the lessor and the lessee, the host network may determine whether the back-off process may be applied to a portion of or the entire license area. Based on the geographic region involved for capacity relief, spectrum reallocation may not be required for every cell of the entire license area. Accordingly, back-off processes may be implemented in sub-license areas of the licensed area.

In implementing the back-off process for an entire license area, the host DSC 910 may inform the DPC 902 that the host network has reached a predefined threshold of traffic capacity. The DPC 902 may communicate that message to the home DSC 910. The home DSC 910 may reduce the host resources available to the home eNodeB in a stepwise manner and handover the secondary user traffic to a non-leased spectrum. The steps of reducing the available resources to the eNodeB may be performed on a predefined time intervals basis. If traffic is not migrated in a timely manner, the home DPC 902 may initiate network handovers to migrate the secondary users from the host network to another appropriate channel. Once the resources are freed, the home eNodeB may remove the channel from its available channel lists.

In implementing the back-off process for sub-license areas (in opposed to the entire license area), the process above may be implemented except that defined cells or TAI's may be used instead of the entire license area.

Once the capacity restrictions are resolved by the host network, the spectrum may be reallocated to the home network. To reallocate resources, the host DSC 910 may inform the DPC 902 that spectrum resources are again available for use by the home network. The home DPC 902 may inform the home DSC 910 that resources are again available. The resources may be reallocated to the home network based upon predetermined policies and rule sets.

For back-off processes which are not governed by rules and policies in the Access and EPC, the host may initiate a DSMPTA back-off process. It may be possible that based on the rules sets.

In an embodiment, the back-off process for a DSA communication system using a Regional area method may depend on the policies and rule sets agreed upon by the lessor and the lessee.

The back-off process in a DSA using the Regional area method of resources allocation may include handing over all the existing secondary wireless devices 101 using the host spectrum in the regional area or sub-regional area back to the home or another network. The host DSC 910 and DPC 902/DSC 910 rule sets may define whether the secondary users should be moved from the entire or a sub-set of regional area.

The timeframe for the reallocation of resources during the back-off process may be predetermined based on policies and rule sets agreed upon by the lessor and lessee. Not all the traffic may be successfully migrated to the home or another network during the back-off process if the timelines set forth in the agreement is not met. In such a scenario, some connections may be dropped or lost as soon as the predetermined timeframe is expired.

Upon initiation of the back-off process, the lessee network resources associated with the home eNodeB may be reduced in a stepwise manner. The home OMC 912 may initiate reduction of the resources by the eNodeB. Other policy based components of the home network, such as the DPC 902 may also initiate the reduction of resources by the eNodeB. The home network may facilitate the handover of the secondary users from the host network spectrum to the home network spectrum. If the home network does not have the capacity to handle the traffic volume or handover is not being performed in a timely fashion, it may either handover the communication session to another network or channel or force the secondary user wireless devices 101 to perform a reselection process. Once the eNodeB has handed over all the secondary users from the host spectrum, it may remove the spectrum channel from the available list of channels accessible to secondary users.

Once the capacity restrictions are resolved by the host network, the spectrum may be reallocated to the home network. To reallocation resources, the host DSC 910 may inform the DPC 902 that spectrum resources are again available for use by the home network. The home DPC 902 may inform the home DSC 910 that resources are again available. The resources may be reallocated to the home network based upon predetermined policies and rule sets.

Figure 34:
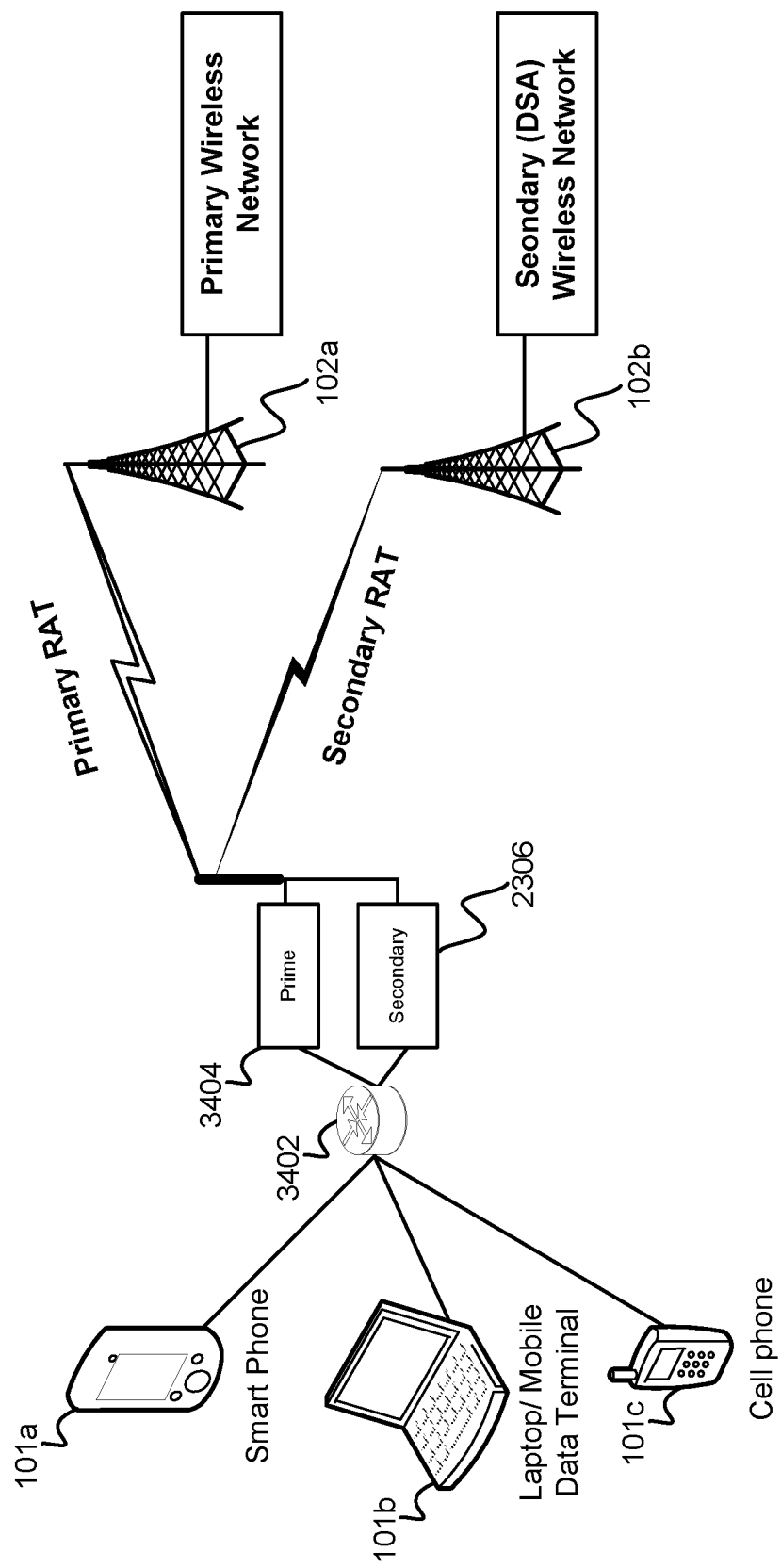
FIG. 34 is a communication system block diagram of a DSA communication system illustrating providing user equipment access to several Radio Access Terminals (RAT) according to an embodiment.

FIG. 34 shows a smart phone 101*a*, a laptop 101*b*, and a cell phone 101*c* communicating with an element 3402 that is connected to a prime 3404 and a secondary 2306 and which communicates with a base station 102*a* and 102*b* via a primary RAT and a secondary RAT. The base station 102*a* connects with a primary network and the base station 102*b* connects with a secondary network 102*b*. In an embodiment, as illustrated in FIG. 34, the DSA communication system may allow wireless devices 101*a*-101*c* to access several Radio Access Technologies (i.e., primary and secondary RATs) simultaneously. For example, the DSA may enable a wireless device 101 using a primary RAT of a primary network to access a secondary RAT on a secondary network only for certain types of services. For example, when the wireless device 101 use of the primary network causes high volume or bursty traffic, the DSA communication system may enable the primary network to offload and send the high volume and bursyt traffic to the secondary network. For example, prime and secondary element 2306 and 3404 may provide data to route traffic over to the primary and secondary wireless networks and base stations using a header. Switching may occur using a DSA to switch between the networks. In another embodiment, the switching may occur using the element 3402, prime component or secondary component 3404 or 3406. In yet another embodiment, the switching may be initiated by the prime or secondary DSA networks, or by another entity that views the capacity of the network.

Figure 35:
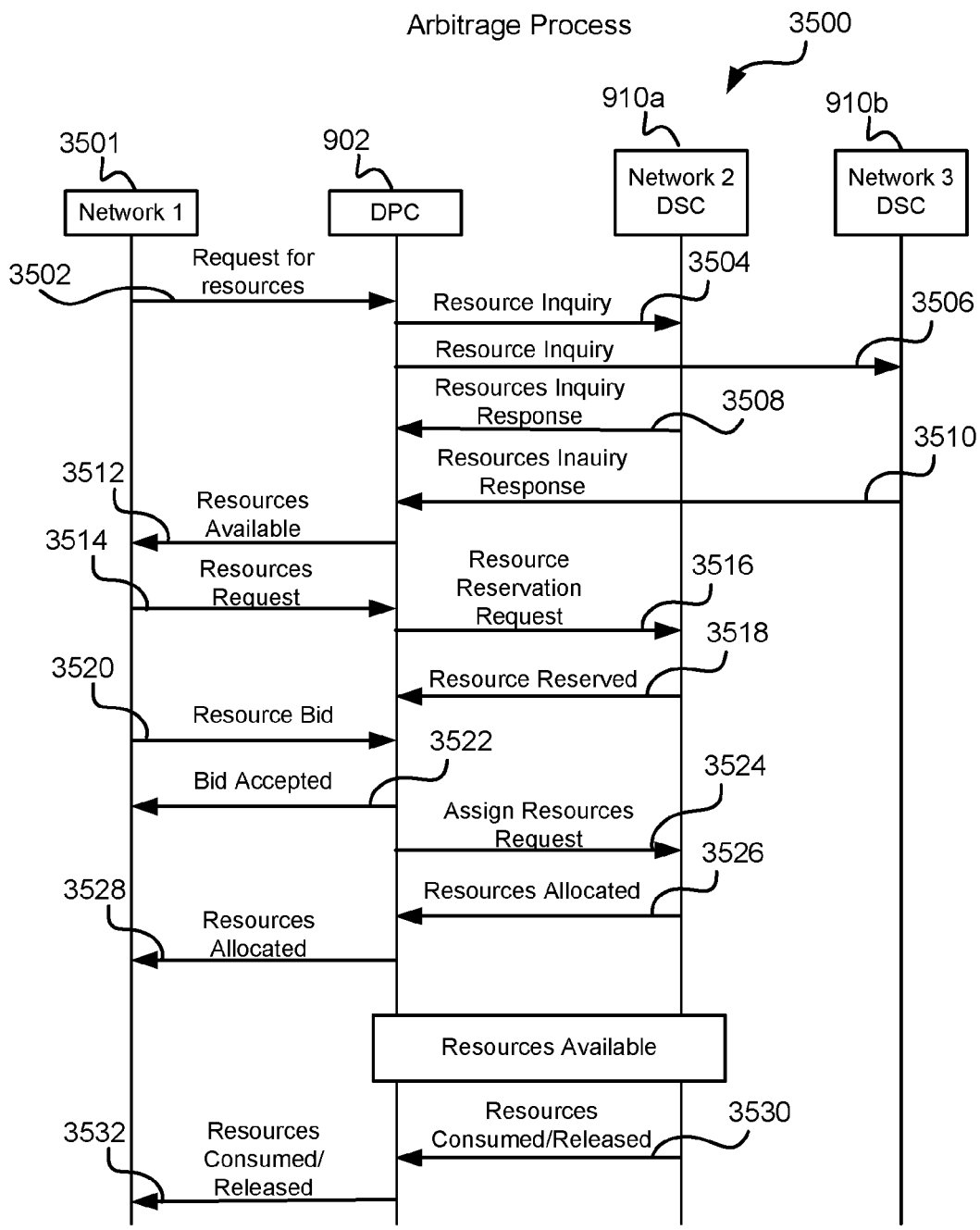
FIG. 35 is a message flow diagram illustrating message communications between components of a DSA communication system according to an embodiment.

FIG. 35 illustrates a message flow diagram 3500 of the arbitrate process in a DSA communication system according to an embodiment. In this embodiment, one bidder (i.e., Network 1) is used for simplicity, however, it is contemplated that multiple bidders may use this process. Network 1 3501 may send a request for resources message 3502 to the DPC 902. The DPC 902 may receive the request message and send queries 3504, 3506 to participating DSCs 910*a*, 910*b* of Network 2 and Network 3 based on pre-defined criteria which may include types and capabilities of the user wireless device 101 in addition to the geographic criteria of the requesting wireless device 101. Geographic criteria may include geographic location, geographic polygon or license area of the user wireless device 101. The geographic criteria request may include parameters that are greater than those that the host network may permit. The DPC 902 may receive resource inquiry responses 3508, 3510 from each DSC 910*a*, 910*b* that was contacted.

The DPC 902 may send a resource availability message 3512 to inform Network 1 that the requested resources are available through DSC 910*a*. Network 1 3501 may receive the resource availability message 3510 and in response send a resources request message 3514 to the DPC 902 to reserve the available resources at DSC 910*a*. The DPC 902 may the send a resource reservation request 3516 to the DSC 910*a*. Upon receiving the resource reservation request 3516, the DSC 910*a* may reserve the required spectrum and send a resources reserved message 3518 back to the DPC 902. The DPC 902 may receive a resource bid message 3520 from Network 1, accept the bid (if the bid complies to the policies and rules of the DPC 902) and send a bid accepted message 3522 to Network 1 3501. Upon accepting the bid from the bidder, the DPC 902 may also send an assign resources request 3524 to the DSC 910*a* to allocate the reserved resources to Network 1 3501. The DSC 910*a* may receive the assign resources request 3524, allocate the resources to be used by Network 1 3501 and send a resources allocated message 3526 to the DPC 902. The DPC 902 may inform Network 1 3501 that the requested resources are now allocated to be used by the wireless device 101 subscriber Network 1 3501 by sending a resources allocated message 3528 to Network 1 3501. The resources may be available for use by Network 1 3501. Once the resources are used, the DSC 910*a* may send a resources consumed/released message 3530 to the DPC 902. The DPC 902 may receive the resources consumed/released message 3530 and send a resources consumed/released message 3532 to Network 1 3501. Network 1 3501 may settle the charges for the spectrum that it used.

Figure 36:
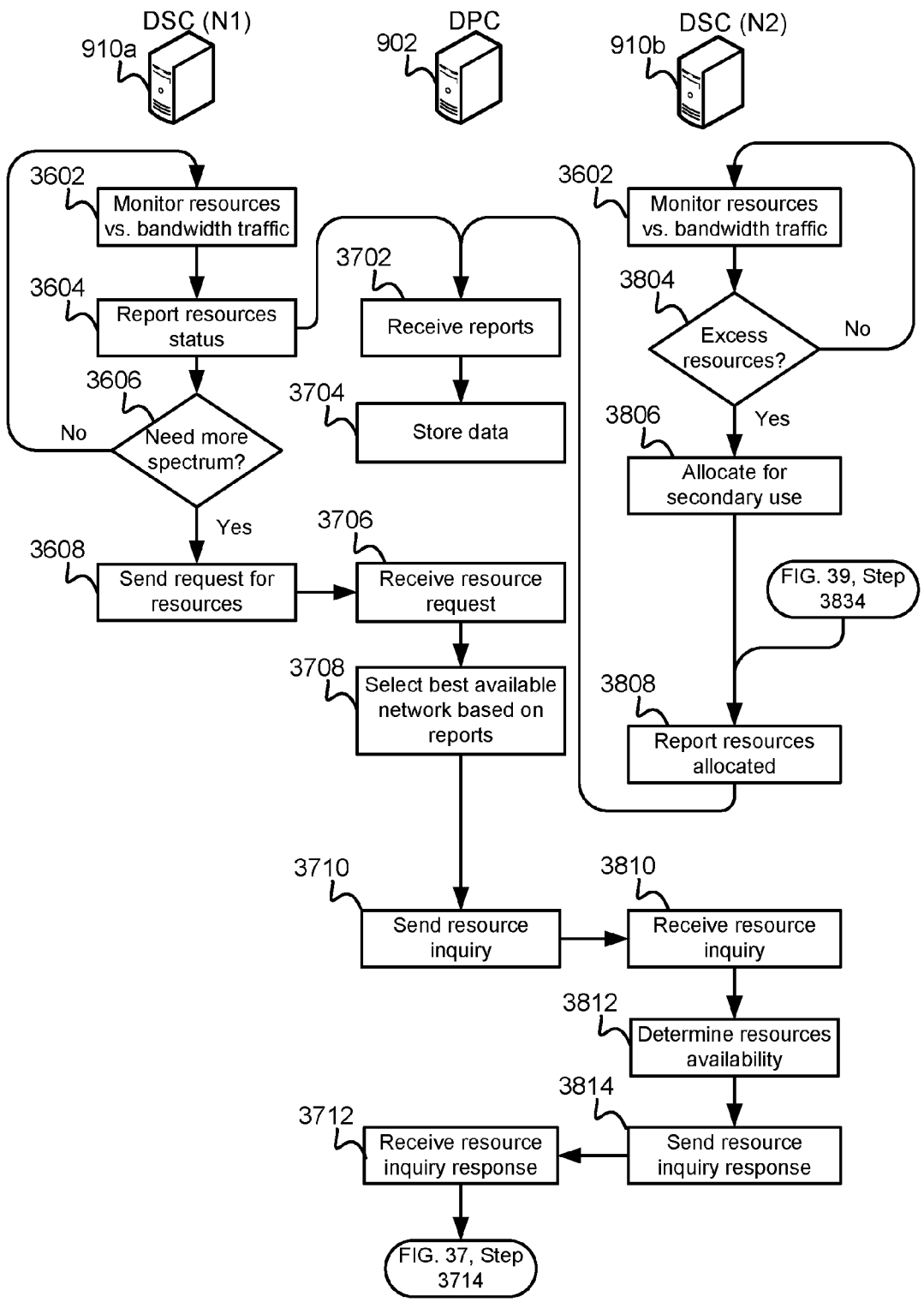
FIGS. 36 through 40 are process flow diagrams of embodiment methods for allocating and accessing resources using the DSA communication system.

FIGS. 36-40 illustrate flow diagrams of an embodiment method for allocating and accessing resources using the DSA communication system. As illustrated in FIG. 36, the Network 1 DSC 910*a* may monitor call traffic as compared to the total spectrum resources available to Network 1, block 3602. The DSC 910*a* may record and report the resource status of Network 1 to the DPC 902. The DPC 902 may receive the resource status report from Network 1, block 3702, and store it, block 3704. The DSC 910a of Network 1 may determine based on the resources status report whether additional resources may be required to provide service to the existing users of Network 1, determination 3606. If additional resources are not required (i.e., determination 3606="No"), the DSC 910a may continue to monitor resources available vs. bandwidth traffic by going back to block 3602. If additional resources are required (i.e., determination 3606="Yes"), the DSC 910a may send a request for additional resources to the DPC 902, block 3608.

The Network 2 DSC 910b may also monitor resources available vs. bandwidth traffic in Network 2, block 3602, and report the resource status to the DPC 902, block 3804. The DPC 902 may receive the resource status report from DSC 910b, block 3702 and store the received data, block 3704. The DSC 910b may determine whether excess amount of resources are available in Network 2, determination 3804. If excess amounts of resources are not available in Network 2 (i.e., determination 3804="No"), the DSC 910b may continue to monitor resources available vs. bandwidth traffic by going back to block 3602. If excess amounts of resources are available (i.e., determination 3804="Yes"), the DSC 910b may allocate the excess resources or a sub-part of the excess resources for secondary use, block 3806, and report to the DPC 902 that resources are allocated for use by secondary users, block 3808. The DPC 902 may receive the resource allocation report from DSC 910b, block 3702, and store the received data, block 3704.

The DPC 902 may receive resource status reports from many different networks. However, in this embodiment, for ease of illustration, only interactions of DPC 902 with two networks are shown. The status reports received from the networks may further include additional information such as network rules and policies with respect to access and use to allocated resources. For example, the status reports from Network 2 may include system requirements for Network 2 which must be met before a wireless device 101 can successfully access the allocated resources on Network 2 as a secondary user.

The DPC 902 receives the request for additional resources from DSC 910a of Network 1, block 3706, and based on data received from other networks selects the best available network from which Network 1 may purchase additional resources, in block 3708. In this example, the DPC 902 may select Network 2 as the most suitable network to provide resources to Network 1. The DPC 902 may send a resource inquiry to the Network 2, block 3710, to determine the availability and quantity of allocated excess resources of Network 2.

The DSC 910b of Network 2 may receive the resource inquiry, block 3810, and determine resource availability, block 3812. The DSC 910b may send a resource inquiry response to the DPC 902. The resource inquiry response may include information about the quantity and quality of resources available for use by secondary users. The DPC 902 may receive the resources inquiry response, block 3712.

Figure 37:
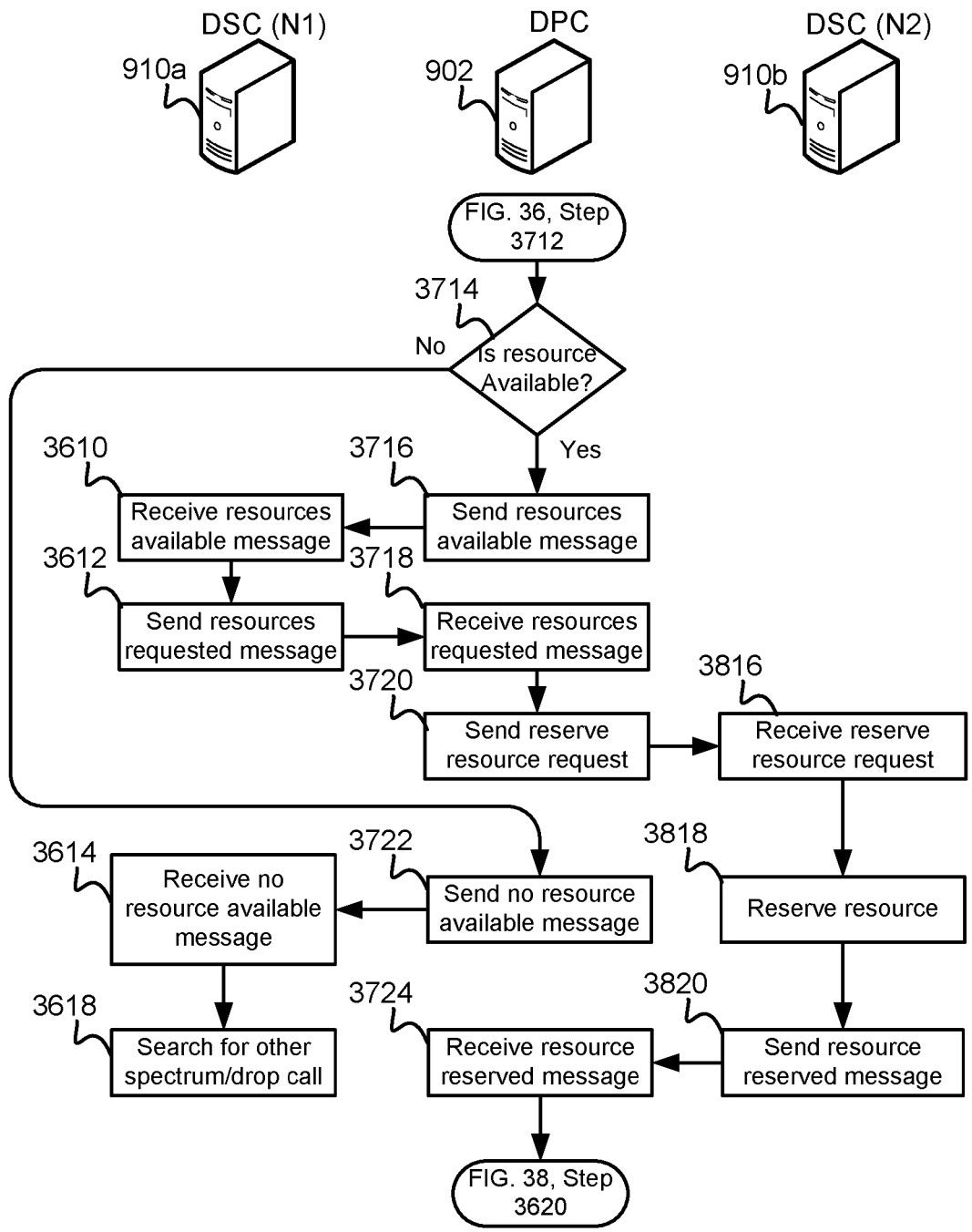

As illustrated in FIG. 37, the DPC 902 may determine whether resources are available based on the data received from the DSC 910b of Network 2, block 3714. If data is not available (i.e., determination block 3714="No"), the DPC 902 may send a no resource available message to Network 1, block 3722. Resources may not be available for use by a network for different reasons. For example, resources may be purchased to other bidders before they were reserved by the network. The DSC 910a of Network 1 may receive the no resource available message, block 3614, and search for other available spectrum resources or terminate connection sessions with users to free-up resources on Network 1, block 3618.

If data is available (i.e., determination 3714="Yes"), the DPC 902 may send a resource available message to the DSC 910a to inform Network 1 about the quality and quantity of resources available for secondary use at Network 2, block 3716. The DSC 910a may receive the resources available message and send a request resource message to reserve the allocated resources of Network 2 for use by subscribers of Network 1, block 3612. The request resource message may include data such as the quantity of resources that Network 1 may require in this transaction.

The DPC 902 may receive the resources request message, block 3718, and send a reserve resources request message to Network 2, block 3720. The DSC 910b at Network 2 may receive the reserve resource request, block 3816, and reserve the requested quantity of the allocated resources for use by Network 1 subscribers, block 3818. The DSC 910b of Network 2 may confirm that the requested quantity of allocated resources is reserved for use by Network 1 by sending a resource reserved message, block 3820. The DPC 902 may receive the resource reserved message from Network 2 and prepare for the bidding process as described in FIG. 38.

Figure 38:
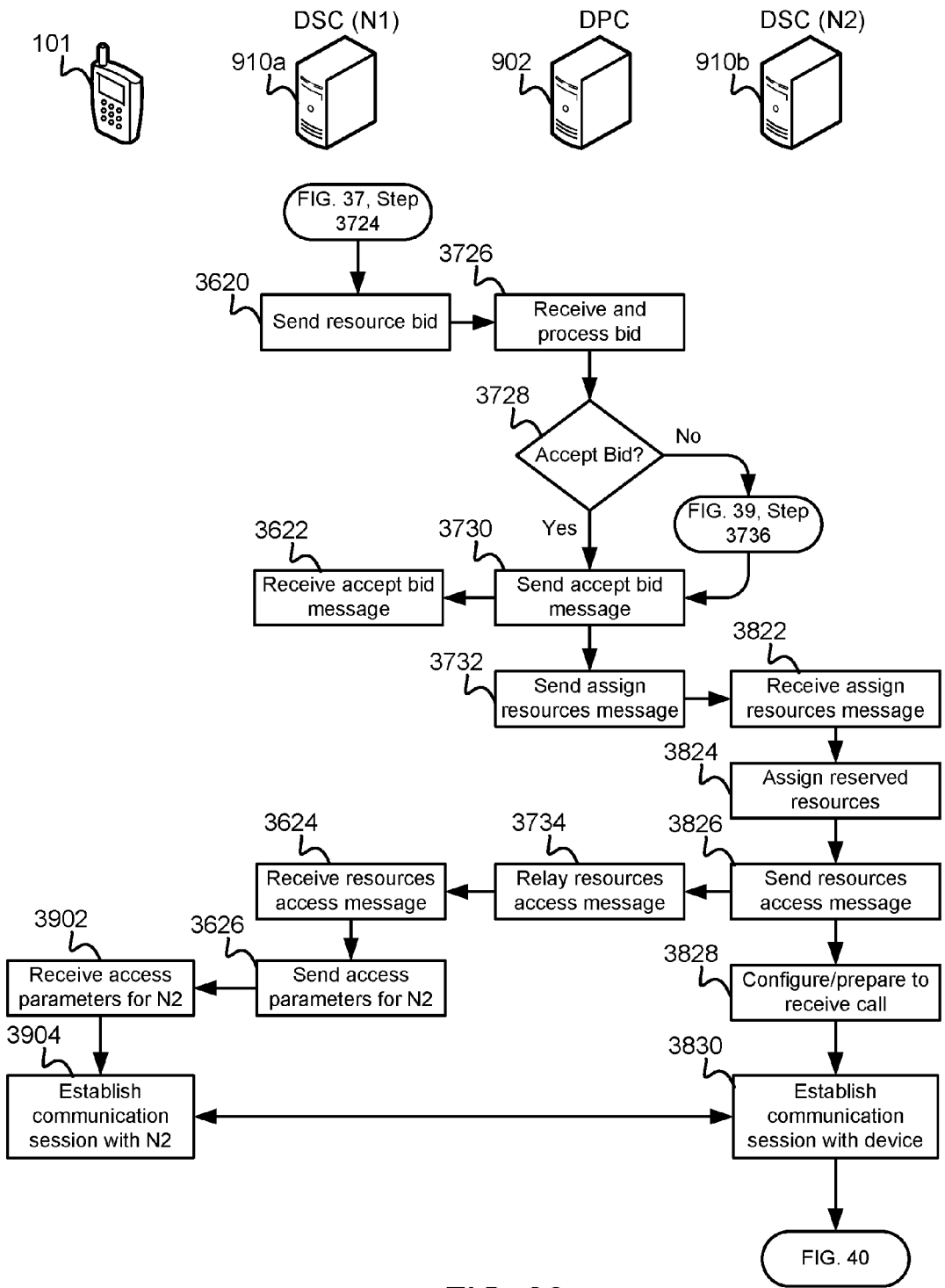

As illustrated in FIG. 38, the DSC 910a of Network 1 may send a resource bid to negotiate access to the reserved resources of Network 2, block 3620. The DPC 902 may receive the resource bid and process it, block 3726. The DPC 902 may determine whether the bid received from Network 1 may be accepted, at determination block 3728. The DPC 902 may evaluate a bid from a network provider based upon policies and rule sets of the DSA communication system in addition to requirements set forth by the resource offering network, such as prices and allocation or access methods or by other methods. If the bid is accepted (i.e., determination 3728="Yes"), the DPC 902 may send an accept bid message to Network 1, block 3730. The DSC 910a may receive the accept bid message and await resource access instructions, in block 3622. Once the bid is accepted, the DPC 902 may also send an assign resources message to the DSC 910b of Network 2, block 3732. The DSC 910b may receive the assign resources message, block 3822, and assign reserved resources for use by Network 1, block 3824. The DSC 910b may send a resources access message to enable Network 1 to access the assigned resources of Network 2, block 3826, and configure to establish communication session with the wireless device 101 of Network 1, block 3828.

The DPC 902 may relay the resources access message to Network 1, block 3734. The DSC 910a may receive the resources access message, block 3624. The resource access message may include data, such as, access parameters that may be used by secondary user wireless devices 101 to access resources on Network 2. The DSC 910a may send access parameters for Network 2 to wireless devices 101 which have communication sessions with Network 1 and Network 1 has designated to migrate to Network 2, block 3626. The designated wireless devices 101 may receive the access parameters for Network 2, block 3902, and establish a communication session with wireless device 101 of Network 1, steps 3904 and 3830. Network 2 may commence the settlement process as described in more detail below with reference to FIG. 40.

Figure 39:
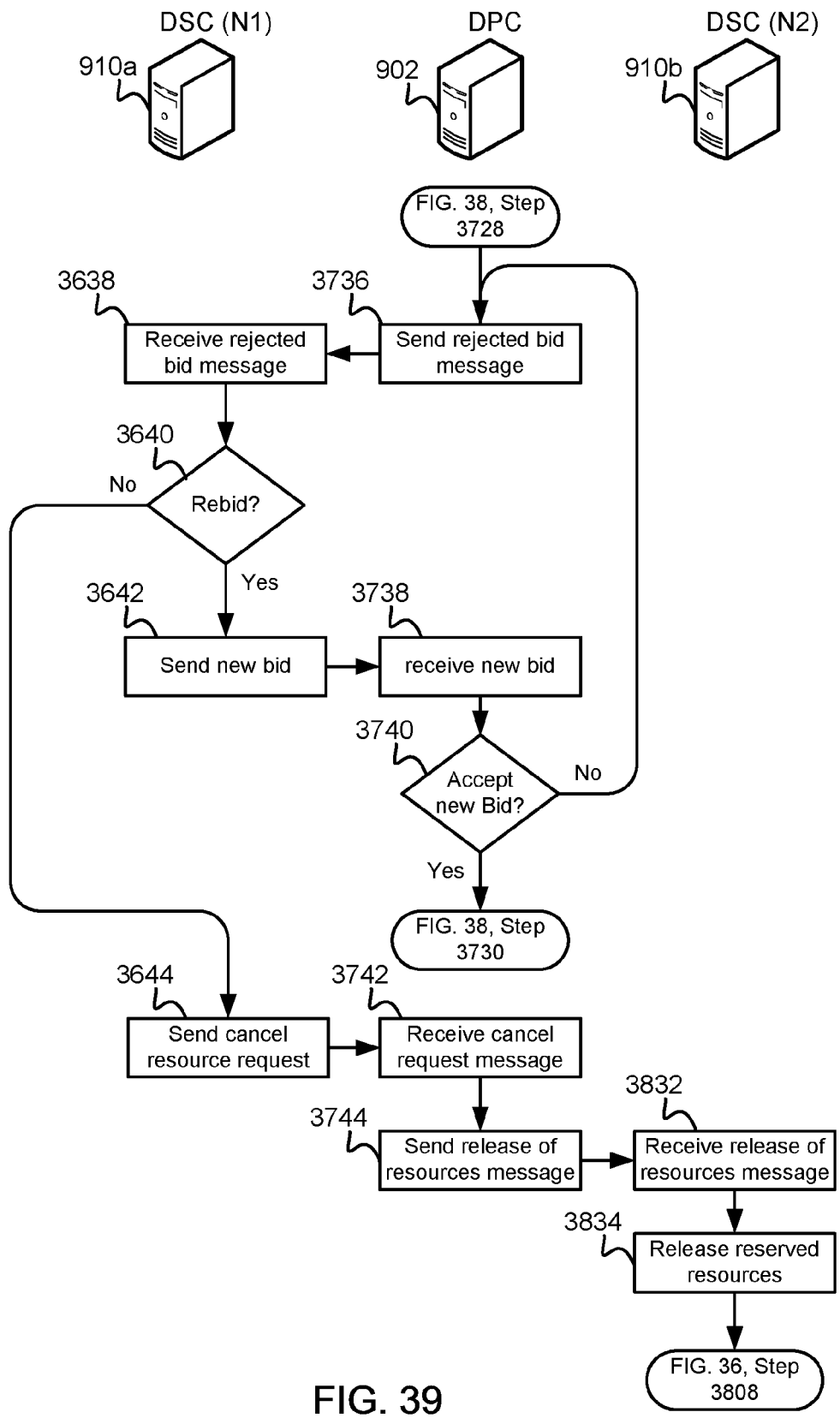

If the bid is rejected (i.e., determination block 3728="No"), the DPC 902 may send a rejected bid message to Network 1, block 3736 (shown in FIG. 39). As illustrated in FIG. 39, the DSC 910a may receive the rejected bid message, block 3736, and determine whether to rebid, determination 3640. If no rebid (i.e., determination 3640="No"), the DSC 910*a* may send a cancel resource request message, block 3644. The DPC 902 may receive the cancel resource request message, block 3742, and send a release of resources message to Network 2, block 3744. The DSC 910*b* of Network 2 may receive the release of resources message, block 3832, release the reserved resources for use by other networks, block 3834, and report the allocated resource status to DPC 902 by going back to block 3808 as shown in FIG. 36 and follow the steps as described above with respect to FIG. 36.

If rebid (i.e., determination 3640="Yes"), the DSC 910*a* may send a new bid for the same resources, block 3642. The DPC 902 may receive the new bid, block 3738, and determine whether to accept the new bid, determination 3740. If the new bid is rejected again (i.e., determination 3740="No"), the DPC 902 may send a rejected bid message by going back to block 3736. If the bid is accepted (i.e., determination 3740="Yes"), the DPC 902 may send an accept bid message by going back to block 3730 as shown in FIG. 38 and follow the same steps as described above with respect to FIG. 38.

Figure 40:
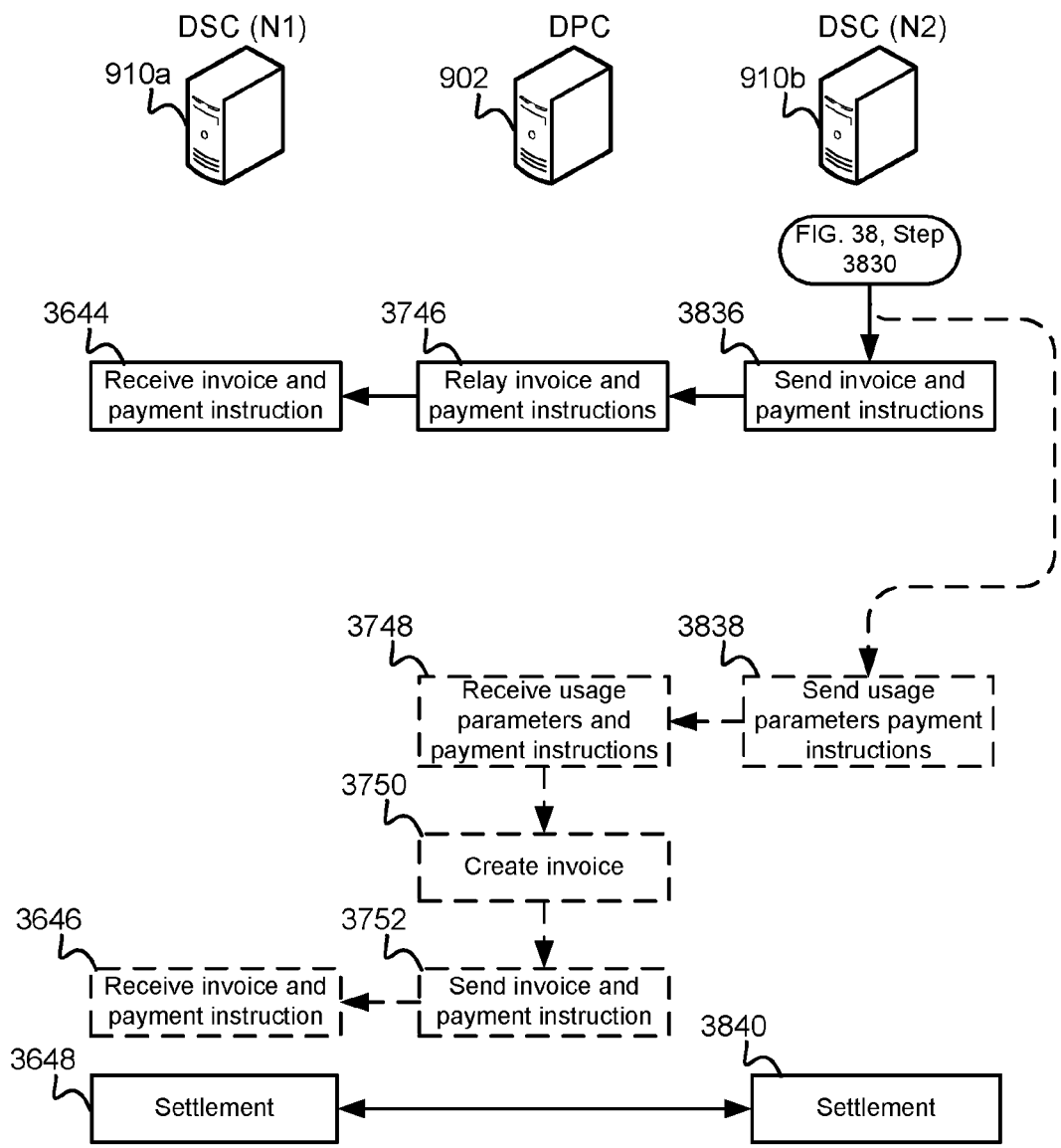

FIG. 40 illustrates the settlement process after Network 2 provides access to the secondary user wireless devices 101 of Network 1. DSC 910*b* of Network 2 may send invoices and payment instructions relating to the use of allocated resources by Network 1 to the DPC 902, block 3836. The DPC 902 may relay the invoice and payment instructions from Network 2 to Network 1, block 3746. DSC 910*a* may receive the invoices and payment instructions, block 3644, and settle the charges with Network 2, steps 3648 and 3840.

Optionally, the DSC 910*b* of Network 2 may send usage parameters and payment instructions to the DPC 902, block 3838. The DPC 902 may receive the usage parameters and payment instructions, block 3748, create an invoice, block 3750, and send the invoice to Network 2, block 3752. The DSC 910*a* may receive the invoice and payment instructions, block 3646, and settle the charges with Network 2, steps 3648 and 3840.

Figure 41:
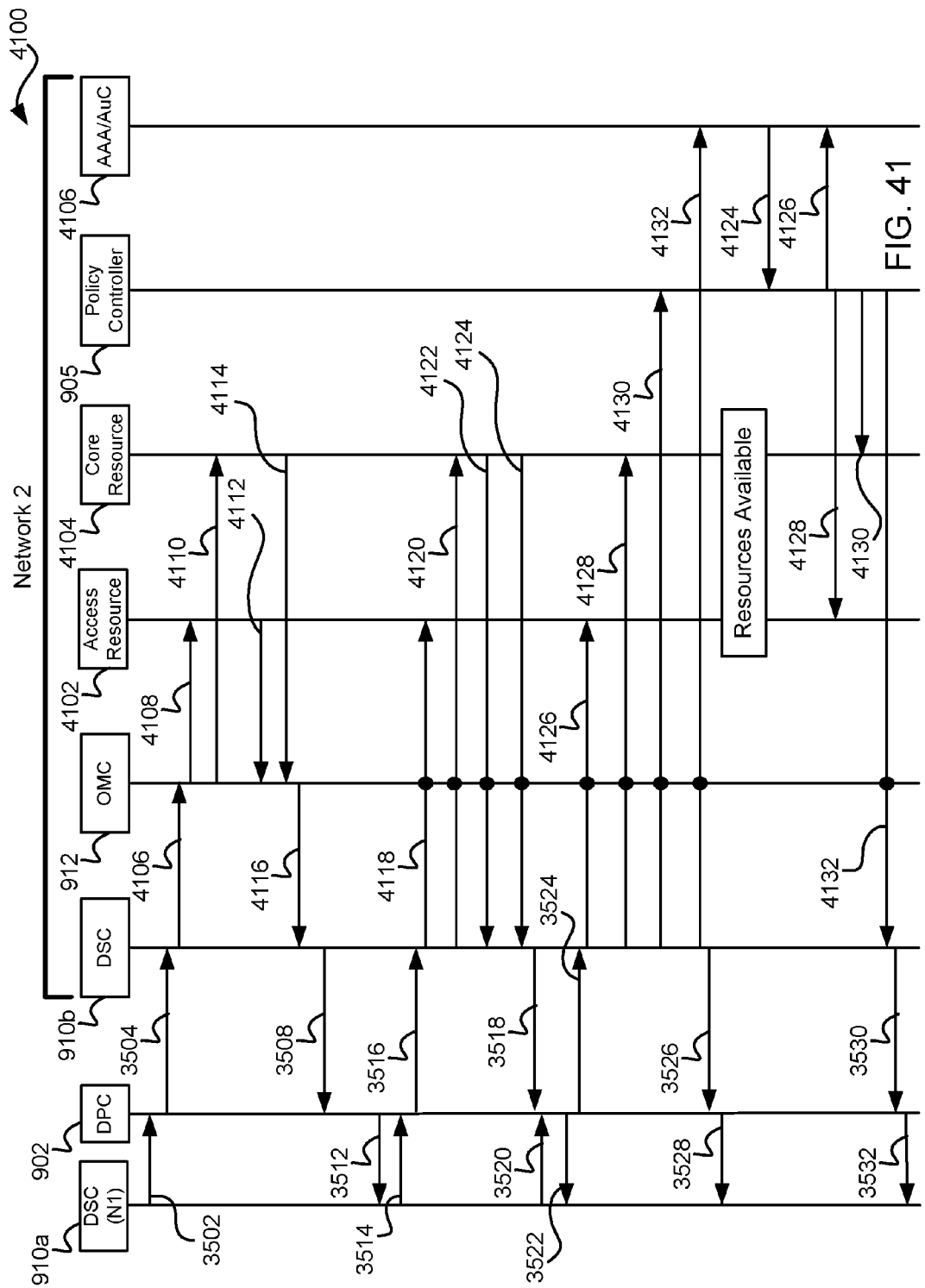
FIG. 41 is a message flow diagram illustrating in more detail message communications between components of a DSA communication system according to an embodiment.

FIG. 41 illustrates a message flow diagram 4100 of message communication between components of a network provider which is allocating available resources to other resources requesting networks. The DSC 910*a* at Network 1 3501 may send a request for resources from, message 3502. The DPC 902 may receive the request for resources message and send a resource inquiry to Network 2, message 3504. At Network 2, the resource inquiry may be received at the DSC 910*b*. The DSC 910*b* may send a resource inquiry to the OMC 912 in Network 2 to determine whether resources are available for Network 1, message 4106. The OMC 912 may receive the resource inquiry message from the DSC 910*b* and send a resource inquiry message to the Access Resources 4102, message 4108. The OMC 912 may also send a resource inquiry message to the Core Resources 4204, message 4110. The Access Resource 4102 and the Core Resources 4204 each receive the resource inquiry messages from OMC 912 and send a resource response to the OMC 912, messages 4112, 4114 respectively. The resources response from the Access Resources 4102 may include message parameters. The resources response from the Access Resources 4102 may include other message parameters.

The OMC 912 may receive the resource responses from the Access Resource 4102 and Core Resource 4104 and send a resource response message to the DSC 910*b* indicating status of resources availability in Network 2, message 4116. The DSC 910*b* may receive the resource response message from the OMC 912 and send a resource inquiry response to the DPC 902, message 3508. The DPC 902 may receive the a resource inquiry response from the DSC 910*b*, determine whether the type of resources requested are available at Network 2 and send a resources available message to the DSC 910*a* of Network 1, message 3512. The DSC 910*a* may receive the resources available message and send a resources request message to direct the DPC 902 to request the available resources from Network 2, message 3514. The DPC 902 may receive the resources request message and send a resources reservation request message to the DSC 910*b* to request that the available resources in Network 2 be reserved for use by Network 1, message 3516. The DSC 910*b* may receive the resources reservation request message and, via the OMC 912, send a resource reservation request to the Access Resource 4102, message 4118, and a resource reservation request to the Core Resources 4104, message 4120.

The Access Resource 4102 may receive the resource reservation request from the OMC 912, reserve the available resources and send a resources reserved message back to the DSC 910*b* via the OMC 912, message 4122. Similarly, the Core Resources 4104 may receive the resource reservation request from the OMC 912, reserve the available resources and send a resources reserved message back to the DSC 910*b* via the OMC 912, message 4124. The DSC 910*b* may receive the resources reserved message from the Access Resources 4102 and Core Resources 4104 and send resources reserved message to the DPC 902 to inform the DPC 902 and Network 1 that the requested resources are reserved for use by Network 1, message 3518. The DPC 902 may receive a resource bid message from the DSC 910*a* of Network 1, message 3520. The DPC 902 may send a bid accepted message to the DSC 910*a* if the bid received by DPC 902 satisfies the price and contract requirements of Network 2, message 3522. If the bid is accepted, the DPC 902 may send an assign resources request to the DSC 910*b*, message 3524. The DSC 910*b* may receive the assign resources request to the Access Resources 4102, message 4126, and an assign resources request to the Core Resources 4104, message 4128. The DSC 910*b* may further send a policy for resources assigned message to the Policy Controller 905, which can be the same or different relative to the PCFF, message 4130. The DSC 910*b* may further send a metering for resources assigned to the AAA/AuC 4106, message 4132.

Figure 42:
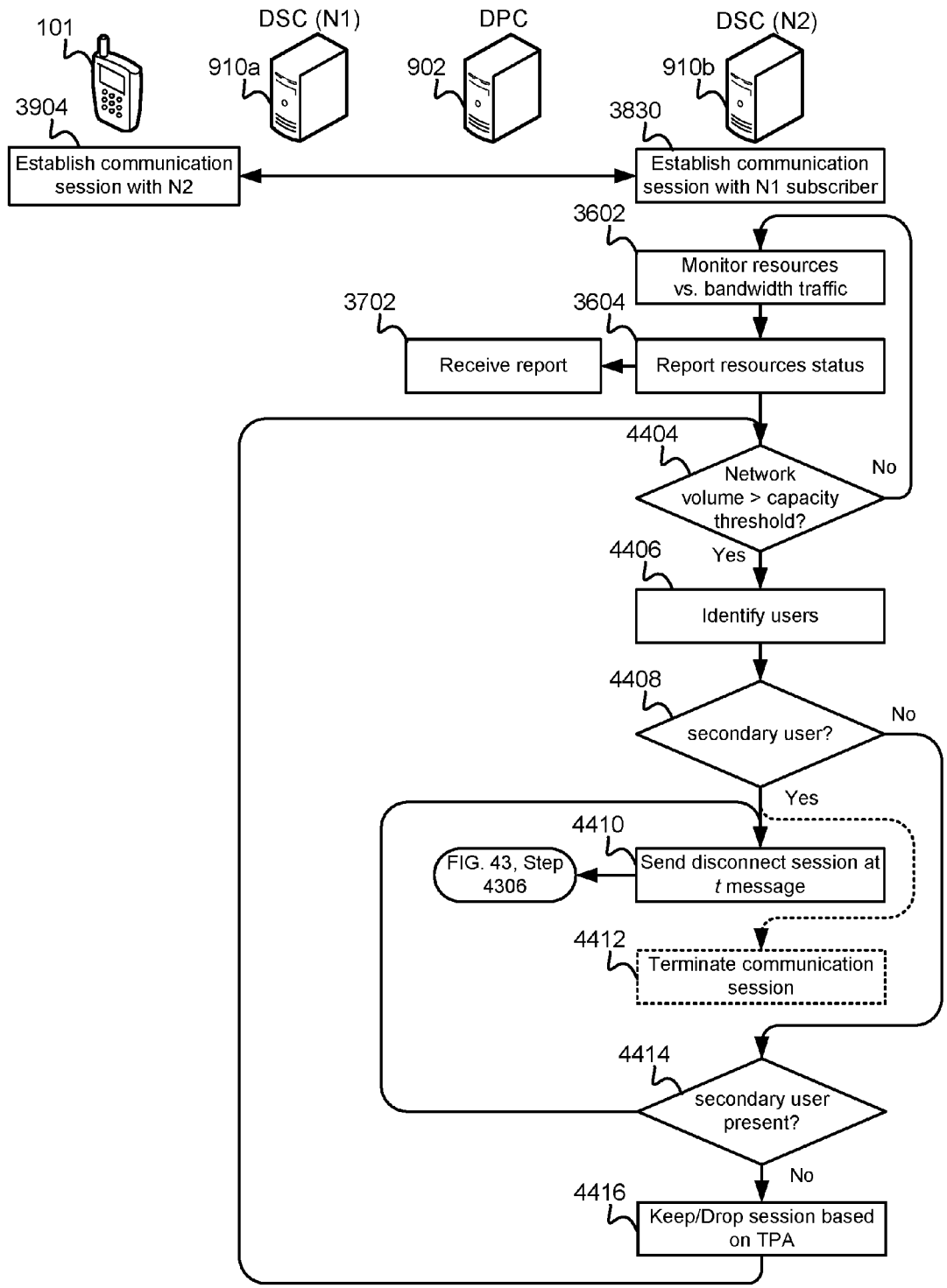
FIGS. 42 through 44 are process flow diagrams of embodiment methods for off-loading communication sessions from a host network.
Figure 43:
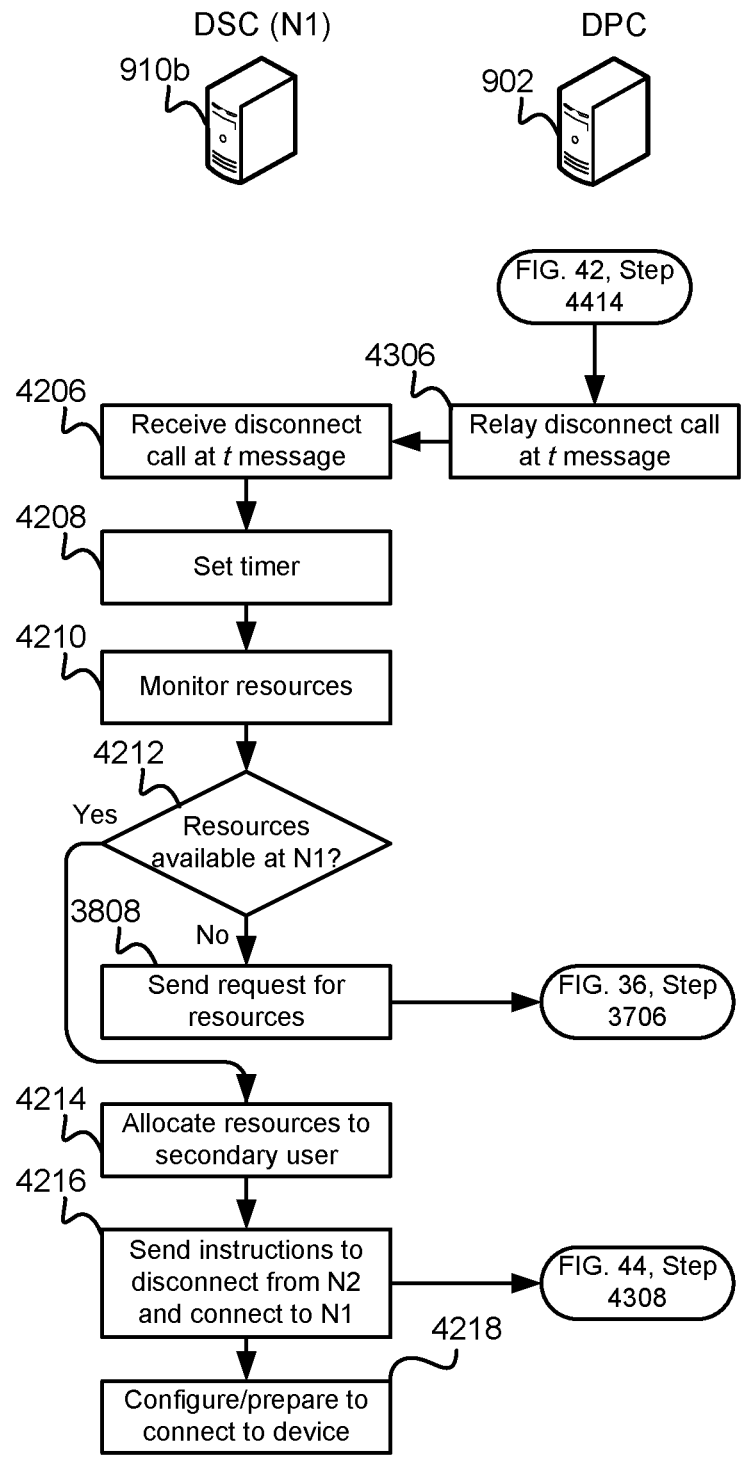
Figure 44:
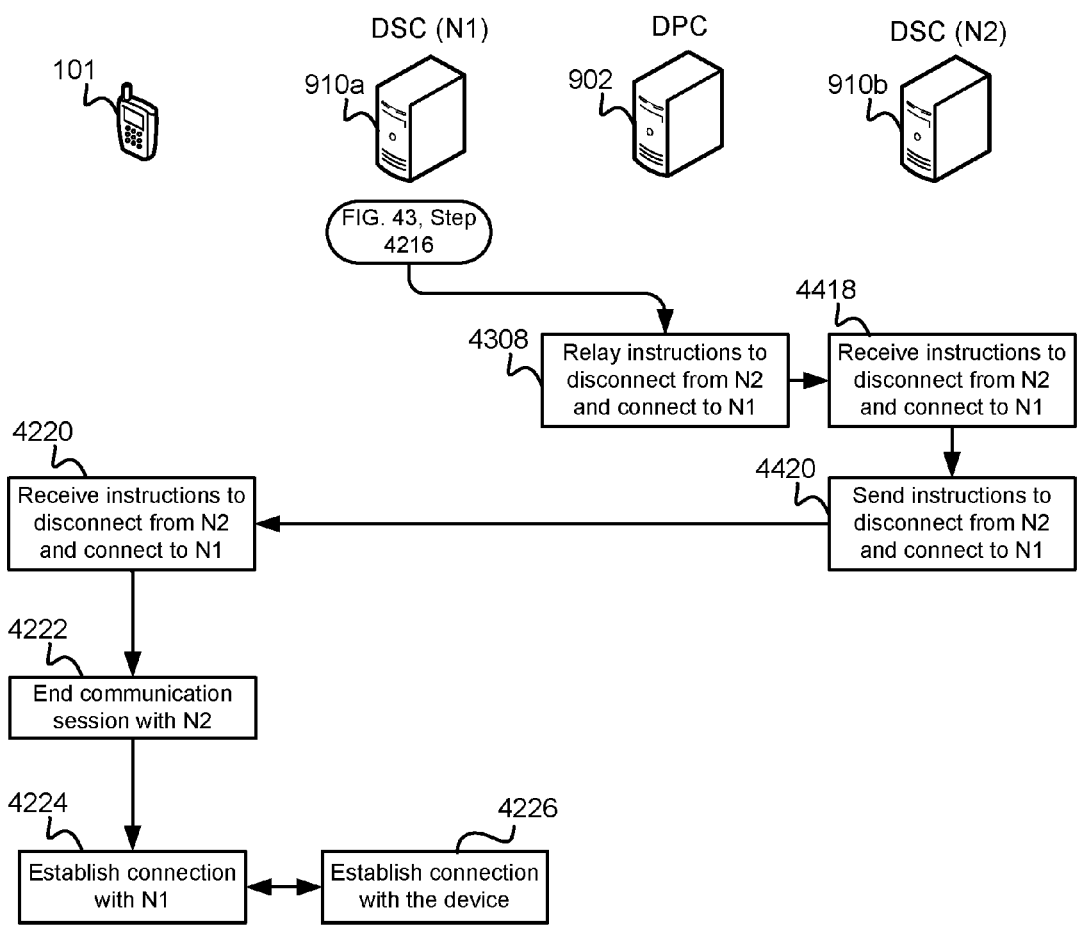

FIGS. 42-44 illustrate process flow diagrams of an embodiment method for backing off secondary users by handing them over back to their home network or terminating their communication session with the host network. A wireless device 101 from Network 1 may establish a secondary user communication session with Network 2 via the DSC 910*b*, steps 3904, 3830. The DSC 910*b* of Network 2 may continuously monitor traffic on the network versus the available resources, block 3602, and send a report to the DPC 902, block 3604. DPC 902 may receive the resource status report from the DSC 910*b*. The DSC 910*b* may further determine whether the network volume is greater than the capacity of the network based on its available resources, determination 4404. If the network volume is not greater than the capacity of the network (i.e., determination 4404="No"), the DSC 910*b* may continue to monitor network traffic versus the available resources by returning to block 3602. If the network volume is greater than the capacity of the network (i.e., determination 4404="Yes"), the DSC 910b may identify a user on the network, block 4406, and determine whether the user is a secondary user, determination 4408.

If the user is a secondary user (i.e., determination 4408="Yes"), the DSC 910b may send disconnect session at t message, t being the amount of time left before the secondary user communication session will be terminated by Network 2, block 4410. The disconnect session at t message may be received by the DPC 902 as illustrated in FIG. 43, block 4306. Optionally, instead of sending a disconnect session at t message, the DSC 910b may terminate the communication session of the secondary user to immediately provide additional resources for primary or other important users, block 4412. The decision regarding whether to immediately terminate or transmit a warning before termination of a secondary user may be based on contractual terms between the primary and secondary network providers and the DSA communication system policies and rule sets.

If the user is not a secondary user (i.e., determination 4408="No"), the DSC 910b may determine whether any other secondary users are present on the network, step 4414. If there are other secondary users still connected to Network 1 (i.e., determination 4414="Yes"), the DSC 910b may send try to disconnect their sessions first before the primary users by returning to steps 4410, 4412. If there are no other secondary users on the primary network (i.e., determination 4414="No"), the DSC 910b may keep or drop the primary user communication session based on tiered priority access rules, block 4416. For example, premium primary users (i.e., those with more expensive subscription plans) may be dropped last. Alternatively, in an embodiment (not shown), instead of terminating the primary user communication sessions, the DSC 910b may try to handover the users to another network as secondary users, thus, preserving the communication session connection while reducing volume of Network 1. The DSC 910b may return to monitoring the network volume versus capacity to determine whether additional callers need to be off-loaded by returning to block 4404.

As illustrated in FIG. 43, the DPC 902 may relay the disconnect session at t message to the DSC 910a, block 4306. The DSC 910a may receive the disconnect session at t message, block 4206, set a timer to count down from t, block 4208, and monitor its available resources, block 4210, to determine whether there is resources available on Network 1 to receive the secondary user communication session from Network 2, determination 4212. If resources are not available on Network 1 (i.e., determination 4212="No"), the DSC 910a may send a request for resources to the DPC 902, block 3808, to reserve and purchase available resources from network providers by returning to block 3706 of FIG. 36 and following the resources allocation steps as described above with respect to FIGS. 36-40.

If resources are available on Network 1 (i.e., determination 4212="Yes"), the DSC 910a may allocate resources to the secondary user that is going to be terminated from Network 2, block 4212, and send instructions for the wireless device 101 to disconnect from Network 2 and connect to Network 1 to the DPC 902 as shown in FIG. 44, block 4308. The DSC 910a may also configure/prepare the Network 1 system to connect to the secondary user wireless device 101, block 4218.

As illustrated in FIG. 44, the DPC 902 may relay the instructions for the wireless device 101 to disconnect from Network 2 and connect to Network 1 to the DSC 910b of Network 2, block 4308. The DSC 910b may receive the instructions, block 4418, and send them to the secondary user wireless device 101 which currently has a communication session with Network 2, block 4420. The wireless device 101 may receive the instructions to disconnect from Network 2 and connect to Network 1, block 4220, and end communication session with Network 2, block 4222, and establish communication session with Network 1, steps 4224, 4226.

Public Safety Network:

In an embodiment, the primary network provider of the DSA communication system may be a public safety network. A public safety network may be the holder or owner of public safety spectrum. Public safety spectrum is generally reserved for used by public safety authorities. The assigned public safety bandwidth typically includes more spectrum than is used by public safety authorities on an average bases. An excess amount of spectrum is assigned for public safety use in anticipation of its use during public safety emergencies such as disasters.

In an embodiment, the DSA communication system may allow the public safety networks to lease spectrum resources to other networks when the public safety spectrum is available and not in use. During public safety emergency situations when all of the network resources may be required for use by public safety authorities, the DSA communication system may allow the network to retrieve all of its allocated resources from other networks by off-loading traffic from the public safety network to free-up resources.

In addition, if the assigned spectrum of a public safety network proves inadequate to handle a large volume of use by public safety authorities during an emergency, the DSA communication system may enable the public safety network to lease or take resources from other networks which are participating in the DSA communication system. For example, the DSA communication system may require that all participating networks to continuously keep a certain percentage (e.g., 10%) of their resources unassigned. The public safety networks may use the unassigned resources of the participating networks to augment their resources for public safety communications during emergencies. The DSA communication system may further off-load primary and/or secondary users of a primary network to free-up resources for use by the public safety authorities.

In an embodiment, access to public safety spectrum may be based on tiered priority access methods described above with respect to FIGS. 1-8. For example, police dispatchers may always have access to the spectrum. However, access of other non-governmental users of the public safety resources may be limited to certain times periods or dates depending on the contracts between the users and the public safety network providers.

In an embodiment, off-loading of non-public safety users from the public safety or other networks may be performed using a tiered priority access methods described above with respect to FIGS. 1-8. For example, in a public safety network, when resources are required for public safety use, the DSA communication system may enable the public safety network to off-load users in order of preferences such as first, off-loading secondary non-public safety users, second, off-loading primary non-public safety users, third, off-loading, lower ranked public safety users, etc. Similar tiered priority access method may be used to off-load users of another network the resources of which may be used by the public safety network.

In an embodiment, during an emergency, the DSA communication system may restrict access to any resources of a public safety network which is allocated for secondary use. For example, once the DSA communication system determines that there is a public safety emergency, the DSA communication system may no longer consider the allocated resources from the public safety network which is involved in the emergency as available resources for use by other networks.

In an embodiment, the DSA communication system policies and rule sets may require that participating networks allocate a percent of their resources for public safety use and disasters response purposes. During an emergency, the DSA communication system may enable public safety networks to access additional resources which each non-public safety network may allocate for public safety use. In this scenario, if the allocated resources are in use, tiered priority access methods may be used to off-load users from the allocated resources. Other resources of the non-public safety network may not be used for public safety unless properly negotiated.

Figure 45:
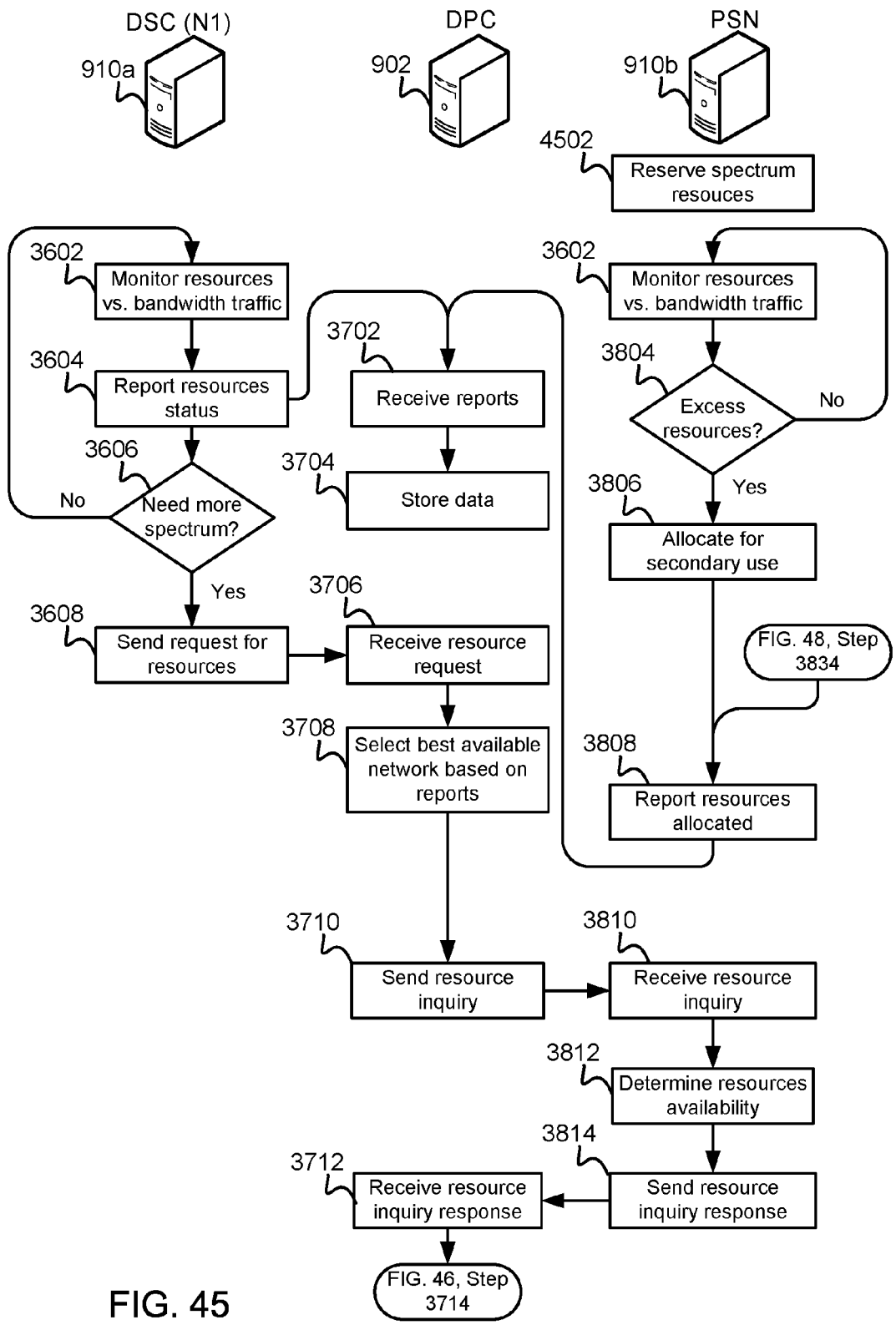
FIGS. 45 through 49 are process flow diagrams of embodiment methods for allocating and accessing resources in a public safety network using the DSA communication system.

FIGS. 45-49 illustrate flow diagrams of an embodiment method for allocating and accessing resources of a public safety network using the DSA communication system. As illustrated in FIG. 45, the DSC 910a may monitor resources versus bandwidth traffic in Network 1, block 3602. The DSC 910a may record and report the resource status of Network 1 to the DPC 902. The DPC 902 may receive the resource status report from Network 1, block 3702, and store it, block 3704. The DSC 910a of Network 1 may determine, based on the resources status report, whether additional resources may be required to provide service to the existing users of Network 1, determination 3606. If additional resources are not required (i.e., determination 3606="No"), the DSC 910a may continue to monitor available resources as versus bandwidth traffic by going back to block 3602. If additional resources are required (i.e., determination 3606="Yes"), the DSC 910a may send a request for additional resources to the DPC 902, block 3608.

The public safety network DSC 910b may reserve a predetermined amount of unused spectrum resources as a back-up for use only by public safety authorities, in block 4502. This may ensure that if there is a need for resources during an emergency, such as a natural disaster, resources are readily available to be dedicated for public safety use until additional resources are released by off-loading secondary users from the network. The Public safety network DSC 910b may also monitor resources available vs. bandwidth traffic in Public safety network, block 3602, and report the resource status to the DPC 902, block 3804. The DPC 902 may receive the resource status report from DSC 910b, block 3702 and store the received data, block 3704. The DSC 910b may determine whether excess amount of resources are available in Public safety network, determination 3804. If excess amounts of resources are not available in Public safety network (i.e., determination 3804="No"), the DSC 910b may continue to monitor resources available vs. bandwidth traffic by going back to block 3602. If excess amounts of resources are available (i.e., determination 3804="Yes"), the DSC 910b may allocate the excess resources or a sub-part of the excess resources for secondary use, block 3806, and report to the DPC 902 that resources are allocated for use by secondary users, block 3808. The DPC 902 may receive the resource allocation report from DSC 910b, block 3702, and store the received data, block 3704.

The status reports received from the networks may further include information such as network rules and policies with respect to access and use to allocated resources. For example, the status reports from Public safety network may include system requirements for Public safety network which must be met before a wireless device 101 can successfully access the allocated resources on Public safety network as a secondary user.

The DPC 902 receives the request for additional resources from DSC 910a of Network 1, block 3706, and based on data received from other networks selects the best available network from which Network 1 may purchase additional resources, block 3708. In this example, the DPC 902 may select Public safety network as the most suitable network to provide resources to Network 1. The DPC 902 may send a resource inquiry to the Public safety network, in block 3710, to determine the availability and quantity of allocated excess resources of Public safety network.

The DSC 910b of Public safety network may receive the resource inquiry, block 3810, and determine resource availability, block 3812. The DSC 910b may send a resource inquiry response to the DPC 902. The resource inquiry response may include information about the quantity and quality of resources available for use by secondary users. The DPC 902 may receive the resources inquiry response, block 3712.

Figure 46:
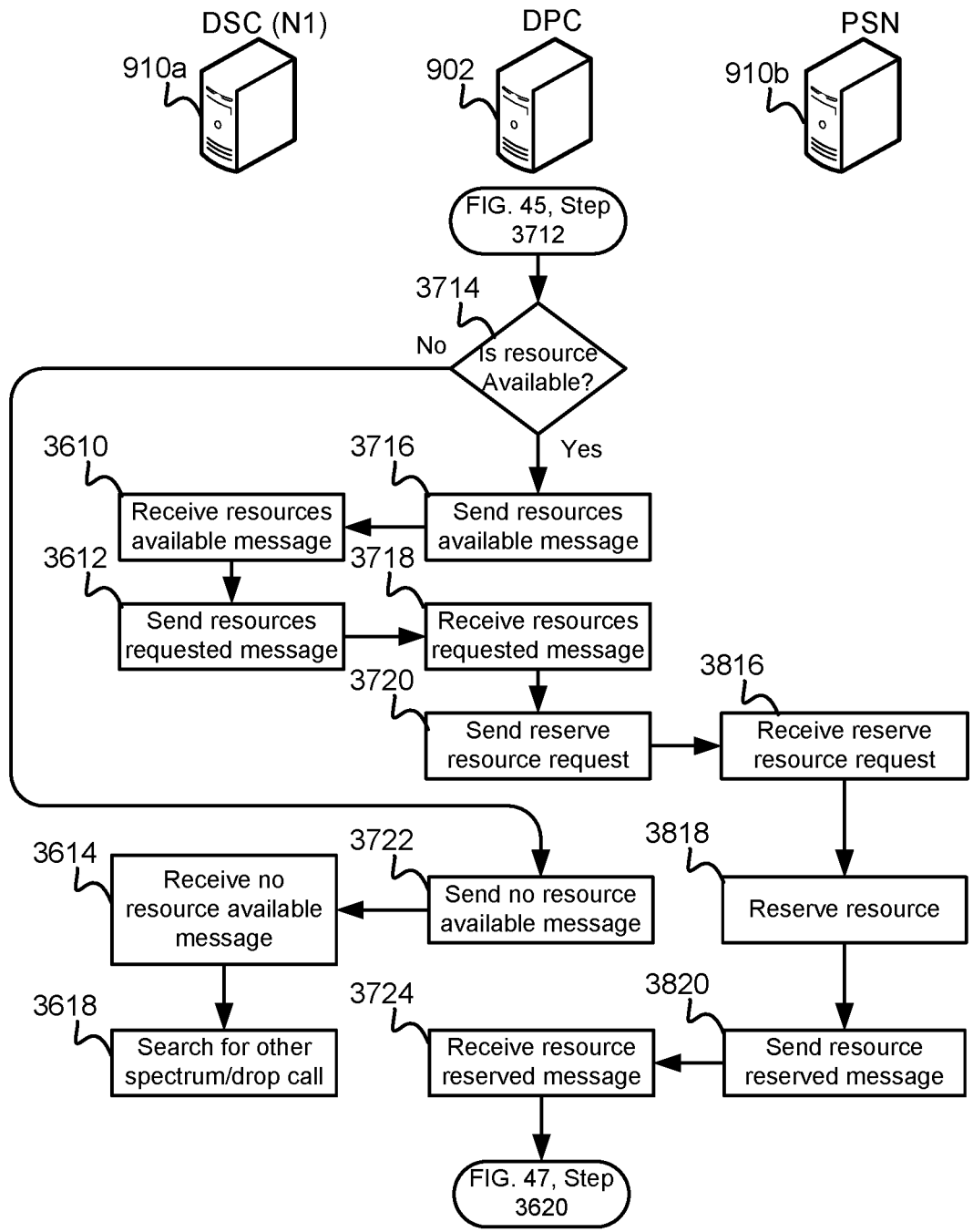

As illustrated in FIG. 46, the DPC 902 may determine whether resources are available based on the data received from the DSC 910b of Public safety network, block 3714. If data is not available (i.e., determination 3714="No"), the DPC 902 may send a no resource available message to Network 1, block 3722. Resources may not be available for use by a network for different reasons. For example, resources may be sold to other bidders before they were reserved by a requesting network. The DSC 910a of Network 1 may receive the no resource available message, block 3614, and search for other available spectrum resources or terminate connection sessions with users to free-up resources on Network 1, block 3618.

If data is available (i.e., determination 3714="Yes"), the DPC 902 may send a resource available message to the DSC 910a to inform Network 1 about the quality and quantity of resources available for secondary use at Public safety network, block 3716. The DSC 910a may receive the resources available message and send a request resource message to reserve the allocated resources of Public safety network for use by subscribers of Network 1, block 3612. The request resource message may include data such as the quantity of resources that Network 1 may require in this transaction. The DPC 902 may receive the resources request message, block 3718, and send a reserve resources request message to Public safety network, block 3720. The DSC 910b at Public safety network may receive the reserve resource request, block 3816, and reserve the requested quantity of the allocated resources for use by Network 1 subscribers, block 3818. The DSC 910b of Public safety network may confirm that the requested quantity of allocated resources is reserved for use by Network 1 by sending a resource reserved message, block 3820. The DPC 902 may receive the resource reserved message from Public safety network and prepare for the bidding process as described in FIG. 47.

Figure 47:
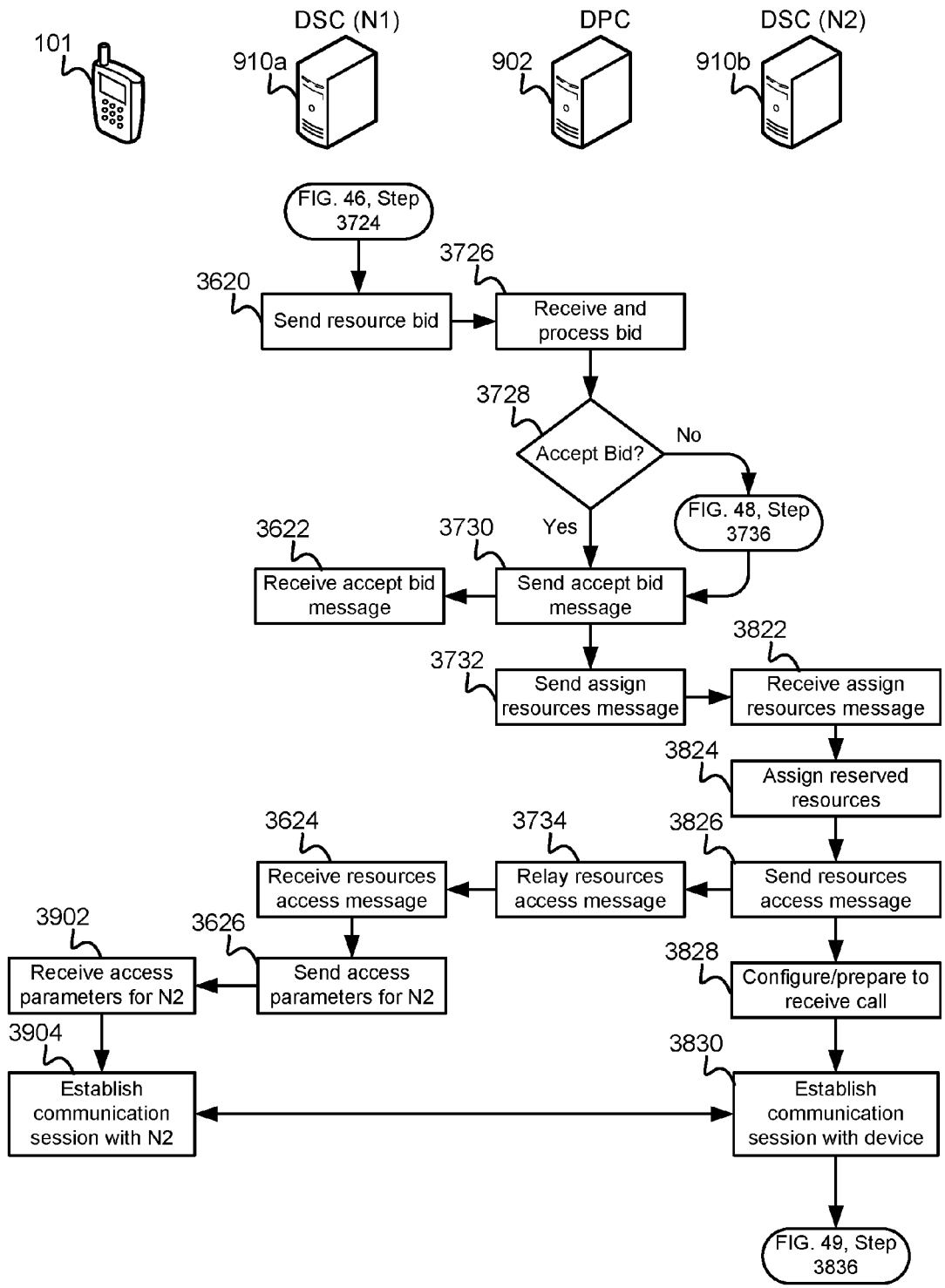

As illustrated in FIG. 47, the DSC 910a of Network 1 may send a resource bid to negotiate access to the reserved resources of Public safety network, block 3620. The DPC 902 may receive the resource bid and process it, block 3726. The DPC 902 may determine whether the bid received from Network 1 may be accepted, in determination block 3728. The DPC 902 may evaluate a bid from a network provider based upon policies and rule sets of the DSA communication system in addition to requirements set forth by the resource offering network, such as prices and allocation or access methods.

If the bid is accepted (i.e., determination 3728="Yes"), the DPC 902 may send an accept bid message to Network 1, block 3730. The DSC 910a may receive the accept bid message and await resource access instructions, block 3622. Once the bid is accepted, the DPC 902 may also send an assign resources message to the DSC 910b of Public safety network, block 3732. The DSC 910b may receive the assign resources message, block 3822, and assign reserved resources for use by Network 1, block 3824. The DSC 910b may send a resources access message to enable Network 1 to access the assigned resources of Public safety network, block 3826, and configure to establish communication session with the wireless device 101 of Network 1, block 3828.

The DPC 902 may relay the resources access message to Network 1, block 3734. The DSC 910a may receive the resources access message, block 3624. The resource access message may include data such as access parameters that may be used by secondary user wireless devices 101 to access resources on Public safety network. It should be appreciated that other data may be included in the resources access message. The DSC 910a may send access parameters for Public safety network to wireless devices 101 which have communication sessions with Network 1 and Network 1 has designated to migrate to Public safety network, block 3626. The designated wireless devices 101 may receive the access parameters for Public safety network, block 3902, and establish a communication session with wireless device 101 of Network 1, steps 3904 and 3830. Public safety network may commence the settlement process as described in more detail below with reference to FIG. 49.

Figure 48:
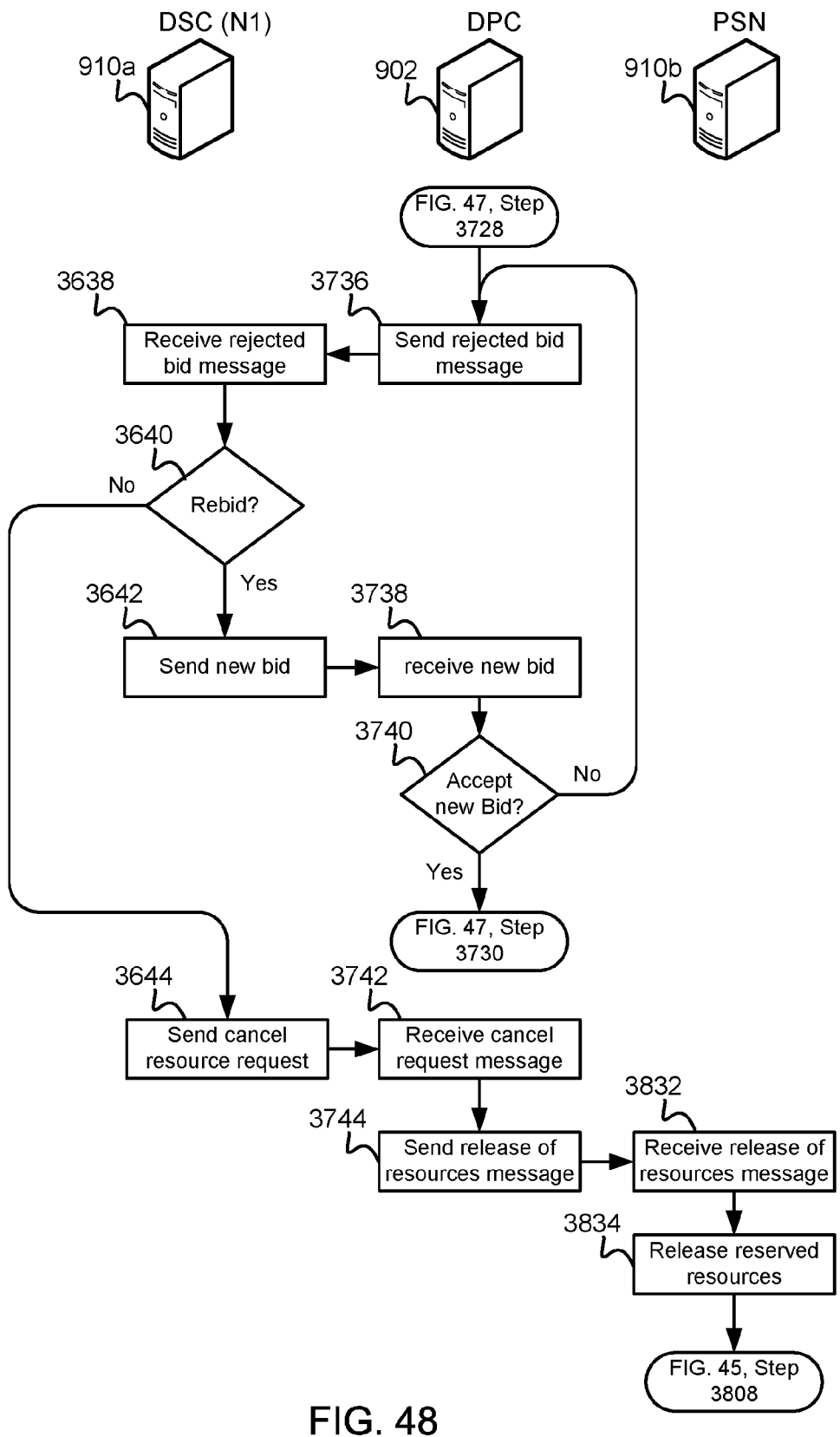

If the bid is rejected (i.e., determination 3728="No"), the DPC 902 may send a rejected bid message to Network 1, block 3736 (shown in FIG. 48). As illustrated in FIG. 48, the DSC 910a may receive the rejected bid message, block 3736, and determine whether to rebid, determination 3640. If no rebid (i.e., determination 3640="No"), the DSC 910a may send a cancel resource request message, block 3644. The DPC 902 may receive the cancel resource request message, block 3742, and send a release of resources message to Public safety network, block 3744. The DSC 910b of Public safety network may receive the release of resources message, block 3832, release the reserved resources for use by other networks, block 3834, and report the allocated resource status to DPC 902 by going back to block 3808 as shown in FIG. 45 and follow the steps as described above with respect to FIG. 45.

If rebid (i.e., determination 3640="Yes"), the DSC 910a may send a new bid for the same resources, block 3642. The DPC 902 may receive the new bid, block 3738, and determine whether to accept the new bid, determination 3740. If the new bid is rejected again (i.e., determination 3740="No"), the DPC 902 may send a rejected bid message by going back to block 3736. If the bid is accepted (i.e., determination 3740="Yes"), the DPC 902 may send an accept bid message by going back to block 3730 as shown in FIG. 47 and follow the same steps as described above with respect to FIG. 47.

Figure 49:
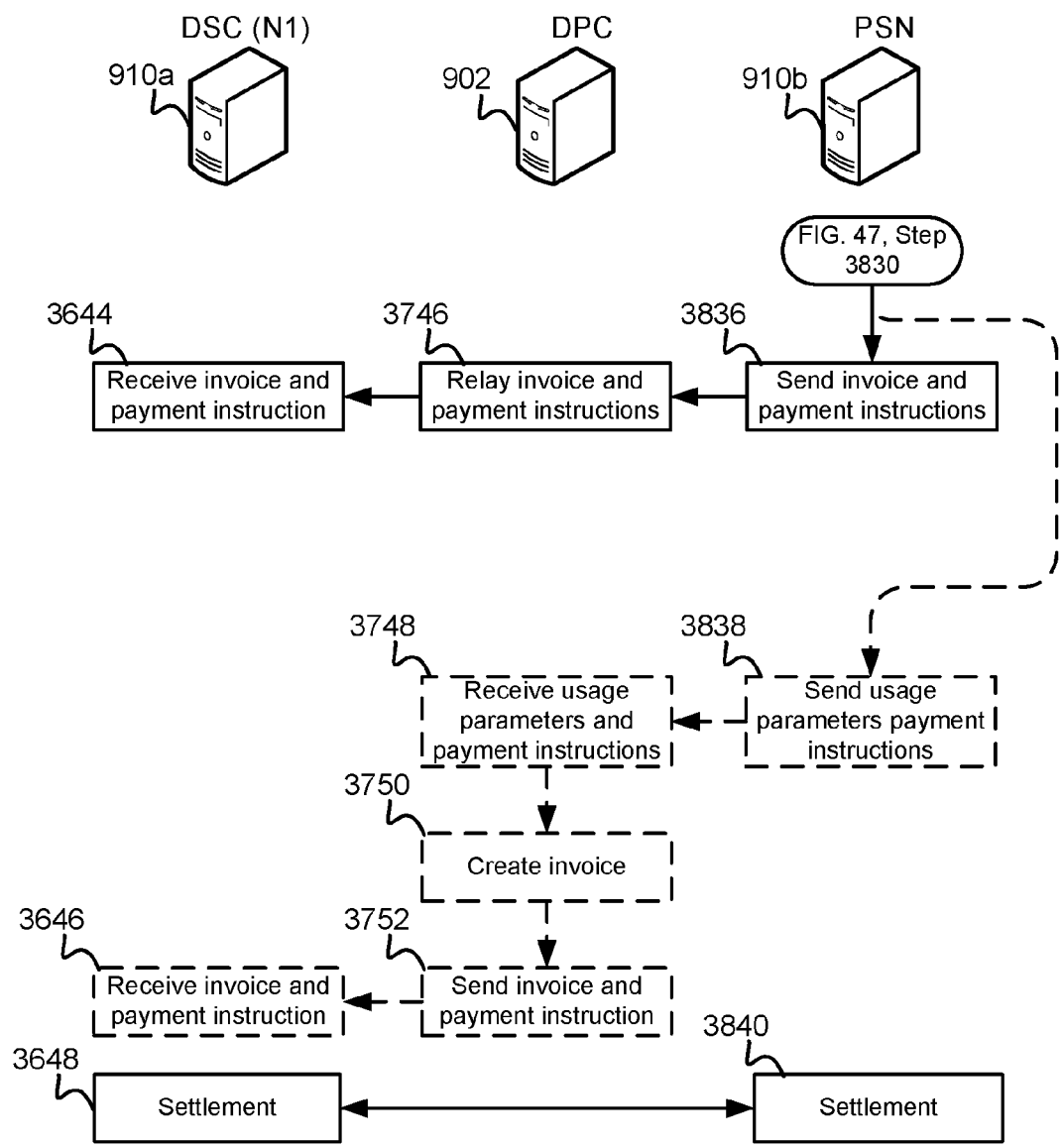

FIG. 49 illustrates the settlement process after Public safety network provides access to the secondary user wireless devices 101 of Network 1. DSC 910b of Public safety network may send invoices and payment instructions relating to the use of allocated resources by Network 1 to the DPC 902, block 3836. The DPC 902 may relay the invoice and payment instructions from Public safety network to Network 1, block 3746. DSC 910a may receive the invoices and payment instructions, block 3644, and settle the charges with Public safety network, steps 3648 and 3840.

Optionally, the DSC 910b of Public safety network may send usage parameters and payment instructions to the DPC 902, block 3838. The DPC 902 may receive the usage parameters and payment instructions, block 3748, create an invoice, block 3750, and send the invoice to Public safety network, block 3752. The DSC 910a may receive the invoice and payment instructions, block 3646, and settle the charges with Public safety network, steps 3648 and 3840.

FIGS. 50-53 illustrate process flow diagrams of an embodiment method for backing off secondary users by handing them over back to their home network or terminating their communication session with the host network. A wireless device 101 from Network 1 may establish a secondary user communication session with Public safety network via the DSC 910b, steps 3904, 3830. The DSC 910b of Public safety network may continuously monitor traffic on the network versus the available resources, block 3602, and send a report to the DPC 902, block 3604. DPC 902 may receive the resource status report from the DSC 910b. The DSC 910b may further determine whether the network volume is greater than the capacity of the network based on its available resources, determination 4404. If the network volume is not greater than the capacity of the network (i.e., determination 4404="No"), the DSC 910b may continue to monitor the network traffic versus the available resources by returning to block 3602. If the network volume is greater than the capacity of the network (i.e., determination 4404="Yes"), the DSC 910b may identify a user on the network, block 4406, and determine whether the user is a secondary user, determination 4408.

If the network volume exceeds the allocated capacity threshold of the network (i.e., determination 4408="Yes"), an abnormal situation exists which may indicate that an emergency situation is unfolding. In this scenario, the DSC 910b may follow the processes illustrated in the process flow diagrams of FIG. 50 to free-up resources for public safety use and FIG. 54 to incrementally allocate network resources based on a Tiered Priority Access regime.

Figure 50:
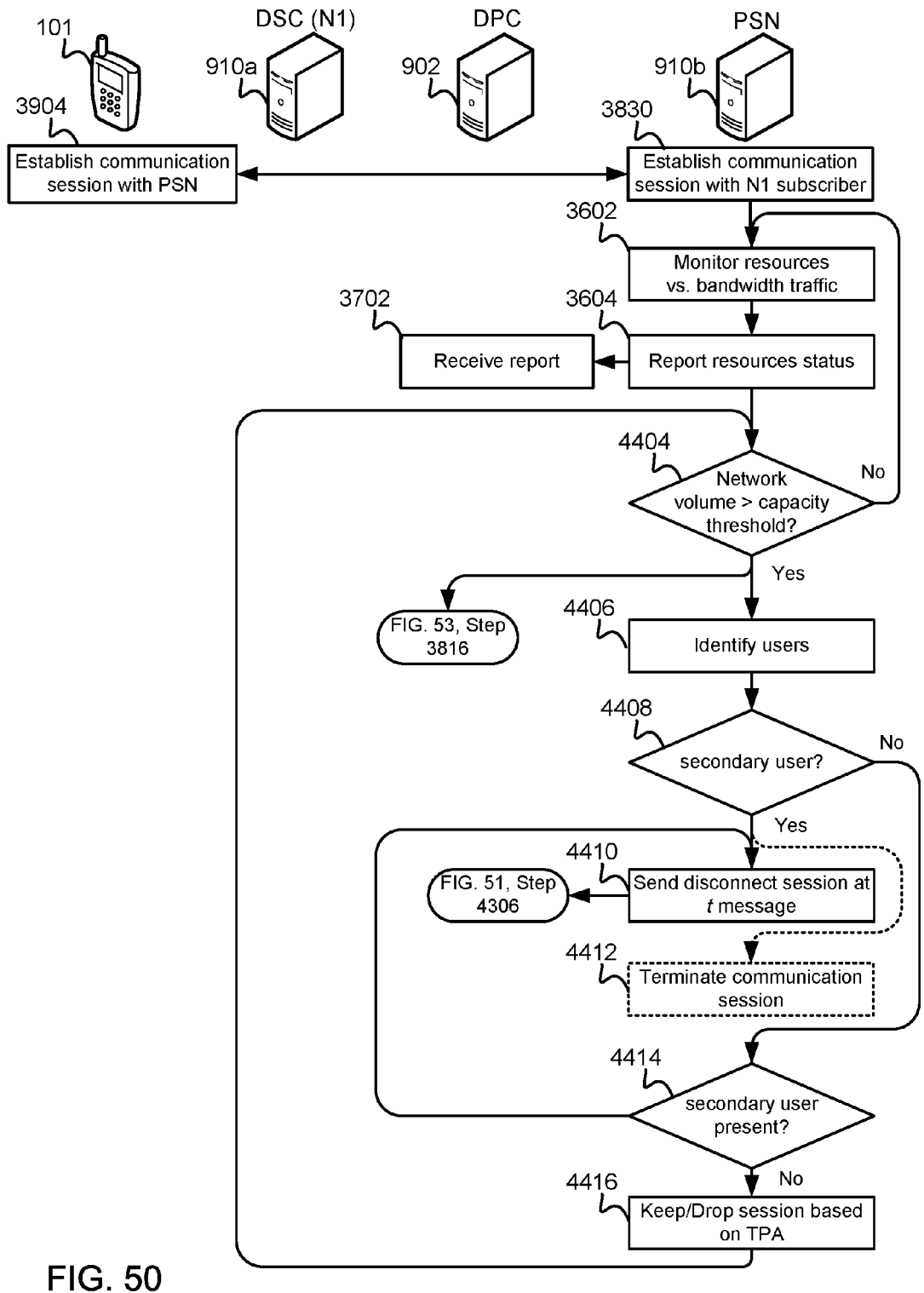
FIGS. 50 through 53 are process flow diagrams of embodiment methods for off-loading communication sessions from a public safety network.

As shown in FIG. 50, to free-up resources for public safety use, the Public safety network may send disconnect session at t message, t being the amount of time left before the secondary user communication session will be terminated by Public safety network, block 4410. The disconnect session at t message may be received by the DPC 902 as illustrated in FIG. 43, block 4306. Optionally, instead of sending a disconnect session at t message, the DSC 910b may terminate the communication session of the secondary user to immediately provide additional resources for primary or other important users, block 4412. The decision regarding whether to immediately terminate or transmit a warning before termination of a secondary user may be based on contractual terms between the primary and secondary network providers and the DSA communication system policies and rule sets.

If the user is not a secondary user (i.e., determination 4408="No"), the DSC 910b may determine whether any other secondary users are present on the network, block 4414. If there are other secondary users still connected to Network 1 (i.e., determination 4414="Yes"), the DSC 910b may send try to disconnect their sessions first before the primary users by returning to steps 4410, 4412. If there are no other secondary users on the primary network (i.e., determination 4414="No"), the DSC 910b may keep or drop the primary user communication session based on tiered priority access rules, block 4416. For example, premium primary users (i.e., those with more expensive subscription plans) may be dropped last. Alternatively, in an embodiment (not shown), instead of terminating the primary user communication sessions, the DSC 910b may try to handover the users to another network as secondary users, thus, preserving the communication session connection while reducing volume of Network 1. The DSC 910b may return to monitoring the network volume versus capacity to determine whether additional callers need to be off-loaded by returning to block 4404.

Figure 51:
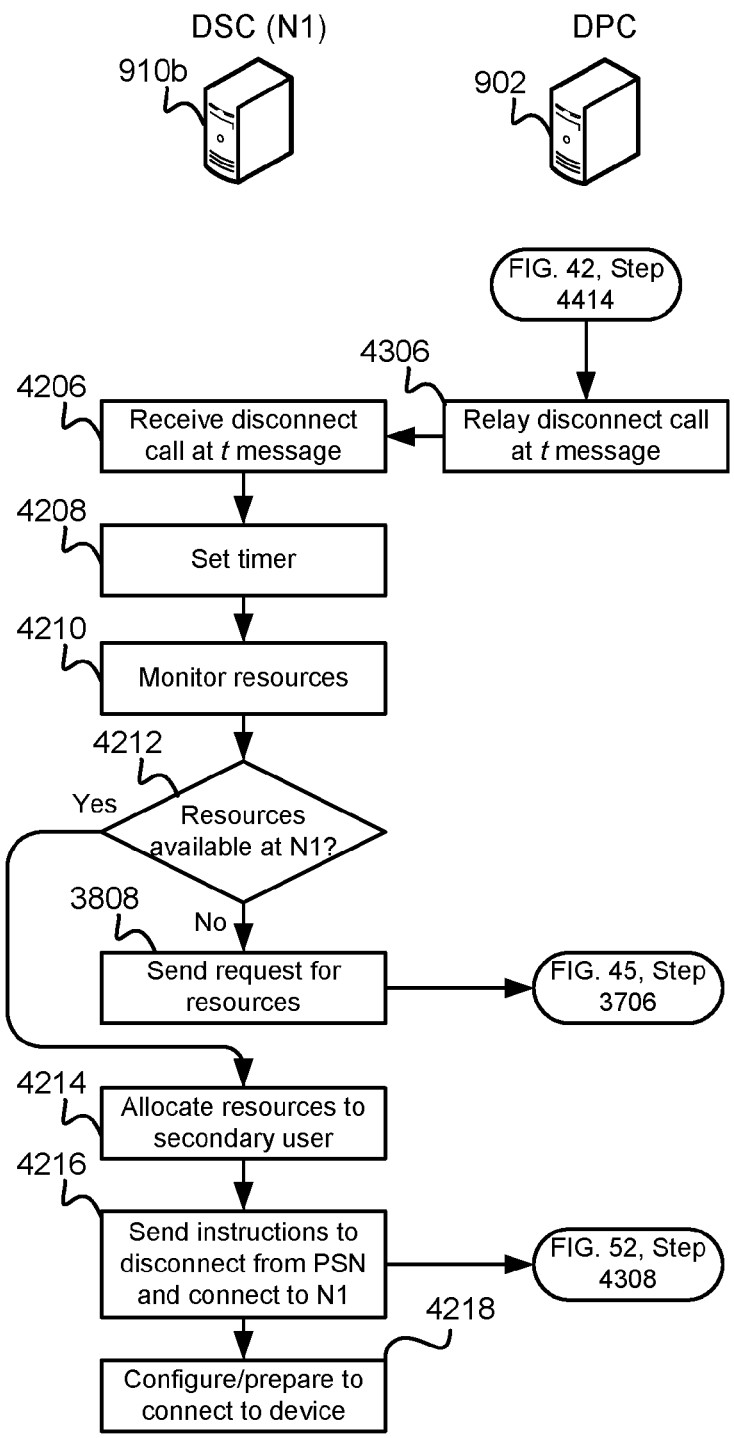

As illustrated in FIG. 51, the DPC 902 may relay the disconnect session at t message to the DSC 910a, block 4306. The DSC 910a may receive the disconnect session at t message, block 4206, set a timer to count down from t, block 4208, and monitor its available resources, block 4210, to determine whether there is resources available on Network 1 to receive the secondary user communication session from Public safety network, determination 4212. If resources are not available on Network 1 (i.e., determination 4212="No"), the DSC 910a may send a request for resources to the DPC 902, block 3808, to reserve and purchase available resources from network providers by returning to block 3706 of FIG. 45 and following the resources allocation steps as described above with respect to FIGS. 45-49.

Figure 52:
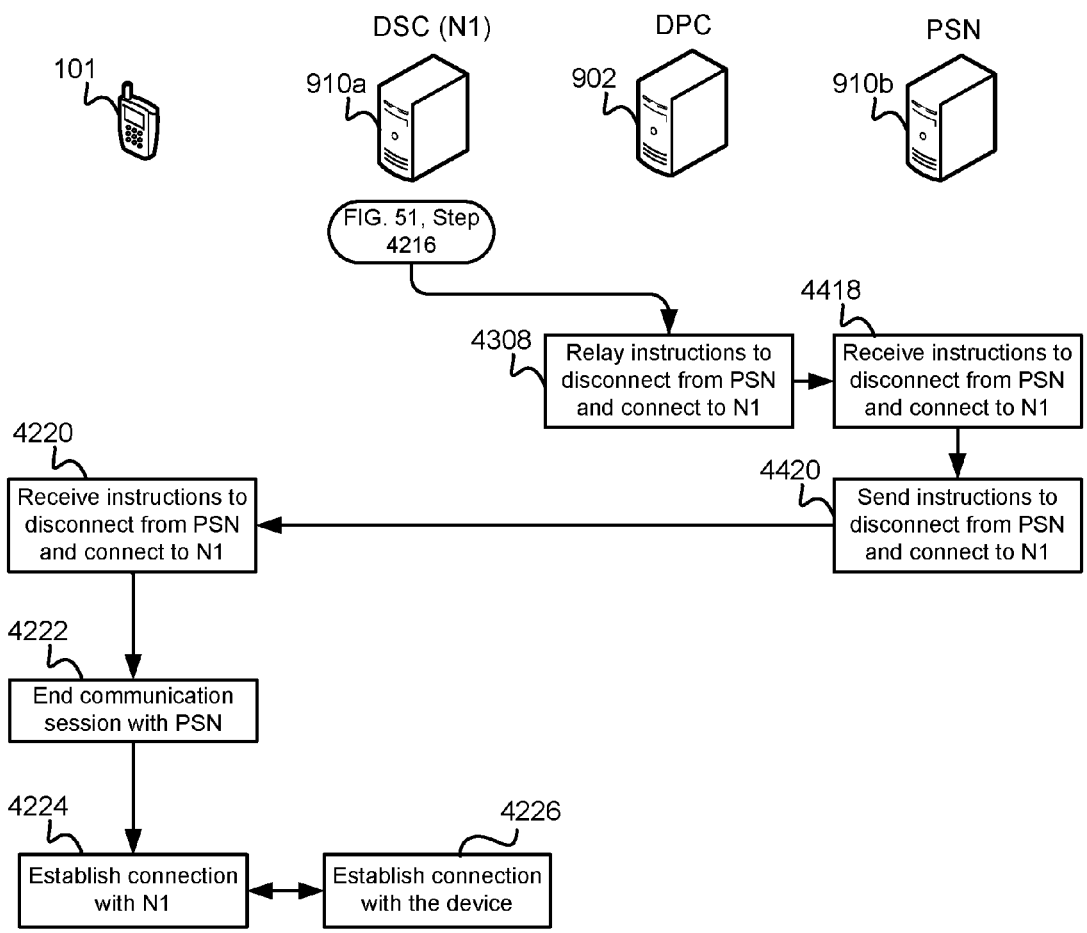
Figure 53:
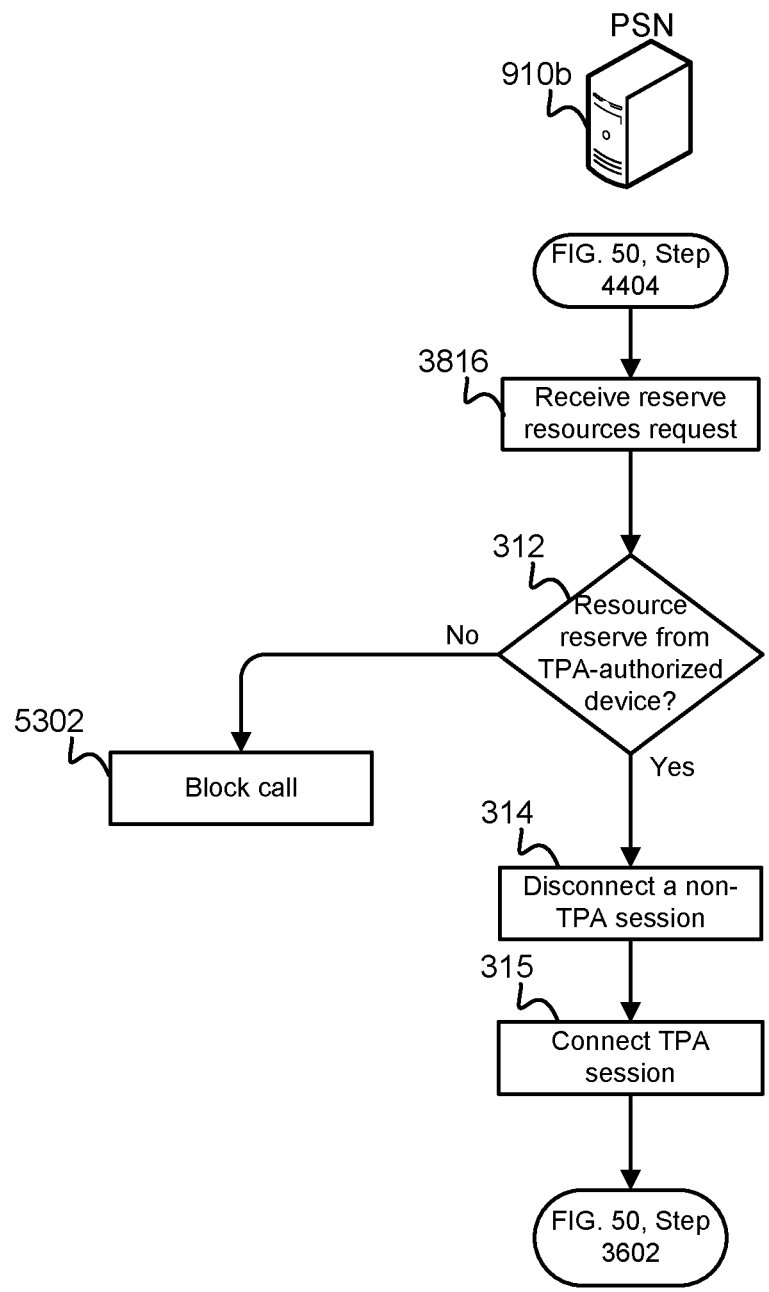

If resources are available on Network 1 (i.e., determination 4212="Yes"), the DSC 910a may allocate resources to the secondary user that is going to be terminated from Public safety network, block 4212, and send instructions for the wireless device 101 to disconnect from Public safety network and connect to Network 1 to the DPC 902 as shown in FIG. 52, block 4308. The DSC 910a may also configure/prepare the Network 1 system to connect to the secondary user wireless device 101, block 4218.

As illustrated in FIG. 52, the DPC 902 may relay the instructions for the wireless device 101 to disconnect from Public safety network and connect to Network 1 to the DSC 910b of Public safety network, block 4308. The DSC 910b may receive the instructions, block 4418, and send them to the secondary user wireless device 101 which currently has a communication session with Public safety network, block 4420. The wireless device 101 may receive the instructions to disconnect from Public safety network and connect to Network 1, block 4220, and end communication session with Public safety network, block 4222, and establish communication session with Network 1, steps 4224, 4226.

In a further embodiment, the Public safety network may monitor all new reserve resource requests and inquiries received from the DPC 902 to ensure that resources are provided only to those requests that are initiated by public safety authorities based on TPA at least until resource capacity is back to below the threshold levels. The Public safety network may receive a reserve resource request at the DSC 910b, block 3810, and determine whether the resources inquiry is from a TPA-authorized device, determination 312. If the resources requested are from a TPA-authorized device (i.e., determination 312="Yes"), the DSC 910b may disconnect a non-TPA communication session, such as a secondary user communication session, block 314, and connect the TPA call, block 315. The DSC 910b may again monitor the resources versus bandwidth available by returning to block 3602 of FIG. 50. If the resource reserve message is received from a wireless device 101 other than an authorized device (i.e., determination 312="No"), the Public safety network may block the call until excess resources are again available for use by secondary users, block 5302.

In an embodiment, for TPA-authorized personnel who may try to establish a communication session with the Public safety network using a wireless device which is subscribed to a network provider other than the public safety network provider, the Public safety authorities may be provided a prefix number which may alert the receiving network provider about a request to transfer communication session to a public safety network and an access PIN. By using the prefix number and PIN, a Public safety user may access the Public safety network using any device, even if the device is considered a secondary user wireless device 101 on the Public safety network.

Figure 54:
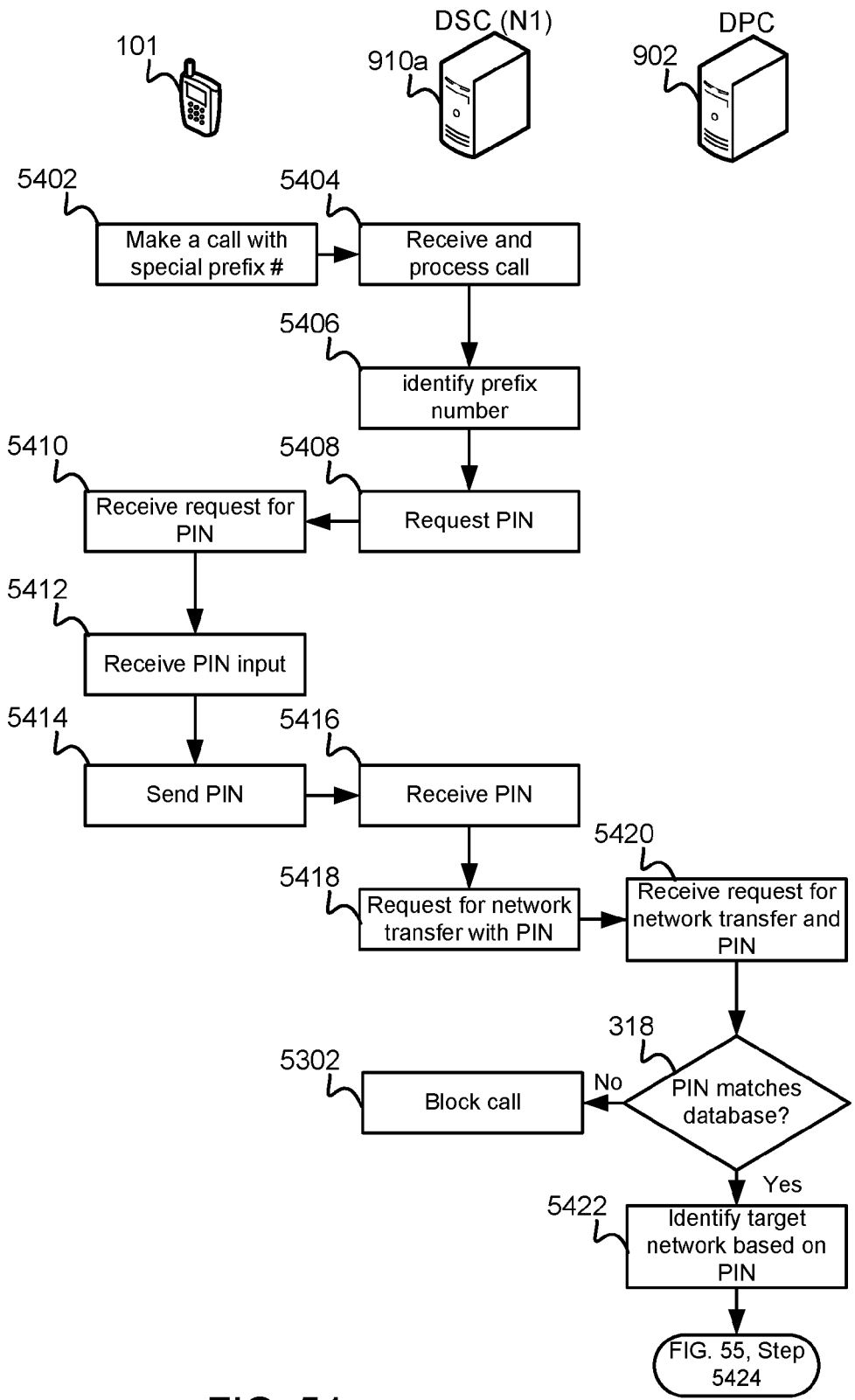
FIGS. 54 through 56 are process flow diagrams of embodiment methods for enabling an authorized public safety authority to access the public safety network using a wireless device from another network.
Figure 55:
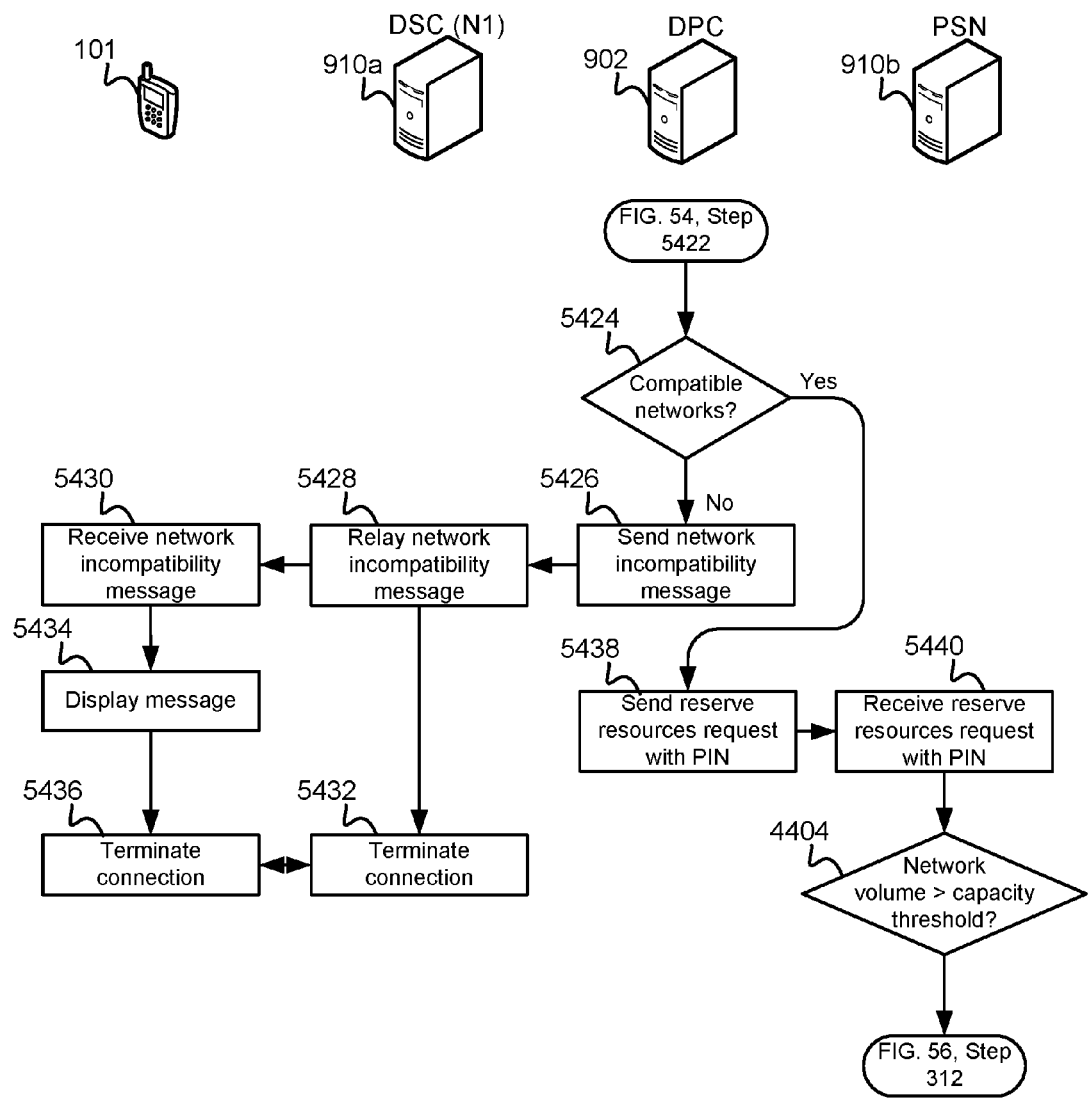
Figure 56:
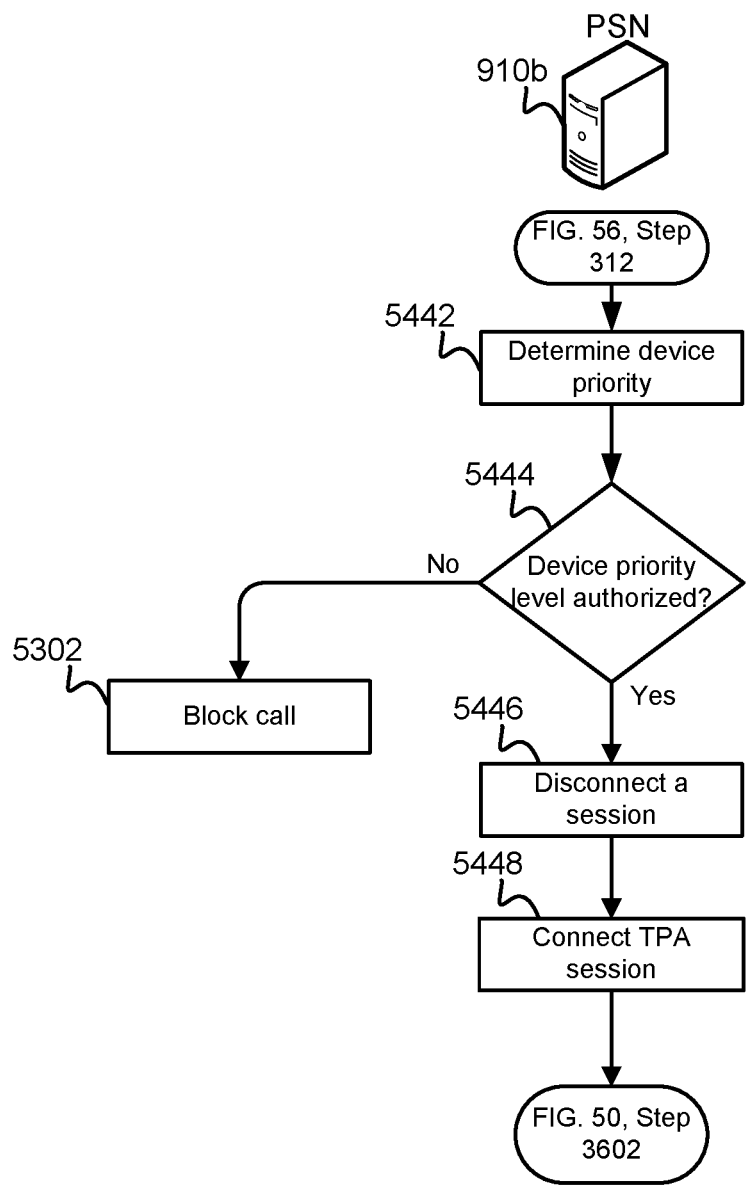

As illustrated in FIG. 54 to FIG. 56, when an authorized public safety officer requires to establish connection with a specific public safety network, he may place a call using any unauthorized wireless device 101 of Network 1 and dialing a special prefix number, such as *272, block 5402. The DSC 910a may receive and process the call, block 5404, and identify the prefix number as a request to transfer the communication session to a public safety network, block 5406. The DSC 910a may send a PIN request to the wireless device 101, block 5408. The wireless device 101 may receive the PIN request, block 5410, display the PIN request to the user using Graphical User Interface (GUI) and receive the user's PIN input, block 5412. The wireless device 101 may send the inputted PIN to the DSC 910a for processing, block 5414. The DSC 910a may receive the PIN, block 5416, and send a request for a network transfer along with the PIN to the DPC 902, block 5418. The DPC 902 may receive the request for network transfer, block 5420, and determine whether the PIN matches a PIN database, determination 318. If the PIN does not match an entry in the PIN database (i.e., determination 318="No"), the DPC 902 may block the call, block 5302. If the PIN matches an entry in the PIN database (i.e., determination 318="No"), the DPC 902 may identify the target Public safety network based on the received PIN, block 5422.

As illustrated in FIG. 55, the DPC 902 may determine whether the wireless device 101 of Network 1 includes compatible technology with the target Public safety network, block 5424. If the device and the public safety network are not technologically compatible (i.e., determination 5424="No"), the DPC 902 may send a network incompatible message back to the device via the DSC 910a, block 5426. The DSC 910a may relay the network incompatibility message, block 5428, and terminate connection with the wireless device 101, block 5432. The wireless device 101 may receive the network incompatible message, block 5430, display the message to the user, block 5434, and terminate connection with the Network 1, block 5436. If the device and the public safety network technologies are compatible (i.e., determination 5424="Yes"), the DPC 902 may send a reserve resources request with PIN to the public safety network DSC 910b, block 5438. The DSC 910b may receive the reserve resources request with PIN, block 5440.

In an embodiment, as illustrated in FIG. 56, access to a public safety networks by authorized public safety authorities may be on a priority level. For example, the higher ranking officials of a public safety organization may have priority access to the network as compared lower ranking officials from the same organization. At any given time, depending on the level of traffic and resources available, the public safety network may determine what level of authority may have access to the network. Accordingly, the DSC 910b may be configured to allow those with required levels of priority and reject those with levels of priority lower than required. The DSC 910b may continuously reevaluate the resource availability and change the access level of officials based on the availability of resources. The DSC 910b may determine, based on the PIN, the level of priority of the user of the wireless device 101, block 5442. The DSC 910b may determine whether the level of priority of the device 101 is allowed to access the public safety network at that time, determination 5444. If the device 101 priority level is authorized (i.e., determination 5444="Yes"), the DSC 910b may disconnect a non-TPA session or a lower priority TPA session to free-up resources for the new request for resources, block 5446, and connect the new TPA session, block 5448, and return back to monitoring the resources of the network versus the bandwidth traffic, block 3602 of FIG. 45. If the request is from a TPA-authorized device which does not have the priority level to access the network at that time (i.e., determination 5444="No"), the DSC 910b may block the call, block 5302.

As discussed above, the various embodiments include a dynamic spectrum arbitrage (DSA) system configured to dynamically manage the availability, allocation, access, and use of telecommunication resources, such as radio frequency (RF) spectrum and RF spectrum resources. The DSA system may include various DSA components, such as a dynamic spectrum policy controller (DPC) component, a dynamic spectrum controller (DSC) component, and an eNodeB component. The DPC component may be configured to manage the DSA operations and interactions between two or more networks (e.g., between a lesser network and a lessee network), which often requires communicating with a DSC component in each of the participating networks. The eNodeB component may be configured to monitor various network conditions (e.g., network congestion, resource usage, resource availability, etc.), generate reports based on the monitoring, and send the generated reports to a DSC component, which may receive and use such information to make better or more informed resource requests and/or to better identify the resources that could be made available for allocation. Similarly, the DSC may be configured to maintain records suitable for identifying geographical areas/boundaries associated with various resources, and send this information to the eNodeB so that it can make better and more efficient use of the allocated resources. For example, the eNodeB may be configured to use the geographical information received from the DSC to better determine the geographic regions, zones, cell sites, etc. in which a wireless device may use an allocated resource.

Further embodiments may include DSA components that are configured to leverage the dynamic nature and wealth of information exchanged in communication networks that use or benefit from the DSA system and/or DSA components for the distribution of advertisements.

Conventional mobile advertising solutions use various techniques to deliver an advertisement (an "ad") to a wireless device. One method of delivering advertisements uses a "pop-up" advertisement that appears on a screen of the wireless device. Using this method, a pop-up window/dialog is used to interrupt the operations of a software application (e.g., an active program the wireless device operator is using) so as to force the user to view and dismiss the pop-up before he/she may continue using the application. Such pop-ups may be generated by an application that is running on the wireless device paired with an Internet browser installed thereon. Another method of delivering advertisements may place an advertisement inside a third-party application. Yet another method of delivering advertisements may place an advertisement inside a web page for presentation to the wireless device operator (e.g., when they visit that web page using the wireless device's Internet browser). These advertising solutions are designed to capture the wireless device operator's attention and entice the operator to click on a hyperlink associated with the advertisement. However, an overwhelming majority of wireless device users pay little attention to and/or dismiss such advertisements, particularly since the advertisements are often of little or no interest to them. As a result, these advertisements are little more than a user annoyance.

Some wireless devices now include and/or allow location services. The websites that are visited/viewed by user of such devices may use location information from such services to select a more targeted advertisement for display. However, due to the enormous reach of the Internet, conventional solutions often use very course geographic criterion for selecting the advertisements. That is, although location services may be used for selecting an advertisement to display on a wireless device visiting a web site, using conventional solutions, the selected advertisements apply to large regions of the country (a metropolitan area or a city). Often, such advertisements are not sufficiently local to garner the attention or the interest of the user. For example, a wireless device user in a big city, like New York City, using a web browser to search for "Pizza," may be presented with a few sponsored sites at the top of the search results, along with some advertised sites that may appear on the side of the display. Search engine providers, like Google®, may use location services, if available, to ensure the search results are all related to New York City based pizza. However, the user may be directed to get a slice of pizza from a vender that is eighty blocks away, even though there are numerous vendors that are much closer to the wireless device.

Various embodiments may include components that are configured to use the DSA system (and or DSA information) to more efficiently deliver wireless/mobile advertisements and/or generate more revenue for those who sell advertisement space and those who buy and utilize it.

Generally, the DSA system allows a cellular network provider to monitor where, when, and how many of its users, subscribers, or customers are using its network, the specific resources that are allocated to service those customers, and other similar factors or conditions. The embodiment components may be configured to use this and other information (e.g., a wireless device's location within a cell or a city block, etc.) for improved mobile advertising and/or to create or improve wireless device advertising markets.

For example, the embodiment components may allow a commercial business (e.g., a pizzeria) to promote a product or service (e.g., a sale for a limited time, etc.) by sending advertisements to the wireless device users that within a very small geographic area (e.g., devices that are less than two city blocks away from the pizzeria, etc.). The embodiment components also enable wireless device users to receive more relevant advertisements. For example, an individual checking social media (e.g., FACEBOOK, etc.) from a browser or app in the wireless device may be presented with an onscreen advertisement for products and/or services from a very nearby location (e.g., a store that is one or two city blocks away from the user, etc.).

Users are much more inclined to click on an advertisement's link and follow through with a promotion when the products or services are very convenient to the user. The various embodiments allow advertisements to be directed to a targeted audience through accurate and specific location and time-based cellular services.

Various embodiments create advertisement opportunities using DSA to simultaneously monitor where and when large amounts of radio resources are being consumed. Such information from DSA may be used to generate advertising opportunities that may be monetized or sold. In addition, advertisement space generated using DSA may be made exclusive to the highest bidder. Advertisers competing for business may drive higher revenue for a cellular provider, which may reduce costs for the cellular customers. A benefit to advertisers is that advertising with DSA may allow them to make the most out of their advertisements by reaching a better targeted audience, having their advertisements presented at opportune locations and/or times, and by preventing competitors from presenting advertisements in the same area through the same cellular network.

Figure 57:
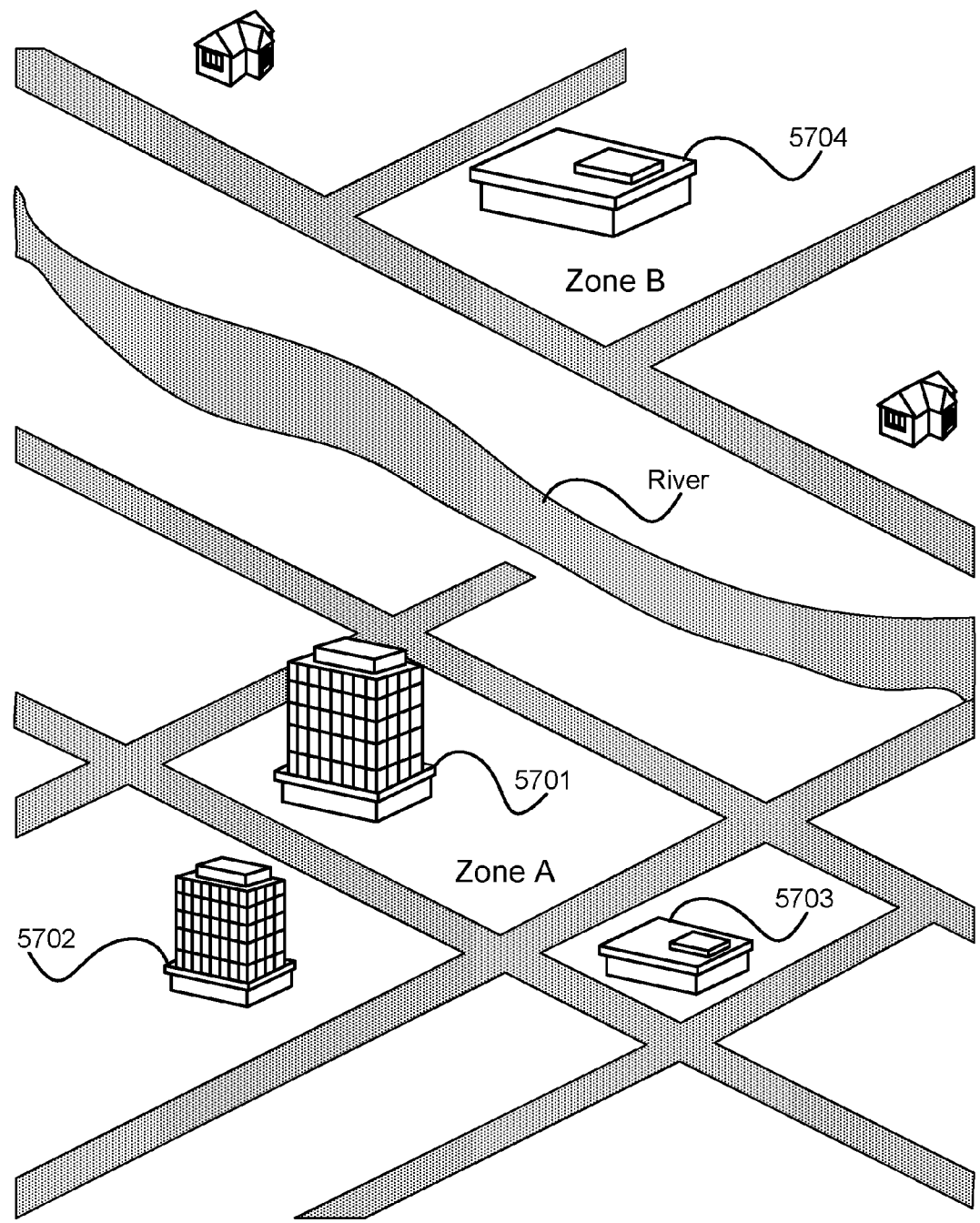
FIG. 57 is a schematic representation of two geographic zones containing potential advertisers for a DSA-Ad delivery in accordance with various embodiments.

In various embodiments, as illustrated in FIG. 57, there are four stores (stores 5701, 5702, 5703 and 5704) located in two separate zones (Zone A and B), with the two zones separated by a river. Stores 5701, 5702, and 5703 are in Zone A. Store 5704 is in Zone B.

Using advertising with DSA (or DSA-based advertising or a DSA-Ad system), stores 5701, 5702, and 5703 may all compete for the right to advertise specifically within Zone A (and not Zone B). Store 5704, which is not located within Zone A, may be prohibited from buying advertisement space in Zone A. This may help ensure local advertisers they can reach local customers. This may also increase the value of advertisement space to Stores 5701, 5702, and 5703. In some embodiments, a telecommunications exchange may be established that enables Stores 5701, 5702, and 5703 to participate in an auction to buy advertisement space at certain times in specific geographic zones. The areas that are illustrated as Zones A and B in this example may be expanded or contracted to any size appropriate for a DSA auction, creating a marketplace for advertising that can adjust itself to whatever market or area for which it is needed.

Traditional mobile advertising places control outside cellular networks, using wireless device's connection to the Internet to deliver an advertisement through an application, webpage, or as a pop-up on the wireless device. Through such contemporary methods, a device's location is never accurately measured for the use of the advertiser, and service providers have no way of collecting profits from advertisements placed onto a user's cellular phones.

In contrast, DSA-based advertising (or DSA-Ad system) not only creates and delivers advertisements differently, but also provides methods that may be more precise and profitable for both advertisers and cellular service providers. DSA-based advertising places control over the advertising process, and profits, with wireless device service providers.

Through DSA-based advertising, a company wishing to promote an advertisement may purchase a DSA-advertisement lease ("DSA-Ad lease"), which places their advertisement on wireless devices located in a particular geographic zone and optionally for a limited period. The DSA-Ad lease may be purchased through a telecommunications exchange in which an advertiser obtains the right to advertise in a certain area and optionally for a limited part of the day. The term of the DSA-Ad lease may be different than the daily period of DSA-Ad delivery. For example, an advertiser may purchase a DSA-Ad lease that lasts for one month, but only delivers advertisements during a few hours each day. Alternatively, the DSA-Ad lease my last only as long as one continuous delivery period. The DSA-Ad lease may provide exclusive rights in the agreed-upon zone or may limit the number of competing business with the same or similar rights.

In accordance with various embodiments, the DSC (e.g., DSC 910a, 910b) may notify the wireless provider (e.g., 903 in FIG. 9) associated with the parameters of a particular DSA-Ad lease, including resource allocations. With DSA-based advertising, the wireless provider, using the parameters of the DSA-Ad lease, may designate specific frequency band channels for advertising. Such channel designations may be reserved to be exclusively used for the DSA-Ad lease during one or more predetermined periods. Once a DSA-Ad lease is established and begun, an advertiser may have the means and the right of way to deliver advertisements to any wireless device's within the constraints of the DSA-Ad lease. In this way, the wireless provider is granted great control over advertising through the wireless provider's network, rather than rest all control outside of the 3GPP standard. With a wireless service provider controlling such advertising, that wireless service provider may have new revenue sources from network resources already in use.

Figure 58:
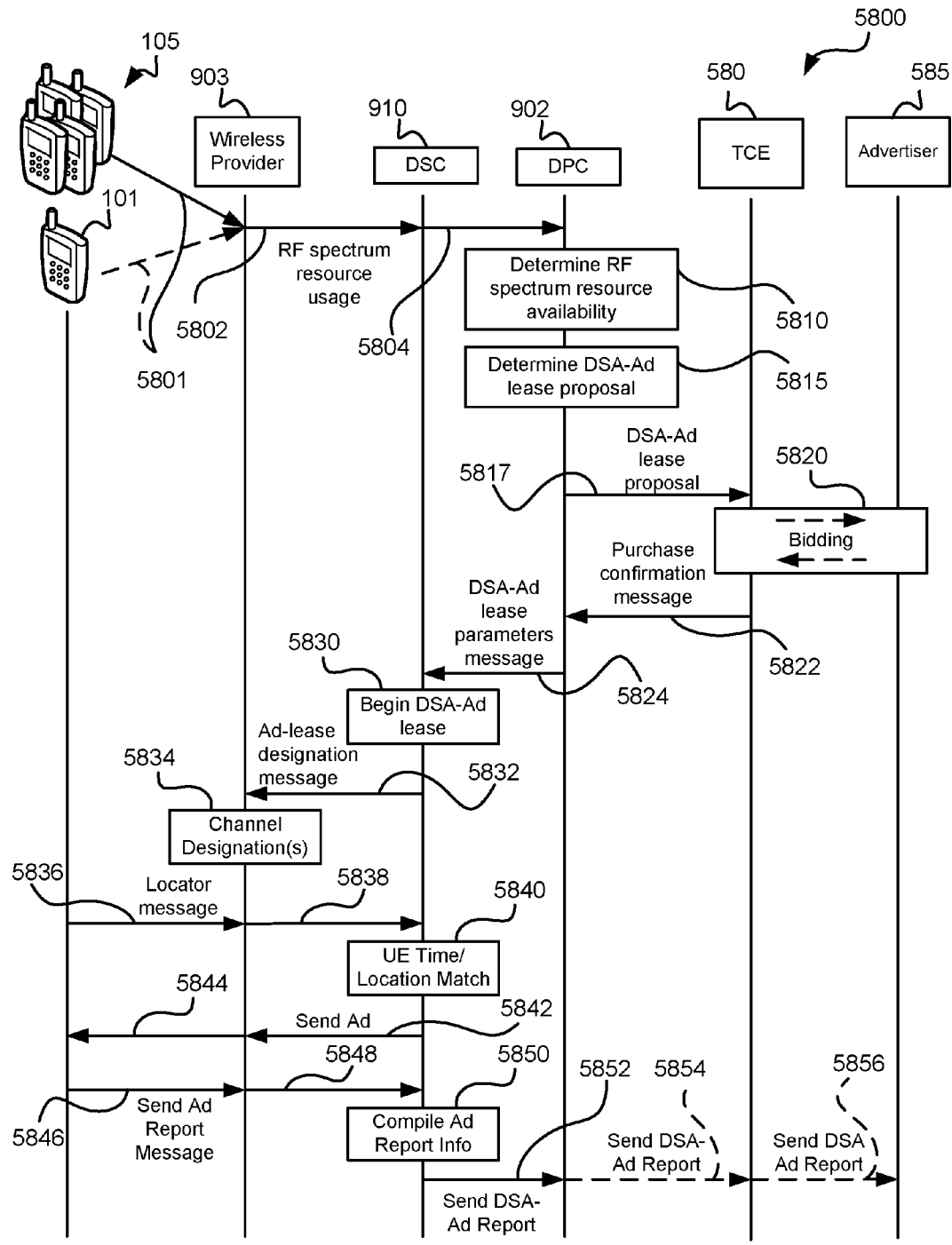
FIG. 58 is a communication flow diagram of a DSA communication system illustrating the establishment and execution of DSA-Ad delivery in accordance with various embodiments.

FIG. 58 illustrates a communication flow diagram 5800 of communications between network components for providing advertisements using DSA, in accordance with various embodiments. One or more wireless device's 101, 105 communicate 5801 with a wireless provider 903, which may provide traditional wireless communications, as well as enhanced services using DSA-based advertising. A particular wireless device 101, which is the target of a subsequent DSA-Ad, does need to be part of the group of wireless device's 105 that communicate 5801 with the wireless provider when collecting network resource information. The wireless network provider 903 may transmit 5804 the network resource information, like RF spectrum resource usage, to the DPC 902 by way of the DSC 910. The RF spectrum resource usage may include information that may be used to assess and determine resource allocations, locate an individual wireless device 101, and/or determine where within the wireless network provider's network a large number of wireless device's 105 are using RF spectrum resources. The DPC 902, which serves a communication server, may compile the network resource information from one or more DSC 910 for assessment. In particular, the DPC 902 may determine RF spectrum resource availability 5810 based on the network resource information from the wireless network 903, which is customarily performed by the DPC 902 as part of conventional DSA. In this way, the DPC 902 may determine additional RF spectrum resources are needed by the wireless provider 903 and initiate conventional DSA. However, in accordance with various embodiments, the DPC 902 may alternatively determine excess RF spectrum resources are available that may be offered for sale as part of a DSA-Ad lease, which is a deviation from conventional DSA.

In various embodiments, the DPC 902 may determine a DSA-Ad lease proposal 5815 based on the determined RF spectrum availability 5810. For example, if the DPC 902 determines a high volume of customers are using service in Zone A (e.g., a downtown area of a city where a convention is taking place), the DPC 902 may prepare/compile a DSA-Ad lease proposal that attempts to exploit additional RF spectrum resources available for servicing wireless customers in Zone A to provide advertising to those customers through a DSA-Ad lease. The reselling of unused RF spectrum on a temporary or long-term basis may monetize excess resources that might otherwise go unused for a time; or as alternative provide new revenue streams for RF spectrum resources. The determined DSA-Ad lease proposal 5815 may include and/or may be based on user equipment (UE) location-based usage information from the determined amount of RF spectrum resources available. The determined DSA-Ad lease proposal 5815 may be prepared/compiled using a rules engine for deciding which terms and conditions to use in a particular DSA-Ad lease. For example, based on historical DSA-Ad lease purchases, the DPC 902 may use all or parts of the most successful DSA-Ad lease proposals to solicit bids from advertisers. Alternatively, the terms may be set or guided by predetermined terms established by the wireless provider 903.

In order to get advertisers 585 to bid on or agree to purchase a DSA-Ad lease proposal, the DPC 902 may send 5817 a prepared DSA-Ad lease proposal by communicating with a Telecommunications Exchange (TCE) 580. The TCE 580 may act as a clearinghouse or auction house for selling/auctioning DSA-Ad leases. Advertisers 585 may access the TCE 580 to participate in auctions and/or directly purchase DSA-Ad leases based on the prepared DSA-Ad lease proposal. The bidding 5820 and/or purchase may be a fee-based process, which may involve the TCE 580 managing the auction or sale of DSA-Ad lease proposals.

During the bidding 5820, the TCE 580 may implement a rule set that may be used to define the types of services, treatments, and duration of Ad-leases delivered to wireless devices through the wireless provider's 903 network. The rule sets may include information such as: 1) requested capacity/boundary; 2) time constraints for advertisement delivery; 3) geographic boundaries in which the DSA-Ad will be delivered; 4) time for when resources are requested; and 5) duration for which requested resources would be used by the DSA-Ads being delivered. It is contemplated that all or a sub-set of these rules may be used depending on the arbitrage scheme. Alternatively, the bidding 5820 may involve the DPC 902 if the DPC 902 allows counter-terms or revisions to the DSA-Ad leases to be proposed by the advertisers 585.

Once the bidding 5820 is settled with a buyer and/or purchase is settled with a buyer, the TCE 580 may communicate a purchase confirmation message 5822 to the DPC 902. In the way, the DPC 902 may receive the purchase confirmation message 5822 of the DSA-Ad lease based on the DSA-Ad lease proposal 5817. The agreed upon DSA-Ad lease may include advertisement-lease parameters defining a first RF spectrum resources allocation for a UE 101 situated within a designated geographic zone. The parameters defining the first RF spectrum resources allocation may be compiled as a message including one or more information units identifying RF spectrum resources (PORT), resource availability/restrictions, traffic allocations, traffic authorizations/restrictions, routing areas, BID AREA etc. In response to receiving the DSA-Ad lease purchase confirmation message 5822, the DPC 902 may send DSA advertisement-lease parameters to the DSC 910, which may act as an intermediate server to the one or more servers more directly associated with the wireless provider 903.

The DSC 910 may begin the DSA-Ad lease in accordance with the DSA-Ad lease parameters 5824. In this way, the DSC 910 may send an ad-lease designation message 5832 to the wireless provider 903. The ad-lease designation message 5832 may include time and space designations of the DSA-AD lease, which the wireless provider 903 may use to dedicate the appropriate resources for compliance with the DSA-Ad lease. The time and space designation may define time limitations for when the ad-information unit should be delivered. In addition, the time and space designation may identify the designated geographic zone for delivery of the ad-information unit. Upon receipt of the ad-lease designation message 5832, the wireless provider 903 may make one or more channel designations 5834. The channel designations 5834 may include a dedicated UE port identifier or address designation for delivering DSA-based advertisements to a UE 101 using cellular service within one or more designated geographic zones. In addition, the channel designations 5834 may include time-limits in which customers should receive the DSA-based advertisements. Once the channel designation(s) 5834 is/are established, the wireless provider may receive a locator message 5836 from a UE 101 that identifies a current location of the UE 101. The wireless provider 903 may forward the locator message or send a translated locator message 5838 to the DSC 910 that identifies the UE 101 as meeting all or part of the parameters of the DSA-Ad lease (i.e., indicating the UE 101 is situated in the designated geographic zone).

The DSC 902 may receive the message 5838 from the wireless provider 903 to determine whether the UE 101 is located within the geographic zone during the appropriate time window that complies with the DSA-Ad lease. If the timing and the UE's 101 are a match (i.e., a UE Time/Location Match) 5840 to the DSA-Ad lease, the DSC 910 may send an advertisement 5842, in accordance with the DSA-Ad lease, to the wireless provider 903 for delivery 5844 to the UE 101. Delivery 5844 of an advertisement in this way may appear to a user of the UE 101 the same as any other advertisement. However, in accordance with various embodiments the DSA-Ad may be more appropriate and/or more interesting to the user since more precise location information was used an matched with providers of goods and/or services in close proximity to the UE 101.

With the DSA-Ad delivered and/or run on the UE 101, an application on the UE 101 may be configured to send one or more an Ad reports 5846, 5848 to the DSC 910 by way of the wireless provider 903. Such Ad reports 5846, 5848 may provide information about how a user of the UE 101 responded or did not respond to the DSA-Ad. Alternatively, the wireless provider 903 may just deliver an Ad report 5848 to the DSC 910 after sending the DSA-Ad to the UE 101. The DSC 910 may compile Ad report information 5850, which may be sent as a DSA-Ad report 5852 to the DPC 902. Optionally, DSA-Ad report may be transmitted 5854 to the TCE 580 for delivery 5856 to the advertiser 585 as feedback on how often the DSA-Ads are reaching customers.

Figure 59:
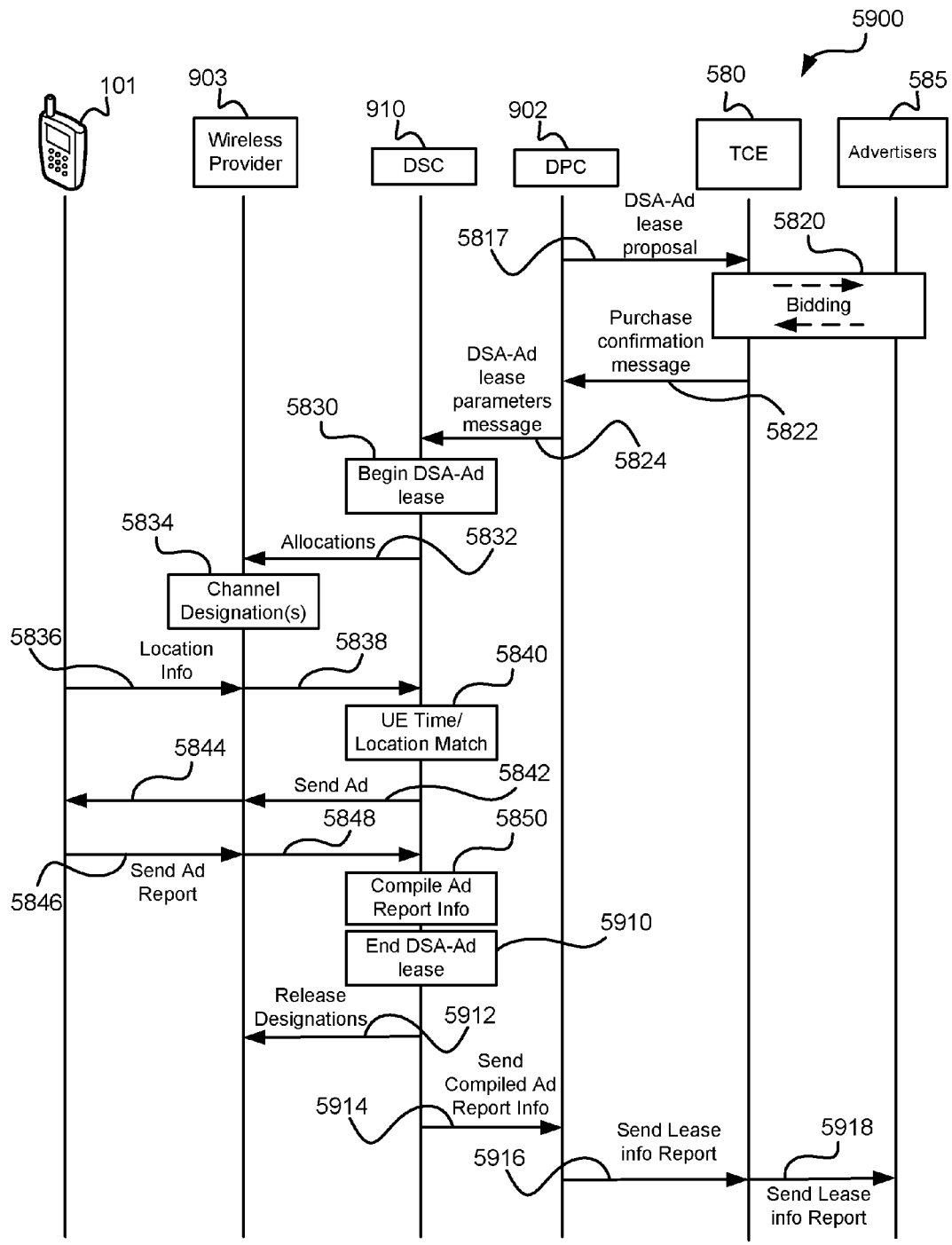
FIG. 59 is a communication flow diagram of a DSA communication system illustrating the end of a DSA-Ad lease and the reporting thereof in accordance with various embodiments.

FIG. 59 illustrates a communication flow diagram 5900, similar to communication flow diagram 5800, but additionally illustrating circumstances once a DSA-Ad lease has ended, in accordance with various embodiments. Once the DSC 910 compiles Ad report information 5850 and the DSA-Ad lease has ended 5910, the DSC 910 may send a message 5912 to the wireless provider 903 to release the appropriate channel designations. In addition, the DSC 910 may send compiled advertisement report information 5914 to the DPC 902. The DPC 902 may send a lease information report 5916 to the TCE 580, which may also be conveyed 5918 to the advertiser 585.

Figure 60:
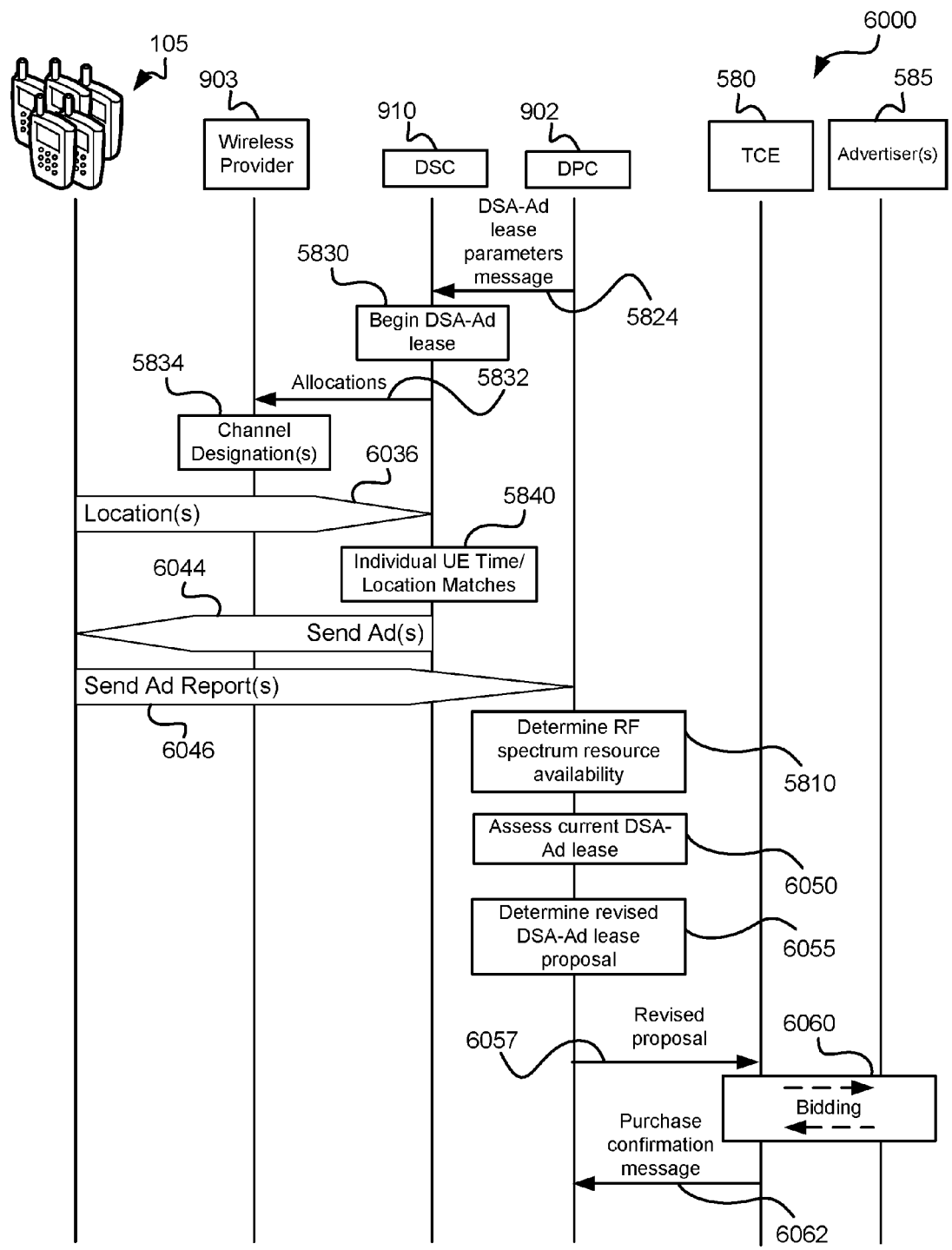
FIG. 60 is a communication flow diagram of a DSA communication system illustrating the assessment and revision of a DSA-Ad lease in accordance with various embodiments.

FIG. 60 illustrates a communication flow diagram 6000, similar to communication flow diagrams 5800, 5900, but additionally illustrating circumstances in which a DSA-Ad lease may be assessed and revised with an advertiser after the DSA-Ad lease began, in accordance with various embodiments.

In response to the channel designations 5834, a plurality of UE's 105 may individually report their location information 6036 to the DSC 910 via the wireless provider 903. After individual UE time/location matches 5840, the DSC 910 may selectively deliver 6044 DSA advertisements to individual UE's 105 and the UE's may individually send Ad reports 6046 back to the DPC 902, by way of the wireless provider 903 and the DSC 910. The Ad reports 6046 may include information about whether and how the UE's 105 interacted with the delivered advertisements.

The DPC 902 may periodically or continuously determine FR spectrum resource availability 5810. In particular, after receiving Ad reports 6046 from the UE's 6046, the DPC 902 may make a more current determination of RF spectrum resources that are and are not available. The more current determination of RF spectrum resources 5810 may then be used by the DPC 902 to assess the current DSA-Ad lease. The DPC 902 may be configured with rules that determine a revised DSA-Ad lease proposal 6055 that may be published under various circumstances. For example, if circumstances indicate an advertiser would be dissatisfied with a current DSA-Ad lease, the DPC 902 could be programmed to offer a revised DSA-Ad lease 6055 that gives an advertiser a discount or extends the geographic region or period during which the advertiser's advertisements get delivered. The DPC 902 may publish a revised DSA-Ad lease proposal 6057 by communicating with the TCE 580. The TCE 580 may once again act as a clearinghouse or auction house for renegotiating, selling, and/or auctioning the revised DSA-Ad lease. Advertisers 585 may access the TCE 580 to participate in auctions and/or directly purchase DSA-Ad leases based on the prepared DSA-Ad lease proposal. As before, once the bidding 6060 is settled with a buyer and/or purchase is settled with a buyer, the TCE 580 may communicate a purchase confirmation message 6062 to the DPC 902 and the process may continue accordingly.

Over time, different tiered levels of advertising may be offered, rather than just giving the rights flat out to whoever won the auction. One level customer may have their advertisements appear more often than a lower level customer. For example, a platinum level customer's advertisement may show up seventy five percent of the time, while a gold level customer's advertisement may show up the other twenty five percent of the time.

Mobile applications may be developed and used as a platform to allow businesses (i.e., existing advertisers) to monitor the effectiveness of their advertisement space from anywhere. In this way, those businesses may participate in further DSA-Ad lease auctions at any time. Also, the businesses may gain the ability to adjust how and when they advertise from anywhere at any time. Such tools may provide more control and feedback to such business of their advertising campaigns.

As yet a further alternative, mobile applications may be developed and deployed that get paid for, at least in-part, by the advertisers who pay for the RF spectrum resources used for the application. Some mobile applications upload or download a great deal of data, which requires RF spectrum resources. Using DSA-Ad leases, advertisers may provide the RF spectrum resources needed by the mobile application in exchange for having the advertisements delivered to the wireless device while the application is in use.

There is continually increasing amount of revenue to be found in mobile advertising. DSA advertisements may be utilized effectively not only by advertisers, but by network service providers as well.

Figure 61:
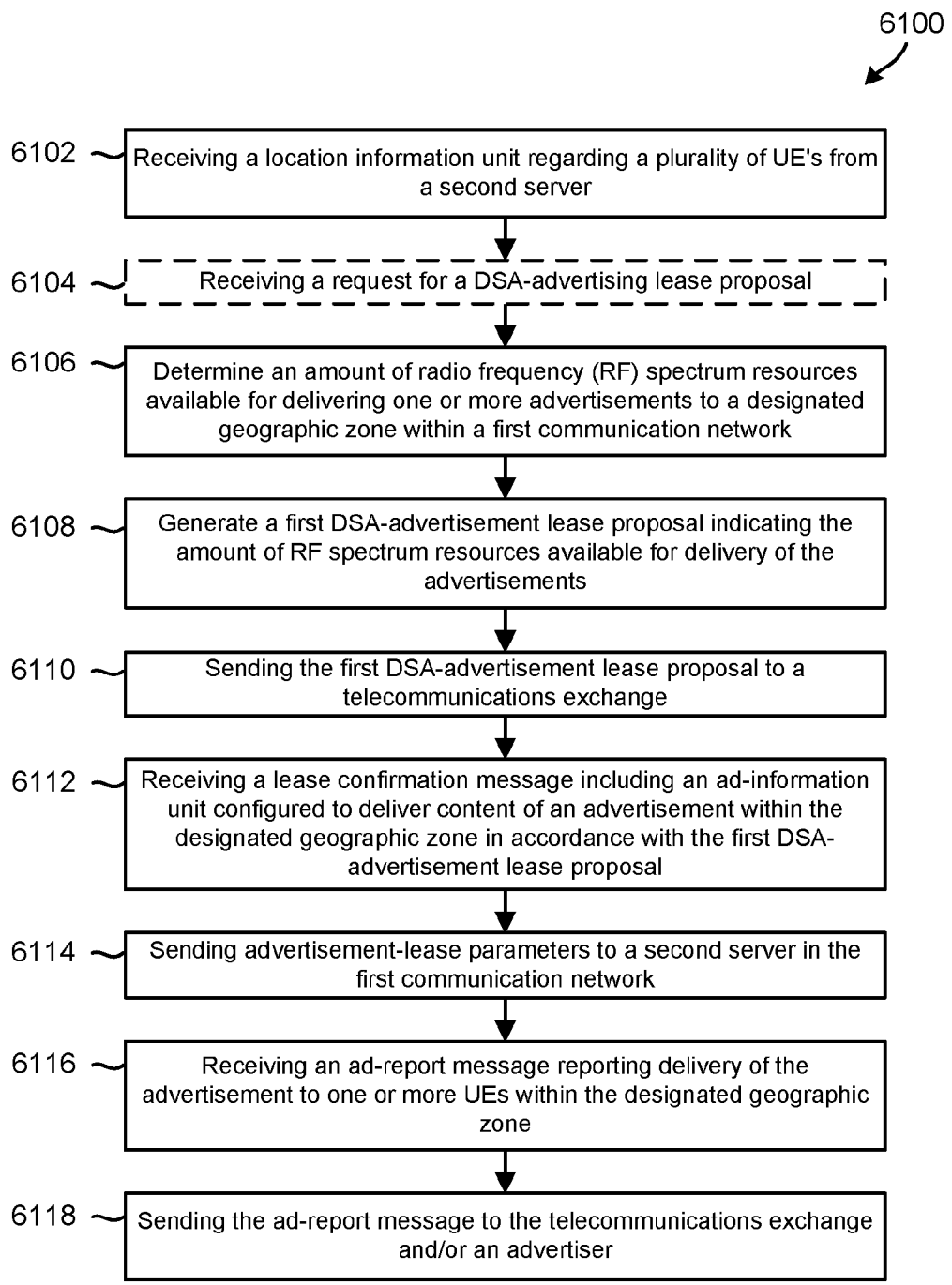
FIGS. 61 through 62 are process flow diagrams of embodiment methods for enabling a DSA communication system to establish and execute DSA-Ad delivery in accordance with various embodiments.

FIG. 61 illustrates an example process flow of a DSA method 6100 that may be used to implement a DSA communication system to establish and execute DSA-Ad delivery in accordance with various embodiments. The DSA method 6100 may be implemented by a first server, such as the DSP (e.g., 902 in FIGS. 58-60). In block 6102, the first server may receive from a second server, such as the DSC (e.g., 910 in FIGS. 58-60) a location information unit regarding a plurality of UEs. The determined amount of RF spectrum resources available may be based on the received location information. In optional block 6104, the first server may receive from the telecommunications exchange (e.g., 580 in FIGS. 58-60) a request for a DSA-advertising lease proposal. The request may define (i.e., prescribe) the designated geographic zone. In block 6106, the first server may determine an amount of radio frequency (RF) spectrum resources available for delivery of one or more advertisements to a designated geographic zone (e.g., Zone A in FIG. 57) within a first communication network. In block 6108, the first server may generate a first DSA-advertisement lease proposal indicating the amount of RF spectrum resources available for delivery of the one or more advertisements. In block 6110, the first server may send the first DSA-advertisement lease proposal to the telecommunications exchange. In block 6112, the first server may receive a lease confirmation message, from the telecommunications exchange, including an ad-information unit configured to deliver content of an advertisement within the designated geographic zone in accordance with the first DSA-advertisement lease proposal. The advertisement may be provided by an advertiser or third-party to the lease. In block 6114, the first server may send advertisement-lease parameters to the second server in the first communication network. The advertisement-lease parameters may include the ad-information unit and identify the designated geographic zone for delivery of the advertisement to user equipment (UE) situated within the designated geographic zone. In addition, the advertisement-lease parameters may include a period of the lease, including when the lease terminates. In block 6116, the first server may receive an ad-report message, from the second server, reporting delivery of the advertisement to one or more UEs within the designated geographic zone. In block 6118, the first server may send the ad-report message to at least one of the telecommunications exchange and an advertiser.

Figure 62:
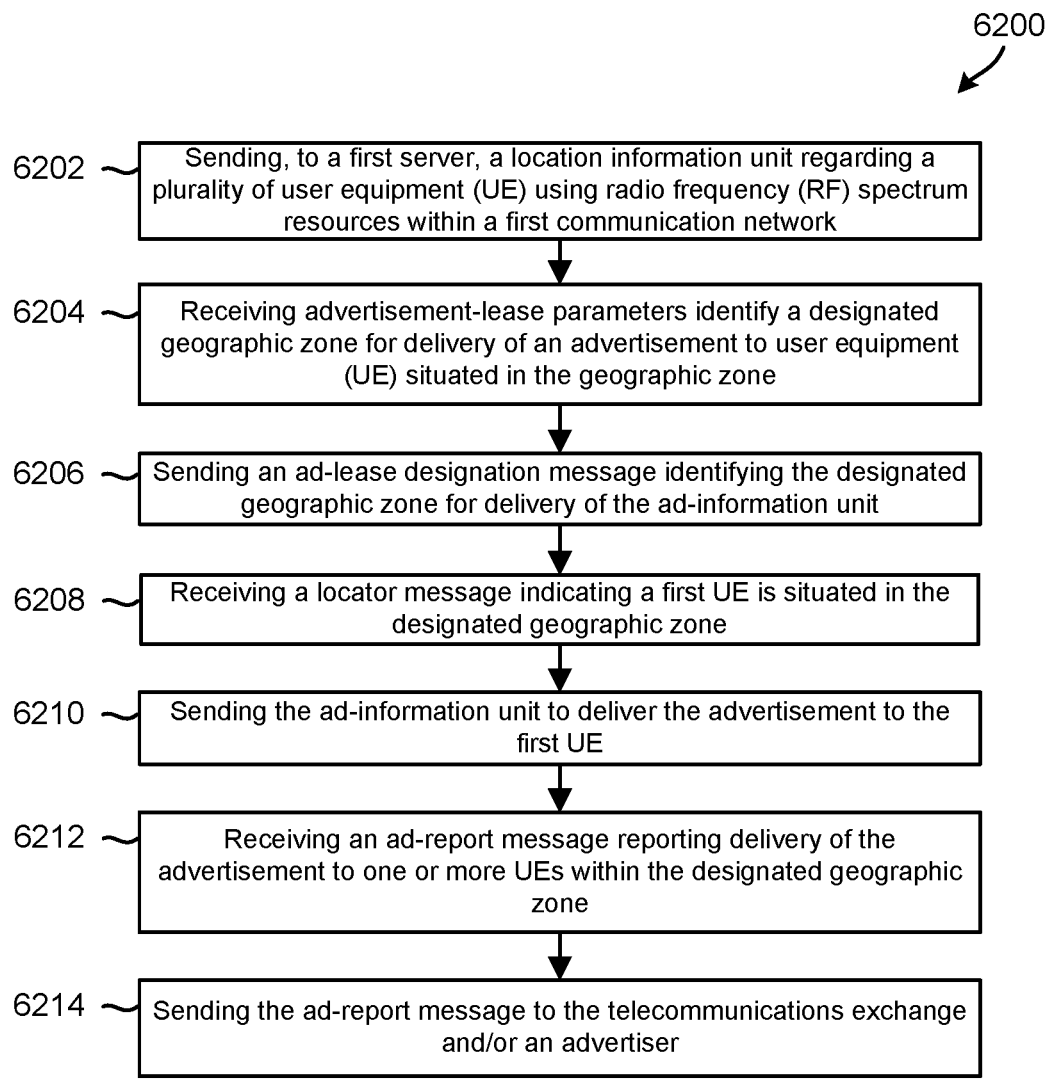

FIG. 62 illustrates an example process flow of a DSA method 6200 that may be used to implement a DSA communication system to establish and execute DSA-Ad delivery in accordance with various embodiments. The DSA method 6200 may be implemented by a second server, such as the DSC (e.g., 910 in FIGS. 58-60). In block 6202, the second server may send to a first server, such as the DSP (e.g., 902 in FIGS. 58-60) a location information unit regarding a plurality of user equipment (UE) using radio frequency (RF) spectrum resources within a first communication network. In block 6204, the second server may receive from the first server advertisement-lease parameters identify a designated geographic zone for delivery of an advertisement to UEs situated within the designated geographic zone. The advertisement-lease parameters may include an ad-information unit configured to deliver content of the advertisement within the designated geographic zone. In block 6206, the second server may send to a second communication network, such as to a wireless provider (e.g., 903 in FIGS. 58-60), an ad-lease designation message identifying the designated geographic zone for delivery of the ad-information unit. In block 6208, the second server may receive a locator message indicating a first UE is situated in the designated geographic zone. The locator message may be transmitted to the second server from the second communication network. In block 6210, the second server may send to the second communication network, the ad-information unit to deliver the advertisement to the first UE. In block 6212, the second server may receive from the second communication network an ad-report message reporting delivery of the advertisement to one or more UEs within the designated geographic zone. In block 6214, the second server may send to the first server the ad-report message.

Figure 63:
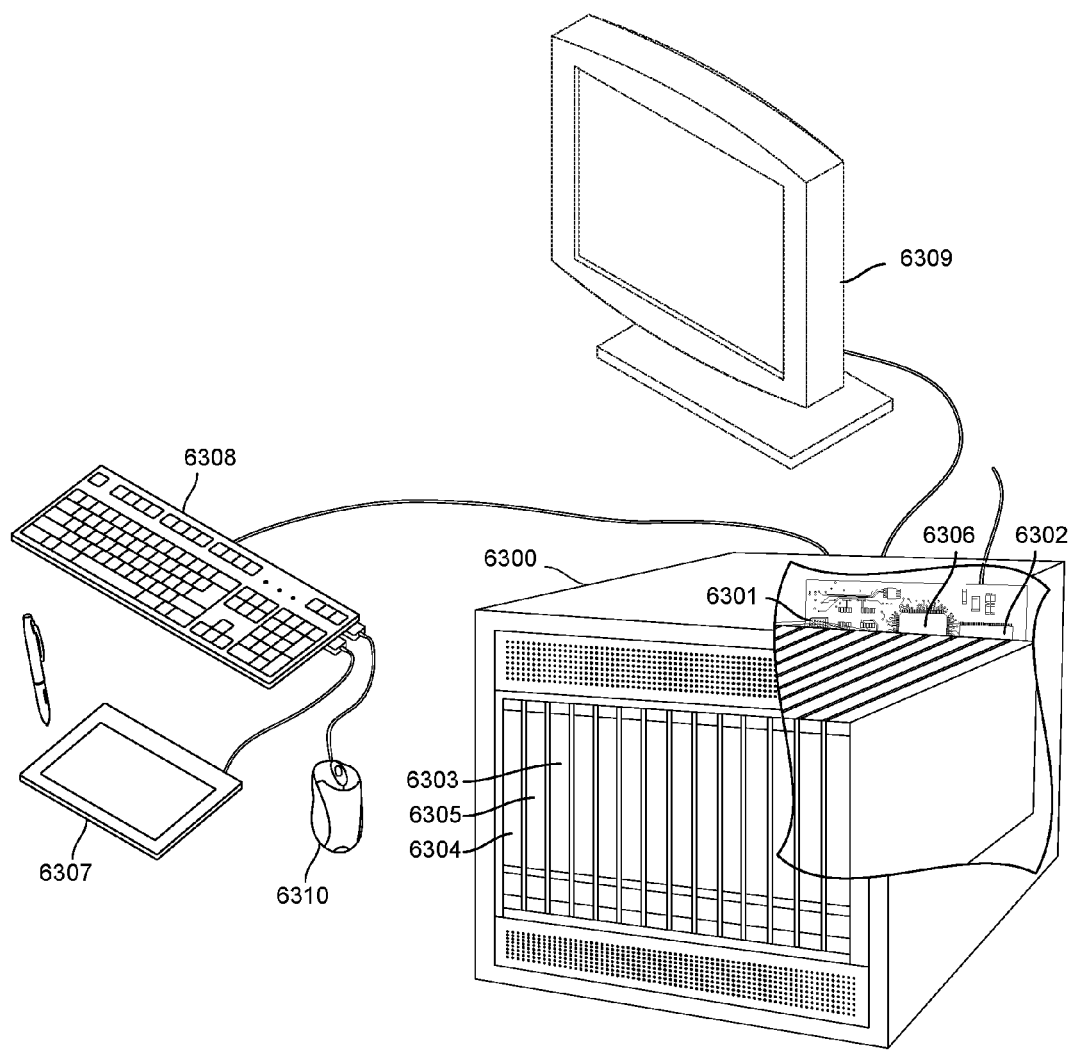
FIG. 63 is a component block diagram of a server suitable for use with an embodiment.

The embodiments described above, including the spectrum arbitrage functions, may be implemented within a broadcast system on any of a variety of commercially available server devices, such as the server 6300 illustrated in FIG. 63. Such a server 6300 typically includes a processor 6301 coupled to volatile memory 6302 and a large capacity nonvolatile memory, such as a disk drive 6303. The server 6300 may also include a floppy disc drive and/or a compact disc (CD) drive 6306 coupled to the processor 6301. The server 6300 may also include network access ports 6304 coupled to the processor 6301 for establishing data connections with a network 6305, such as the Internet and local networks for communicating with broadcast system equipment.

The processor 6301 may be any programmable microprocessor, microcomputer or multiple processor chip or chips that can be configured by software instructions (applications) to perform a variety of functions, including the functions of the various embodiments described herein. In some receiver devices, multiple processors 6301 may be provided, such as one processor dedicated to wireless communication functions and one processor dedicated to running other applications. Typically, software applications may be stored in the internal memory 6302 before they are accessed and loaded into the processor 6301. In some servers, the processor 6301 may include internal memory sufficient to store the application software instructions. In some receiver devices, the secure memory may be in a separate memory chip coupled to the processor 6301. The internal memory 6302 may be a volatile or nonvolatile memory, such as flash memory, or a mixture of both. For the purposes of this description, a general reference to memory refers to all memory accessible by the processor 6301, including internal memory 6302, removable memory plugged into the device, and memory within the processor 6301 itself.

Embodiments include methods for managing, allocating and arbitraging RF bandwidth and DSA-Ad leases as described above. Embodiments also include the communication systems that enable the DSA methods described herein. Embodiments also include the non-transitory computer-readable storage media storing computer-executable instructions for performing the methods described above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such as, non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A dynamic spectrum arbitrage (DSA) method, comprising:
    determining, in a first server, an amount of radio frequency (RF) spectrum resources available for delivery of one or more advertisements to a designated geographic zone within a first communication network;
    sending a first DSA-advertisement lease proposal from the first server to a telecommunications exchange, wherein the first DSA-advertisement lease proposal indicates the amount of RF spectrum resources available for delivery of the one or more advertisements;
    receiving, in the first server, a lease confirmation message including an ad-information unit configured to deliver content of an advertisement within the designated geographic zone in accordance with the first DSA-advertisement lease proposal;
    sending advertisement-lease parameters to a second server in the first communication network, wherein the advertisement-lease parameters include the ad-information unit and identify the designated geographic zone for delivery of the advertisement to user equipment (UE) situated therein; and
    receiving, in the first server, an ad-report message from the second server reporting delivery of the advertisement to one or more UEs within the designated geographic zone.

2. The DSA method of claim 1, further comprising:
    receiving, from the second server, a location information unit regarding a plurality of UEs, wherein the determined amount of RF spectrum resources available is based on the received location information.

3. The DSA method of claim 1, wherein the advertisement-lease parameters limit a period during which the advertisement is delivered to the UE situated in the designated geographic zone.

4. The DSA method of claim 1, further comprising:
    generating a second DSA-advertisement lease proposal including revisions from the first DSA-advertisement lease proposal based on the received ad-report message; and
    sending the second DSA-advertisement lease proposal from the first server to the telecommunications exchange.

5. The DSA method of claim 1, wherein the first DSA-advertisement lease proposal is sent to the telecommunications exchange to offer a DSA-Ad lease as part of an auction, wherein the DSA-Ad lease dedicates at least a portion of the determined amount of RF spectrum resources for delivering the one or more advertisements within the first communication network.

6. The DSA method of claim 5, wherein the DSA-Ad lease limits a boundary within the designated geographic zone in which the advertisement is delivered.

7. The DSA method of claim 5, wherein the DSA-Ad lease limits a period during which the advertisement is delivered to the UE situated in the designated geographic zone.

8. The DSA method of claim 1, further comprising:
    receiving, in the first server, a request for a DSA-advertising lease proposal from the telecommunications exchange, wherein the request defines the designated geographic zone.

9. The DSA method of claim 1, wherein determining the amount of RF spectrum resources available for delivery of advertisements comprises:
    monitoring communications in the first communication network to determine the amount of RF spectrum resources in use; and
    determining a difference between the amount of RF spectrum resources controlled by the first communication network and the determined amount of RF spectrum resources in use.

10. The DSA method of claim 1, further comprising:
    sending, by the first server, the ad-report message to at least one of the telecommunications exchange and an advertiser, wherein the ad-report message reports delivery of the advertisement to the one or more UEs within the designated geographic zone.

11. A dynamic spectrum arbitrage (DSA) method, comprising:
    sending, to a first server, a location information unit regarding a plurality of user equipment (UE) using radio frequency (RF) spectrum resources within a first communication network;
    receiving, from the first server, advertisement-lease parameters identify a designated geographic zone for delivery of an advertisement to UEs situated therein, wherein the advertisement-lease parameters include an ad-information unit configured to deliver content of the advertisement within the designated geographic zone; and
    sending, to a second communication network, an ad-lease designation message identifying the designated geographic zone for delivery of the ad-information unit;
    receiving a locator message indicating a first UE is situated in the designated geographic zone; and
    sending, to the second communication network, the ad-information unit to deliver the advertisement to the first UE.

12. The DSA of claim 11, further comprising:
    receiving, from the second communication network, an ad-report message reporting delivery of the advertisement to one or more UEs within the designated geographic zone.

13. The DSA of claim 11, further comprising:
    sending, to the first server, an ad-report message reporting delivery of the advertisement to one or more UEs within the designated geographic zone.

14. A dynamic spectrum policy controller, comprising:
    network communications circuitry for communicating with a telecommunications exchange and a dynamic spectrum controller;
    a memory; and
    a processor coupled to the memory and the network communications circuitry, wherein the processor is configured with processor-executable instructions to perform operations comprising:
        determining an amount of radio frequency (RF) spectrum resources available for delivery of one or more advertisements to a designated geographic zone within a first communication network of the dynamic spectrum controller;
        sending a first DSA-advertisement lease proposal to the telecommunications exchange, wherein the first DSA-advertisement lease proposal indicates the amount of RF spectrum resources available for delivery of the one or more advertisements;
        receiving a lease confirmation message including an ad-information unit configured to deliver content of an advertisement within the designated geographic zone in accordance with the first DSA-advertisement lease proposal;

sending advertisement-lease parameters to the dynamic spectrum controller, wherein the advertisement-lease parameters include the ad-information unit and identify the designated geographic zone for delivery of the advertisement to user equipment (UE) situated therein; and receiving an ad-report message from the dynamic spectrum controller reporting delivery of the advertisement to one or more UEs within the designated geographic zone.

15. The dynamic spectrum policy controller of claim 14, wherein the processor is configured with the processor-executable instructions to further perform operations comprising:

receiving, from the dynamic spectrum controller, a location information unit regarding a plurality of UEs, wherein the determined amount of RF spectrum resources available is based on the received location information.

16. The dynamic spectrum policy controller of claim 14, wherein the processor is configured with the processor-executable instructions such that the advertisement-lease parameters limit a period during which the advertisement is delivered to the UE situated in the designated geographic zone.

17. The dynamic spectrum policy controller of claim 14, wherein the processor is configured with the processor-executable instructions to further perform operations comprising:

generating a second DSA-advertisement lease proposal including revisions from the first DSA-advertisement lease proposal based on the received ad-report message; and sending the second DSA-advertisement lease proposal to the telecommunications exchange.

18. The dynamic spectrum policy controller of claim 14, wherein the processor is configured with the processor-executable instructions to further perform operations comprising:

conducting an auction for a DSA-Ad lease that dedicates at least a portion of the determined amount of RF spectrum resources for delivering the one or more advertisements within the first communication network.

19. The dynamic spectrum policy controller of claim 14, wherein the processor is configured with the processor-executable instructions such that a DSA-Ad lease limits a boundary within the designated geographic zone in which the advertisement is delivered.

20. The dynamic spectrum policy controller of claim 14, wherein the processor is configured with the processor-executable instructions such that a DSA-Ad lease limits a period during which the advertisement is delivered to the UE situated in the designated geographic zone.

21. The dynamic spectrum policy controller of claim 14, wherein the processor is configured with the processor-executable instructions to further perform operations comprising:

receiving a request for a DSA-advertising lease proposal, wherein the request defines the designated geographic zone.

22. The dynamic spectrum policy controller of claim 14, wherein the processor is configured with the processor-executable instructions to further perform operations comprising:

monitoring communications in the first communication network to determine the amount of RF spectrum resources in use; and determining a difference between the amount of RF spectrum resources controlled by the first communication network and the determined amount of RF spectrum resources in use.

23. The dynamic spectrum policy controller of claim 14, wherein the processor is configured with the processor-executable instructions to further perform operations comprising:

sending the ad-report message to at least one of the telecommunications exchange and an advertiser reporting delivery of the advertisement to the one or more UEs within the designated geographic zone.

24. A dynamic spectrum controller, comprising:

network communications circuitry for communicating with a dynamic spectrum policy controller (DSP) within a first communication network and a server within a second communication network;

a memory; and a processor coupled to the memory and the network communications circuitry, wherein the processor is configured with processor-executable instructions to perform operations comprising:

sending, to the DSP, a location information unit regarding a plurality of user equipment (UE) using radio frequency (RF) spectrum resources within a first communication network;

receiving, from the DSP, advertisement-lease parameters identify a designated geographic zone for delivery of an advertisement to UEs situated therein, wherein the advertisement-lease parameters include an ad-information unit configured to deliver content of the advertisement within the designated geographic zone; and sending, to the second communication network, an ad-lease designation message identifying the designated geographic zone for delivery of the ad-information unit;

receiving a locator message indicating a first UE is situated in the designated geographic zone; and sending, to the second communication network, the ad-information unit to deliver the advertisement to the first UE.

25. The dynamic spectrum controller of claim 24, wherein the processor is configured with the processor-executable instructions to further perform operations comprising:

receiving, from the second communication network, an ad-report message reporting delivery of the advertisement to one or more UEs within the designated geographic zone.

26. The dynamic spectrum controller of claim 24, wherein the processor is configured with the processor-executable instructions to further perform operations comprising:

sending, to the DSP, an ad-report message reporting delivery of the advertisement to one or more UEs within the designated geographic zone.

27. A dynamic spectrum arbitrage (DSA) system, comprising:

a first server within a first communication network comprising:

first network communications circuitry for communicating with a telecommunications exchange and a second server within a first communication network;

a first memory; and a first processor coupled to the first memory and the network communications circuitry, wherein the processor is configured with first processor-executable instructions to perform operations comprising:
  determining an amount of radio frequency (RF) spectrum resources available for delivery of one or more advertisements to a designated geographic zone within a first communication network of the second server;
  sending a first DSA-advertisement lease proposal to the telecommunications exchange, wherein the first DSA-advertisement lease proposal indicates the amount of RF spectrum resources available for delivery of the one or more advertisements;
  receiving a lease confirmation message including an ad-information unit configured to deliver content of an advertisement within the designated geographic zone in accordance with the first DSA-advertisement lease proposal;
  sending advertisement-lease parameters to the second server,
  wherein the advertisement-lease parameters include the ad-information unit and identify the designated geographic zone for delivery of the advertisement to user equipment (UE) situated therein; and
a second server comprising:
  second network communications circuitry for communicating with the first server and a third server within a second communication network;
  a second memory; and
  a second processor coupled to the second memory and the second network communications circuitry, wherein the second processor is configured with second processor-executable instructions to perform operations comprising:
    receiving, from the first server, advertisement-lease parameters identify the designated geographic zone for delivery of the advertisement to UEs situated therein, wherein the advertisement-lease parameters include the ad-information unit configured to deliver the content of the advertisement within the designated geographic zone; and
    sending, to the second communication network, an ad-lease designation message identifying the designated geographic zone for delivery of the ad-information unit;
    receiving a locator message indicating a first UE is situated in the designated geographic zone; and
    sending, to the second communication network, the ad-information unit to deliver the advertisement to the first UE.

28. A first server, comprising:
means for determining an amount of radio frequency (RF) spectrum resources available for delivery of one or more advertisements to a designated geographic zone within a first communication network;
means for sending a first DSA-advertisement lease proposal to a telecommunications exchange, wherein the first DSA-advertisement lease proposal indicates the amount of RF spectrum resources available for delivery of the one or more advertisements;
means for receiving a lease confirmation message including an ad-information unit configured to deliver content of an advertisement within the designated geographic zone in accordance with the first DSA-advertisement lease proposal;
means for sending advertisement-lease parameters to a second server in the first communication network, wherein the advertisement-lease parameters include the ad-information unit and identify the designated geographic zone for delivery of the advertisement to user equipment (UE) situated therein; and
means for receiving, in the first server, an ad-report message from the second server reporting delivery of the advertisement to one or more UEs within the designated geographic zone.

29. A non-transitory processor-readable storage medium having stored thereon processor-executable instructions configured to cause a first server to perform dynamic spectrum arbitrage (DSA) operations comprising:
  determining, in a first server, an amount of radio frequency (RF) spectrum resources available for delivery of one or more advertisements to a designated geographic zone within a first communication network;
  sending a first DSA-advertisement lease proposal from the first server to a telecommunications exchange, wherein the first DSA-advertisement lease proposal indicates the amount of RF spectrum resources available for delivery of the one or more advertisements;
  receiving, in the first server, a lease confirmation message including an ad-information unit configured to deliver content of an advertisement within the designated geographic zone in accordance with the first DSA-advertisement lease proposal;
  sending advertisement-lease parameters to a second server in the first communication network, wherein the advertisement-lease parameters include the ad-information unit and identify the designated geographic zone for delivery of the advertisement to user equipment (UE) situated therein; and
  receiving, in the first server, an ad-report message from the second server reporting delivery of the advertisement to one or more UEs within the designated geographic zone.

30. A non-transitory processor-readable storage medium having stored thereon processor-executable instructions configured to cause a second server, in communication with a first server, to perform dynamic spectrum arbitrage (DSA) operations comprising:
  sending, to the first server, a location information unit regarding a plurality of user equipment (UE) using radio frequency (RF) spectrum resources within a first communication network;
  receiving, from the first server, advertisement-lease parameters identify a designated geographic zone for delivery of an advertisement to UEs situated therein, wherein the advertisement-lease parameters include an ad-information unit configured to deliver content of the advertisement within the designated geographic zone; and
  sending, to a second communication network, an ad-lease designation message identifying the designated geographic zone for delivery of the ad-information unit;
  receiving a locator message indicating a first UE is situated in the designated geographic zone; and
  sending, to the second communication network, the ad-information unit to deliver the advertisement to the first UE.

* * * * *